US011897347B2

(12) United States Patent
Slepchenkov et al.

(10) Patent No.: US 11,897,347 B2
(45) Date of Patent: Feb. 13, 2024

(54) SYSTEMS, DEVICES, AND METHODS FOR CHARGING AND DISCHARGING MODULE-BASED CASCADED ENERGY SYSTEMS

(71) Applicant: TAE TECHNOLOGIES, INC., Foothill Ranch, CA (US)

(72) Inventors: Mikhail Slepchenkov, Lake Forest, CA (US); Roozbeh Naderi, Foothill Ranch, CA (US); Milan Bhakta, Irvine, CA (US); Romi S. Kadri, Santa Barbara, CA (US)

(73) Assignee: TAE Technologies, Inc., Foothill Ranch (CA)

(*) Notice: Subject to any disclaimer, the term of this patent is extended or adjusted under 35 U.S.C. 154(b) by 0 days.

(21) Appl. No.: 17/229,764

(22) Filed: Apr. 13, 2021

(65) Prior Publication Data

US 2021/0316621 A1 Oct. 14, 2021

Related U.S. Application Data

(60) Provisional application No. 63/084,300, filed on Sep. 28, 2020, provisional application No. 63/069,369, (Continued)

(51) Int. Cl.
*B60L 53/00* (2019.01)
*B60L 53/10* (2019.01)
(Continued)

(52) U.S. Cl.
CPC ............... *B60L 53/11* (2019.02); *B60L 53/14* (2019.02); *B60L 58/18* (2019.02); *B60L 2210/30* (2013.01)

(58) Field of Classification Search
CPC .......... B60L 53/11; B60L 53/14; B60L 58/18; B60L 2210/30; Y02T 10/70; Y02T 10/7072; Y02T 10/72; Y02T 90/14
(Continued)

(56) References Cited

U.S. PATENT DOCUMENTS 5,204,548 A 4/1993 Daehler et al.
5,428,522 A 6/1995 Millner et al.
(Continued)

FOREIGN PATENT DOCUMENTS

CA 2 810 369 A1 3/2012
CN 201789411 U 4/2011
(Continued)

OTHER PUBLICATIONS

EP, 18816636.7 Extended Search Report, dated Feb. 18, 2021.
(Continued)

*Primary Examiner* — Paul Dinh
(74) *Attorney, Agent, or Firm* — Fish & Richardson P.C.

(57) ABSTRACT

Example embodiments of systems, devices, and methods are provided for charging and discharging energy systems having multiple modules arranged in cascaded fashion for generating and storing power. Each module can include an energy source and switch circuitry that selectively couples the energy source to other modules in the system for generating power or for receiving and storing power from a charge source. The energy systems can be arranged in single phase or multiphase topologies with multiple serial or interconnected arrays. The embodiments are capable of being charged with multiphase AC charge signals, a single phase AC charge signal, and/or a DC charge signal. Embodiments implementing the modular energy system within a charge source for performing multiphase, single phase AC, or DC charging of electric vehicles are also dis-
(Continued)

closed are multi-motor embodiments and embodiments with the capability to power active suspensions and active steering systems.

21 Claims, 63 Drawing Sheets

Related U.S. Application Data filed on Aug. 24, 2020, provisional application No. 63/043,731, filed on Jun. 24, 2020, provisional application No. 63/009,996, filed on Apr. 14, 2020.

(51) Int. Cl.
*B60L 53/14* (2019.01)
*B60L 58/18* (2019.01)

(58) Field of Classification Search
USPC .......................................................... 320/107
See application file for complete search history.

(56) References Cited

U.S. PATENT DOCUMENTS 5,642,275 A 6/1997 Peng et al.
5,905,371 A 5/1999 Limpaecher
5,933,339 A 8/1999 Duba et al.
5,949,664 A 9/1999 Bernet et al.
6,051,961 A 4/2000 Jang et al.
6,058,032 A 5/2000 Yamanaka et al.
6,064,180 A 5/2000 Sullivan et al.
6,236,580 B1 5/2001 Aiello et al.
6,373,734 B1 4/2002 Martinelli
7,091,701 B2 8/2006 Turner et al.
7,485,987 B2 2/2009 Mori et al.
8,395,280 B2 3/2013 Graovac et al.
8,476,888 B1 7/2013 Chen et al.
8,503,202 B2 8/2013 Chimento et al.
8,614,525 B2 12/2013 Teichmann et al.
8,829,723 B2 9/2014 Graovac et al.
9,172,254 B2 10/2015 Ganor
9,444,275 B2 9/2016 Huang et al.
9,461,474 B2 10/2016 Deboy et al.
9,673,732 B2 6/2017 Deboy et al.
10,014,611 B2 7/2018 Götz
10,074,995 B2 9/2018 Smedley et al.
10,193,359 B2 1/2019 Ganor
10,218,189 B2 2/2019 Goetz
10,291,037 B2 5/2019 Birkl et al.
10,391,870 B2 8/2019 Götz et al.
10,396,682 B2 8/2019 Götz et al.
10,439,506 B2 10/2019 Götz
10,442,309 B2 10/2019 Götz
10,454,331 B2 10/2019 Götz
10,473,728 B2 11/2019 Goetz
10,630,201 B2 4/2020 Götz et al.
10,700,587 B2 6/2020 Götz
10,759,284 B2 9/2020 Jaensch et al.
10,784,698 B2 9/2020 Jaensch et al.
10,840,714 B2 11/2020 Götz et al.
10,980,103 B2 4/2021 Götzet al.
10,985,551 B2 4/2021 Götz
10,998,739 B2 5/2021 Hinterberger et al.
11,038,435 B2 6/2021 Götz
2003/0102845 A1 6/2003 Aker et al.
2004/0008016 A1 1/2004 Sutardja et al.
2004/0037101 A1 2/2004 Meynard et al.
2005/0065684 A1 3/2005 Larson et al.
2006/0097782 A1 5/2006 Ebner
2006/0202636 A1 9/2006 Schneider
2007/0147098 A1 6/2007 Mori et al.
2007/0194627 A1 8/2007 Mori et al.
2007/0246635 A1 10/2007 Nakajima et al.
2008/0080212 A1 4/2008 Grbovic
2008/0245593 A1 10/2008 Kim
2008/0304296 A1 12/2008 Nadimpalliraju et al.
2009/0251212 A1 10/2009 Pillonnet et al.
2009/0311891 A1 12/2009 Lawrence et al.
2010/0060235 A1 3/2010 Dommaschk et al.
2010/0085789 A1 4/2010 Ulrich et al.
2010/0121511 A1 5/2010 Onnerud et al.
2010/0188009 A1* 7/2010 Bull .................... H05B 39/085 315/246
2010/0298957 A1 11/2010 Sanchez Rocha et al.
2010/0301827 A1 12/2010 Chen et al.
2011/0133573 A1 6/2011 Ratnaparkhi et al.
2011/0140533 A1 6/2011 Zeng et al.
2011/0148198 A1 6/2011 Tripathi et al.
2011/0187184 A1 8/2011 Ichikawa
2011/0198936 A1 8/2011 Graovac et al.
2012/0053871 A1 3/2012 Sirard
2012/0074949 A1 3/2012 Kepley et al.
2012/0112693 A1 5/2012 Kusch et al.
2012/0155140 A1 6/2012 Chen et al.
2012/0161858 A1 6/2012 Permuy et al.
2012/0195084 A1 8/2012 Norrga
2012/0262967 A1 10/2012 Cuk
2013/0027126 A1 1/2013 Jayaraman et al.
2013/0083563 A1 4/2013 Wang et al.
2013/0088254 A1 4/2013 Hoang et al.
2013/0088903 A1 4/2013 Sagona et al.
2013/0090872 A1 4/2013 Kurimoto
2013/0154379 A1 6/2013 Tiefenbach
2013/0154521 A1 6/2013 Butzmann et al.
2013/0260188 A1 10/2013 Coates
2013/0285457 A1 10/2013 Kepley
2013/0302652 A1 11/2013 Wolff et al.
2014/0042815 A1 2/2014 Maksimovic et al.
2014/0042827 A1 2/2014 Wolff
2014/0104899 A1 4/2014 Fischer et al.
2014/0152109 A1 6/2014 Kanakasabai et al.
2014/0226379 A1 8/2014 Harrison
2014/0239927 A1 8/2014 Nascimento et al.
2014/0254219 A1 9/2014 Davies
2014/0340052 A1 11/2014 Dwertmann et al.
2014/0354212 A1 12/2014 Sugeno et al.
2015/0009594 A1 1/2015 Okaeme et al.
2015/0049532 A1 2/2015 Bernet et al.
2015/0123612 A1* 5/2015 Ide ....................... H02M 7/155 363/67
2015/0124506 A1 5/2015 Sahoo et al.
2015/0229227 A1 8/2015 Aeloiza et al.
2015/0249351 A1 9/2015 Wolff et al.
2015/0270801 A1 9/2015 Kessler et al.
2015/0280604 A1 10/2015 Hassanpoor
2015/0288287 A1 10/2015 Madawala et al.
2015/0295505 A1* 10/2015 Chau ........................ H02J 3/14 323/235
2015/0296292 A1 10/2015 Hogan et al.
2015/0303820 A1 10/2015 Cubaines
2015/0340964 A1 11/2015 Modeer
2015/0364935 A1 12/2015 Fetzer et al.
2016/0072396 A1 3/2016 Deboy et al.
2016/0183451 A1 6/2016 Conrad et al.
2016/0240894 A1 8/2016 Wartenberg et al.
2016/0254682 A1 9/2016 Yip et al.
2016/0308466 A1 10/2016 Oates
2017/0054306 A1 2/2017 Vo et al.
2017/0099007 A1 4/2017 Oates et al.
2017/0163171 A1 6/2017 Park
2017/0179745 A1 6/2017 Tritschler et al.
2017/0338654 A1 11/2017 Subramanian
2017/0366079 A1 12/2017 Bhowmik et al.
2018/0043789 A1 2/2018 Goetz
2018/0175744 A1 6/2018 Jasim et al.
2018/0241239 A1 8/2018 Frost et al.
2019/0031042 A1 1/2019 Müller
2019/0131851 A1 5/2019 Herb
2019/0288522 A1 9/2019 Hinterberger et al.
2019/0288526 A1 9/2019 Jaensch et al.
2019/0288527 A1 9/2019 Jaensch et al.
2019/0288547 A1 9/2019 Jaensch et al.
2019/0288617 A1 9/2019 Jaensch et al.

(56) References Cited

U.S. PATENT DOCUMENTS

| | | | | |
|---|---|---|---|---|
| 2019/0312504 | A1 | 10/2019 | Kim et al. | |
| 2020/0014306 | A1* | 1/2020 | Riar | H02J 7/0063 |
| 2020/0212687 | A1 | 7/2020 | Hinterberger et al. | |
| 2020/0235439 | A1 | 7/2020 | Frost et al. | |
| 2020/0244076 | A1 | 7/2020 | Wang et al. | |
| 2020/0278936 | A1 | 9/2020 | Gopalakrishnan et al. | |
| 2020/0317086 | A1 | 10/2020 | Goetz et al. | |
| 2020/0328593 | A1 | 10/2020 | Goetz | |
| 2020/0338997 | A1 | 10/2020 | Goetz et al. | |
| 2020/0358370 | A1 | 11/2020 | Goetz et al. | |
| 2020/0395840 | A1 | 12/2020 | Goetz | |
| 2021/0005855 | A1 | 1/2021 | Gotz et al. | |
| 2021/0126468 | A1* | 4/2021 | Juang | H02J 3/06 |
| 2021/0146791 | A1 | 5/2021 | Hinterberger et al. | |
| 2021/0151726 | A1 | 5/2021 | Hinterberger et al. | |
| 2021/0151727 | A1 | 5/2021 | Hinterberger et al. | |
| 2021/0151728 | A1 | 5/2021 | Hinterberger et al. | |
| 2021/0159031 | A1* | 5/2021 | Guo | H01H 9/542 |
| 2021/0197676 | A1 | 7/2021 | Goetz et al. | |

FOREIGN PATENT DOCUMENTS

| | | | |
|---|---|---|---|
| CN | 204156591 | U | 2/2015 |
| CN | 103812377 | B | 5/2016 |
| DE | 10 2014 008 399 | A1 | 12/2015 |
| DE | 10 2016 109 077 | A1 | 11/2017 |
| DE | 10 2017 220 175 | A1 | 5/2019 |
| DE | 10 2018 109 921 | B3 | 8/2019 |
| DE | 10 2018 109 922 | A1 | 10/2019 |
| DE | 10 2018 109 925 | A1 | 10/2019 |
| DE | 10 2018 109 926 | B4 | 12/2019 |
| DE | 10 2018 121 403 | A1 | 3/2020 |
| DE | 10 2018 121 490 | A1 | 3/2020 |
| DE | 10 2018 121 547 | A1 | 3/2020 |
| DE | 10 2018 126 780 | A1 | 4/2020 |
| DE | 102018 129 111 | A1 | 5/2020 |
| DE | 10 2018 126 779 | B4 | 6/2020 |
| DE | 10 2019 112 826 | B3 | 6/2020 |
| DE | 10 2019 102 306 | A1 | 7/2020 |
| DE | 10 2019 102 311 | A1 | 7/2020 |
| DE | 10 2019 103 757 | B3 | 7/2020 |
| DE | 10 2019 120 615 | B3 | 8/2020 |
| DE | 10 2019 112 373 | A1 | 11/2020 |
| DE | 10 2019 112 823 | A1 | 11/2020 |
| DE | 10 2019 120 616 | B3 | 11/2020 |
| DE | 10 2019 120 947 | B3 | 11/2020 |
| DE | 10 2019 125 577 | B3 | 11/2020 |
| DE | 10 2019 125 578 | B3 | 11/2020 |
| DE | 10 2019 120 945 | B3 | 2/2021 |
| DE | 10 2019 130 736 | A1 | 5/2021 |
| DE | 10 2019 130 737 | A1 | 5/2021 |
| DE | 10 2019 132 685 | A1 | 6/2021 |
| DE | 10 2020 117 264 | B3 | 6/2021 |
| DE | 10 2020 117 435 | B3 | 6/2021 |
| DE | 10 2020 118 242 | B3 | 7/2021 |
| EP | 0 907 238 | A1 | 4/1999 |
| EP | 2 290 799 | A1 | 3/2011 |
| EP | 2 658 071 | A2 | 10/2013 |
| EP | 2 693 598 | A1 | 2/2014 |
| WO | WO 2011/009689 | A2 | 1/2011 |
| WO | WO 2011/082855 | A2 | 7/2011 |
| WO | WO 2011/082856 | A2 | 7/2011 |
| WO | WO 2011/128133 | A1 | 10/2011 |
| WO | WO 2012/016735 | A1 | 2/2012 |
| WO | WO 2012/038162 | A1 | 3/2012 |
| WO | WO 2013/056900 | A2 | 4/2013 |
| WO | WO 2014/151178 | A2 | 9/2014 |
| WO | WO 2014/193254 | A1 | 12/2014 |
| WO | WO 2016/030144 | A1 | 3/2016 |
| WO | WO 2018/072837 | A1 | 4/2018 |
| WO | WO 2018/095552 | A1 | 5/2018 |
| WO | WO 2018/154206 | | 8/2018 |
| WO | WO 2018/193173 | | 10/2018 |
| WO | WO 2018/210451 | A1 | 11/2018 |
| WO | WO 2018/210452 | A1 | 11/2018 |
| WO | WO 2018/231810 | A1 | 12/2018 |
| WO | WO 2018/232403 | A1 | 12/2018 |
| WO | WO 2018/233871 | A1 | 12/2018 |
| WO | WO 2019/020215 | A1 | 1/2019 |
| WO | WO 2019/161875 | A1 | 8/2019 |
| WO | WO 2019/166733 | A1 | 9/2019 |
| WO | WO 2019/180699 | A1 | 9/2019 |
| WO | WO 2019/183553 | A1 | 9/2019 |
| WO | WO 2020/078580 | A1 | 4/2020 |
| WO | WO 2020/205511 | A1 | 10/2020 |
| WO | WO 2020/205574 | A1 | 10/2020 |
| WO | WO 2020/243655 | A1 | 12/2020 |

OTHER PUBLICATIONS

EP, 18817541.8 Supplementary Search Report, dated Jan. 20, 2021.
EP, 18817541.8 Written Opinion, dated Feb. 2, 2021.
SG, 11201912049P Written Opinion, dated Mar. 10, 2021.
WO, PCT/US18/37081 ISR and Written Opinion, dated Oct. 17, 2018.
Bode, G.H., et al., "Hysteresis Current Regulation for Single-Phase Multilevel Inverters Using Asynchronous State Machines", 29$^{th}$ Annual Conference of the IEEE Industrial Electronics Society, Piscataway, NJ, 2003, pp. 1203-4208.
"Capacitor Voltage Control Technique for a Modular Converter", An IP.com Prior Art Database Technical Disclosure, Jun. 10, 2015, pp. 1-7.
Chang, F., et al., "Improving the Overall Efficiency of Automotive Inverters Using a Multilevel Converter Composed of Low Voltage Si MOSFETs", IEEE Transactions on Power Electronics, 2019, vol. 34, No. 4, pp. 3586-3602.
Debnath, S., et al., "Operation, Control, and Applications of the Modular Multilevel Converter: A Review", IEEE Transactions on Power Electronics, 2015, vol. 30, No. 1, pp. 37-53.
Farr, E., et al., "A Sub-module Capacitor Voltage Balancing Scheme for the Alternate Arm Converter (AAC)", 15$^{th}$ European Conference on IEEE Power Electronics and Applications, 2013, pp. 1-10.
Gelman, V., "Energy Storage That May Be Too Good to Be True", IEEE Vehicular Technology Magazine, 2031, pp. 70-80.
Gupta, R., et al., "Cascaded Multilevel Control of DSTATCOM Using Multiband Hysteresis Modulation", IEEE Power Engineering Society General Meeting, Piscataway, NJ, 2006, pp. 1-7.
Hassanpoor, A., et al., "Tolerance Band Modulation Methods for Modular Multilevel Converters", IEEE Transactions on Power Electronics, 2015, vol. 30, No. 1, pp. 311-326.
Herrera, V. I., et al., "Optimal Energy Management and Sizing of a Battery—Supercapacitor-Based Light Rail Vehicle With a Multiobjective Approach", IEEE Transactions on Industry Applications, 2016, vol. 52, No. 4, pp. 3367-3377.
Kersten, A., "Battery Loss and Stress Mitigation in a Cascaded H-Bridge Multilevel Inverter for Vehicle Traction Applications by Filter Capacitors", IEEE Transactions on Transportation Electrification, 2019, pp. 1-13.
Khoshkbar-Sadigh, A., et al., "Thermal and Performance Comparison of Active Neutral-Point-Clamped (ANPC) and Dual Flying-Capacitor ANPC (DFC-ANPC) Inverters", IEEE Energy Conversion Congress and Exposition (ECCE), 2019, pp. 5522-5528.
WO, PCT/US18/38089 ISR and Written Opinion, dated Oct. 29, 2018.
WO, PCT/US19/23695 ISR and Written Opinion, dated Aug. 12, 2019.
Konstantinou, G., et al., "A Hybrid Modular Multilevel Converter with Partial Embedded Energy Storage", Energies, 2016, vol. 9, No. 12, pp. 1-18.
Li, N., et al., "SOH Balancing Control Method for the MMC Battery Energy Storage System", IEEE Transactions on Industrial Electronics, 2018, vol. 65, No. 8, pp. 6581-6591.
Loh, P. C., et al., "A Reduced Common Mode Hysteresis Current Regulation Strategy for Multilevel Inverters", 18$^{th}$ Annual IEEE Applied Power Electronics Conference and Exposition, Miami Beach, FL, 2003, vol. 1, pp. 576-582.

(56) References Cited

OTHER PUBLICATIONS

Loh, P. C., et al., "A Time-Based Double-Band Hysteresis Current Regulation Strategy for Single-Phase Multilevel Inverters", IEEE Transactions on Industry Applications, 2003, vol. 39, No. 3, pp. 883-892.
Maharjan, L., et al., "State-of-Charge (SOC)-Balancing Control of a Battery Energy Storage System Based on a Cascade PWM Converter", IEEE Transactions on Power Electronics, 2009, vol. 24, No. 6, pp. 1628-1636.
Maharjan, L., et al., "Fault-Tolerant Operation of a Battery-Energy-Storage System Based on a Multilevel Cascade PWM Converter With Star Configuration", IEEE Transactions on Power Electronics, 2010, vol. 25, No. 9, pp. 2386-2396.
Méllo, J.P.R., et al., "Multilevel Reduced Controlled Switches AC-DC Power Conversion Cells", IEEE Energy Conversion Congress and Exposition (ECCE), 2015, pp. 3815-3822.
Naderi, R., et al., "Phase-Shifted Carrier PWM Technique for General Cascaded Inverters", IEEE Transactions on Power Electronics, 2008, vol. 23, No. 3, pp. 1257-1269.
Naderi, R., et al., "A Correction to the State-Machine-Decoder for Stacked Multicell Converters", IEEE Applied Power Electronics Conference and Exposition (APEC), 2014, pp. 1545-1549.
Naderi, R., et al., "A New Hybrid Active Neutral Point Clamped Flying Capacitor Multilevel Inverter", IEEE Applied Power Electronics Conference and Exposition (APEC), 2015, pp. 794-798.
Naderi, R., et al., "Dual Flying Capacitor Active-Neutral-Point-Clamped Multilevel Converter", IEEE Transactions on Power Electronics, 2016, vol. 31, No. 9, pp. 6476-6484.
Naderi, R., "Battery Management Converter System and Multilevel Converter Topology and Control", 2016, Dissertation at the University of California, Irvine, pp. 1-211.
P., S., et al., "Seven Level Inverter Topologies: A Comparative Study", International Journal of Innovative Research in Electrical, Electronics, Instrumentation and Control Engineering, 2016, vol. 3, No. 1, pp. 148-162.
Sangiri, J. B., et al., "Modular Multilevel Converter for Multifunctional Battery Management System of Electric Vehicle", 44th Annual Conference of the IEEE Industrial Electronics Society, 2018, pp. 1333-1338.
Shimada, M., et al., "Energy-saving Technology for Railway Traction Systems Using Onboard Storage Batteries", Hitachi Review, 2012, vol. 61, No. 7, pp. 312-318.
Tajeddine, K., et al., "A Cascaded H-Bridge Multilevel Inverter with SOC Battery Balancing", International Journal of Advanced Computer Science and Applications, 2017, vol. 8, No. 12, pp. 345-350.
Varghese, K., "Implementation of Single Phase Seven Level Cascaded Multilevel Inverter With Reduced No of Switches", Project Report'15, retrieved from https://www.academia.edu/12826368/single_phase_seven_level_cascaded_multilevel_inverter, pp. 1-45.
Venu, K., et al., "A Seven Level Single-Phase Cascaded Inverter with Improved Efficiency", International Journal & Magazine of Engineering, Technology, Management and Research, 2016, vol. 3, No. 10, pp. 243-249.
Wu, B., et al., "Analysis of a distributed maximum power point tracking tracker with low input voltage ripple and flexible gain range", IET Power Electron., 2016, vol. 9, No. 6, pp. 1220-1227.
Zhang, L., et al., "Design and Performance Evaluation of the Modular Multilevel Converter (MMC)-based Grid-tied PV-Battery Conversion System", IEEE Energy Conversion Congress and Exposition (ECCE), 2018, pp. 2649-2654.
WO, PCT/US21/27159 ISR and Written Opinion, dated Sep. 1, 2021.
WO, PCT/US21/32295 ISR and Written Opinion, dated Sep. 14, 2021.
WO, PCT/US21/27154 ISR and Written Opinion, dated Oct. 14, 2021.
Tolbert et al., "Charge Balance Control Schemes for Cascade Multi-level Converter in Hybrid Electric Vehicles," IEEE Trans. Indus. Electronics, Oct. 2002, 49(5):11058-1064.

* cited by examiner

100

SYSTEMS, DEVICES, AND METHODS FOR CHARGING AND DISCHARGING MODULE-BASED CASCADED ENERGY SYSTEMS

CROSS-REFERENCE TO RELATED APPLICATIONS

This application claims the benefit of, and priority to, U.S. Provisional Application No. 63/009,996, filed Apr. 14, 2020, U.S. Provisional Application No. 63/043,731, filed Jun. 24, 2020, U.S. Provisional Application No. 63/069,369, filed Aug. 24, 2020, and U.S. Provisional Application No. 63/084,300, filed Sep. 28, 2020, all of which are incorporated by reference herein in their entireties and for all purposes.

FIELD

The subject matter described herein relates generally to systems, devices, and methods for charging and discharging module-based cascaded energy systems usable in mobile and stationary applications.

BACKGROUND

Energy systems having multiple energy sources or sinks are commonplace in many industries. One example is the automobile industry. Today's automotive technology, as evolved over the past century, is characterized, amongst many things, by an interplay of motors, mechanical elements, and electronics. These are the key components that impact vehicle performance and driver experience. Motors are of the combustion or electric type and in almost all cases the rotational energy from the motor is delivered via a set of highly sophisticated mechanical elements, such as clutches, transmissions, differentials, drive shafts, torque tubes, couplers, etc. These parts control to a large degree torque conversion and power distribution to the wheels and are define the performance of the car and road handling.

An electric vehicle (EV) includes various electrical systems that are related to the drivetrain including, among others, the battery pack, the charger and motor control. High voltage battery packs are typically organized in a serial chain of lower voltage battery modules. Each such module further includes a set of serially connected individual cells and a simple embedded battery management system (BMS) to regulate basic cell related characteristics, such as state of charge and voltage. Electronics with more sophisticated capabilities or some form of smart interconnectedness are absent. As a consequence, any monitoring or control function is handled by a separate system, which, if at all present elsewhere in the car, lacks the ability to monitor individual cell health, state of charge, temperature and other performance impacting metrics. There is also no ability to meaningfully adjust power draw per individual cell in any form. Some of the major consequences are: (1) the weakest cell constrains the overall performance of the entire battery pack, (2) failure of any cell or module leads to a need for replacement of the entire pack, (3) battery reliability and safety are considerably reduced, (4) battery life is limited, (5) thermal management is difficult, (6) battery packs always operate below maximum capabilities, (7) sudden inrush of regenerative braking derived electric power cannot be readily stored in the batteries and requires dissipation via a dump resistor.

Charging circuits for EVs are typically realized in separate on-board systems. They stage power coming from outside the EV in the form of an AC signal or a DC signal, convert it to DC and feed it to the battery pack. Charging systems monitor voltage and current and typically supply a steady constant teed. Given the design of the battery packs and typical charging circuits, there is little ability to tailor charging flows to individual battery modules based on cell health, performance characteristics, temperature, etc. Charging cycles are also typically long as the charging systems and battery packs lack the circuitry to allow for pulsed charging or other techniques that would optimize the charge transfer or total charge achievable.

Conventional controls contain DC to DC conversion stages to adjust battery pack voltage levels to the bus voltage of the EV's electrical system. Motors, in turn, are then driven by simple two-level multiphase converters that provide the required AC signal(s) to the electric motor. Each motor is traditionally controlled by a separate controller, which drives the motor in a three phase design. Dual motor EVs would require two controllers, while EVs using four in-wheel motors would require four individual controllers. The conventional controller design also lacks the ability to drive next generation motors, such as switch reluctance motors (SRM), characterized by higher numbers of pole pieces. Adaptation would require higher phase designs, making the systems more complex and ultimately fail to address electric noise and driving performance, such as high torque ripple and acoustical noise.

Many of these deficiencies apply not only to automobiles but other motor driven vehicles, and also to stationary applications to a significant extent. For these and other reasons, needs exist for improved systems, devices, and methods for energy systems for mobile and stationary applications.

SUMMARY

Example embodiments of systems, devices, and methods are provided herein for charging and discharging energy systems having multiple modules arranged in cascaded fashion for generating and storing power. Each module can include an energy source and switch circuitry that selectively couples the energy source to other modules in the system for generating power or for receiving and storing power from a charge source. The energy systems can be arranged in single phase or multiphase topologies with multiple serial or interconnected arrays. The energy systems can be arranged with multiple subsystems for supplying power to one or more motors. The embodiments are capable of being charged with multiphase AC charge signals, a single phase AC charge signal, and/or a DC charge signal.

The modules can output status information to a control system that can use the status information to charge the modules while maintaining or targeting a balanced condition across one or more operating characteristics of the modules, such as state of charge and/or temperature. The control system can also control charging in a manner that limits displacement and distortion within the system. In some embodiments charging occurs while bypassing the load or motor, while in other embodiments charging occurs through the load or motor. Charging through the motor can be performed in such a way as to cancel component fluxes of the motor.

The embodiments can have numerous topologies including single phase, multiple phase (e.g., three phase and six phase), topologies with linear arrays or arrays in a delta and serial arrangement, topologies having multiple loads and voltage requirements, and topologies having one or more interconnection modules for performing interarray or interphase balancing and/or for providing power to one or more auxiliary loads, to name a few examples. Also provided are embodiments implementing the modular energy system within a charge source for performing multiphase, single phase AC, or DC charging of electric vehicles.

Example embodiments are also provided for multiple subsystem configurations where each subsystem can provide different voltages and/or utilize energy sources of different types. Example embodiments are provided for placement of modules of the energy system within an interior space of an EV chassis. Example embodiments are further provided for the powering of automated suspension and/or steering systems, including additional embodiments of modules and topologies for the same.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Figure 1A:
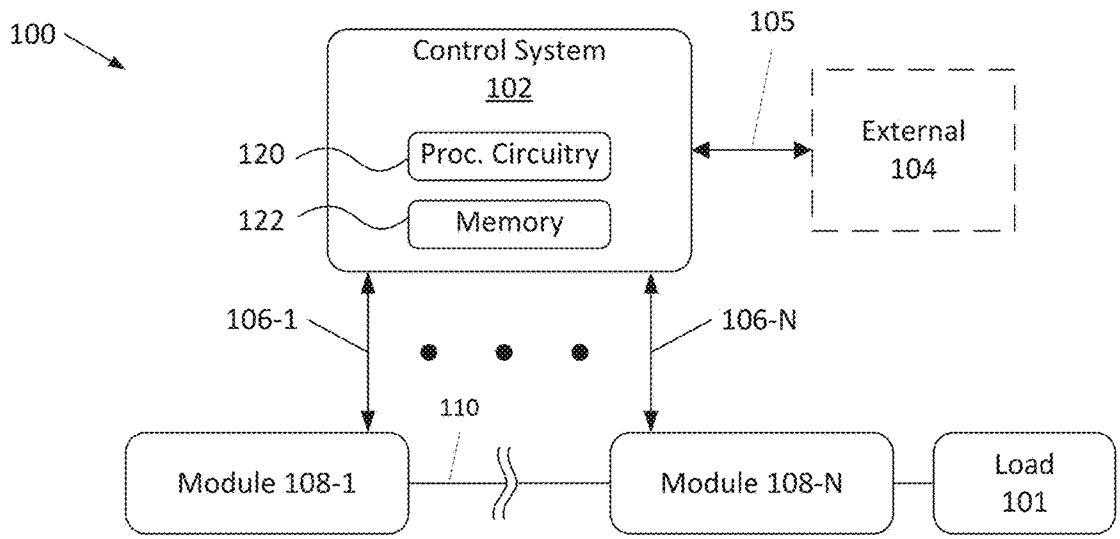
FIGS. 1A-1C are block diagrams depicting example embodiments of a modular energy system.

Before the present subject matter is described in detail, it is to be understood that this disclosure is not limited to the particular embodiments described, as such may, of course, vary. The terminology used herein is for the purpose of describing particular embodiments only, and is not intended to be limiting, since the scope of the present disclosure will be limited only by the appended claims.

Before describing the example embodiments pertaining to charging and discharging modular energy systems, it is first useful to describe these underlying systems in greater detail. With reference to FIGS. 1A through 10F, the following sections describe various applications in which embodiments of the modular energy systems can be implemented, embodiments of control systems or devices for the modular energy systems, configurations of the modular energy system embodiments with respect to charging sources and loads, embodiments of individual modules, embodiments of topologies for arrangement of the modules within the systems, embodiments of control methodologies, embodiments of balancing operating characteristics of modules within the systems, and embodiments of the use of interconnection modules.

Examples of Applications

Stationary applications are those in which the modular energy system is located in a fixed location during use, although it may be capable of being transported to alternative locations when not in use. The module-based energy system resides in a static location while providing electrical energy for consumption by one or more other entities, or storing or buffering energy for later consumption. Examples of stationary applications in which the embodiments disclosed herein can be used include, but are not limited to: energy systems for use by or within one or more residential structures or locales, energy systems for use by or within one or more industrial structures or locales, energy systems for use by or within one or more commercial structures or locales, energy systems for use by or within one or more governmental structures or locales (including both military and non-military uses), energy systems for charging the mobile applications described below (e.g., a charge source or a charging station), and systems that convert solar power, wind, geothermal energy, fossil fuels, or nuclear reactions into electricity for storage. Stationary applications often supply loads such as grids and microgrids, motors, and data centers. A stationary energy system can be used in either a storage or non-storage role.

Mobile applications, sometimes referred to as traction applications, are generally ones where a module-based energy system is located on or within an entity, and stores and provides electrical energy for conversion into motive force by a motor to move or assist in moving that entity. Examples of mobile entities with which the embodiments disclosed herein can be used include, but are not limited to, electric and/or hybrid entities that move over or under land, over or under sea, above and out of contact with land or sea (e.g., flying or hovering in the air), or through outer space. Examples of mobile entities with which the embodiments disclosed herein can be used include, but are not limited to, vehicles, trains, trams, ships, vessels, aircraft, and spacecraft. Examples of mobile vehicles with which the embodiments disclosed herein can be used include, but are not limited to, those having only one wheel or track, those having only two-wheels or tracks, those having only three wheels or tracks, those having only four wheels or tracks, and those having five or more wheels or tracks. Examples of mobile entities with which the embodiments disclosed herein can be used include, but are not limited to, a car, a bus, a truck, a motorcycle, a scooter, an industrial vehicle, a mining vehicle, a flying vehicle (e.g., a plane, a helicopter, a drone, etc.), a maritime vessel (e.g., commercial shipping vessels, ships, yachts, boats or other watercraft), a submarine, a locomotive or rail-based vehicle (e.g., a train, a tram, etc.), a military vehicle, a spacecraft, and a satellite.

In describing embodiments herein, reference may be made to a particular stationary application (e.g., grid, micro-grid, data centers, cloud computing environments) or mobile application (e.g., an electric car). Such references are made for ease of explanation and do not mean that a particular embodiment is limited for use to only that particular mobile or stationary application. Embodiments of systems providing power to a motor can be used in both mobile and stationary applications. While certain configurations may be more suitable to some applications over others, all example embodiments disclosed herein are capable of use in both mobile and stationary applications unless otherwise noted.

Examples of Module-Based Energy Systems

FIG. 1A is a block diagram depicts an example embodiment of a module-based energy system 100. Here, system 100 includes control system 102 communicatively coupled with N converter-source modules 108-1 through 108-N, over communication paths or links 106-1 through 106-N, respectively. Modules 108 are configured to store energy and output the energy as needed to a load 101 (or other modules 108). In these embodiments, any number of two or more modules 108 can be used (e.g., N is greater than or equal to two). Modules 108 can be connected to each other in a variety of manners as will be described in more detail with respect to FIGS. 7A-7E. For ease of illustration, in FIGS. 1A-1C, modules 108 are shown connected in series, or as a one dimensional array, where the Nth module is coupled to load 101.

System 100 is configured to supply power to load 101. Load 101 can be any type of load such as a motor or a grid. System 100 is also configured to store power received from a charge source. FIG. 1F is a block diagram depicting an example embodiment of system 100 with a power input interface 151 for receiving power from a charge source 150 and a power output interface for outputting power to load 101. In this embodiment system 100 can receive and store power over interface 151 at the same time as outputting power over interface 152. FIG. 1G is a block diagram depicting another example embodiment of system 100 with a switchable interface 154. In this embodiment, system 100 can select, or be instructed to select, between receiving power from charge source 150 and outputting power to load 101. System 100 can be configured to supply multiple loads 101, including both primary and auxiliary loads, and/or receive power from multiple charge sources 150 (e.g., a utility-operated power grid and a local renewable energy source (e.g., solar)).

Figure 1B:
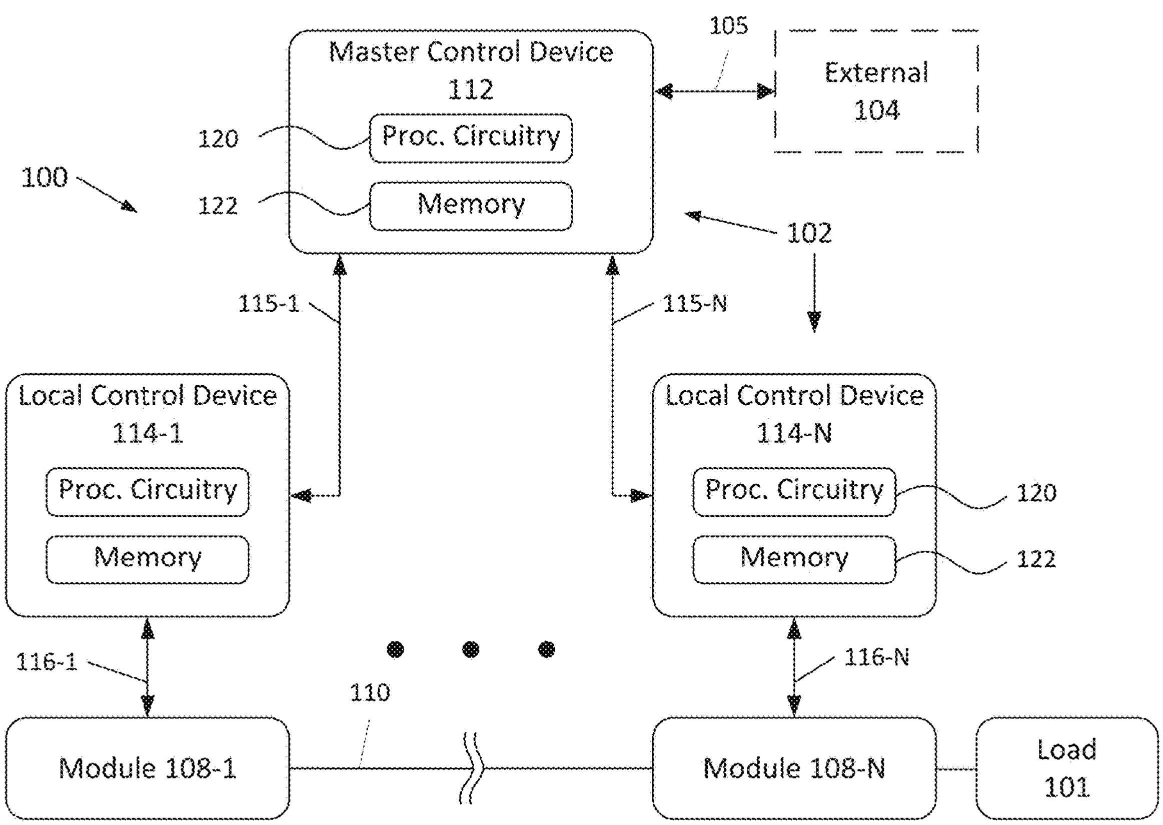

FIG. 1B depicts another example embodiment of system 100. Here, control system 102 is implemented as a master control device (MCD) 112 communicatively coupled with N different local control devices (LCDs) 114-1 through 114-N over communication paths or links 115-1 through 115-N, respectively. Each LCD 114-1 through 114-N is communicatively coupled with one module 108-1 through 108-N over communication paths or links 116-1 through 116-N, respectively, such that there is a 1:1 relationship between LCDs 114 and modules 108.

Figure 1C:
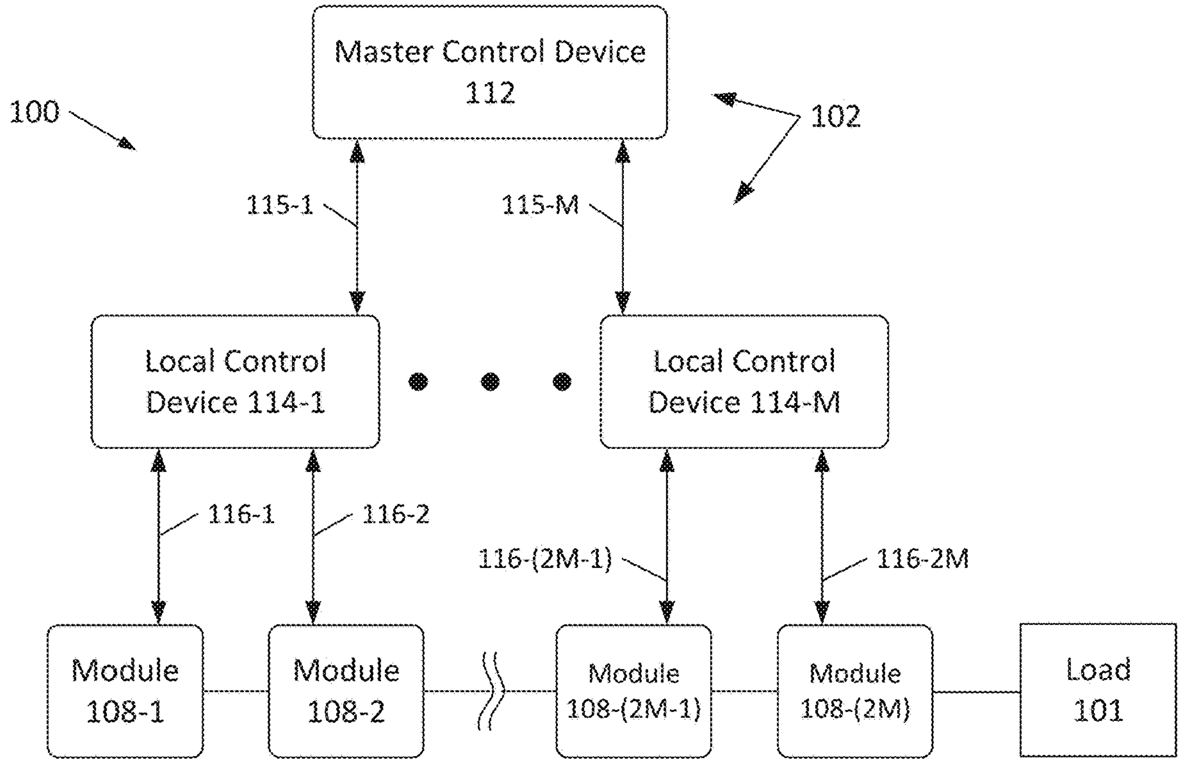

FIG. 1C depicts another example embodiment of system 100. Here, MCD 112 is communicatively coupled with M different LCDs 114-1 to 114-M over communication paths or links 115-1 to 115-M, respectively. Each LCD 114 can be coupled with and control two or more modules 108. In the example shown here, each LCD 114 is communicatively coupled with two modules 108, such that M LCDs 114-1 to 114-M are coupled with 2M modules 108-1 through 108-2M over communication paths or links 116-1 to 116-2M, respectively.

Control system 102 can be configured as a single device (e.g., FIG. 1A) for the entire system 100 or can be distributed across or implemented as multiple devices (e.g., FIGS. 1B-1C). In some embodiments, control system 102 can be distributed between LCDs 114 associated with the modules 108, such that no MCD 112 is necessary and can be omitted from system 100.

Control system 102 can be configured to execute control using software (instructions stored in memory that are executable by processing circuitry), hardware, or a combination thereof. The one or more devices of control system 102 can each include processing circuitry 120 and memory 122 as shown here. Example implementations of processing circuitry and memory are described further below.

Control system 102 can have a communicative interface for communicating with devices 104 external to system 100 over a communication link or path 105. For example, control system 102 (e.g., MCD 112) can output data or information about system 100 to another control device 104 (e.g., the Electronic Control Unit (ECU) or Motor Control Unit (MCU) of a vehicle in a mobile application, grid controller in a stationary application, etc.).

Communication paths or links 105, 106, 115, 116, and 118 (FIG. 2B) can each be wired (e.g., electrical, optical) or wireless communication paths that communicate data or information bidirectionally, in parallel or series fashion. Data, can be communicated in a standardized (e.g., IEEE, ANSI) or custom (e.g., proprietary) format. In automotive applications, communication paths 115 can be configured to communicate according to FlexRay or CAN protocols. Communication paths 106, 115, 116, and 118 can also provide wired power to directly supply the operating power for system 102 from one or more modules 108. For example, the operating power for each LCD 114 can be supplied only by the one or more modules 108 to which that LCD 114 is connected and the operating power for MCD 112 can be supplied indirectly from one or more of modules 108 (e.g., such as through a car's power network).

Control system 102 is configured to control one or more modules 108 based on status information received from the same or different one or more of modules 108. Control can also be based on one or more other factors, such as requirements of load 101. Controllable aspects include, but are not limited to, one or more of voltage, current, phase, and/or output power of each module 108.

Status information of every module 108 in system 100 can be communicated to control system 102, which can independently control every module 108-1 . . . 108-N. Other variations are possible. For example, a particular module 108 (or subset of modules 108) can be controlled based on status information of that particular module 108 (or subset), based on status information of a different module 108 that is not that particular module 108 (or subset), based on status information of all modules 108 other than that particular module 108 (or subset), based on status information of that particular module 108 (or subset) and status information of at least one other module 108 that is not that particular module 108 (or subset), or based on status information of all modules 108 in system 100.

The status information can be information about one or more aspects, characteristics, or parameters of each module 108. Types of status information include, but are not limited to, the following aspects of a module 108 or one or more components thereof (e.g., energy source, energy buffer, converter, monitor circuitry): State of Charge (SOC) (e.g., the level of charge of an energy source relative to its capacity, such as a fraction or percent) of the one or more energy sources of the module, State of Health (SOH) (e.g., a figure of merit of the condition of an energy source compared to its ideal conditions) of the one or more energy sources of the module, temperature of the one or more energy sources or other components of the module, capacity of the one or more energy sources of the module, voltage of the one or more energy sources and/or other components of the module, current of the one or more energy sources and/or other components of the module, and/or the presence of absence of a fault in any one or more of the components of the module.

LCDs 114 can be configured to receive the status information from each module 108, or determine the status information from monitored signals or data received from or within each module 108, and communicate that information to MCD 112. In some embodiments, each LCD 114 can communicate raw collected data to MCD 112, which then algorithmically determines the status information on the basis of that raw data. MCD 112 can then use the status information of modules 108 to make control determinations accordingly. The determinations may take the form of instructions, commands, or other information (such as a modulation index described herein) that can be utilized by LCDs 114 to either maintain or adjust the operation of each module 108.

For example, MCD 112 may receive status information and assess that information to determine a difference between at least one module 108 (e.g., a component thereof) and at least one or more other modules 108 (e.g., comparable components thereof). For example, MCD 112 may determine that a particular module 108 is operating with one of the following conditions as compared to one or more other modules 108: with a relatively lower or higher SOC, with a relatively lower or higher SOH, with a relatively lower or higher capacity, with a relatively lower or higher voltage, with a relatively lower or higher current, with a relatively lower or higher temperature, or with or without a fault. In such examples, MCD 112 can output control information that causes the relevant aspect (e.g., output voltage, current, power, temperature) of that particular module 108 to be reduced or increased (depending on the condition). In this manner, the utilization of an outlier module 108 (e.g., operating with a relatively lower SOC or higher temperature), can be reduced so as to cause the relevant parameter of that module 108 (e.g., SOC or temperature) to converge towards that of one or more other modules 108.

The determination of whether to adjust the operation of a particular module 108 can be made by comparison of the status information to predetermined thresholds, limits, or conditions, and not necessarily by comparison to statuses of other modules 108. The predetermined thresholds, limits, or conditions can be static thresholds, limits, or conditions, such as those set by the manufacturer that do not change during use. The predetermined thresholds, limits, or conditions can be dynamic thresholds, limits, or conditions, that are permitted to change, or that do change, during use. For example, MCD 112 can adjust the operation of a module 108 if the status information for that module 108 indicates it to be operating in violation (e.g., above or below) of a predetermined threshold or limit, or outside of a predetermined range of acceptable operating conditions. Similarly, MCD 112 can adjust the operation of a module 108 if the status information for that module 108 indicates the presence of an actual or potential fault (e.g., an alarm, or warning) or indicates the absence or removal of an actual or potential fault. Examples of a fault include, but are not limited to, an actual failure of a component, a potential failure of a component, a short circuit or other excessive current condition, an open circuit, an excessive voltage condition, a failure to receive a communication, the receipt of corrupted data, and the like. Depending on the type and severity of the fault, the faulty module's utilization can be decreased to avoid damaging the module, or the module's utilization can be ceased altogether.

MCD 112 can control modules 108 within system 100 to achieve or converge towards a desired target. The target can be, for example, operation of all modules 108 at the same or similar levels with respect to each other, or within predetermined thresholds limits, or conditions. This process is also referred to as balancing or seeking to achieve balance in the operation or operating characteristics of modules 108. The term "balance" as used herein does not require absolute equality between modules 108 or components thereof, but rather is used in a broad sense to convey that operation of system 100 can be used to actively reduce disparities in operation between modules 108 that would otherwise exist.

MCD 112 can communicate control information to LCD 114 for the purpose of controlling the modules 108 associated with the LCD 114. The control information can be, e.g., a modulation index and a reference signal as described herein, a modulated reference signal, or otherwise. Each LCD 114 can use (e.g., receive and process) the control information to generate switch signals that control operation of one or more components (e.g., a converter) within the associated module(s) 108. In some embodiments, MCD 112 generates the switch signals directly and outputs them to LCD 114, which relays the switch signals to the intended module component.

All or a portion of control system 102 can be combined with a system external control device 104 that controls one or more other aspects of the mobile or stationary application. When integrated in this shared or common control device (or subsystem), control of system 100 can be implemented in any desired fashion, such as one or more software applications executed by processing circuitry of the shared device, with hardware of the shared device, or a combination thereof. Non-exhaustive examples of external control devices 104 include: a vehicular ECU or MCU having control capability for one or more other vehicular functions (e.g., motor control, driver interface control, traction control, etc.); a grid or micro-grid controller having responsibility for one or more other power management functions (e.g., load interfacing, load power requirement forecasting, transmission and switching, interface with charge sources (e.g., diesel, solar, wind), charge source power forecasting, back up source monitoring, asset dispatch, etc.); and a data center control subsystem (e.g., environmental control, network control, backup control, etc.).

Figure 1D:
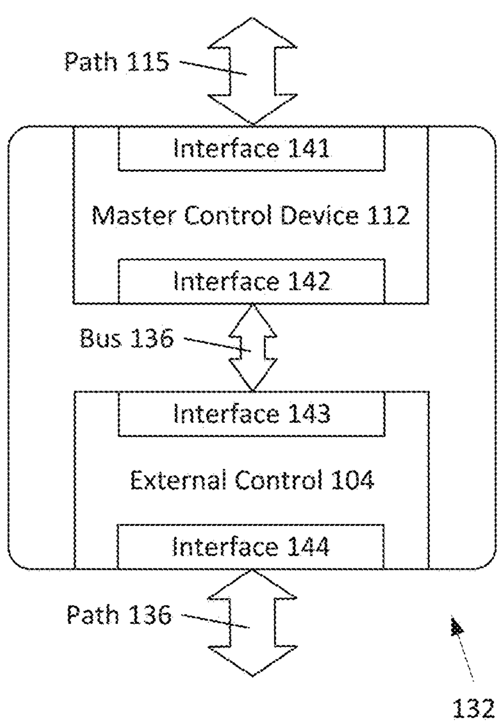
FIGS. 1D-1E are block diagrams depicting example embodiments of control devices for an energy system.
Figure 1E:
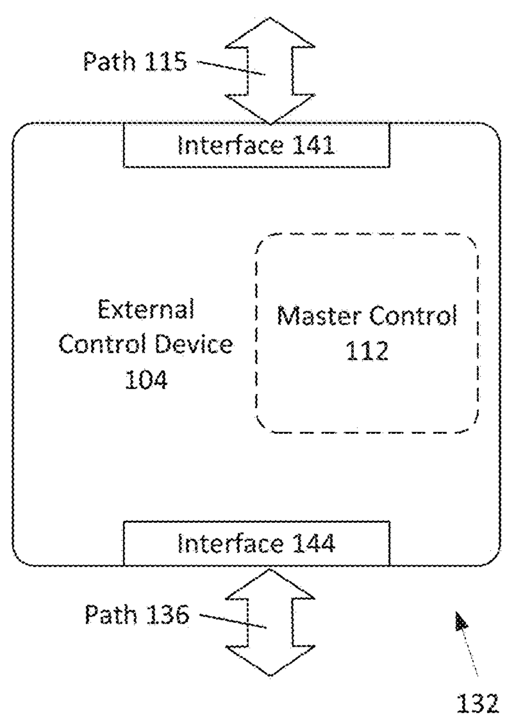
Figure 1F:
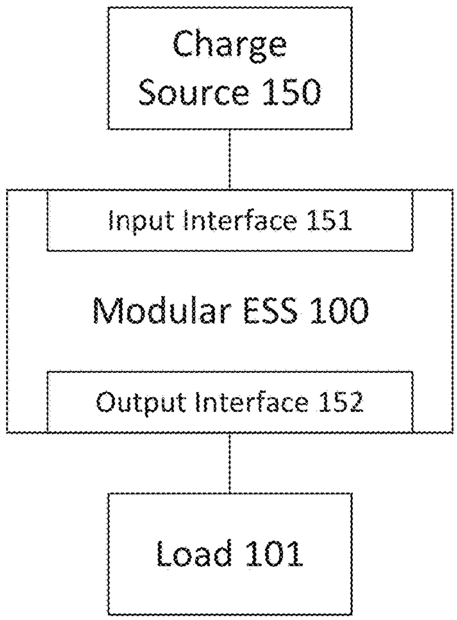
FIGS. 1F-1G are block diagrams depicting example embodiments of modular energy systems coupled with a load and a charge source.
Figure 1G:
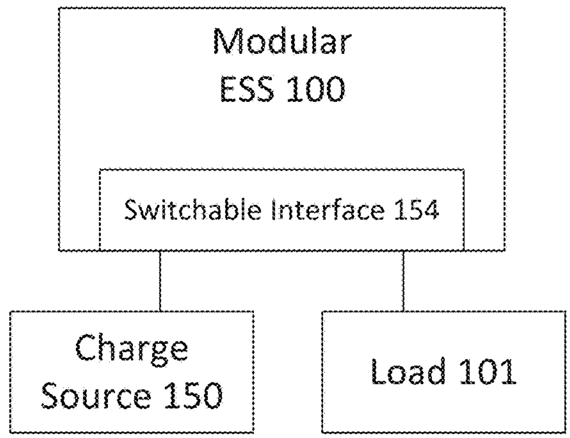

FIGS. 1D and 1E are block diagrams depicting example embodiments of a shared or common control device (or system) 132 in which control system 102 can be implemented. In FIG. 1D, common control device 132 includes master control device 112 and external control device 104. Master control device 112 includes an interface 141 for communication with LCDs 114 over path 115, as well as an interface 142 for communication with external control device 104 over internal communication bus 136. External control device 104 includes an interface 143 for communication with master control device 112 over bus 136, and an interface 144 for communication with other entities (e.g., components of the vehicle or grid) of the overall application over communication path 136. In some embodiments, common control device 132 can be integrated as a common housing or package with devices 112 and 104 implemented as discrete integrated circuit (IC) chips or packages contained therein.

In FIG. 1E, external control device 104 acts as common control device 132, with the master control functionality implemented as a component 112 within device 104. This component 112 can be or include software or other program instructions stored and/or hardcoded within memory of device 104 and executed by processing circuitry thereof. The component can also contain dedicated hardware. The component can be a self-contained module or core, with one or more internal hardware and/or software interfaces (e.g., application program interface (API)) for communication with the operating software of external control device 104. External control device 104 can manage communication with LCDs 114 over interface 141 and other devices over interface 144. In various embodiments, device 104/132 can be integrated as a single IC chip, can be integrated into multiple IC chips in a single package, or integrated as multiple semiconductor packages within a common housing.

In the embodiments of FIGS. 1D and 1E, the master control functionality of system 102 is shared in common device 132, however, other divisions of shared control or permitted. For example, part of the master control functionality can be distributed between common device 132 and a dedicated MCD 112. In another example, both the master control functionality and at least part of the local control functionality can be implemented in common device 132 (e.g., with remaining local control functionality implemented in LCDs 114). In some embodiments, all of control system 102 is implemented in common device (or subsystem) 132. In some embodiments, local control functionality is implemented within a device shared with another component of each module 108, such as a Battery Management System (BMS).

Examples of Modules within Cascaded Energy Systems

Figure 2A:
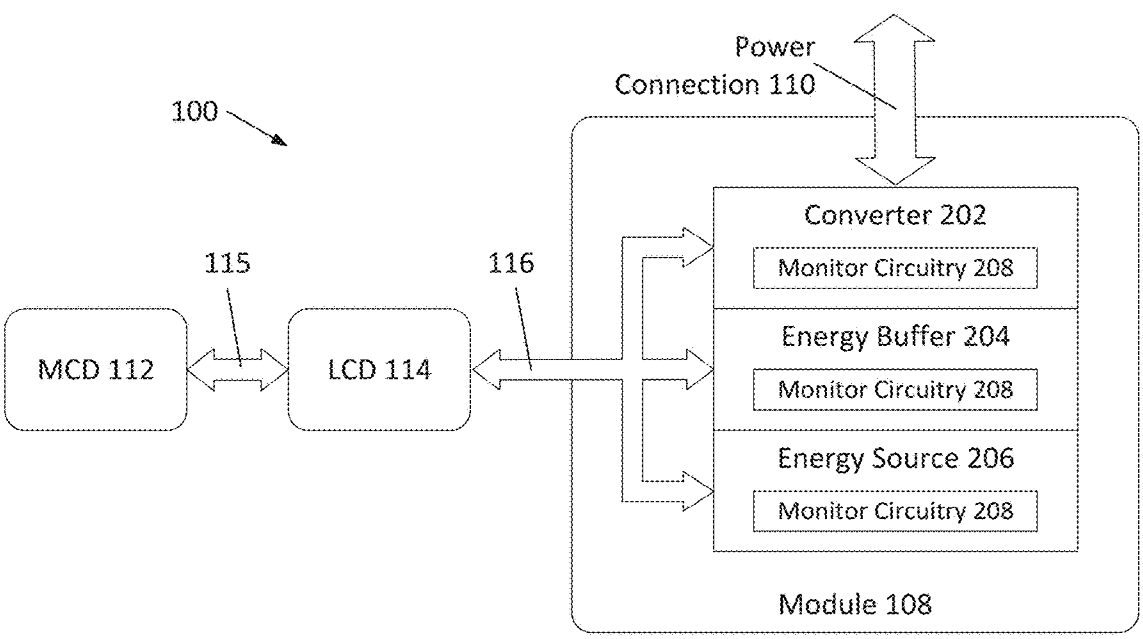
FIGS. 2A-2B are block diagrams depicting example embodiments of a module and control system within an energy system.
Figure 2B:
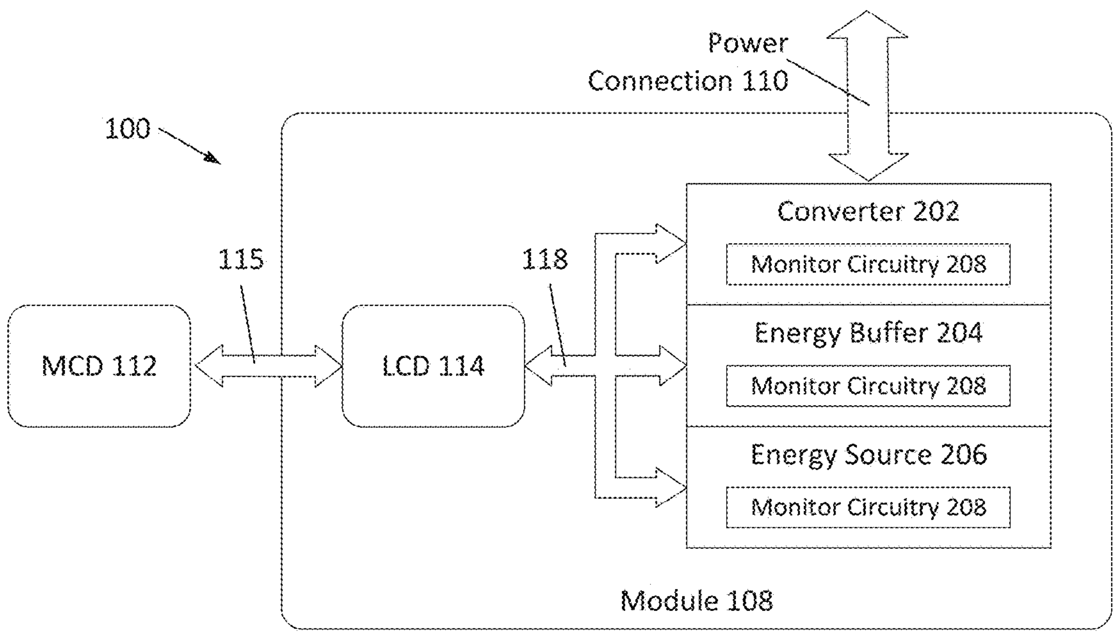

Module 108 can include one or more energy sources and a power electronics converter and, if desired, an energy buffer. FIGS. 2A-2B are block diagrams depicting additional example embodiments of system 100 with module 108 having a power converter 202, an energy buffer 204, and an energy source 206. Converter 202 can be a voltage converter or a current converter. The embodiments are described herein with reference to voltage converters, although the embodiments are not limited to such. Converter 202 can be configured to convert a direct current (DC) signal from energy source 204 into an alternating current (AC) signal and output it over power connection 110 (e.g., an inverter). Converter 202 can also receive an AC or DC signal over connection 110 and apply it to energy source 204 with either polarity in a continuous or pulsed form. Converter 202 can be or include an arrangement of switches (e.g., power transistors) such as a half bridge of full bridge (H-bridge). In some embodiments converter 202 includes only switches and the converter (and the module as a whole) does not include a transformer.

Converter 202 can be also (or alternatively) be configured to perform AC to DC conversion (e.g., a rectifier) such as to charge a DC energy source from an AC source, DC to DC conversion, and/or AC to AC conversion (e.g., in combination with an AC-DC converter). In some embodiments, such as to perform AC-AC conversion, converter 202 can include a transformer, either alone or in combination with one or more power semiconductors (e.g., switches, diodes, thyristors, and the like). In other embodiments, such as those where weight and cost is a significant factor, converter 202 can be configured to perform the conversions with only power switches, power diodes, or other semiconductor devices and without a transformer.

Energy source 206 is preferably a robust energy storage device capable of outputting direct current and having an energy density suitable for energy storage applications for electrically powered devices. The fuel cell can be a single fuel cell, multiple fuel cells connected in series or parallel, or a fuel cell module. Two or more energy sources can be included in each module, and the two or more sources can include two batteries of the same or different type, two capacitors of the same or different type, two fuel cells of the same or different type, one or more batteries combined with one or more capacitors and/or fuel cells, and one or more capacitors combined with one or more fuel cells.

Figure 4A:
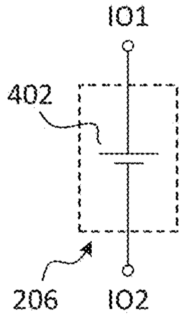
FIGS. 4A-4F are schematic views depicting example embodiments of energy sources.
Figure 4B:
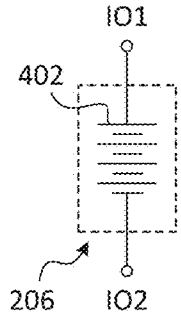
Figure 4C:
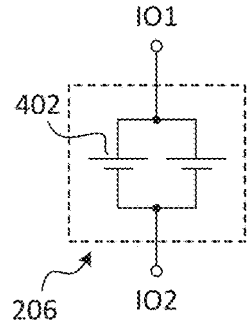
Figure 4D:
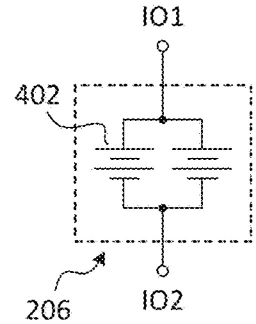

Energy source 206 can be an electrochemical battery, such as a single battery cell or multiple battery cells connected together in a battery module or array, or any combination thereof. FIGS. 4A-4D are schematic diagrams depicting example embodiments of energy source 206 configured as a single battery cell 402 (FIG. 4A), a battery module with a series connection of multiple (e.g., four) cells 402 (FIG. 4B), a battery module with a parallel connection of single cells 402 (FIG. 4C), and a battery module with a parallel connection with legs having multiple (e.g., two) cells 402 each (FIG. 4D). Examples of battery types are described elsewhere herein.

Energy source 206 can also be a high energy density (HED) capacitor, such as an ultracapacitor or supercapacitor. An RED capacitor can be configured as a double layer capacitor (electrostatic charge storage), pseudocapacitor (electrochemical charge storage), hybrid capacitor (electrostatic and electrochemical), or otherwise, as opposed to a solid dielectric type of a typical electrolytic capacitor. The HED capacitor can have an energy density of 10 to 100 times (or higher) that of an electrolytic capacitor, in addition to a higher capacity. For example, HED capacitors can have a specific energy greater than 1.0 watt hours per kilogram (Wh/kg), and a capacitance greater than 10-100 farads (F). As with the batteries described with respect to FIGS. 4A-4D, energy source 206 can be configured as a single HED capacitor or multiple HED capacitors connected together in an array (e.g., series, parallel, or a combination thereof).

Energy source 206 can also be a fuel cell. Examples of fuel cells include proton-exchange membrane fuel cells (PEMFC), phosphoric acid fuel cells (PAFC), solid acid fuel cells, alkaline fuel cells, high temperature fuel cells, solid oxide fuel cells, molten electrolyte fuel cells, and others. As with the batteries described with respect to FIGS. 4A-4D, energy source 206 can be configured as a single fuel cell or multiple fuel cells connected together in an array (e.g., series, parallel, or a combination thereof). The aforementioned examples of batteries, capacitors, and fuel cells are not intended to form an exhaustive list, and those of ordinary skill in the art will recognize other variants that fall within the scope of the present subject matter.

Energy buffer 204 can dampen or filter fluctuations in current across the DC line or link (e.g., $+V_{DCL}$ and $-V_{DCL}$ as described below), to assist in maintaining stability in the DC link voltage. These fluctuations can be relatively low (e.g., kilohertz) or high (e.g., megahertz) frequency fluctuations or harmonics caused by the switching of converter 202, or other transients. These fluctuations can be absorbed by buffer 204 instead of being passed to source 206 or to ports IO3 and IO4 of converter 202.

Power connection 110 is a connection for transferring energy or power to, from and through module 108. Module 108 can output energy from energy source 206 to power connection 110, where it can be transferred to other modules of the system or to a load. Module 108 can also receive energy from other modules 108 or a charging source (DC charger, single phase charger, multi-phase charger). Signals can also be passed through module 108 bypassing energy source 206. The routing of energy or power into and out of module 108 is performed by converter 202 under the control of LCD 114 (or another entity of system 102).

In the embodiment of FIG. 2A, LCD 114 is implemented as a component separate from module 108 (e.g., not within a shared module housing) and is connected to and capable of communication with converter 202 via communication path 116. In the embodiment of FIG. 2B, LCD 114 is included as a component of module 108 and is connected to and capable of communication with converter 202 via internal communication path 118 (e.g., a shared bus or discrete connections). LCD 114 can also be capable of receiving signals from, and transmitting signals to, energy buffer 204 and/or energy source 206 over paths 116 or 118.

Module 108 can also include monitor circuitry 208 configured to monitor (e.g., collect, sense, measure, and/or determine) one or more aspects of module 108 and/or the components thereof, such as voltage, current, temperature or other operating parameters that constitute status information (or can be used to determine status information by, e.g., LCD 114). A main function of the status information is to describe the state of the one or more energy sources 206 of the module 108 to enable determinations as to how much to utilize the energy source in comparison to other sources in system 100, although status information describing the state of other components (e.g., voltage, temperature, and/or presence of a fault in buffer 204, temperature and/or presence of a fault in converter 202, presence of a fault elsewhere in module 108, etc.) can be used in the utilization determination as well. Monitor circuitry 208 can include one or more sensors, shunts, dividers, fault detectors, Coulomb counters, controllers or other hardware and/or software configured to monitor such aspects. Monitor circuity 208 can be separate from the various components 202, 204, and 206, or can be integrated with each component 202, 204, and 206 (as shown in FIGS. 2A-2B), or any combination thereof. In some embodiments, monitor circuitry 208 can be part of or shared with a Battery Management System (BMS) for a battery energy source 204. Discrete circuitry is not needed to monitor each type of status information, as more than one type of status information can be monitored with a single circuit or device, or otherwise algorithmically determined without the need for additional circuits.

LCD 114 can receive status information (or raw data) about the module components over communication paths 116, 118. LCD 114 can also transmit information to module components over paths 116, 118. Paths 116 and 118 can include diagnostics, measurement, protection, and control signal lines. The transmitted information can be control signals for one or more module components. The control signals can be switch signals for converter 202 and/or one or more signals that request the status information from module components. For example, LCD 114 can cause the status information to be transmitted over paths 116, 118 by requesting the status information directly, or by applying a stimulus (e.g., voltage) to cause the status information to be generated, in some cases in combination with switch signals that place converter 202 in a particular state.

Figure 2C:
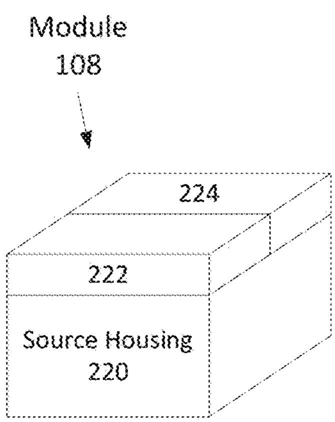
FIG. 2C is a block diagram depicting an example embodiment of a physical configuration of a module.

The physical configuration or layout of module 108 can take various forms. In some embodiments, module 108 can include a common housing in which all module components, e.g., converter 202, buffer 204, and source 206, are housed, along with other optional components such as an integrated LCD 114. In other embodiments, the various components can be separated in discrete housings that are secured together. FIG. 2C is a block diagram depicting an example embodiment of a module 108 having a first housing 220 that holds an energy source 206 of the module and accompanying electronics such as monitor circuitry 208 (not shown), a second housing 222 that holds module electronics such as converter 202, energy buffer 204, and other accompany electronics such as monitor circuitry (not shown), and a third housing 224 that holds LCD 114 (not shown) for the module 108. Electrical connections between the various module components can proceed through the housings 220, 222, 224 and can be exposed on any of the housing exteriors for connection with other devices such as other modules 108 or MCD 112.

Figure 2D:
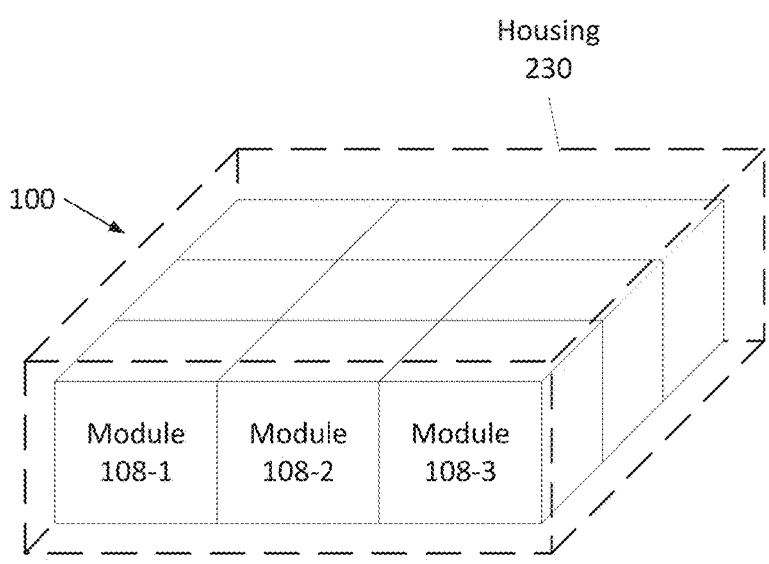
FIG. 2D is a block diagram depicting an example embodiment of a physical configuration of a modular energy system.

Modules 108 of system 100 can be physically arranged with respect to each other in various configurations that depend on the needs of the application and the number of loads. For example, in a stationary application where system 100 provides power for a microgrid, modules 108 can be placed in one or more racks or other frameworks. Such configurations may be suitable for larger mobile applications as well, such as maritime vessels. Alternatively, modules 108 can be secured together and located within a common housing, referred to as a pack. A rack or a pack may have its own dedicated cooling system shared across all modules. Pack configurations are useful for smaller mobile applications such as electric cars. System 100 can be implemented with one or more racks (e.g., for parallel supply to a microgrid) or one or more packs (e.g., serving different motors of the vehicle), or combination thereof. FIG. 2D is a block diagram depicting an example embodiment of system 100 configured as a pack with nine modules 108 electrically and physically coupled together within a common housing 230.

Examples of these and further configurations are described in Int'l. Appl. No. PCT/US20/25366, filed Mar. 27, 2020 and titled Module-Based Energy Systems Capable of Cascaded and Interconnected Configurations, and Methods Related Thereto, which is incorporated by reference herein in its entirety for all purposes.

Figure 3A:
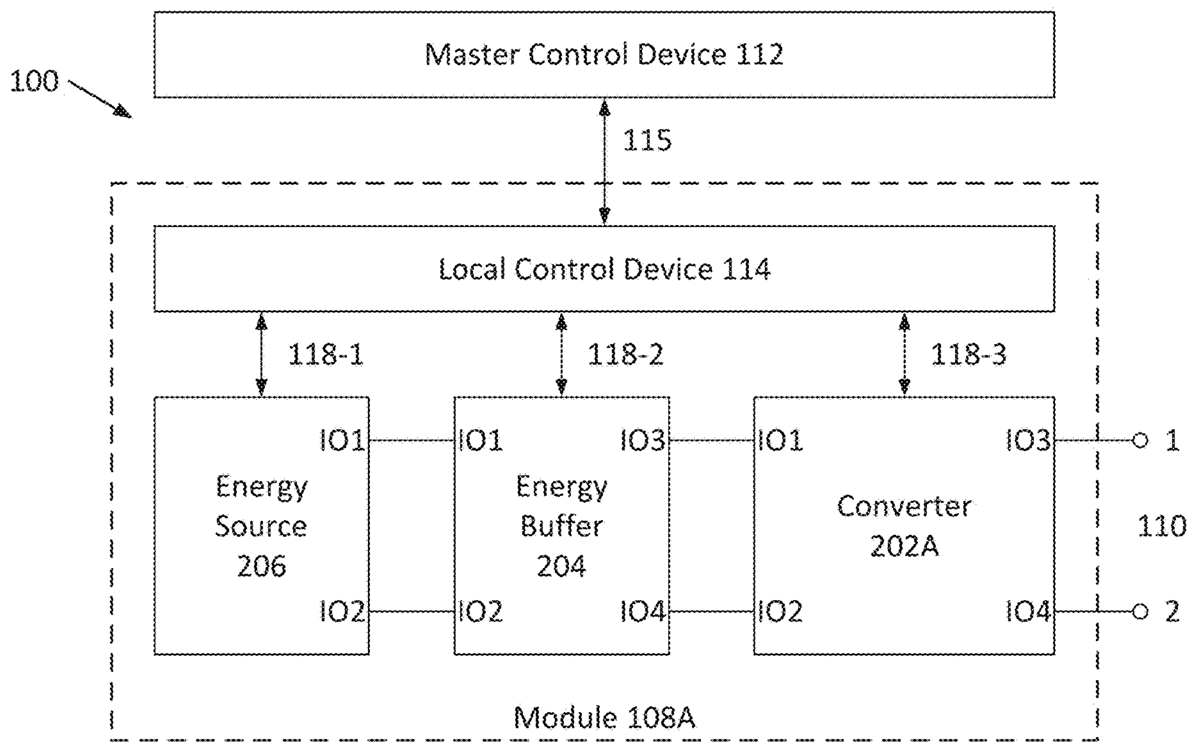
FIGS. 3A-3C are block diagrams depicting example embodiments of modules having various electrical configurations.
Figure 3B:
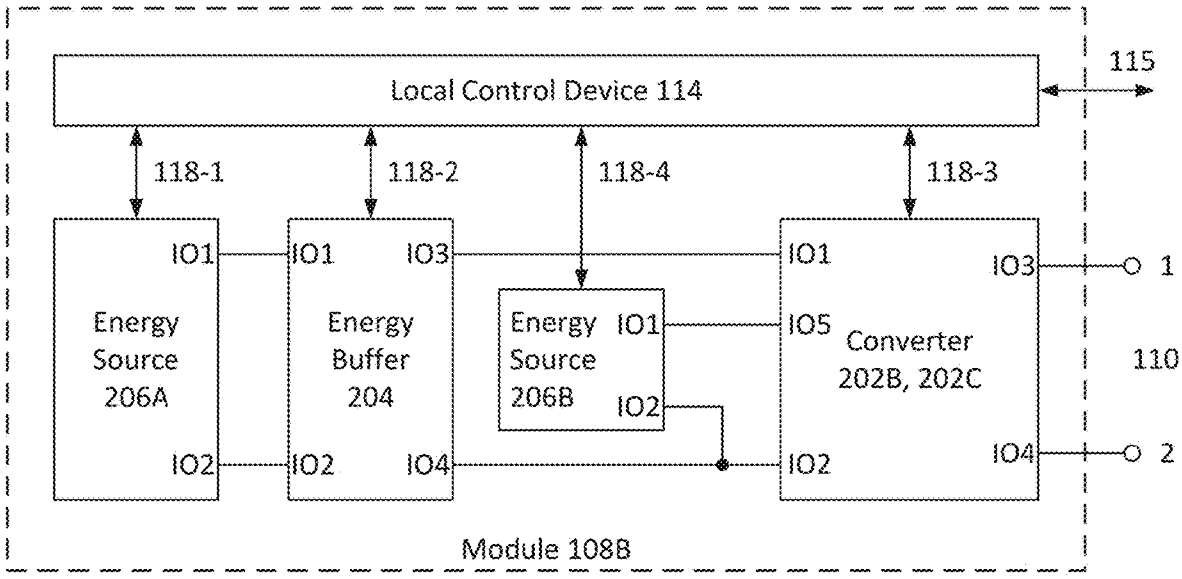
Figure 3C:
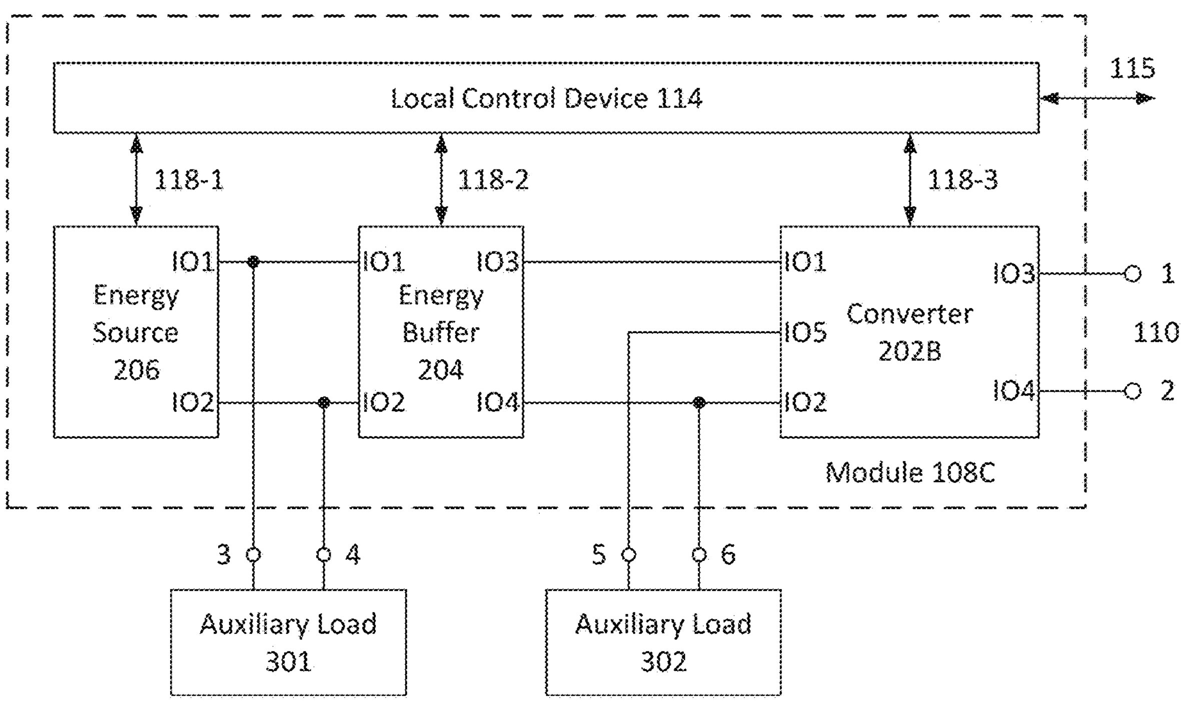

FIGS. 3A-3C are block diagrams depicting example embodiments of modules 108 having various electrical configurations. These embodiments are described as having one LCD 114 per module 108, with the LCD 114 housed within the associated module, but can be configured otherwise as described herein. FIG. 3A depicts a first example configuration of a module 108A within system 100. Module 108A includes energy source 206, energy buffer 204, and converter 202A. Each component has power connection ports (e.g., terminals, connectors) into which power can be input and/or from which power can be output, referred to herein as IO ports. Such ports can also be referred to as input ports or output ports depending on the context.

Figure 5A:
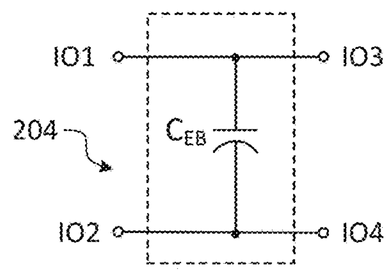
FIGS. 5A-5C are schematic views depicting example embodiments of energy buffers.
Figure 5B:
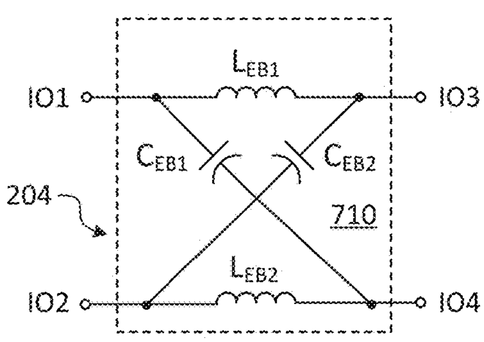
Figure 5C:
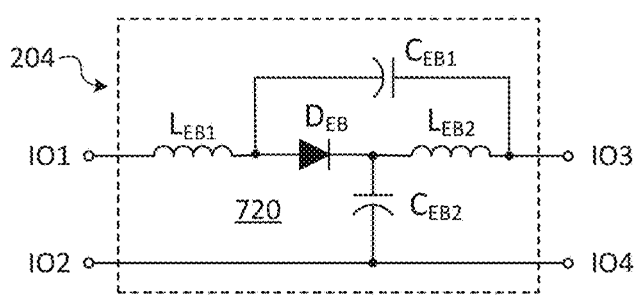

Energy source 206 can be configured as any of the energy source types described herein (e.g., a battery as described with respect to FIGS. 4A-4D, an HED capacitor, a fuel cell, or otherwise). Ports IO1 and IO2 of energy source 206 can be connected to ports IO1 and IO2, respectively, of energy buffer 204. Energy buffer 204 can be configured to buffer or filter high and low frequency energy pulsations arriving at buffer 204 through converter 202, which can otherwise degrade the performance of module 108. The topology and components for buffer 204 are selected to accommodate the maximum permissible amplitude of these high frequency voltage pulsations. Several (non-exhaustive) example embodiments of energy buffer 204 are depicted in the schematic diagrams of FIGS. 5A-5C. In FIG. 5A, buffer 204 is an electrolytic and/or film capacitor $C_{EB}$, in FIG. 5B buffer 204 is a Z-source network 710, formed by two inductors $L_{EB1}$ and $L_{EB2}$ and two electrolytic and/or film capacitors $C_{EB1}$ and $C_{EB2}$, and in FIG. 5C buffer 204 is a quasi Z-source network 720, formed by two inductors $L_{EB1}$ and $L_{EB2}$, two electrolytic and/or film capacitors $C_{EB1}$ and $C_{EB2}$ and a diode $D_{EB}$.

Figure 6A:
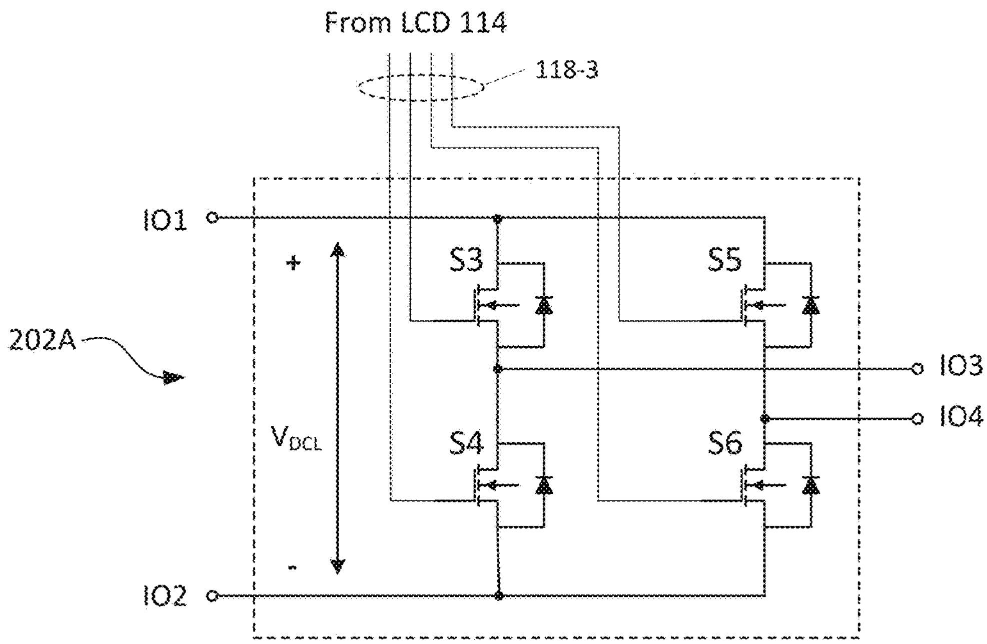
FIGS. 6A-6C are schematic views depicting example embodiments of converters.

Ports IO3 and IO4 of energy buffer 204 can be connected to ports IO1 and IO2, respectively, of converter 202A, which can be configured as any of the power converter types described herein. FIG. 6A is a schematic diagram depicting an example embodiment of converter 202A configured as a DC-AC converter that can receive a DC voltage at ports IO1 and IO2 and switch to generate pulses at ports IO3 and IO4. Converter 202A can include multiple switches, and here converter 202A includes four switches S3, S4, S5, S6 arranged in a full bridge configuration. Control system 102 or LCD 114 can independently control each switch via control input lines 118-3 to each gate.

The switches can be any suitable switch type, such as power semiconductors like the metal-oxide-semiconductor field-effect transistors (MOSFETs) shown here, insulated gate bipolar transistors (IGBTs), or gallium nitride (GaN) transistors. Semiconductor switches can operate at relatively high switching frequencies, thereby permitting converter 202 to be operated in pulse-width modulated (PWM) mode if desired, and to respond to control commands within a relatively short interval of time. This can provide a high tolerance of output voltage regulation and fast dynamic behavior in transient modes.

In this embodiment, a DC line voltage $V_{DCL}$ can be applied to converter 202 between ports IO1 and IO2. By connecting $V_{DCL}$ to ports IO3 and IO4 by different combinations of switches S3, S4, S5, S6, converter 202 can generate three different voltage outputs at ports IO3 and IO4: $+V_{DCL}$, 0, and $-V_{DCL}$. A switch signal provided to each switch controls whether the switch is on (closed) or off (open). To obtain $+V_{DCL}$, switches S3 and S6 are turned on while S4 and S5 are turned off, whereas $-V_{DCL}$ can be obtained by turning on switches S4 and S5 and turning off S3 and S6. The output voltage can be set to zero (including near zero) or a reference voltage by turning on S3 and S5 with S4 and S6 off, or by turning on S4 and S6 with S3 and S5 off. These voltages can be output from module 108 over power connection 110. Ports IO3 and IO4 of converter 202 can be connected to (or form) module IO ports 1 and 2 of power connection 110, so as to generate the output voltage for use with output voltages from other modules 108.

The control or switch signals for the embodiments of converter 202 described herein can be generated in different ways depending on the control technique utilized by system 100 to generate the output voltage of converter 202. In some embodiments, the control technique is a PWM technique such as space vector pulse-width modulation (SVPWM) or sinusoidal pulse-width modulation (SPWM), or variations thereof. FIG. 8A is a graph of voltage versus time depicting an example of an output voltage waveform 802 of converter 202. For ease of description, the embodiments herein will be described in the context of a PWM control technique, although the embodiments are not limited to such. Other classes of techniques can be used. One alternative class is based on hysteresis, examples of which are described in Int'l Publ. Nos. WO 2018/231810A1, WO 2018/232403A1, and WO 2019/183553A1, which are incorporated by reference herein for all purposes.

Each module 108 can be configured with multiple energy sources 206 (e.g., two, three, four, or more). Each energy source 206 of module 108 can be controllable (switchable) to supply power to connection 110 (or receive power from a charge source) independent of the other sources 206 of the module. For example, all sources 206 can output power to connection 110 (or be charged) at the same time, or only one (or a subset) of sources 206 can supply power (or be charged) at any one time. In some embodiments, the sources 206 of the module can exchange energy between them, e.g., one source 206 can charge another source 206. Each of the sources 206 can be configured as any energy source described herein (e.g., battery, HED capacitor, fuel cell). Each of the sources 206 can be the same type (e.g., each can be a battery), or a different type (e.g., a first source can be a battery and a second source can be an HED capacitor, or a first source can be a battery having a first type (e.g., NMC) and a second source can be a battery having a second type (e.g., LFP).

FIG. 3B is a block diagram depicting an example embodiment of a module 108B in a dual energy source configuration with a primary energy source 206A and secondary energy source 206B. Ports IO1 and IO2 of primary source 202A can be connected to ports IO1 and IO2 of energy buffer 204. Module 108B includes a converter 202B having an additional IO port. Ports IO3 and IO4 of buffer 204 can be connected ports IO1 and IO2, respectively, of converter 202B. Ports IO1 and IO2 of secondary source 206B can be connected to ports IO5 and IO2, respectively, of converter 202B (also connected to port IO4 of buffer 204).

In this example embodiment of module 108B, primary energy source 202A, along with the other modules 108 of system 100, supplies the average power needed by the load. Secondary source 202B can serve the function of assisting energy source 202 by providing additional power at load power peaks, or absorbing excess power, or otherwise.

Figure 4E:
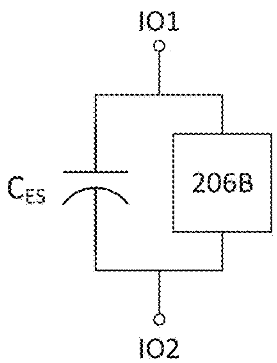
Figure 4F:
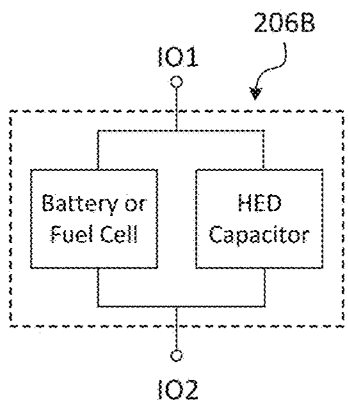

As mentioned both primary source 206A and secondary source 206B can be utilized simultaneously or at separate times depending on the switch state of converter 202B. If at the same time, an electrolytic and/or a film capacitor ($C_{ES}$) can be placed in parallel with source 206B as depicted in FIG. 4E to act as an energy buffer for the source 206B, or energy source 206B can be configured to utilize an HED capacitor in parallel with another energy source (e.g., a battery or fuel cell) as depicted in FIG. 4F.

Figure 6B:
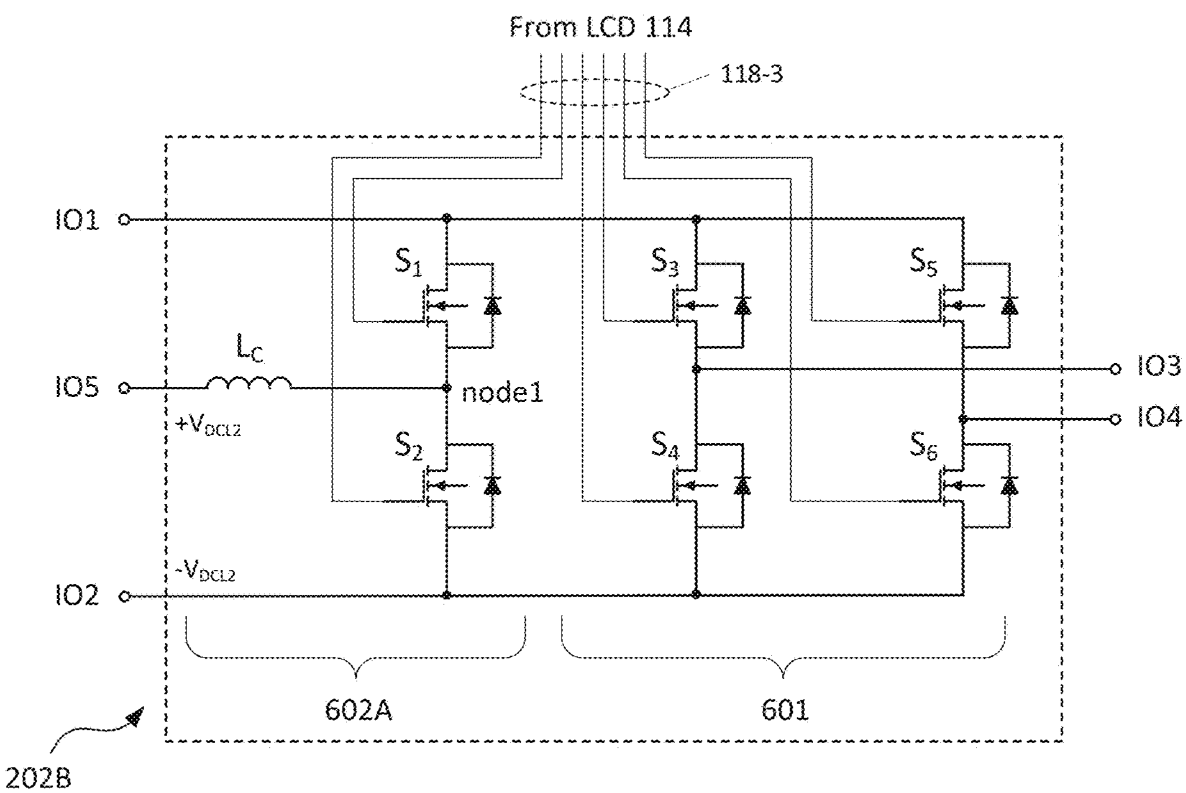
Figure 6C:
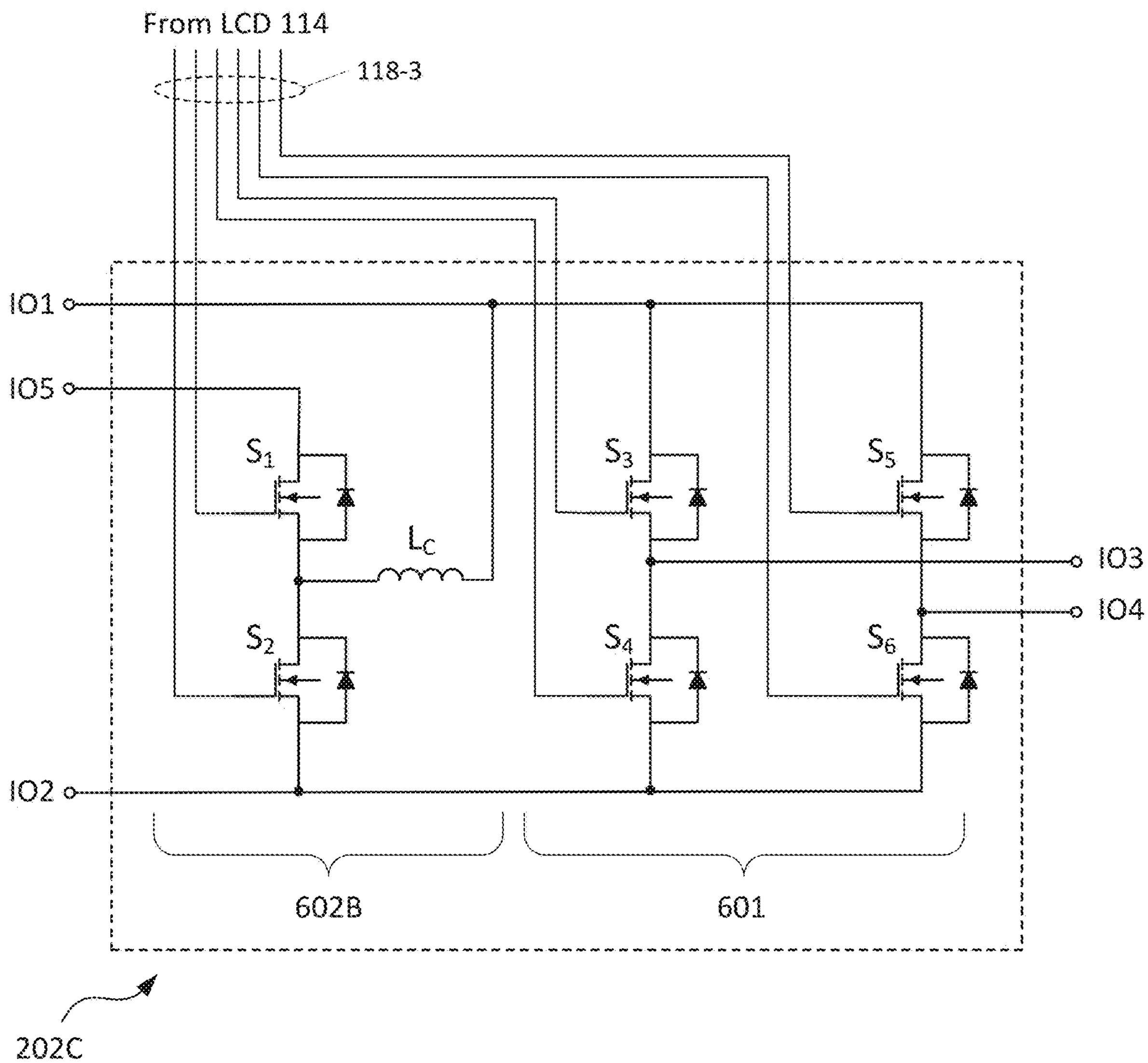

FIGS. 6B and 6C are schematic views depicting example embodiments of converters 202B and 202C, respectively. Converter 202B includes switch circuitry portions 601 and 602A. Portion 601 includes switches S3 through S6 configured as a full bridge in similar manner to converter 202A, and is configured to selectively couple IO1 and IO2 to either of IO3 and IO4, thereby changing the output voltages of module 108B. Portion 602A includes switches S1 and S2 configured as a half bridge and coupled between ports IO1 and IO2. A coupling inductor $L_C$ is connected between port IO5 and a node1 present between switches S1 and S2 such that switch portion 602A is a bidirectional converter that can regulate (boost or buck) voltage (or inversely current). Switch portion 602A can generate two different voltages at node1, which are $+V_{DCL2}$ and 0, referenced to port IO2, which can be at virtual zero potential. The current drawn from or input to energy source 202B can be controlled by regulating the voltage on coupling inductor $L_C$, using, for example, a pulse-width modulation technique or a hysteresis control method for commutating switches S1 and S2. Other techniques can also be used.

Converter 202C differs from that of 202B as switch portion 602B includes switches S1 and S2 configured as a half bridge and coupled between ports IO5 and IO2. A coupling inductor $L_C$ is connected between port IO1 and a node1 present between switches S1 and S2 such that switch portion 602B is configured to regulate voltage.

Control system 102 or LCD 114 can independently control each switch of converters 202B and 202C via control input lines 118-3 to each gate. In these embodiments and that of FIG. 6A, LCD 114 (not MCD 112) generates the switching signals for the converter switches. Alternatively, MCD 112 can generate the switching signals, which can be communicated directly to the switches, or relayed by LCD 114.

In embodiments where a module 108 includes three or more energy sources 206, converters 202B and 202C can be scaled accordingly such that each additional energy source 206B is coupled to an additional IO port leading to an additional switch circuitry portion 602A or 602B, depending on the needs of the particular source. For example a dual source converter 202 can include both switch portions 202A and 202B.

Modules 108 with multiple energy sources 206 are capable of performing additional functions such as energy sharing between sources 206, energy capture from within the application (e.g., regenerative braking), charging of the primary source by the secondary source even while the overall system is in a state of discharge, and active filtering of the module output. The active filtering function can also be performed by modules having a typical electrolytic capacitor instead of a secondary energy source. Examples of these functions are described in more detail in Int'l. Appl. No. PCT/US20/25366, filed Mar. 27, 2020 and titled Module-Based Energy Systems Capable of Cascaded and Interconnected Configurations, and Methods Related Thereto, and Int'l. Publ. No. WO 2019/183553, filed Mar. 22, 2019, and titled Systems and Methods for Power Management and Control, both of which are incorporated by reference herein in their entireties for all purposes.

Each module 108 can be configured to supply one or more auxiliary loads with its one or more energy sources 206. Auxiliary loads are loads that require lower voltages than the primary load 101. Examples of auxiliary loads can be, for example, an on-board electrical network of an electric vehicle, or an HVAC system of an electric vehicle. The load of system 100 can be, for example, one of the phases of the electric vehicle motor or electrical grid. This embodiment can allow a complete decoupling between the electrical characteristics (terminal voltage and current) of the energy source and those of the loads.

FIG. 3C is a block diagram depicting an example embodiment of a module 108C configured to supply power to a first auxiliary load 301 and a second auxiliary load 302, where module 108C includes an energy source 206, energy buffer 204, and converter 202B coupled together in a manner similar to that of FIG. 3B. First auxiliary load 301 requires a voltage equivalent to that supplied from source 206. Load 301 is coupled to IO ports 3 and 4 of module 108C, which are in turn coupled to ports IO1 and IO2 of source 206. Source 206 can output power to both power connection 110 and load 301. Second auxiliary load 302 requires a constant voltage lower than that of source 206. Load 302 is coupled to IO ports 5 and 6 of module 108C, which are coupled to ports IO5 and IO2, respectively, of converter 202B. Converter 202B can include switch portion 602 having coupling inductor $L_C$ coupled to port IO5 (FIG. 6B). Energy supplied by source 206 can be supplied to load 302 through switch portion 602 of converter 202B. It is assumed that load 302 has an input capacitor (a capacitor can be added to module 108C if not), so switches S1 and S2 can be commutated to regulate the voltage on and current through coupling inductor $L_C$ and thus produce a stable constant voltage for load 302. This regulation can step down the voltage of source 206 to the lower magnitude voltage is required by load 302.

Module 108C can thus be configured to supply one or more first auxiliary loads in the manner described with respect to load 301, with the one or more first loads coupled to IO ports 3 and 4. Module 108C can also be configured to supply one or more second auxiliary loads in the manner described with respect to load 302. If multiple second auxiliary loads 302 are present, then for each additional load 302 module 108C can be scaled with additional dedicated module output ports (like 5 and 6), an additional dedicated switch portion 602, and an additional converter IO port coupled to the additional portion 602.

Energy source 206 can thus supply power for any number of auxiliary loads (e.g., 301 and 302), as well as the corresponding portion of system output power needed by primary load 101. Power flow from source 206 to the various loads can be adjusted as desired.

Module 108 can be configured as needed with two or more energy sources 206 (FIG. 3B) and to supply first and/or second auxiliary loads (FIG. 3C) through the addition of a switch portion 602 and converter port IO5 for each additional source 206B or second auxiliary load 302. Additional module IO ports (e.g., 3, 4, 5, 6) can be added as needed. Module 108 can also be configured as an interconnection module to exchange energy (e.g., for balancing) between two or more arrays, two or more packs, or two or more systems 100 as described further herein. This interconnection functionality can likewise be combined with multiple source and/or multiple auxiliary load supply capabilities.

Control system 102 can perform various functions with respect to the components of modules 108A, 108B, and 108C. These functions can include management of the utilization (amount of use) of each energy source 206, protection of energy buffer 204 from over-current, overvoltage and high temperature conditions, and control and protection of converter 202.

For example, to manage (e.g., adjust by increasing, decreasing, or maintaining) utilization of each energy source 206, LCD 114 can receive one or more monitored voltages, temperatures, and currents from each energy source 206 (or monitor circuitry). The monitored voltages can be at least one of, preferably all, voltages of each elementary component independent of the other components (e.g., each individual battery cell, HED capacitor, and/or fuel cell) of the source 206, or the voltages of groups of elementary components as a whole (e.g., voltage of the battery array, HED capacitor array, and/or fuel cell array). Similarly the monitored temperatures and currents can be at least one of, preferably all, temperatures and currents of each elementary component independent of the other components of the source 206, or the temperatures and currents of groups of elementary components as a whole, or any combination thereof. The monitored signals can be status information, with which LCD 114 can perform one or more of the following: calculation or determination of a real capacity, actual State of Charge (SOC) and/or State of Health (SOH) of the elementary components or groups of elementary components; set or output a warning or alarm indication based on monitored and/or calculated status information; and/or transmission of the status information to MCD 112. LCD 114 can receive control information (e.g., a modulation index, synchronization signal) from MCD 112 and use this control information to generate switch signals for converter 202 that manage the utilization of the source 206.

To protect energy buffer 204, LCD 114 can receive one or more monitored voltages, temperatures, and currents from energy buffer 204 (or monitor circuitry). The monitored voltages can be at least one of, preferably all, voltages of each elementary component of buffer 204 (e.g., of $C_{EB}$, $C_{EB1}$, $C_{EB2}$, $L_{EB1}$, $L_{EB2}$, $D_{EB}$) independent of the other components, or the voltages of groups of elementary components or buffer 204 as a whole (e.g., between IO1 and IO2 or between IO3 and IO4). Similarly the monitored temperatures and currents can be at least one of, preferably all, temperatures and currents of each elementary component of buffer 204 independent of the other components, or the temperatures and currents of groups of elementary components or of buffer 204 as a whole, or any combination thereof. The monitored signals can be status information, with which LCD 114 can perform one or more of the following: set or output a warning or alarm indication; communicate the status information to MCD 112; or control converter 202 to adjust (increase or decrease) the utilization of source 206 and module 108 as a whole for buffer protection.

To control and protect converter 202, LCD 114 can receive the control information from MCD 112 (e.g., a modulated reference signal, or a reference signal and a modulation index), which can be used with a PWM technique in LCD 114 to generate the control signals for each switch (e.g., S1 through S6). LCD 114 can receive a current feedback signal from a current sensor of converter 202, which can be used for overcurrent protection together with one or more fault status signals from driver circuits (not shown) of the converter switches, which can carry information about fault statuses (e.g., short circuit or open circuit failure modes) of all switches of converter 202. Based on this data, LCD 114 can make a decision on which combination of switching signals to be applied to manage utilization of module 108, and potentially bypass or disconnect converter 202 (and the entire module 108) from system 100.

If controlling a module 108C that supplies a second auxiliary load 302, LCD 114 can receive one or more monitored voltages (e.g., the voltage between IO ports 5 and 6) and one or more monitored currents (e.g., the current in coupling inductor $L_C$, which is a current of load 302) in module 108C. Based on these signals, LCD 114 can adjust the switching cycles (e.g., by adjustment of modulation index or reference waveform) of S1 and S2 to control (and stabilize) the voltage for load 302.

Examples of Cascaded Energy System Topologies

Figure 7C:
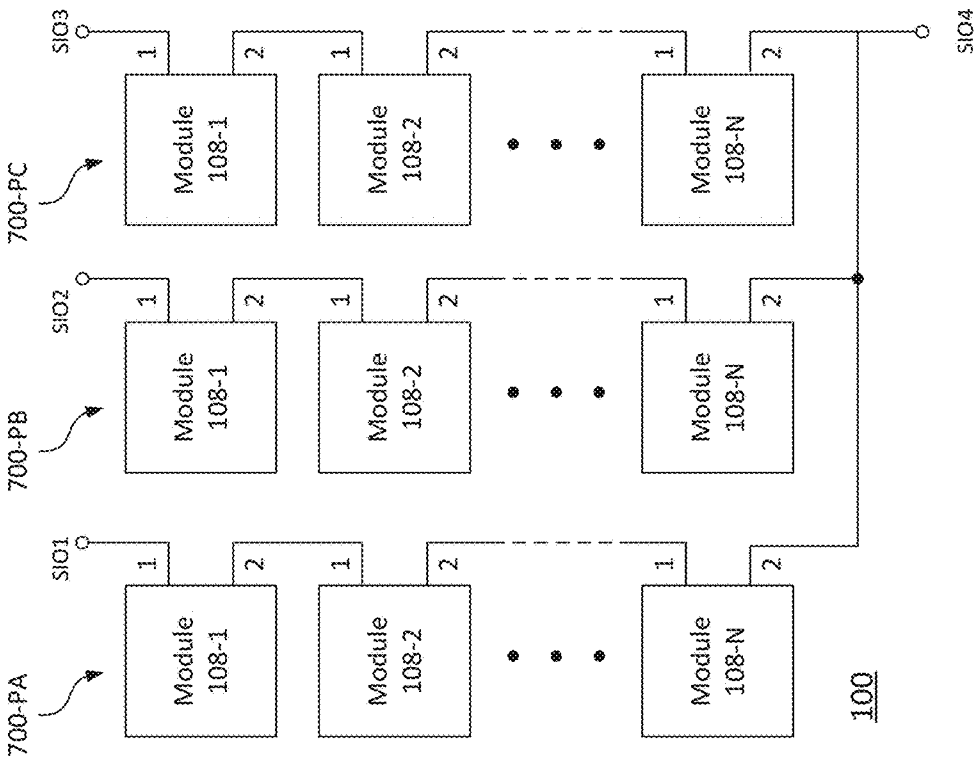
FIGS. 7A-7E are block diagrams depicting example embodiments of modular energy systems having various topologies.

Two or more modules 108 can be coupled together in a cascaded array that outputs a voltage signal formed by a superposition of the discrete voltages generated by each module 108 within the array. FIG. 7A is a block diagram depicting an example embodiment of a topology for system 100 where N modules 108-1, 108-2 . . . 108-N are coupled together in series to form a serial array 700. In this and all embodiments described herein, N can be any integer greater than one. Array 700 includes a first system IO port SIO1 and a second system IO port SIO2 across which is generated an array output voltage. Array 700 can be used as a DC or single phase AC energy source for DC or AC single-phase loads, which can be connected to SIO1 and SIO2 of array 700. FIG. 8A is a plot of voltage versus time depicting an example output signal produced by a single module 108 having a 48 volt energy source. FIG. 8B is a plot of voltage versus time depicting an example single phase AC output signal generated by array 700 having six 48V modules 108 coupled in series.

System 100 can be arranged in a broad variety of different topologies to meet varying needs of the applications. System 100 can provide multi-phase power (e.g., two-phase, three-phase, four-phase, five-phase, six-phase, etc.) to a load by use of multiple arrays 700, where each array can generate an AC output signal having a different phase angle.

Figure 7B:
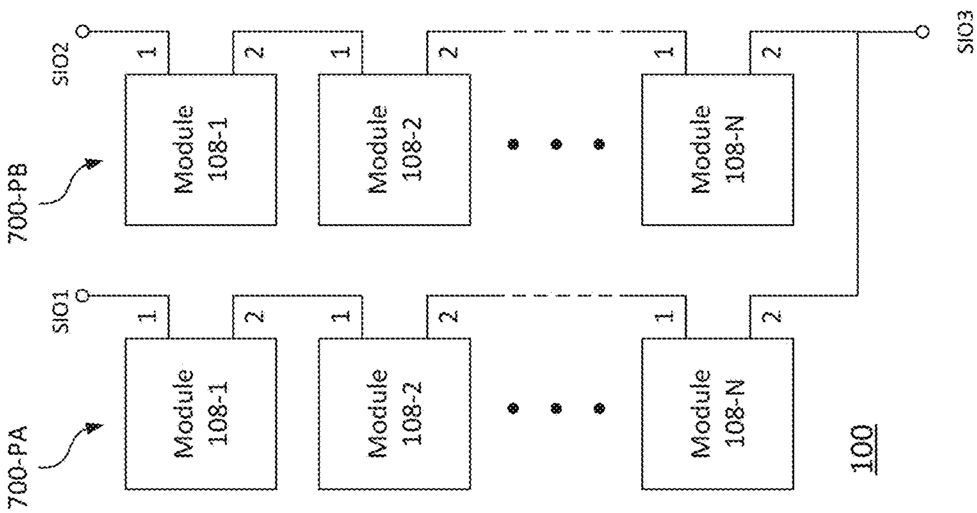
Figure 7A:
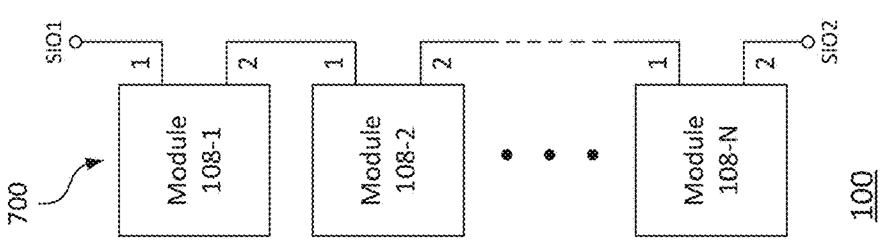

FIG. 7B is a block diagram depicting system 100 with two arrays 700-PA and 700-PB coupled together. Each array 700 is one-dimensional, formed by a series connection of N modules 108. The two arrays 700-PA and 700-PB can each generate a single-phase AC signal, where the two AC signals have different phase angles PA and PB (e.g., 180 degrees apart). IO port 1 of module 108-1 of each array 700-PA and 700-PB can form or be connected to system IO ports SIO1 and SIO2, respectively, which in turn can serve as a first output of each array that can provide two phase power to a load (not shown). Or alternatively ports SIO1 and SIO2 can be connected to provide single phase power from two parallel arrays. IO port 2 of module 108-N of each array 700-PA and 700-PB can serve as a second output for each array 700-PA and 700-PB on the opposite end of the array from system IO ports SIO1 and SIO2, and can be coupled together at a common node and optionally used for an additional system IO port SIO3 if desired, which can serve as a neutral. This common node can be referred to as a rail, and IO port 2 of modules 108-N of each array 700 can be referred to as being on the rail side of the arrays.

FIG. 7C is a block diagram depicting system 100 with three arrays 700-PA, 700-PB, and 700-PC coupled together. Each array 700 is one-dimensional, formed by a series connection of N modules 108. The three arrays 700-1 and 700-2 can each generate a single-phase AC signal, where the three AC signals have different phase angles PA, PB, PC (e.g., 120 degrees apart). IO port 1 of module 108-1 of each array 700-PA, 700-PB, and 700-PC can form or be connected to system IO ports SIO1, SIO2, and SIO3, respectively, which in turn can provide three phase power to a load (not shown). IO port 2 of module 108-N of each array 700-PA, 700-PB, and 700-PC can be coupled together at a common node and optionally used for an additional system IO port SIO4 if desired, which can serve as a neutral.

The concepts described with respect to the two-phase and three-phase embodiments of FIGS. 7B and 7C can be extended to systems 100 generating still more phases of power. For example, a non-exhaustive list of additional examples includes: system 100 having four arrays 700, each of which is configured to generate a single phase AC signal having a different phase angle (e.g., 90 degrees apart): system 100 having five arrays 700, each of which is configured to generate a single phase AC signal having a different phase angle (e.g., 72 degrees apart); and system 100 having six arrays 700, each array configured to generate a single phase AC signal having a different phase angle (e.g., 60 degrees apart).

System 100 can be configured such that arrays 700 are interconnected at electrical nodes between modules 108 within each array. FIG. 7D is a block diagram depicting system 100 with three arrays 700-PA, 700-PB, and 700-PC coupled together in a combined series and delta arrangement. Each array 700 includes a first series connection of M modules 108, where M is two or greater, coupled with a second series connection of N modules 108, where N is two or greater. The delta configuration is formed by the interconnections between arrays, which can be placed in any desired location. In this embodiment, IO port 2 of module 108-(M+N) of array 700-PC is coupled with IO port 2 of module 108-M and IO port 1 of module 108-(M+1) of array 700-PA, IO port 2 of module 108-(M+N) of array 700-PB is coupled with IO port 2 of module 108-M and IO port 1 of module 108-(M+1) of array 700-PC, and IO port 2 of module 108-(M+N) of array 700-PA is coupled with IO port 2 of module 108-M and IO port 1 of module 108-(M+1) of array 700-PB.

Figure 7E:
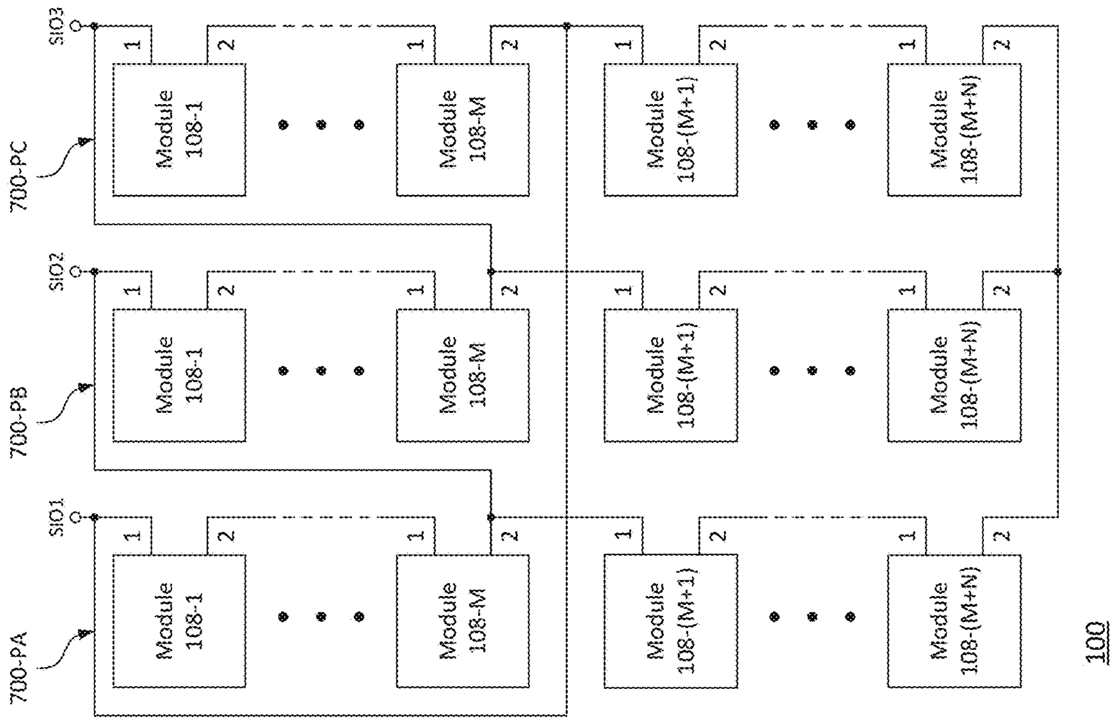
Figure 7D:
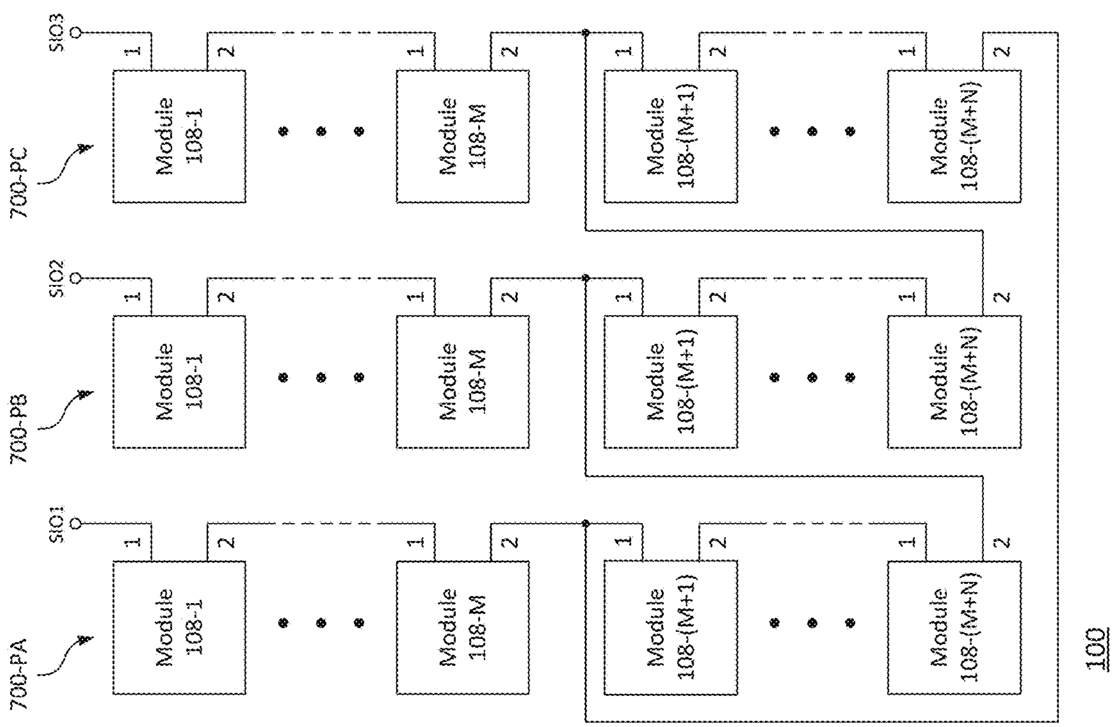

FIG. 7E is a block diagram depicting system 100 with three arrays 700-PA, 700-PB, and 700-PC coupled together in a combined series and delta arrangement. This embodiment is similar to that of FIG. 7D except with different cross connections. In this embodiment, IO port 2 of module 108-M of array 700-PC is coupled with IO port 1 of module 108-1 of array 700-PA, IO port 2 of module 108-M of array 700-PB is coupled with IO port 1 of module 108-1 of array 700-PC, and IO port 2 of module 108-M of array 700-PA is coupled with IO port 1 of module 108-1 of array 700-PB. The arrangements of FIGS. 7D and 7E can be implemented with as little as two modules in each array 700. Combined delta and series configurations enable an effective exchange of energy between all modules 108 of the system (interphase balancing) and phases of power grid or load, and also allows reducing the total number of modules 108 in an array 700 to obtain the desired output voltages.

In the embodiments described herein, although it is advantageous for the number of modules 108 to be the same in each array 700 within system 100, such is not required and different arrays 700 can have differing numbers of modules 108. Further, each array 700 can have modules 108 that are all of the same configuration (e.g., all modules are 108A, all modules are 108B, all modules are 108C, or others) or different configurations (e.g., one or more modules are 108A, one or more are 108B, and one or more are 108C, or otherwise). As such, the scope of topologies of system 100 covered herein is broad.

Example Embodiments of Control Methodologies

As mentioned, control of system 100 can be performed according to various methodologies, such as hysteresis or PWM. Several examples of PWM include space vector modulation and sine pulse width modulation, where the switching signals for converter 202 are generated with a phase shifted carrier technique that continuously rotates utilization of each module 108 to equally distribute power among them.

Figure 8C:
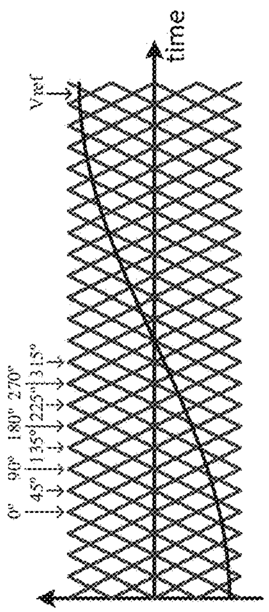
FIG. 8C is a plot depicting an example reference signal and carrier signals usable in a pulse width modulation control technique.
Figure 8D:
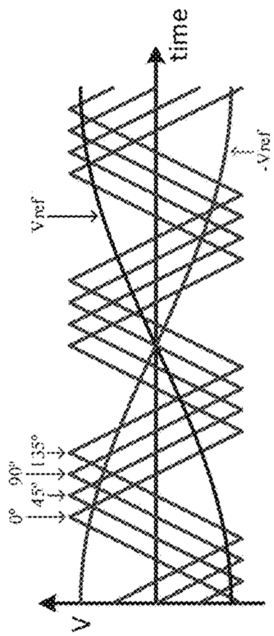
FIG. 8D is a plot depicting example reference signals and carrier signals usable in a pulse width modulation control technique.
Figure 8E:
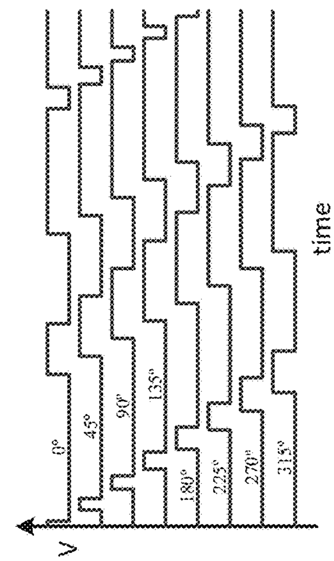
FIG. 8E is a plot depicting example switch signals generated according to a pulse width modulation control technique.
Figure 8F:
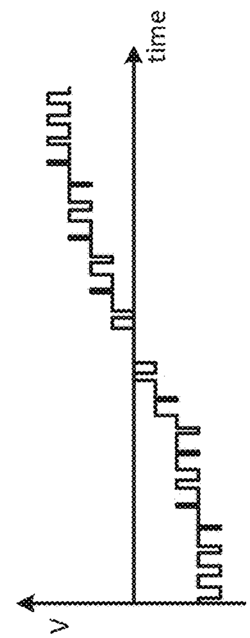
FIG. 8F as a plot depicting an example multilevel output voltage generated by superposition of output voltages from an array of modules under a pulse width modulation control technique.
Figure 8A:
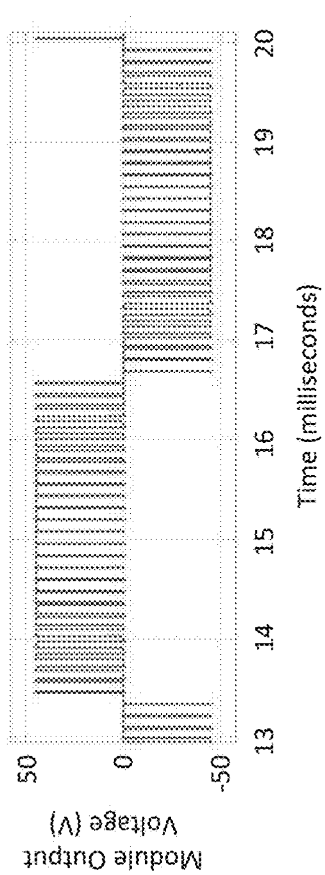
FIG. 8A is a plot depicting an example output voltage of a module.
Figure 8B:
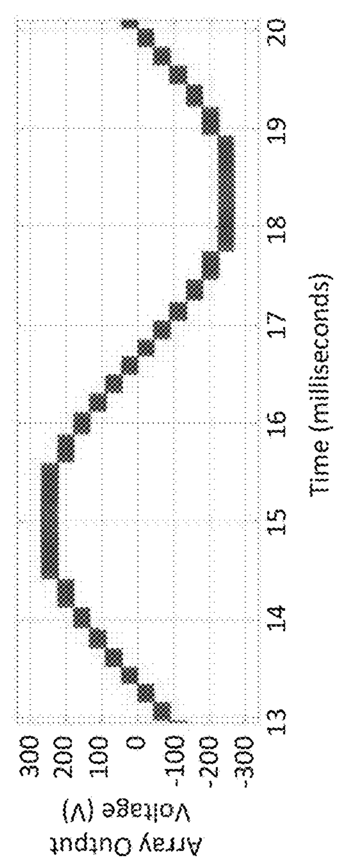
FIG. 8B is a plot depicting an example multilevel output voltage of an array of modules.

FIGS. 8C-8F are plots depicting an example embodiment of a phase-shifted PWM control methodology that can generate a multilevel output PWM waveform using incrementally shifted two-level waveforms. An X-level PWM waveform can be created by the summation of (X−1)/2 two-level PWM waveforms. These two-level waveforms can be generated by comparing a reference waveform Vref to carriers incrementally shifted by 360°/(X−1). The carriers are triangular, but the embodiments are not limited to such. A nine-level example is shown in FIG. 8C (using four modules 108). The carriers are incrementally shifted by 360°/(9−1)=45° and compared to Vref. The resulting two-level PWM waveforms are shown in FIG. 8E. These two-level waveforms may be used as the switching signals for semiconductor switches (e.g., S1 though S6) of converters 202. As an example with reference to FIG. 8E, for a one-dimensional array 700 including four modules 108 each with a converter 202, the 0° signal is for control of S3 and the 180° signal for S6 of the first module 108-1, the 45° signal is for S3 and the 225° signal for S6 of the second module 108-2, the 90 signal is for S3 and the 270 signal is for S6 of the third module 108-3, and the 135 signal is for S3 and the 315 signal is for S6 of the fourth module 108-4. The signal for S3 is complementary to S4 and the signal for S5 is complementary to S6 with sufficient dead-time to avoid shoot through of each half-bridge. FIG. 8F depicts an example single phase AC waveform produced by superposition (summation) of output voltages from the four modules 108.

An alternative is to utilize both a positive and a negative reference signal with the first (N−1)/2 carriers. A nine-level example is shown in FIG. 8D, In this example, the 0° to 135° switching signals (FIG. 8E) are generated by comparing +Vref to the 0° to 135° carriers of FIG. 8D and the 180° to 315° switching signals are generated by comparing −Vref to the 0° to 135° carriers of FIG. 8D. However, the logic of the comparison in the latter case is reversed. Other techniques such as a state machine decoder may also be used to generate gate signals for the switches of converter 202.

In multi-phase system embodiments, the same carriers can be used for each phase, or the set of carriers can be shifted as a whole for each phase. For example, in a three phase system with a single reference voltage (Vref), each array 700 can use the same number of carriers with the same relative offsets as shown in FIGS. 8C and 8D, but the carriers of the second phase are shift by 120 degrees as compared to the carriers of the first phase, and the carriers of the third phase are shifted by 240 degrees as compared to the carriers of the first phase. If a different reference voltage is available for each phase, then the phase information can be carried in the reference voltage and the same carriers can be used for each phase. In many cases the carrier frequencies will be fixed, but in some example embodiments, the carrier frequencies can be adjusted, which can help to reduce losses in EV motors under high current conditions.

The appropriate switching signals can be provided to each module by control system 102. For example, MCD 112 can provide Vref and the appropriate carrier signals to each LCD 114 depending upon the module or modules 108 that LCD 114 controls, and the LCD 114 can then generate the switching signals. Or all LCDs 114 in an array can be provided with all carrier signals and the LCD can select the appropriate carrier signals.

The relative utilizations of each module 108 can adjusted based on status information to perform balancing or of one or more parameters as described herein. Balancing of parameters can involve adjusting utilization to minimize parameter divergence over time as compared to a system where individual module utilization adjustment is not performed. The utilization can be the relative amount of time a module 108 is discharging when system 100 is in a discharge state, or the relative amount of time a module 108 is charging when system 100 is in a charge state.

As described herein, modules 108 can be balanced with respect to other modules in an array 700, which can be referred to as intra array or interphase balancing, and different arrays 700 can be balanced with respect to each other, which can be referred to as interarray or interphase balancing. Arrays 700 of different subsystems can also be balanced with respect to each other. Control system 102 can simultaneously perform any combination of intraphase balancing, interphase balancing, utilization of multiple energy sources within a module, active filtering, and auxiliary load supply.

Figure 9A:
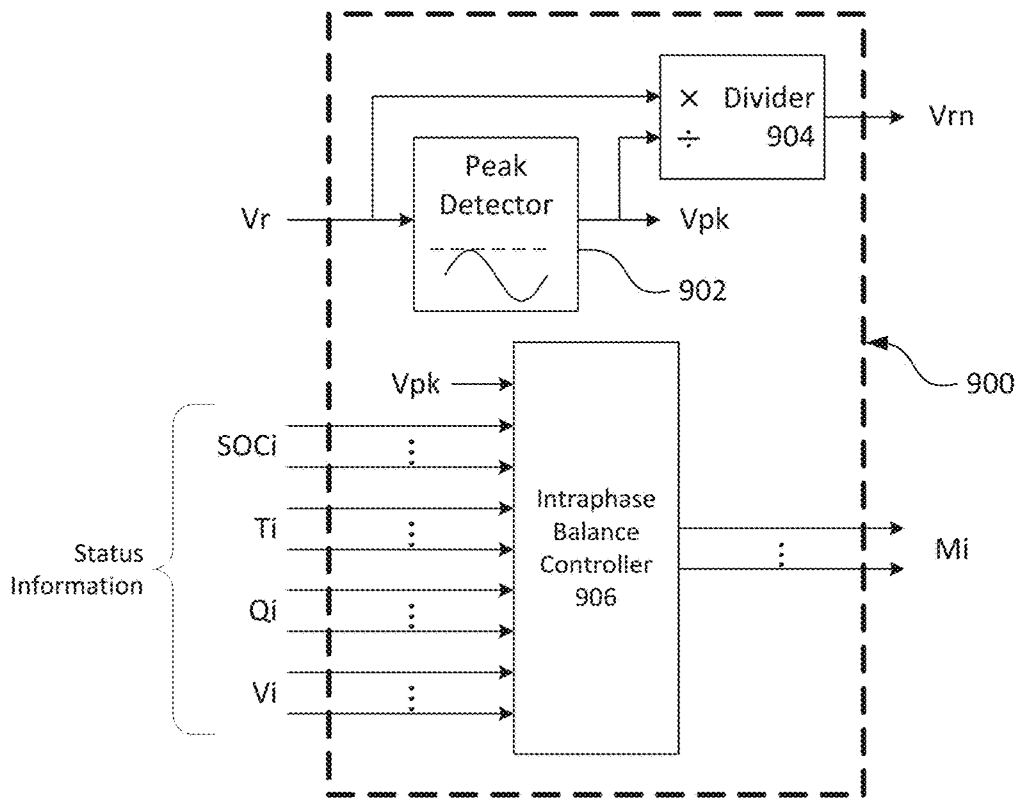
FIGS. 9A-9B are block diagrams depicting example embodiments of controllers for a modular energy system.

FIG. 9A is a block diagram depicting an example embodiment of an array controller 900 of control system 102 for a single-phase AC or DC array. Array controller 900 can include a peak detector 902, a divider 904, and an intraphase (or intra array) balance controller 906. Array controller 900 can receive a reference voltage waveform (Vr) and status information about each of the N modules 108 in the array (e.g., state of charge (SOCi), temperature (Ti), capacity (Qi), and voltage (Vi)) as inputs, and generate a normalized reference voltage waveform (Vrn) and modulation indexes (Mi) as outputs. Peak detector 902 detects the peak (Vpk) of Vr, which can be specific to the phase that controller 900 is operating with and/or balancing. Divider 904 generates Vrn by dividing Vr by its detected Vpk. Intraphase balance controller 906 uses Vpk along with the status information (e.g., SOCi, Ti, Qi, Vi, etc.) to generate modulation indexes Mi for each module 108 within the array 700 being controlled.

The modulation indexes and Vrn can be used to generate the switching signals for each converter 202. The modulation index can be a number between zero and one (inclusive of zero and one). For a particular module 108, the normalized reference Vrn can be modulated or scaled by Mi, and this modulated reference signal (Vrnm) can be used as Vref (or −Vref) according to the PWM technique described with respect to FIGS. 8C-8F, or according to other techniques. In this manner, the modulation index can be used to control the PWM switching signals provided to the converter switching circuitry (e.g., S3-S6 or S1-S6), and thus regulate the operation of each module 108. For example, a module 108 being controlled to maintain normal or full operation may receive an Mi of one, while a module 108 being controlled to less than normal or full operation may receive an Mi less than one, and a module 108 controlled to cease power output may receive an Mi of zero. This operation can be performed in various ways by control system 102, such as by MCD 112 outputting Vrn and Mi to the appropriate LCDs 114 for modulation and switch signal generation, by MCD 112 performing modulation and outputting the modulated Vrnm to the appropriate LCDs 114 for switch signal generation, or by MCD 112 performing modulation and switch signal generation and outputting the switch signals to the LCDs or the converters 202 of each module 108 directly. Vrn can be sent continually with Mi sent at regular intervals, such as once for every period of the Vrn, or one per minute, etc.

Controller 906 can generate an Mi for each module 108 using any type or combination of types of status information (e.g., SOC, temperature (T), Q, SOH, voltage, current) described herein. For example, when using SOC and T, a module 108 can have a relatively high Mi if SOC is relatively high and temperature is relatively low as compared to other modules 108 in array 700. If either SOC is relatively low or T is relatively high, then that module 108 can have a relatively low Mi, resulting in less utilization than other modules 108 in array 700. Controller 906 can determine Mi such that the sum of module voltages does not exceed Vpk. For example, Vpk can be the sum of the products of the voltage of each module's source 206 and Mi for that module (e.g., $Vpk=M_1V_1+M_2V_2+M_3V_3 \ldots +M_NV_N$, etc). A different combination of modulation indexes, and thus respective voltage contributions by the modules, may be used but the total generated voltage should remain the same.

Controller 900 can control operation, to the extent it does not prevent achieving the power output requirements of the system at any one time (e.g., such as during maximum acceleration of an EV), such that SOC of the energy source(s) in each module 108 remains balanced or converges to a balanced condition if they are unbalanced, and/or such that temperature of the energy source(s) or other component (e.g., energy buffer) in each module remains balanced or converges to a balanced condition if they are unbalanced. Power flow in and out of the modules can be regulated such that a capacity difference between sources does not cause an SOC deviation. Balancing of SOC and temperature can indirectly cause some balancing of SOH. Voltage and current can be directly balanced if desired, but in many embodiments the main goal of the system is to balance SOC and temperature, and balancing of SOC can lead to balance of voltage and current in a highly symmetric systems where modules are of similar capacity and impedance.

Since balancing all parameters may not be possible at the same time (e.g., balancing of one parameter may further unbalance another parameter), a combination of balancing any two or more parameters (SOC, T, Q, SOH, V, I) may be applied with priority given to either one depending on the requirements of the application. Priority in balancing can be given to SOC over other parameters (T, Q, SOH, V, I), with exceptions made if one of the other parameters (T, Q, SOH, V, I) reaches a severe unbalanced condition outside a threshold.

Figure 9B:
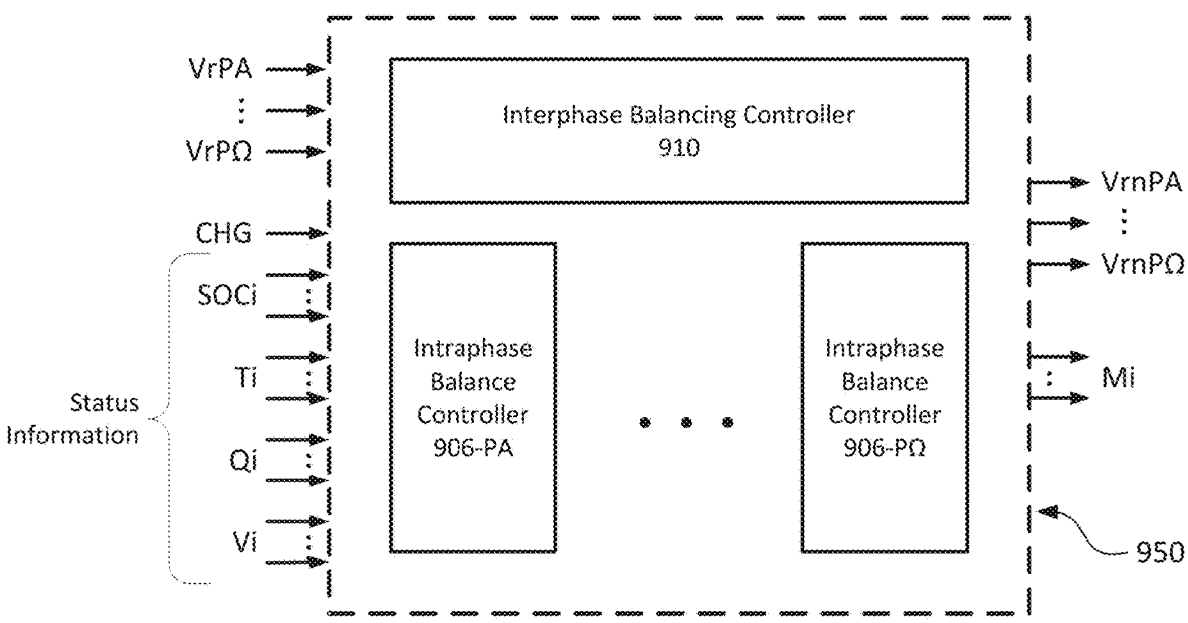

Balancing between arrays 700 of different phases (or arrays of the same phase, e.g., if parallel arrays are used) can be performed concurrently with intraphase balancing. FIG. 9B depicts an example embodiment of an Ω-phase (or Ω-array) controller 950 configured for operation in an Ω-phase system 100, having at least Ω arrays 700, where Ω is any integer greater than one. Controller 950 can include one interphase (or interarray) controller 910 and Ω intraphase balance controllers 906-PA . . . 906-PΩ for phases PA through PΩ, as well as peak detector 902 and divider 904 (FIG. 9A) for generating normalized references VrnPA through VrnPΩ from each phase-specific reference VrPA through VrPΩ. Intraphase controllers 906 can generate Mi for each module 108 of each array 700 as described with respect to FIG. 9A. Interphase balance controller 910 is configured or programmed to balance aspects of modules 108 across the entire multi-dimensional system, for example, between arrays of different phases. This may be achieved through injecting common mode to the phases (e.g., neutral point shifting) or through the use of interconnection modules (described herein) or through both. Common mode injection involves introducing a phase and amplitude shift to the reference signals VrPA through VrPΩ to generate normalized waveforms VrnPA through VrnPΩ to compensate for unbalance in one or more arrays, and is described further in Int'l. Appl. No. PCT/US20/25366 incorporated herein.

Controllers 900 and 950 (as well as balance controllers 906 and 910) can be implemented in hardware, software or a combination thereof within control system 102. Controllers 900 and 950 can be implemented within MCD 112, distributed partially or fully among LCDs 114, or may be implemented as discrete controllers independent of MCD 112 and LCDs 114.

Example Embodiments of Interconnection (IC) Modules

Modules 108 can be connected between the modules of different arrays 700 for the purposes of exchanging energy between the arrays, acting as a source for an auxiliary load, or both. Such modules are referred to herein as interconnection (IC) modules 108IC. IC module 108IC can be implemented in any of the already described module configurations (108A, 108B, 108C) and others to be described herein. IC modules 108IC can include any number of one or more energy sources, an optional energy buffer, switch circuitry for supplying energy to one or more arrays and/or for supplying power to one or more auxiliary loads, control circuitry (e.g., a local control device), and monitor circuitry for collecting status information about the IC module itself or its various loads (e.g., SOC of an energy source, temperature of an energy source or energy buffer, capacity of an energy source, SOH of an energy source, voltage and/or current measurements pertaining to the IC module, voltage and/or current measurements pertaining to the auxiliary load(s), etc.).

Figure 10A:
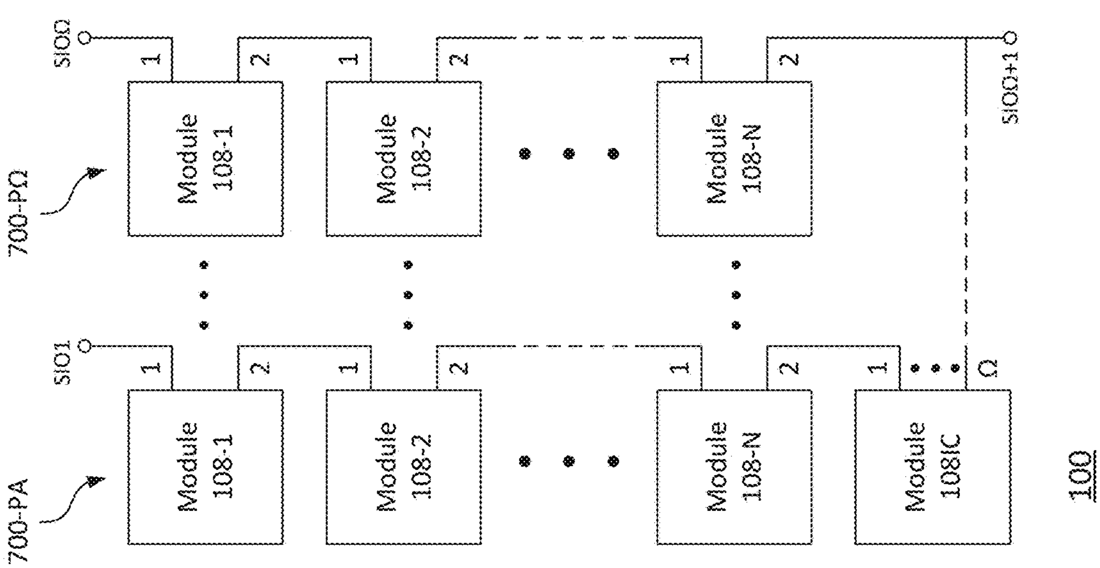
FIG. 10A is a block diagram depicting an example embodiment of a multiphase modular energy system having interconnection module.

FIG. 10A is a block diagram depicting an example embodiment of a system 100 capable of producing Ω-phase power with Ω arrays 700-PA through 700-PΩ, where Ω can be any integer greater than one. In this and other embodiments, IC module 108IC can be located on the rail side of arrays 700 such the arrays 700 to which module 108IC are connected (arrays 700-PA through 700-PΩ in this embodiment) are electrically connected between module 108IC and outputs (e.g., SIO1 through SIOΩ) to the load. Here, module 108IC has Ω IO ports for connection to IO port 2 of each module 108-N of arrays 700-PA through 700-PΩ. In the configuration depicted here, module 108IC can perform interphase balancing by selectively connecting the one or more energy sources of module 108IC to one or more of the arrays 700-PA through 700-PΩ (or to no output, or equally to all outputs, if interphase balancing is not required). System 100 can be controlled by control system 102 (not shown, see FIG. 1A).

Figure 10B:
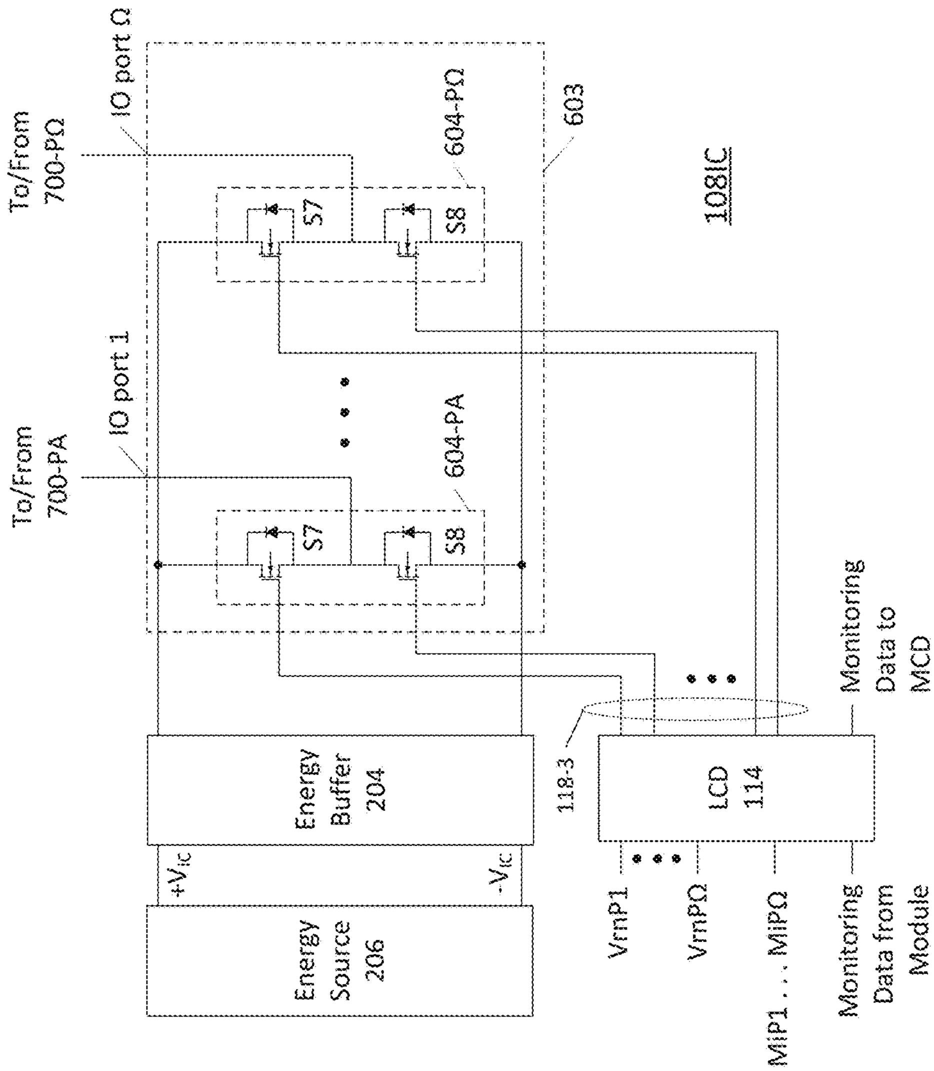
FIG. 10B is a schematic diagram depicting an example embodiment of an interconnection module in the multiphase embodiment of FIG. 10A.

FIG. 10B is a schematic diagram depicting an example embodiment of module 108IC. In this embodiment module 108IC includes an energy source 206 connected with energy buffer 204 that in turn is connected with switch circuitry 603. Switch circuitry 603 can include switch circuitry units 604-PA through 604-PΩ for independently connecting energy source 206 to each of arrays 700-PA through 700-PΩ, respectively. Various switch configurations can be used for each unit 604, which in this embodiment is configured as a half-bridge with two semiconductor switches S7 and S8. Each half bridge is controlled by control lines 118-3 from LCD 114. This configuration is similar to module 108A described with respect to FIG. 3A. As described with respect to converter 202, switch circuitry 603 can be configured in any arrangement and with any switch types (e.g., MOSFET, IGBT, Silicon, GaN, etc.) suitable for the requirements of the application.

Switch circuitry units 604 are coupled between positive and negative terminals of energy source 206 and have an output that is connected to an IO port of module 108IC. Units 604-PA through 604-PΩ can be controlled by control system 102 to selectively couple voltage $+V_{IC}$ or $-V_{IC}$ to the respective module I/O ports 1 through Ω. Control system 102 can control switch circuitry 603 according to any desired control technique, including the PWM and hysteresis techniques mentioned herein. Here, control circuitry 102 is implemented as LCD 114 and MCD 112 (not shown). LCD 114 can receive monitoring data or status information from monitor circuitry of module 108IC. This monitoring data and/or other status information derived from this monitoring data can be output to MCD 112 for use in system control as described herein. LCD 114 can also receive timing information (not shown) for purposes of synchronization of modules 108 of the system 100 and one or more carrier signals (not shown), such as the sawtooth signals used in PWM (FIGS. 8C-8D).

For interphase balancing, proportionally more energy from source 206 can be supplied to any one or more of arrays 700-PA through 700-PΩ that is relatively low on charge as compared to other arrays 700. Supply of this supplemental energy to a particular array 700 allows the energy output of those cascaded modules 108-1 thru 108-N in that array 700 to be reduced relative to the unsupplied phase array(s).

For example, in some example embodiments applying PWM, LCD 114 can be configured to receive the normalized voltage reference signal (Vrn) (from MCD 112) for each of the one or more arrays 700 that module 108IC is coupled to, e.g., VrnPA through VrnPΩ. LCD 114 can also receive modulation indexes MiPA through MiPΩ for the switch units 604-PA through 604-PΩ for each array 700, respectively, from MCD 112. LCD 114 can modulate (e.g., multiply) each respective Vrn with the modulation index for the switch section coupled directly to that array (e.g., VrnA multiplied by MiA) and then utilize a carrier signal to generate the control signal(s) for each switch unit 604. In other embodiments, MCD 112 can perform the modulation and output modulated voltage reference waveforms for each unit 604 directly to LCD 114 of module 108IC. In still other embodiments, all processing and modulation can occur by a single control entity that can output the control signals directly to each unit 604.

This switching can be modulated such that power from energy source 206 is supplied to the array(s) 700 at appropriate intervals and durations. Such methodology can be implemented in various ways.

Based on the collected status information for system 100, such as the present capacity (Q) and SOC of each energy source in each array, MCD 112 can determine an aggregate charge for each array 700 (e.g., aggregate charge for an array can be determined as the sum of capacity times SOC for each module of that array). MCD 112 can determine whether a balanced or unbalanced condition exists (e.g., through the use of relative difference thresholds and other metrics described herein) and generate modulation indexes MiPA through MiPΩ accordingly for each switch unit 604-PA through 604-PΩ.

During balanced operation, Mi for each switch unit 604 can be set at a value that causes the same or similar amount of net energy over time to be supplied by energy source 206 and/or energy buffer 204 to each array 700. For example, Mi for each switch unit 604 could be the same or similar, and can be set at a level or value that causes the module 108IC to perform a net or time average discharge of energy to the one or more arrays 700-PA through 700-PΩ during balanced operation, so as to drain module 108IC at the same rate as other modules 108 in system 100. In some embodiments, Mi for each unit 604 can be set at a level or value that does not cause a net or time average discharge of energy during balanced operation (causes a net energy discharge of zero). This can be useful if module 108IC has a lower aggregate charge than other modules in the system.

When an unbalanced condition occurs between arrays 700, then the modulation indexes of system 100 can be adjusted to cause convergence towards a balanced condition or to minimize further divergence. For example, control system 102 can cause module 108IC to discharge more to the array 700 with low charge than the others, and can also cause modules 108-1 through 108-N of that low array 700 to discharge relatively less (e.g., on a time average basis). The relative net energy contributed by module 108IC increases as compared to the modules 108-1 through 108-N of the array 700 being assisted, and also as compared to the amount of net energy module 108IC contributes to the other arrays. This can be accomplished by increasing Mi for the switch unit 604 supplying that low array 700, and by decreasing the modulation indexes of modules 108-1 through 108-N of the low array 700 in a manner that maintains Vout for that low array at the appropriate or required levels, and maintaining the modulation indexes for other switch units 604 supplying the other higher arrays relatively unchanged (or decreasing them).

The configuration of module 108IC in FIGS. 10A-10B can be used alone to provide interphase or interarray balancing for a single system, or can be used in combination with one or more other modules 108IC each having an energy source and one or more switch portions 604 coupled to one or more arrays. For example, a module 108IC with Ω switch portions 604 coupled with Ω different arrays 700 can be combined with a second module 108IC having one switch portion 604 coupled with one array 700 such that the two modules combine to service a system 100 having Ω+1 arrays 700. Any number of modules 108IC can be combined in this fashion, each coupled with one or more arrays 700 of system 100.

Figure 10C:
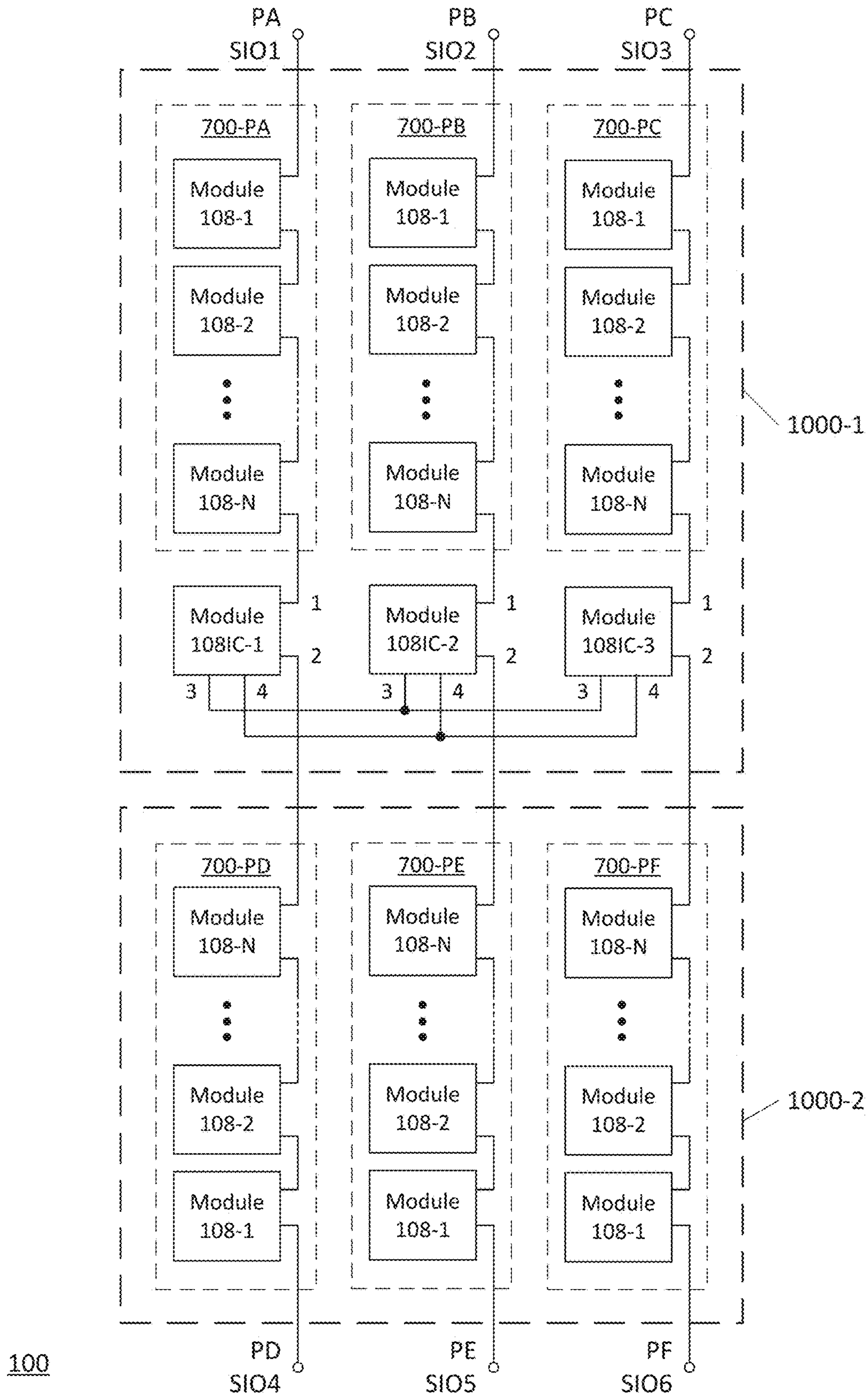
FIG. 10C is a block diagram depicting an example embodiment of a modular energy system having two subsystems connected together by interconnection modules.

Furthermore, IC modules can be configured to exchange energy between two or more subsystems of system 100. FIG. 10C is a block diagram depicting an example embodiment of system 100 with a first subsystem 1000-1 and a second subsystem 1000-2 interconnected by IC modules. Specifically, subsystem 1000-1 is configured to supply three-phase power, PA, PB, and PC, to a first load (not shown) by way of system I/O ports SIO1, SIO2, and SIO3, while subsystem 1000-2 is configured to supply three-phase power PD, PE, and PF to a second load (not shown) by way of system I/O ports SIO4, SIO5, and SIO06, respectively. For example, subsystems 1000-1 and 1000-2 can be configured as different packs supplying power for different motors of an EV or as different racks supplying power for different microgrids.

In this embodiment each module 108IC is coupled with a first array of subsystem 1000-1 (via IO port 1) and a first array of subsystem 1000-2 (via IO port 2), and each module 108IC can be electrically connected with each other module 108IC by way of I/O ports 3 and 4, which are coupled with the energy source 206 of each module 108IC as described with respect to module 108C of FIG. 3C. This connection places sources 206 of modules 108IC-1, 108IC-2, and 108IC-3 in parallel, and thus the energy stored and supplied by modules 108IC is pooled together by this parallel arrangement. Other arrangements such as serious connections can also be used. Modules 108IC are housed within a common enclosure of subsystem 1000-1, however the interconnection modules can be external to the common enclosure and physically located as independent entities between the common enclosures of both subsystems 1000.

Each module 108IC has a switch unit 604-1 coupled with IO port 1 and a switch unit 604-2 coupled with I/O port 2, as described with respect to FIG. 10B. Thus, for balancing between subsystems 1000 (e.g., inter-pack or inter-rack balancing), a particular module 108IC can supply relatively more energy to either or both of the two arrays to which it is connected (e.g., module 108IC-1 can supply to array 700-PA and/or array 700-PD). The control circuitry can monitor relative parameters (e.g., SOC and temperature) of the arrays of the different subsystems and adjust the energy output of the IC modules to compensate for imbalances between arrays or phases of different subsystems in the same manner described herein as compensating for imbalances between two arrays of the same rack or pack. Because all three modules 108IC are in parallel, energy can be efficiently exchanged between any and all arrays of system 100. In this embodiment, each module 108IC supplies two arrays 700, but other configurations can be used including a single IC module for all arrays of system 100 and a configuration with one dedicated IC module for each array 700 (e.g., six IC modules for six arrays, where each IC module has one switch unit 604). In all cases with multiple IC modules, the energy sources can be coupled together in parallel so as to share energy as described herein.

In systems with IC modules between phases, interphase balancing can also be performed by neutral point shifting (or common mode injection) as described above. Such a combination allows for more robust and flexible balancing under a wider range of operating conditions. System 100 can determine the appropriate circumstances under which to perform interphase balancing with neutral point shifting alone, interphase energy injection alone, or a combination of both simultaneously.

Figure 10D:
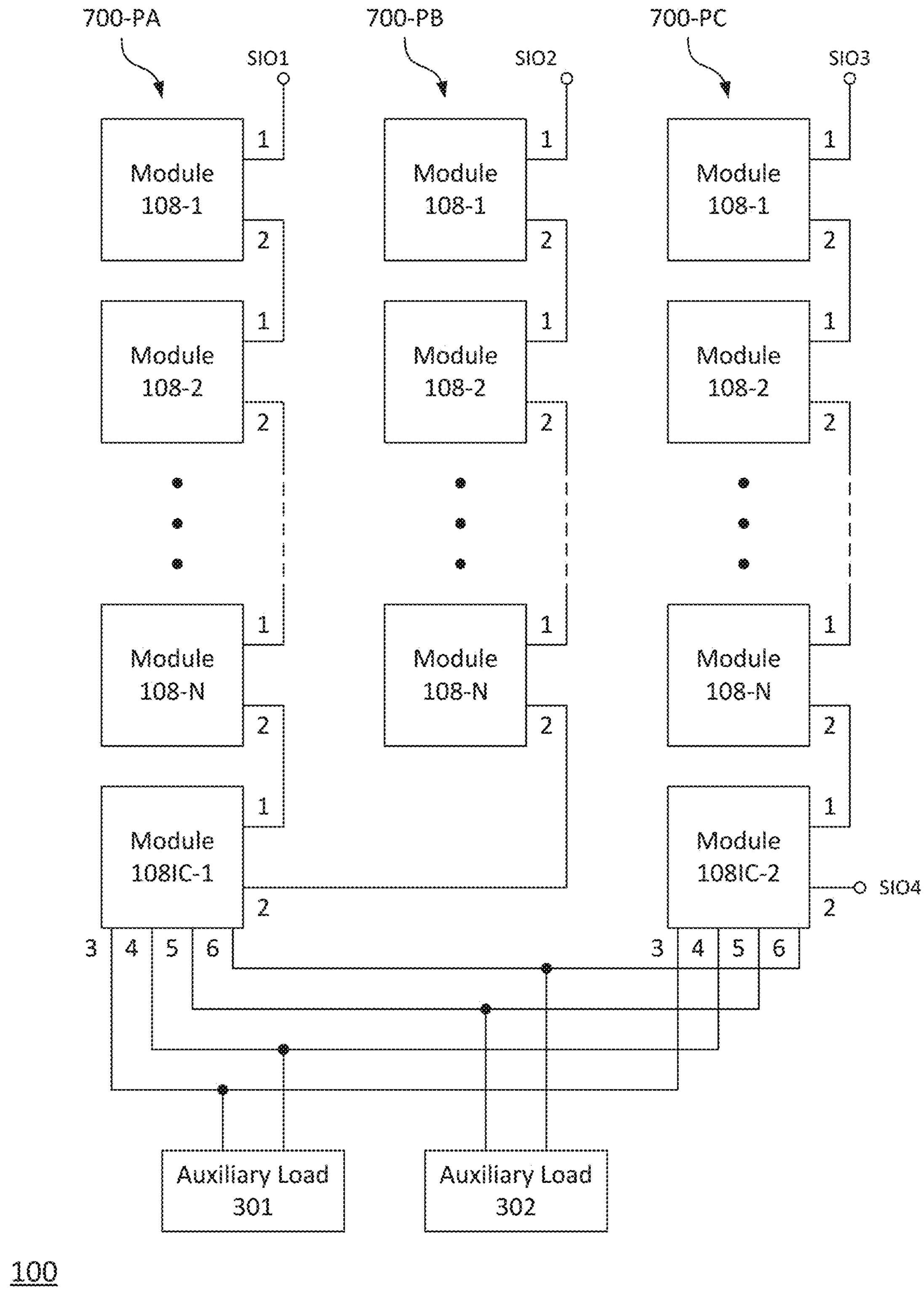
FIG. 10D is a block diagram depicting an example embodiment of a three-phase modular energy system having interconnection modules supplying auxiliary loads.
Figure 10E:
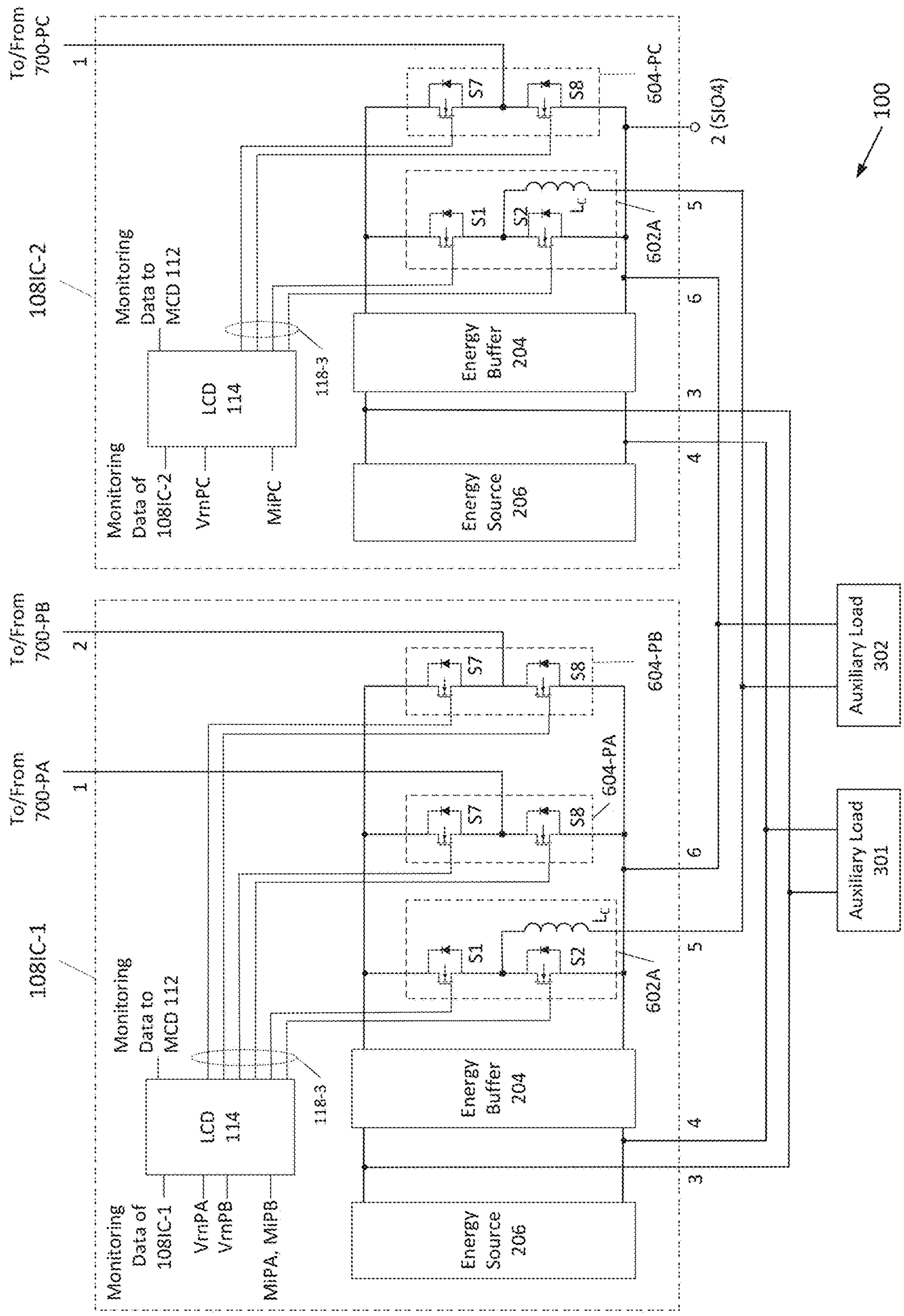
FIG. 10E is a schematic view depicting an example embodiment of the interconnection modules in the multiphase embodiment of FIG. 10D.

IC modules can also be configured to supply power to one or more auxiliary loads 301 (at the same voltage as source 206) and/or one or more auxiliary loads 302 (at voltages stepped down from source 302). FIG. 10D is a block diagram depicting an example embodiment of a three-phase system 100 A with two modules 108IC connected to perform interphase balancing and to supply auxiliary loads 301 and 302. FIG. 10E is a schematic diagram depicting this example embodiment of system 100 with emphasis on modules 108IC-1 and 108IC-2. Here, control circuitry 102 is again implemented as LCD 114 and MCD 112 (not shown). The LCDs 114 can receive monitoring data from modules 108IC (e.g., SOC of ES1, temperature of ES1, Q of ES1, voltage of auxiliary loads 301 and 302, etc.) and can output this and/or other monitoring data to MCD 112 for use in system control as described herein. Each module 108IC can include a switch portion 602A (or 602B described with respect to FIG. 6C) for each load 302 being supplied by that module, and each switch portion 602 can be controlled to maintain the requisite voltage level for load 302 by LCD 114 either independently or based on control input from MCD 112. In this embodiment, each module 108IC includes a switch portion 602A connected together to supply the one load 302, although such is not required.

Figure 10F:
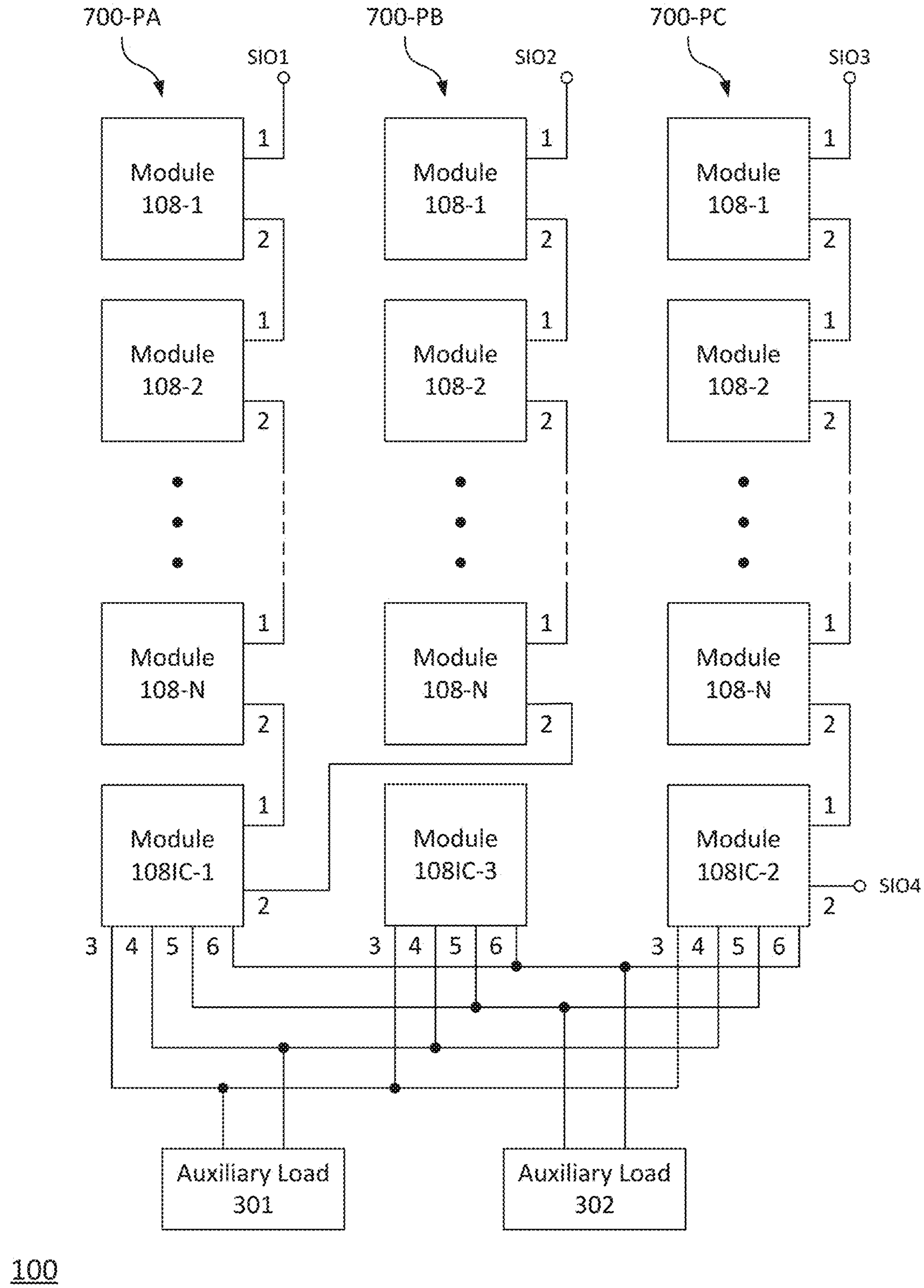
FIG. 10F is a block diagram depicting another example embodiment of a three-phase modular energy system having interconnection modules supplying auxiliary loads.

FIG. 10F is a block diagram depicting another example embodiment of a three-phase system configured to supply power to one or more auxiliary loads 301 and 302 with modules 108IC-1, 108IC-2, and 108IC-3. In this embodiment, modules 108IC-1 and 108IC-2 are configured in the same manner as described with respect to FIGS. 10D-10E. Module 108IC-3 is configured in a purely auxiliary role and does not actively inject voltage or current into any array 700 of system 100. In this embodiment, module 108IC-3 can be configured like module 108C of FIG. 3B, having a converter 202B,C (FIGS. 6B-6C) with one or more auxiliary switch portions 602A, but omitting switch portion 601. As such, the one or more energy sources 206 of module 108IC-3 are interconnected in parallel with those of modules 108IC-1 and 108IC-2, and thus this embodiment of system 100 is configured with additional energy for supplying auxiliary loads 301 and 302, and for maintaining charge on the sources 206A of modules 108IC-1 and 108IC-2 through the parallel connection with the source 206 of module 108IC-3.

The energy source 206 of each IC module can be at the same voltage and capacity as the sources 206 of the other modules 108-1 through 108-N of the system, although such is not required. For example, a relatively higher capacity can be desirable in an embodiment where one module 108IC applies energy to multiple arrays 700 (FIG. 10A) to allow the IC module to discharge at the same rate as the modules of the phase arrays themselves. If the module 108IC is also supplying an auxiliary load, then an even greater capacity may be desired so as to permit the IC module to both supply the auxiliary load and discharge at relatively the same rate as the other modules.

Example Embodiments of Charging and Discharging

Example embodiments pertaining to the charging of modular energy systems 100 will now be described with reference to FIGS. 11A-23B. These embodiments can be implemented with all aspects of system 100 described with respect to FIGS. 1A-10F unless stated otherwise or logically implausible. As such, the many variations contemplated herein will not be repeated with respect to each of the following charging embodiments.

The charging embodiments will be described with reference to the type and quantity of signals available from the charge source to supply charge to the various modules of system 100. These embodiments fall into three main types: DC charging where the charge source supplies a high voltage DC charge signal; single phase AC charging where the charge source supplies a single high voltage AC charge signal; and multiphase AC charging where the charge source supplies two or more high voltage AC charge signals having different phase angles. For simplicity, the multiphase charging embodiments will be described with respect to a system 100 having three phases, and in some cases six phases, although the subject matter is applicable to any system 100 having two or more arrays that charge and discharge with two or more different phases. The charge source can have various configurations depending on the particular application. For stationary applications, the charge source can be a power grid supplied by a utility or other power provider regardless of energy source type. The charge source can also be a renewable energy source such as an array of solar panels, wind powered turbines and the like. For mobile applications, the charge source can also be a grid or renewable energy source, which in many cases is supplied to the electric vehicle by way of a charge station that supplies DC, single phase AC, or multiphase AC power.

Figure 11A:
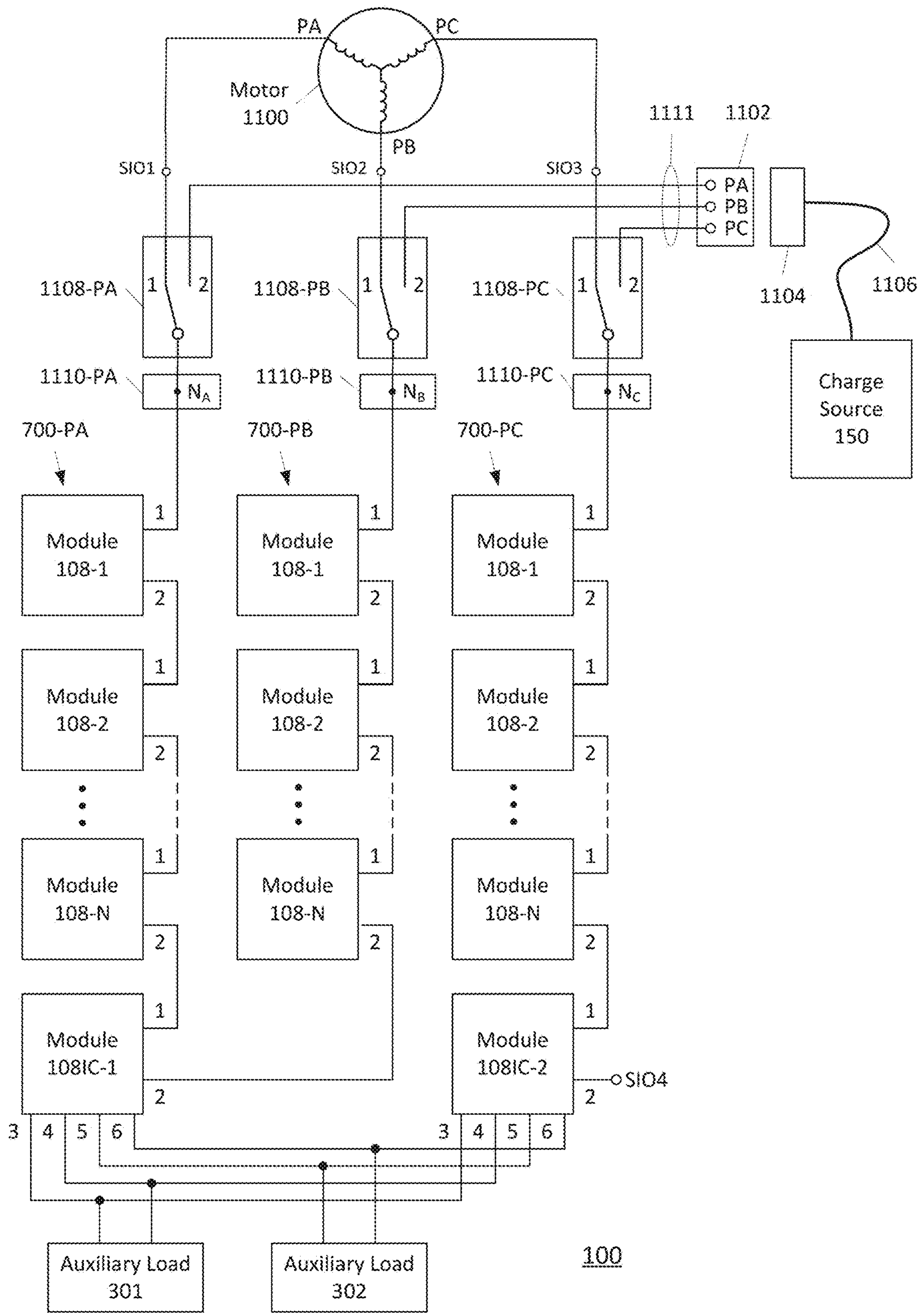
FIGS. 11A-11B are block diagrams depicting example embodiments of a modular energy system configured for multiphase charging.
Figure 11B:
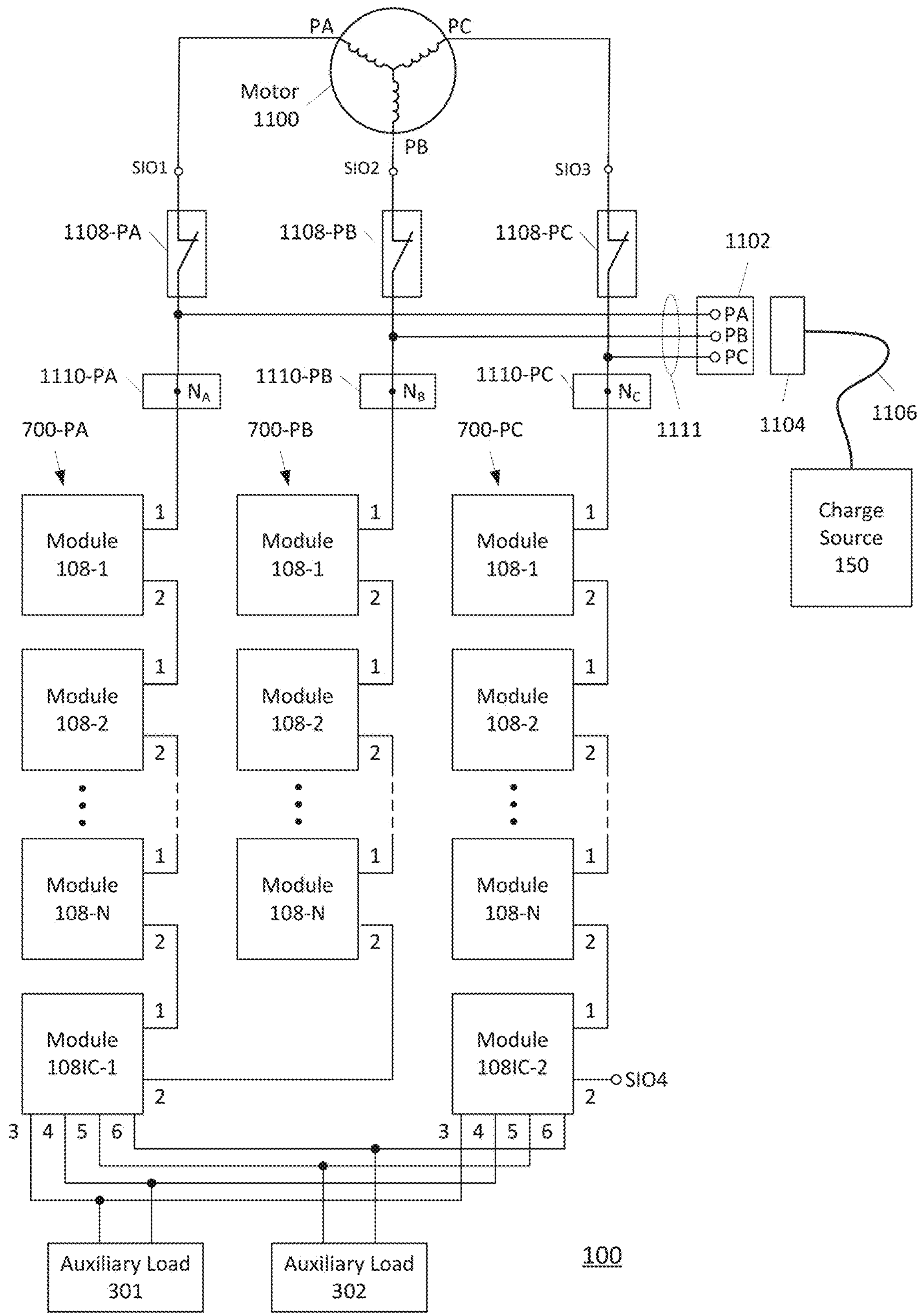

FIGS. 11A and 11B are block diagrams depicting example embodiments of a three-phase system 100 configured for use in a mobile application to supply three-phase power for a motor 1100, and having interconnection modules 108IC-1 and 108IC-2 configured to supply power to auxiliary loads 301 and 302. System 100 includes a switch 1108-PA located between SIO1 and I/O port 1 of module 108-1 of array 700-PA, a switch 1108-PB located between SIO2 and I/O port 1 of module 108-1 of array 700-PB, and a switch 1108-PC located between SIO3 and I/O port 1 of module 108-1 of array 700-PC. Each of switches 1108 are independently controllable by a control signal applied over control lines by control system 102 (e.g., MCD 112) (e.g., FIGS. 1A-1C) or an external control device 104 (e.g., FIGS. 1A, 1B, 1D, 1E).

In this and the other embodiments described herein, motor 1100 can be an electric motor such as a permanent magnet (PM), induction, or switched reluctance motor (SRM). While system 100 here and in many of the following embodiments is a three-phase system having IC modules and auxiliary loads, the charging subject matter can likewise be applied to embodiments having one or more phases with or without IC modules and auxiliary loads.

Switches 1108-PA, 1108-PB, and 1108-PC switchably connect three phase charge signals from ports of a three-phase charge connector 1102 over lines 1111 to their respective phase module arrays (700-PA, 700-PB, and 700-PC). Charge connector 1102 can be coupled to a charge source 150 by way of the charge's source's charge connector 1104 and cable 1106. No neutral connection is necessary for three-phase charging. Switches 1108 are preferably electromechanical switches, but solid state relays (SSRs) may also be used. Electromechanical switches exhibit high reliability in keeping the motor coils or windings connected to the modular energy sources in case power is lost.

System 100 also includes monitor circuits 1110-PA, 1110-PB, and 1110-PC connected between switches 1108-PA, 1108-PB, and 1108-PC and arrays 700-PA, 700-PB, and 700-PC, respectively. Monitor circuits 1110-PA, 1110-PB, and 1110-PC can measure any one or more of the current, voltage, and phase of signals passing through nodes NPA, NPB, and NPC, respectively, and output these measurements over data lines (not shown) to control system 102 for use in controlling modules 108 during charging and discharging.

In FIG. 11A, switches 1108 are each two-conductive position switches (e.g., single pole double throw (SPDT)). When switches 1108 are in position 1 arrays 700 are connected to motor 1100 and connector 1102 is uncoupled and not energized. Switches 1108 default to position 1 as the normal position and assume this position when no control signal is applied. In case of a power loss or occurrence where switches 1108 are disconnected from the control signal, they can revert to position 1 so as not to leave the motor coils unconnected. If a control signal (e.g., a common signal) is applied, then switches 1108 move to position 2 and couple connector 1102 to arrays 700. When in position 2, system 100 can be charged through connector 1102. Application of the control signal can happen automatically when system 100 detects physical coupling of charge source connector 1104 to system connector 1102, or detects the presence of multiphase voltage at connector 1102. Application of the control signal may also be conditioned on the motor being off. Removal of the control signal, such as after detection of decoupling of connector 1104 or absence of multiphase charge voltage at connector 1102, causes switches 1108 to return to position 1.

In the embodiment of FIG. 11B, switches 1108 are on/off switches (e.g., switches having an open state and a closed state, such as a single pole single throw (SPST) switch) that are again controllable by application of a control signal (not shown). Arrays 700 are constantly connected to connector 1102 and thus always energized, so connector 1102 is configured such that the its internal conductors are isolated from user contact. For example, the conductors may be housed deep within the charging receptacle of connector 1102. The design of connector 1102 is preferably sufficient to prevent user contact (e.g., shock or short) such that connector 1102 can be energized even when motor 1100 is operating. The closed position is the default position of switches 1108 in this embodiment to keep system 100 connected to motor 1102, as damage to motor and/or converters 202 can occur if switches 1108 open during operation of motor 1100. Application of the control signal causes switches 1108 to open, which disconnects modules 108 from motor 1100 and permits charging through connector 1102. Although three SPST switches 1108 are shown here, in embodiments with a closed coil motor 1100, one of the SPST switches 1108 can be omitted, e.g., only two of the three SPST switches 1108 can be present (for any two of phases PA, PB, PC), as current will not pass through motor 1100 when two of the three coils are electrically disconnected. The third coil can be left electrically connected to system 100 during charging.

Figure 11C:
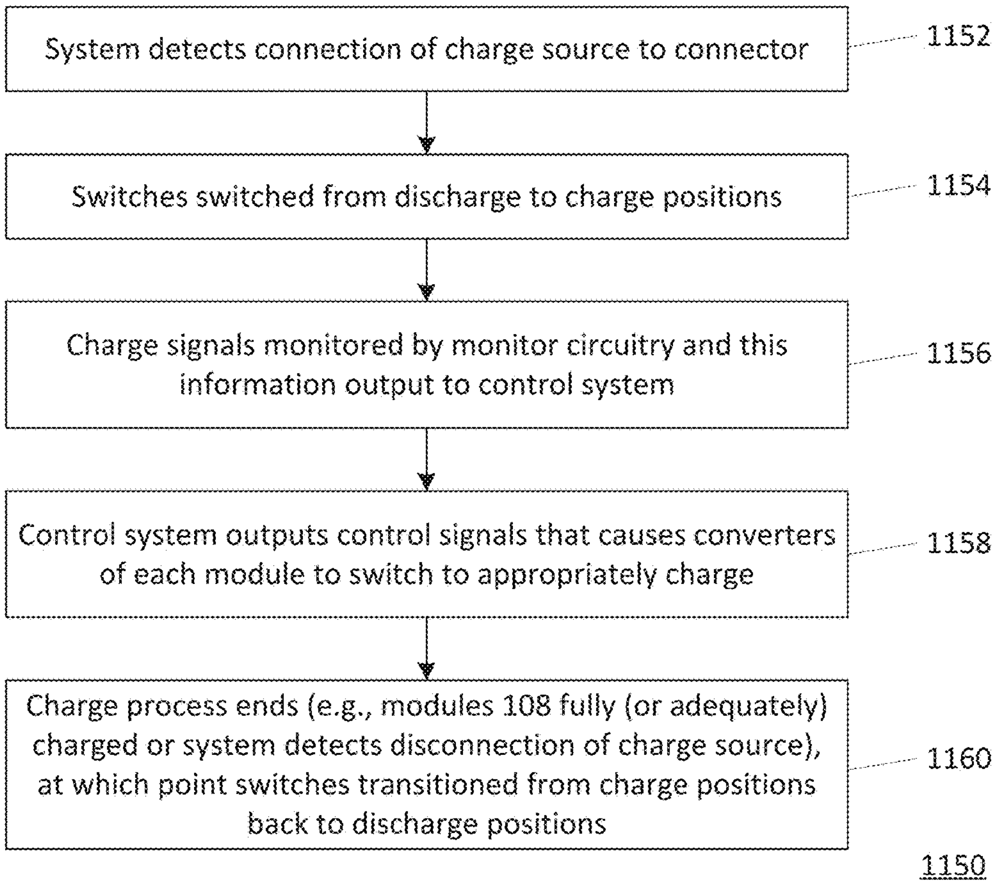
FIG. 11C is a flow diagram depicting an example embodiment of charging a modular energy system.

FIG. 11C is a flow diagram depicting an example embodiment of a method 1150 for charging that is applicable to the embodiments of FIGS. 11A-11B as well as other embodiments described herein. At 1152, system 100 detects connection of charge source 150 to connector 1102. As stated herein, this can occur by control system 102 detecting physical contact of charge source connector 1104 to system connector 1102, or by system 100 sensing the charge signal voltage with sensors in connector 1102. At 1154, after detecting the connection of charge source 150, switches 1108 can be switched from discharge positions to charge positions (e.g., position 2 with respect to FIG. 11A, or an open state with respect to FIG. 11B).

Figure 11D:
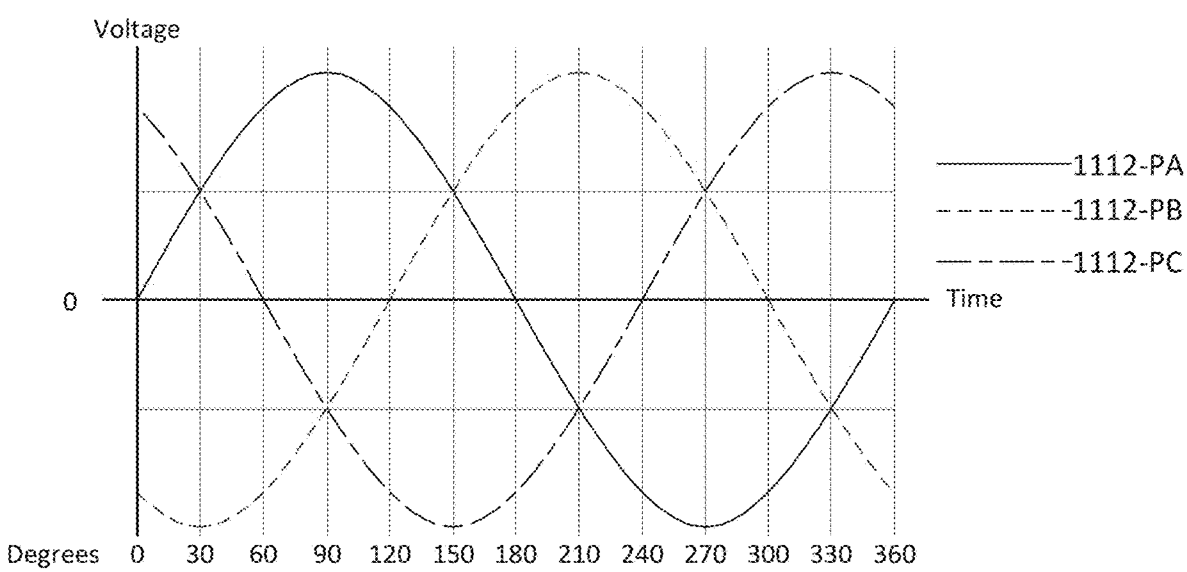
FIG. 11D is a plot depicting an example of a three-phase charging signal.

At 1156, the charge signals supplied by charge source 150 are monitored by monitor circuitry 1110 and this information is output to control system 102. FIG. 11D is a plot depicting three phase charge signals 1112-PA, 1112-PB, and 1112-PC. At 1158, control system 102 outputs control signals to each module 108 of system 100 that causes converters 202 of each module 108 to switch to appropriately charge. Steps 1156 and 1158 are performed concurrently to provide control system 102 with a continuous assessment of the voltage, current, and/or phase of the charge signals while adjusting the switching scheme for each module 108 accordingly.

When switching modules 108 at step 1158, control system 102 (e.g., MCD 112, LCD 114) generates switching signals for each converter 202 of each module 108 as described elsewhere herein. Each converter 202 can be switched between a first state that presents $+V_{DCL}$ at the module I/O ports 1 and 2, a second state that presents $-V_{DCL}$ at ports 1 and 2, and a third state where the module is bypassed (shorted) and presents zero voltage at ports 1 and 2. Switching can be controlled such that each energy source 206 of each module 108 can be charged based on the direction of the current through each array 700.

Control system 102 can be programmed to control switching of each module 108 to minimize distortion and displacement within the array(s) 700 of each phase. This can be achieved by targeting a power factor (PF) at or near one (unity), according to (1):

$$PF = \left(\frac{I1\text{rms}}{I\text{rms}}\right)\cos\theta$$

where I1rms is the root mean square value of the fundamental component of the current within the array 700 of the particular phase (e.g., array 700-PA), Irms is the root mean square value of the total of all significant harmonics of current (I1+I2+I3 . . . ) of the particular phase, and Θ is the phase angle between voltage and current of the particular phase. To achieve a PF at or near one, control system 102 can control switching such that the sum of the currents of each phase (e.g., as measured at NPA, NPB, NPC) is zero or close to zero (e.g., within a threshold) at all times, and the displacement (Θ) between current and voltage of each phase is zero or close to zero (e.g., within a threshold) at all times.

Each module 108 can be charged equally until a limit or threshold is reached for that individual module 108. For example, all modules 108 may be charged equally (e.g., receive the same aggregate current over time) until an individual module 108 reaches a charge threshold (e.g., 80% or 90% of capacity) at which time charging of that module 108 is slowed until all modules 108 reach a balanced or substantially balanced SOC state, at which time the modules 108 are charged equally until, fully or adequately charged.

Alternatively, modules 108 with relatively lesser SOC levels can receive relatively more charging at the outset until system 100 reaches a relatively balanced SOC state, at which time all modules 108 can be charged in a manner such that the system has a relatively balanced SOC state at all times (e.g., all fully functional modules 108 are within 1% of the others in terms of SOC). This approach has the advantage that, if charging is stopped prior to the system 100 reaching capacity, then system 100 will exit the charge process in a relatively balanced state.

Referring back to FIG. 11C, charge process 1150 can continue until 1160 when modules 108 have been fully (or adequately) charged or system 100 detects the disconnection of charge source 150, at which point switches 1108 can be transitioned from their charge positions back to default positions of the discharge state (e.g., position one with respect to FIG. 11A and a closed position with respect to FIG. 11B).

In the embodiments described herein, control system 102 can control switching by generation of switching signals for each module 108 according to a PWM technique, such as those described herein, utilizing an incoming AC charge signal (or representation thereof) for each phase as the reference waveform for the respective array 700, or a different reference in the case of DC charging. Modulation indexes for the switching circuitry of each module 108 can be adjusted to maintain the power factor at or near one by selectively charging and discharging each module for various lengths of time. Charging can also be performed while maintaining or targeting a balanced condition in one or more operating characteristics of system 100 as described earlier herein. Modulation indexes (Mi) can also be adjusted to perform charging while targeting a relatively balanced temperature across all modules, and emphasizing charging for energy sources 206 having the relatively lowest SOC by assigning those modules 108 the relatively highest modulation indexes.

Furthermore, for electrochemical battery sources 206, the length of the charge pulses applied to sources 206 by converter 202 can be maintained to have a certain length, e.g., less than 5 milliseconds, to promote the occurrence of the electrochemical storage reaction in the cells without the occurrence of significant side reactions that can lead to degradation. Such pulses can be applied at high C rates (e.g., 5C-15C and greater) to enable fast charging of the sources 206. Examples of such techniques that can be used with all embodiments described herein are described in Int'l Appl. No. PCT/US20/35437, titled Advanced Battery Charging on Modular Levels of Energy Storage Systems, which is incorporated by reference herein for all purposes.

In the examples of FIGS. 11A-11B, modules 108IC-1 and 108IC-2 are connected to each other and also interconnected between arrays 700 of different phases. During charging, the switch portions 604 (for example, see FIG. 10E) of modules 108IC can be continually switched such that current flows either through S7 or S8 at a 50-50 duty cycle. The energy sources 206 of modules 108IC can be charged by adjusting the duty cycle of each switch portion 604 to a state where aggregate current over time through each portion 604 causes sources 206 of those modules 108IC to charge. Alternatively, the switch portions 604 of modules 108IC can be switched only on an as-needed basis for directing current through module 108IC, e.g., to steer current while charging the source 206 of module 108IC or to steer current without charging source 206. Switching of modules 108IC can also be used to minimize distortion and displacement within each array 700. For all embodiments having auxiliary loads, during charging control system 102 can continue to regulate the voltage for auxiliary load 302 through switch portions 602A (FIG. 10E), and thus power can be maintained for the auxiliary systems if needed. In the context of an electric car, this can maintain power to the onboard network, display, and HVAC, etc.

While charging has been described with reference to a PWM control technique, in alternative embodiments a hysteresis technique can be used. Other custom techniques based on PWM or hysteresis may also be used.

Example Embodiments of DC and Single Phase Charging with Motor Bypass

Figure 12A:
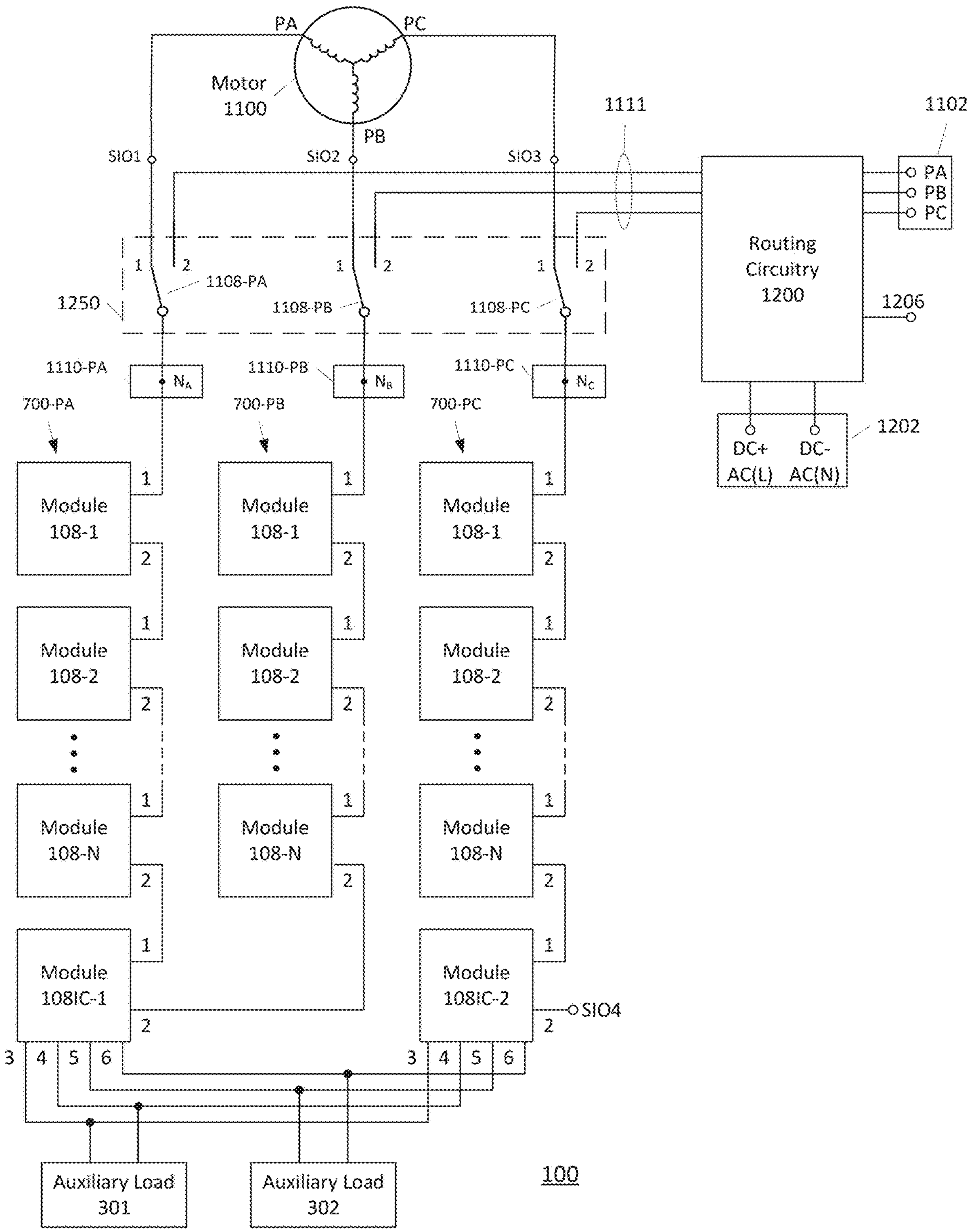
FIG. 12A is a block diagram depicting an example embodiment of a modular energy system configured for DC and multiphase AC charging.

Multiphase configurations of system 100 can also be charged with a DC or single phase AC charge source. FIG. 12A is a block diagram depicting an example embodiment of a three-phase system 100 configured similar to the embodiment of FIG. 11A but with routing circuitry 1200 that permits DC and/or single-phase AC charging capability in addition to multiphase AC charging capability, where all charging can occur in a manner that bypasses motor 1100. Routing circuitry 1200 can be coupled between multiphase charge connector 1102 and three phase charge lines 1111. Routing circuitry 1200 can have at least one connector 1202 that can receive DC charging signals (DC+ and DC−) and/or AC charging signals (AC line (L) and neutral (N)). These connections can be shared as shown in FIG. 12A or can be separate such that different conductors are utilized for DC and single phase AC. Various different configurations and types of circuitry can be used for routing circuitry 1200 depending on the type of charging signal being routed (DC or single-phase AC), and whether the embodiment provides for selective disconnection of the charge connectors 1102 and 1202 from system 100. Example embodiments of routing circuitry 1200 are described in greater detail in FIGS. 12B-21B.

Switches 1108 can be part of a single switching assembly 1250 that is configured to conduct the high currents required during charge and discharge phases. The assembly may be configured as a discrete single device or housing. Assembly 1250 can have one or more inputs to receive switching control signals from control system 102. In some embodiments monitor circuits 1110 can be integrated in assembly 1250, and the control signals to circuits 1110, as well as the data outputs from circuits 1110, can be routed through IO ports of assembly 1250 to control system 102.

Figure 12B:
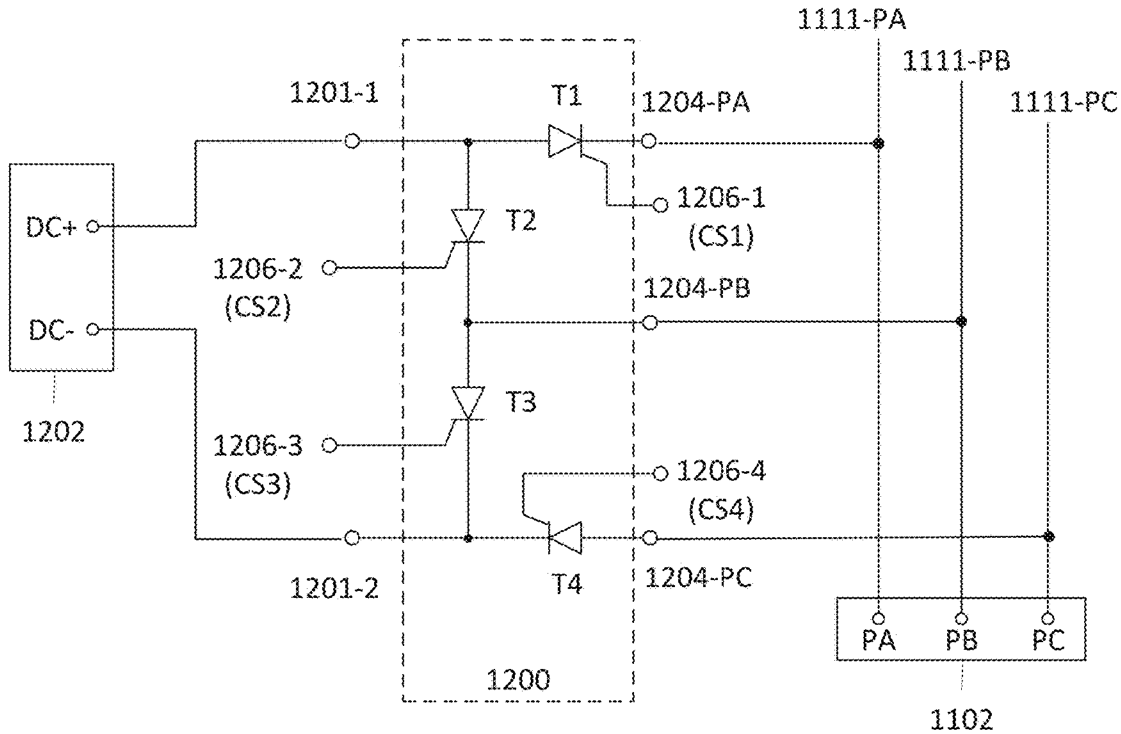
FIG. 12B is a schematic diagram depicting an example embodiment of routing circuitry.

FIG. 12B is a schematic diagram depicting an example embodiment of routing circuitry 1200 configured with solid state (or semiconductor) relays (SSRs) and to provide DC charging capability by way of three phase lines 1111. Routing circuitry 1200 has I/O ports 1201-1 and 1201-2 connected to connector 1202, I/O ports 1204-PA, 1204-PB, and 1204-PC that can be connected to charge lines 1111 for each phase PA, PB, PC. Routing circuitry 1200 can be controlled to selectively output each of the DC+ and DC− signals on inputs 1201 to one or more of the three different outputs 1204. Circuitry 1200 also includes one or more I/O ports 1206-1 through 1206-4 for control signals CS1 through CS4, respectively, that control the routing of each input 1201 to each output 1204. Control signals CS1-CS4 can be generated and provided by control system 102 (not shown).

The use of SSRs isolates system 100 and the EV from the DC charger, which permits additional isolation circuitry (e.g., high frequency transformer and inverters) in the DC charger to be removed or omitted altogether. This can simplify the DC charger implementation and substantially reduce cost. In this embodiment, the SSR circuitry includes four thyristors T1, T2, T3, and T4. Each thyristor can be selectively placed in a unidirectional current conducting (closed) state or a non-conductive (open) state by application of a control signal (CS1, CS2, CS3, CS4, respectively) from control system 102.

During the charge phase, each of switches 1108 can be transitioned to charge position 2, or alternatively, only the switches 1108 of the arrays 700 being charged can be switched to position 2, with the switch 1108 of any array 700 not being charged left in position 1. Thus some commutation of switches 1108 during charge phase may be necessary.

To charge modules 108 of arrays 700-PA and 700-PB (including modules 108IC-1 and 108IC-2, which are connected in parallel), control system 102 can place T1 and T3 in conducting states by way of application of control signals CS1 and CS3, respectively, and place T2 and T4 in non-conducting states by way of application of control signals CS2 and CS4, respectively. Current passes from the DC+ port 1201-1 through T1 to I/O port 1204-PA, which is connected to the PA line 1111 from three-phase charge connector 1102. The current bypasses motor 1100, passes through switch 1108-PA, and through array 700-PA. Each module 108-1 through 108-N of array 700-PA can be selectively charged as described herein. Current passes through module 108IC-1 (e.g., switches S7 of portions 604-PA and 604-PB, or switches S8 of portions 604-PA and 604-PB, as described with respect to FIG. 10E) and through array 700-PB, and each module 108-1 through 108-N of array 700-PB can be selectively charged taking into account opposite current direction. Current passes through switch 1108-PB, into routing circuitry 1200 via I/O port 1204-PB, then through T3, and out through DC− port 1201-2.

To charge modules 108 of arrays 700-PB and 700-PC (including modules 108IC-1 and 108IC-2), control system 102 can place T2 and T4 in conducting states by way of application of control signals CS2 and CS4, respectively, and place T1 and T3 in non-conducting states by way of application of control signals CS1 and CS3, respectively. Current passes from the DC+ port 1201-1 through T2 to I/O port 1204-PB, which is connected to the PB line 1111 from three-phase charge connector 1102. The current bypasses motor 1100, passes through switch 1108-PB, and through array 700-PB. Each module 108-1 through 108-N of array 700-PB can be selectively charged as described herein. Current passes through module 108IC-1 then module 108IC-2 (e.g., using switches S7 together, or S8 together, of portions 604-PB and 604-PC of FIG. 10E), and through array 700-PC, and each module 108-1 through 108-N of array 700-PC can also be selectively charged taking into account opposite current direction. Current passes through switch 1108-PC and into routing circuitry 1200 through I/O port 1204-PC, then through T4, and exits through DC− port 1201-2.

To charge modules 108 of arrays 700-PA and 700-PC (including modules 108IC-1 and 108IC-2), control system 102 can place T1 and T4 in conducting states by way of application of control signals CS1 and CS4, respectively, and place T2 and T3 in non-conducting states by way of application of control signals CS2 and CS3, respectively. Current passes from the DC+ port 1201-1 through T1 to I/O port 1204-PA. The current bypasses motor 1100, passes through switch 1108-PA, and through array 700-PA. Each module 108-1 through 108-N of array 700-PA can be selectively charged as descilbed herein. Current passes through module 108IC-1, then module 108IC-2 (e.g., using switches S7 together, or S8 together, of portions 604-PA and 604-PC of FIG. 10E), and through array 700-PC, and each module 108-1 through 108-N of array 700-PC can also be selectively charged taking into account opposite current direction. Current passes through switch 1108-PC and into routing circuitry 1200 through I/O port 1204-PC, then through T4, and exits through DC− port 1201-2.

In each of the aforementioned examples, module 108IC-1 and interconnected module 108IC-2 can charge their energy source(s) 206 by routing the incoming current through the source(s) 206 by the appropriate combinations of switches in portions 604-PA, 604-PB, and 604-PC prior to outputting the current from the modules 108IC.

Figure 12C:
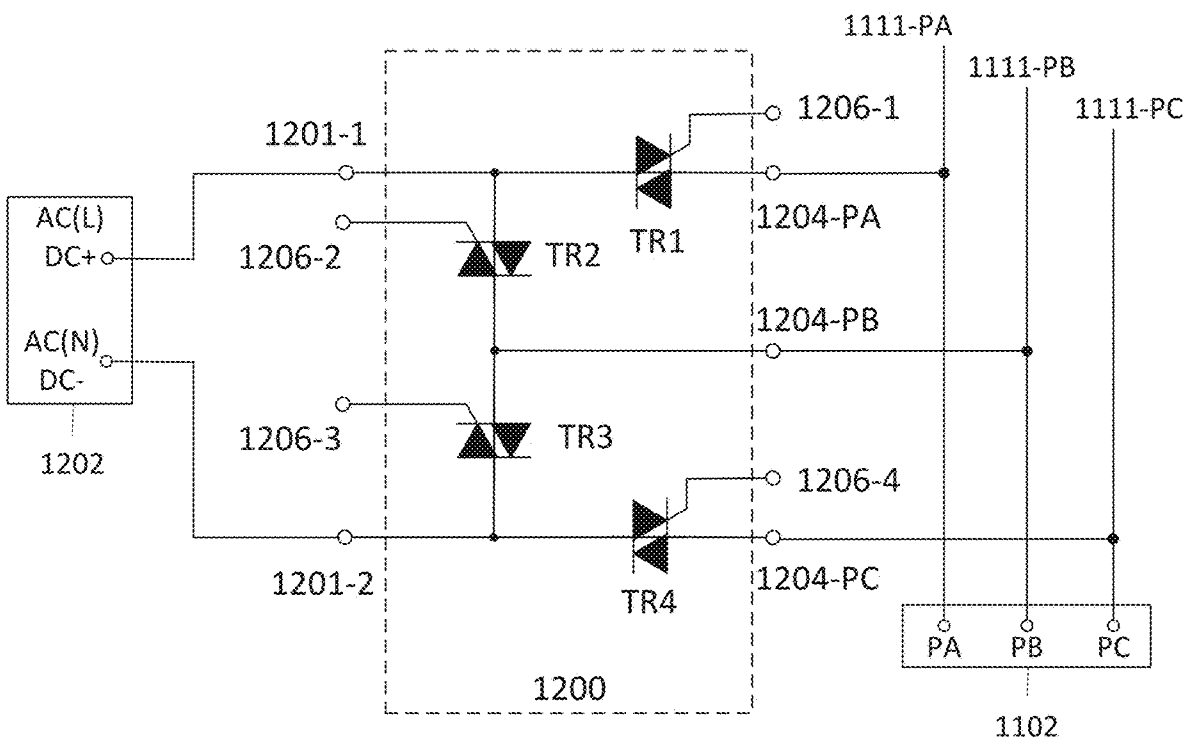
FIG. 12C is a block diagram depicting an example embodiment of a modular energy system configured for DC, single phase AC, and multiphase AC charging.

FIG. 12C is a schematic diagram depicting an example embodiment of routing circuitry 1200 configured with solid state relays (SSRs) and to permit both DC and single phase AC charging through connector 1202. Connector 1202 can be connected to either a single phase charging cable in turn connected to a single phase charge source, or that can be connected to a DC charging cable in turn connected to a DC charge source. In this embodiment, the SSR circuitry includes four triacs TR1, TR2, TR3, and TR4. Each triac can be selectively placed in a bidirectional current conducting (closed) state or a non-conductive (open) state by application of a control signal (CS1, CS2, CS3, CS4, respectively) from control system 102.

For single phase AC charging, routing circuitry 1200 can selectively output each of the AC(L) and AC(N) signals at I/O ports 1201-1 and 1201-2, respectively, to one or more of the three different I/O ports 1204-PA, 1204-PB, and 1204-PC each connected to different lines 1111 from three-phase charge connector 1102, which are in turn connected to arrays 700-PA, 700-PB, and 700-PC. For DC charging, routing circuitry 1200 can similarly selectively output each of the DC+ and DC− signals at inputs 1201 to one or more of the three I/O ports 1204 for provision to arrays 700. Selective routing is controlled by control signals CS1-CS4 supplied by control system 102 and applied to one or more control inputs 1206-1 through 1206-4.

The triacs can assume the same states in single phase AC charging as the thyristors in DC charging when charging the same pairs of arrays 700. The use of bidirectional triacs (or other bidirectional SSR devices) permits current flow directionality to change when the single phase AC charging signal transitions between positive and negative polarities. Whether DC or single phase AC charging while the signal is positive, charging can be performed in a manner similar to that of FIGS. 12A-12B, except with triacs TR1-TR4 instead of thyristors T1-T4. Current flow is in the opposite direction when the single phase AC charge signal is in the negative half of the cycle can be performed as follows.

To charge modules 108 of arrays 700-PA and 700-PB (including modules 108IC-1 and 108IC-2) when the AC signal is negative, control system 102 can place TR1 and TR3 in conducting states by way of application of control signals CS1 and CS3, respectively, and place TR2 and TR4 in non-conducting states by way of application of control signals CS2 and CS4, respectively. Current passes from AC neutral (N) port 1201-2 through TR3 to I/O port 1204-PB, and from there bypasses motor 1100, passes through switch 1108-PB, and through array 700-PB. Each module 108-1 through 108-N of array 700-PB can be selectively charged as described herein. Current passes through module 108IC-1 (e.g., using switches S7 together, or S8 together, of portions 604-PA and 604-PB of FIG. 10E) and through array 700-PA, and each module 108-1 through 108-N of array 700-PA can be selectively charged taking into account opposite current direction. Current passes through switch 1108-PA, into routing circuitry 1200 via I/O port 1204-PA, then through TR1, and out through the AC line (L) port 1201-1.

To charge modules 108 of arrays 700-PB and 700-PC (including modules 108IC-1 and 108IC-2) when the AC signal is negative, control system 102 can place TR2 and TR4 in conducting states by way of application of control signals CS2 and CS4, respectively, and place TR1 and TR3 in non-conducting states by way of application of control signals CS1 and CS3, respectively. Current passes from AC(N) port 1201-2 through TR4 to I/O port 1204-PC, bypasses motor 1100, passes through switch 1108-PC, and through array 700-PC. Each module 108-1 through 108-N of array 700-PC can be selectively charged as described herein. Current passes through module 108IC-2 and then module 108IC-2 (e.g., using switches S7 together, or S8 together, of portions 604-PB and 604-PC of FIG. 10E), and through array 700-PB, and each module 108-1 through 108-N of array 700-PB can also be selectively charged taking into account opposite current direction. Current passes through switch 1108-PB and into routing circuitry 1200 through I/O port 1204-PB, then through TR2, and exits through AC(L) port 1201-1.

To charge modules 108 of arrays 700-PA and 700-PC (including modules 108IC-1 and 108IC-2) when the AC signal is negative, control system 102 can place TR1 and TR4 in conducting states by way of application of control signals CS1 and CS4, respectively, and place TR2 and TR3 in non-conducting states by way of application of control signals CS2 and CS3, respectively. Current passes from AC(N) port 1201-2 through TPA to I/O port 1204-PC. The current bypasses motor 1100, passes through switch 1108-PC, and through array 700-PA. Each module 108-1 through 108-N of array 700-PC can be selectively charged as described herein. Current passes through module 108IC-2 and then module 108IC-1 (e.g., using switches S7 together, or S8 together, of portions 604-PA and 604-PC of FIG. 10E), and through array 700-PA, and each module 108-1 through 108-N of array 700-PA can also be selectively charged taking into account opposite current direction. Current passes through switch 1108-PA and into routing circuitry 1200 through I/O port 1204-PA, then through TR1, and exits through AC(L) port 1201-1.

Figure 12D:
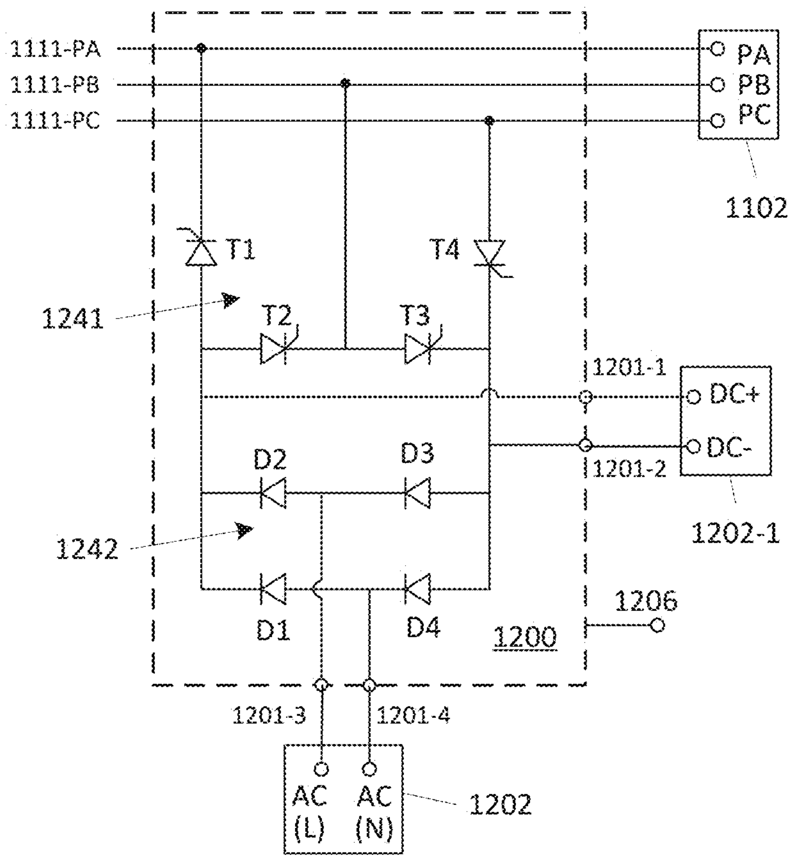
FIG. 12D is a schematic diagram depicting another example embodiment of routing circuitry.

FIG. 12D is a schematic diagram depicting an example embodiment of routing circuitry 1200 configured to permit DC and single phase AC charging using a combination of thyristors and diodes. DC charging is provided by connector 1202-1 coupled to a DC+ input 1201-1 and a DC− input 1201-2, which signals are routed to three phase lines 1111 by section 1241 having thyristors T1-T4 in a manner similar to that of FIG. 12B. (Control inputs 1206 are not shown.) Single phase AC charging is provided by connector 1202-2 coupled to AC(L) input 1201-3 and AC(N) input 1201-4, which signals are routed to lines 1111 by section 1242 having diodes D1 through D4. When the AC charge signal is positive diodes D2 and D4 are on and D1 and D3 are off, and when the AC signal is negative diodes D1 and D3 are on and D2 and D4 are off. The AC signal presented to section 1241 can then be routed as desired to lines 1111. Diodes D1-D4 are high voltage diodes corresponding to the voltage applied to DC ports 1201-1 and 1201-2. The embodiment of FIG. 12D enables cost reduction by use of diodes D1-D4 as opposed to triacs.

Use of the SPDT switch configuration of FIGS. 11A and 12A results in automatic disconnection and isolation of charge connectors 1102 and 1202 when the switches 1108 are in the discharge position 1. Similarly, motor 1100 is automatically disconnected and isolated when switches 1108 are in charge position 2. When using SPST switches 1108 like in the embodiment of FIG. 11B, motor 1100 is disconnected when in the charge state. However, the charge connectors remain connected when switches 1108 are closed and motor 1100 is connected for the discharge state. FIGS. 13A-13D depict example embodiments using SPST switches 1108 and having the capability to selectively disconnect the charge connectors while motor 1100 is connected and system 100 is in the discharge state.

Figure 13A:
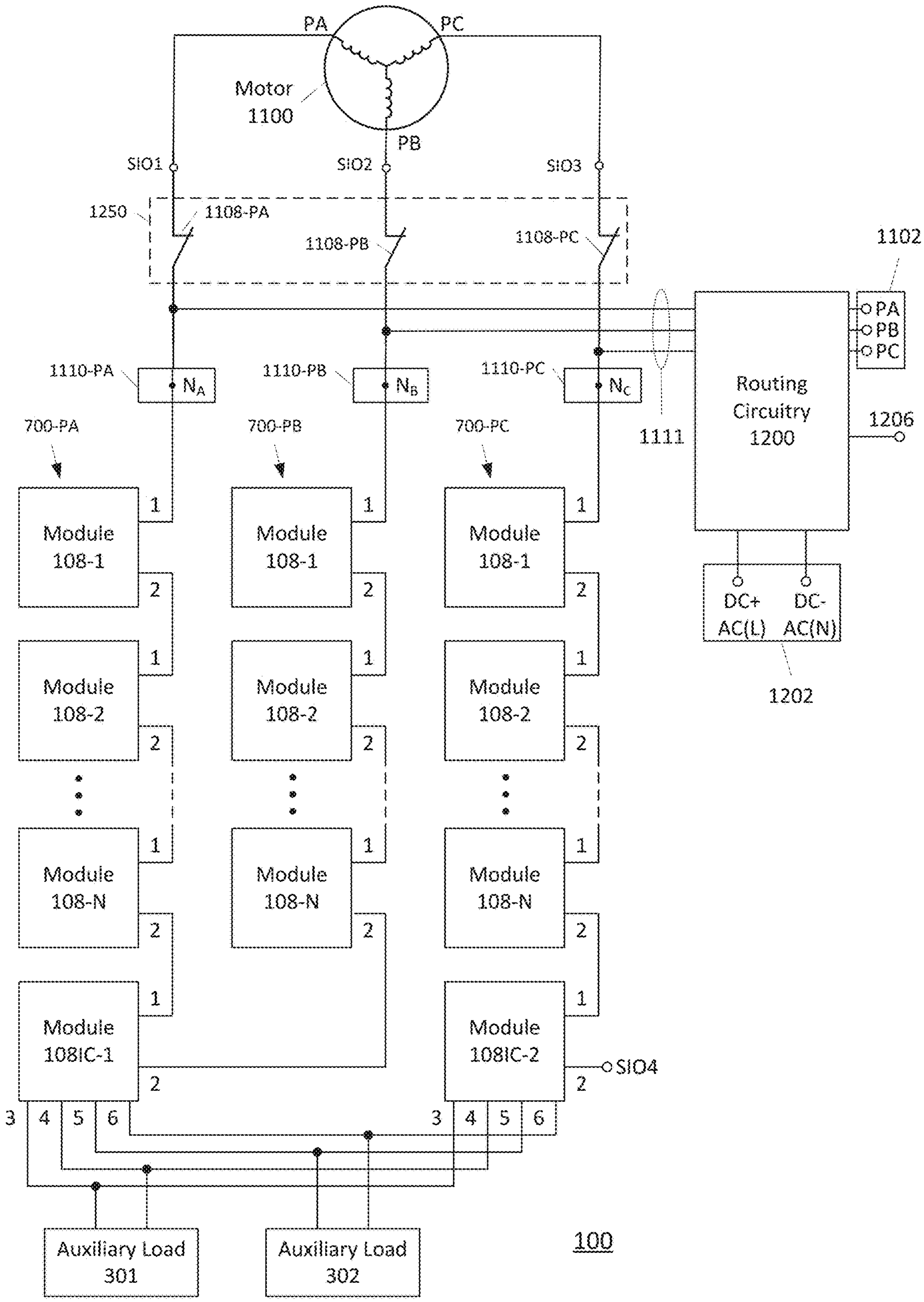
FIGS. 13A and 13D are block diagrams depicting an example embodiment of a modular energy system configured for DC, single phase AC, and multiphase AC charging.
Figure 13B:
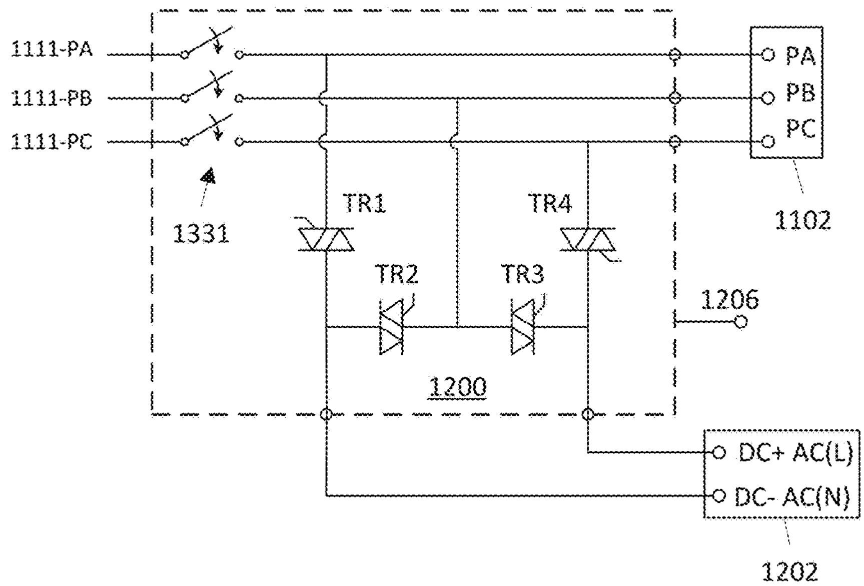
FIGS. 13B-13C and 13E-13H are schematic diagrams depicting example embodiments of routing circuitry.
Figure 13C:
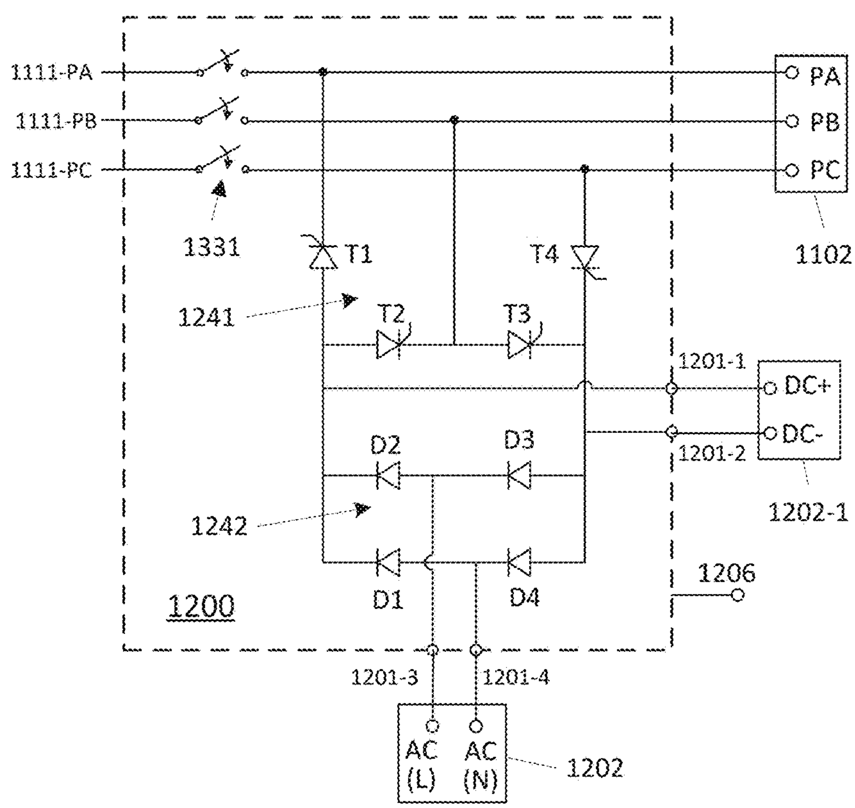

FIG. 13A is a block diagram depicting system 100 configured with SPST switches 1108, similar to that of FIG. 11B, but with routing circuitry 1200 that permits DC and/or single-phase AC charging in addition to multiphase AC charging while bypassing motor 1100. Like FIG. 12A, in this embodiment switches 1108 can be placed in a unified switch assembly device 1250. FIGS. 13B and 13C are schematic diagrams depicting additional example embodiments of routing circuitry 1200 having switches 1331-PA, 1331-PB, and 1331-PC configured to selectively disconnect lines 1111-PA, 1111-PB, and 1111-PC connected between arrays 700-PA, 700-PB, and 700-PC and connector 1102. Switches 1331 in this embodiment are configured as electromechanical relays. Each of switches 1331 can be controlled with control signals received at I/O ports 1206. (Control connections not shown.) Control system 102 can generate an output the control signals to switches 1331. While SPST switches 1108 are configured to default to a closed position to keep motor 1100 connected to system 100, switches 1331 are configured to default to an open position to keep the charge connectors 1102 and 1202 disconnected from system 100. The embodiment of FIG. 13B is otherwise configured to operate similar to that of FIG. 12C, in the embodiment of FIG. 13C is otherwise configured to operate similar to that of FIG. 12D. The embodiment of FIG. 12B can also be used if switches 1331 are included within circuitry 1200.

Figure 13D:
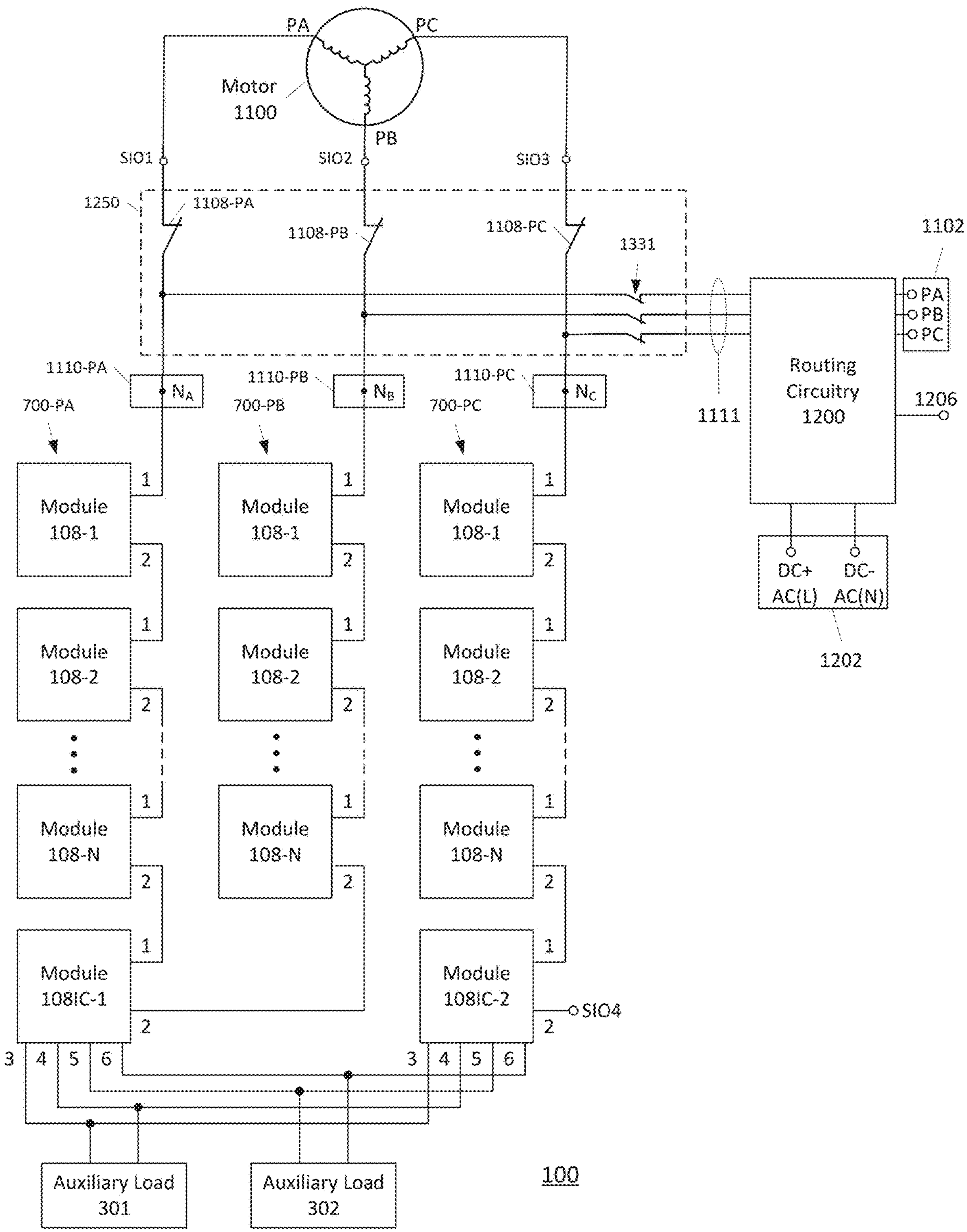

FIG. 13D is a block diagram depicting an example embodiment similar to that of FIG. 13A, but with switches 1331 moved from routing circuitry 1200 to switch assembly 1250. In this embodiment, routing circuitry 1200 can be configured similar to that of FIG. 12B, 12C, or 12D.

Figure 13E:
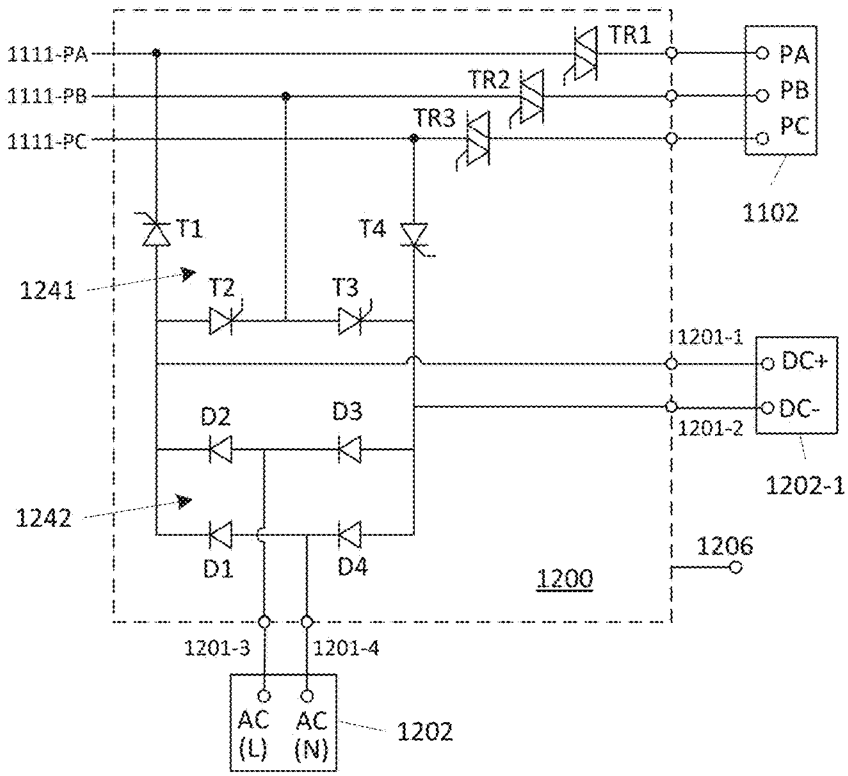

FIGS. 13E-13H are schematic diagrams depicting example embodiments of routing circuitry 1200 for use with the embodiment of FIG. 13A, where switches 1331 are configured as triacs having a relatively lower cost and higher switching speed than electromechanical relays. While these embodiments depict the use of triacs, other SSR types can be used. In each of these embodiments, the controllable triacs and thyristors can be controlled by control signals generated and provided by control system 102. For ease of illustration, the control lines and control ports for routing these control signals to each of the controllable thyristors and triacs are not shown. In FIG. 13E, switches 1331 in the form of triacs TR1-TR3 are positioned between thyristor section 1241 and three-phase connector 1102. In another embodiment, triacs TR1-TR3 can be positioned on the opposite (array) side of the section 1241 connections. In yet another embodiment, triacs TR1-TR3 can be positioned in switch assembly 1250 similar to the embodiment of FIG. 13D (and used with routing circuitry 1200 of FIGS. 12B-12D).

Figure 13F:
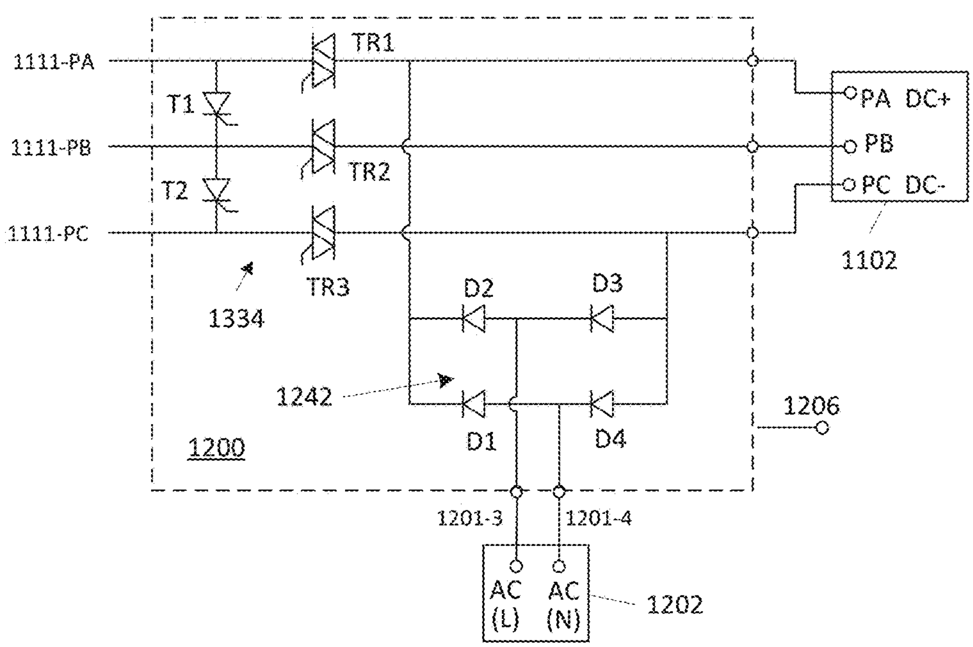

FIG. 13F depicts another example embodiment where the number of components from the embodiment of FIG. 13E have been reduced by consolidation and reconfiguration, while maintaining the same functionality. Here, section 1242 remains generally the same and is coupled to lines 1111-PA and 1111-PC between section 1334 and connector 1102. DC charge signals are input to multiphase charge connector 1102 with the DC+ signal input to the PA terminal and the DC− signal input to the PC terminal. Section 1334 includes a triac on each of lines 1111, with a thyristor T1 coupled between the array sides of triacs TR1 and TR2, and a thyristor 12 coupled between the array sides of triacs TR2 and TR3. To charge arrays 700-PA and PB, triacs TR1 and TR3 and thyristor T2 are opened and triac TR2 and thyristor T1 are closed. To charge arrays 700-PB and PC, triacs TR1 and TR3 and thyristor T1 are opened and triac TR2 and thyristor T2 are closed. To charge arrays 700-PA and PC, triacs TR1 and TR3 are opened and triac TR2 and thyristors T1 and T2 are closed.

Figure 13G:
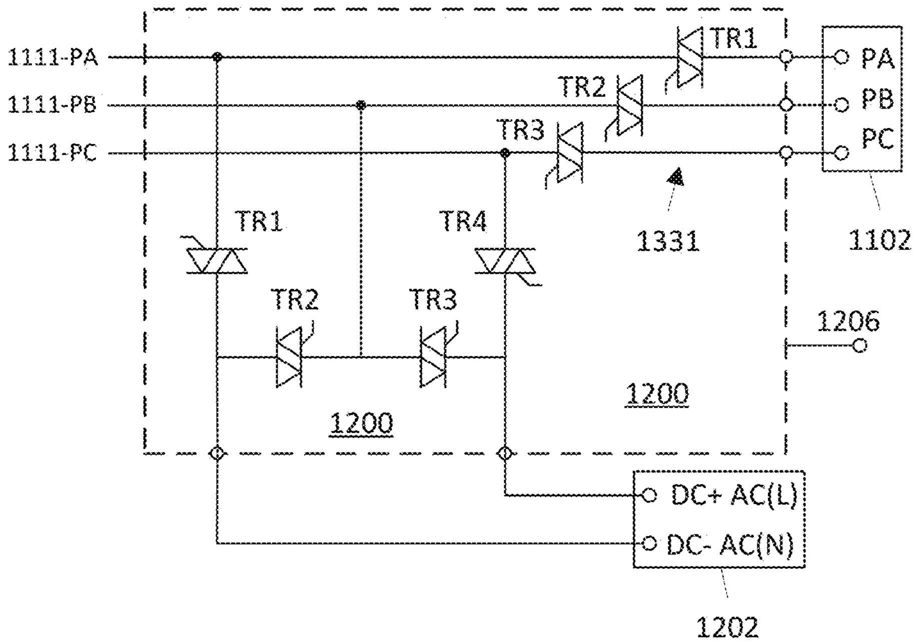
Figure 13H:
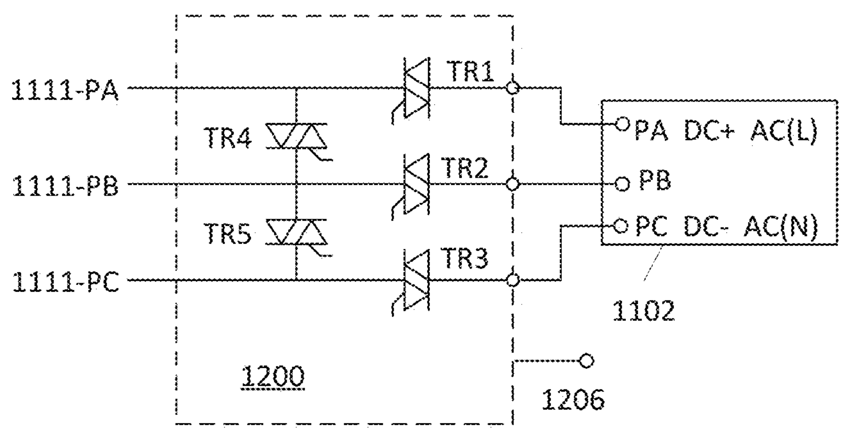

FIG. 13G depicts an embodiment where the dual DC and single phase AC triac configuration of FIG. 12C is connected to lines 1111, and switches 1331 in the form of triacs TR1-TR3 are positioned between those connections and connector 1102. FIG. 13H depicts another example embodiment where the number of components from the embodiment of FIG. 13G have been reduced by consolidation and reconfiguration, while maintaining the same functionality. Here, a triac TR4 is coupled between the array sides of triacs TR1 and TR2, and a triac TR5 is coupled between the array sides of triacs TR2 and TR3. To charge arrays 700-PA and PB, triacs TR1, TR3, and TR5 are opened and triacs TR2 and TR4 are closed. To charge arrays 700-PB and PC, triacs TR1, TR3, and TR4 are opened and triacs TR2 and TR5 are closed. To charge arrays 700-PA and PC, triacs TR1 and TR3 are opened and triacs TR2, TR4, and TR5 are closed.

In the embodiments described herein, connector 1202, whether configured for DC only, single phase AC only, or both, can be a separate and discrete connector from that of three-phase charge connector 1102, or connectors 1102 and 1202 can be combined in a single location on the EV.

Different approaches can be used to charge each pair of arrays 700. In one example embodiment, when charging arrays 700-PA and PB, charging can be performed until both arrays 700 have reached a desired level or threshold (e.g., 50%). Then when charging arrays 700-PB and PC, charging can be performed until array 700-PB has reached 100% and array 700-PC has reached 50%. Then when charging arrays 700-PA and PC, charging can be performed until both arrays 700 reach 100%. In another example embodiment, routing circuitry 1200, switches 1108, and modules 108 of each array 700 can be controlled and cycled to charge up all arrays 700 in relative unison (e.g., array 700-PA modules are charged one or a few percent and then array 700-PB modules are charged one or a few percent, then array 700-PC modules are charged one or a few percent, and the process can repeat until all modules are fully charged). In single phase AC charging, switching can occur rapidly such that each array 700-PA through 700-PC is charged one or more times during the positive half of the cycle and charged again one or more times during the negative half of the cycle.

Example Embodiments of Charging Arrays in Parallel with Motor Bypass

Figure 14:
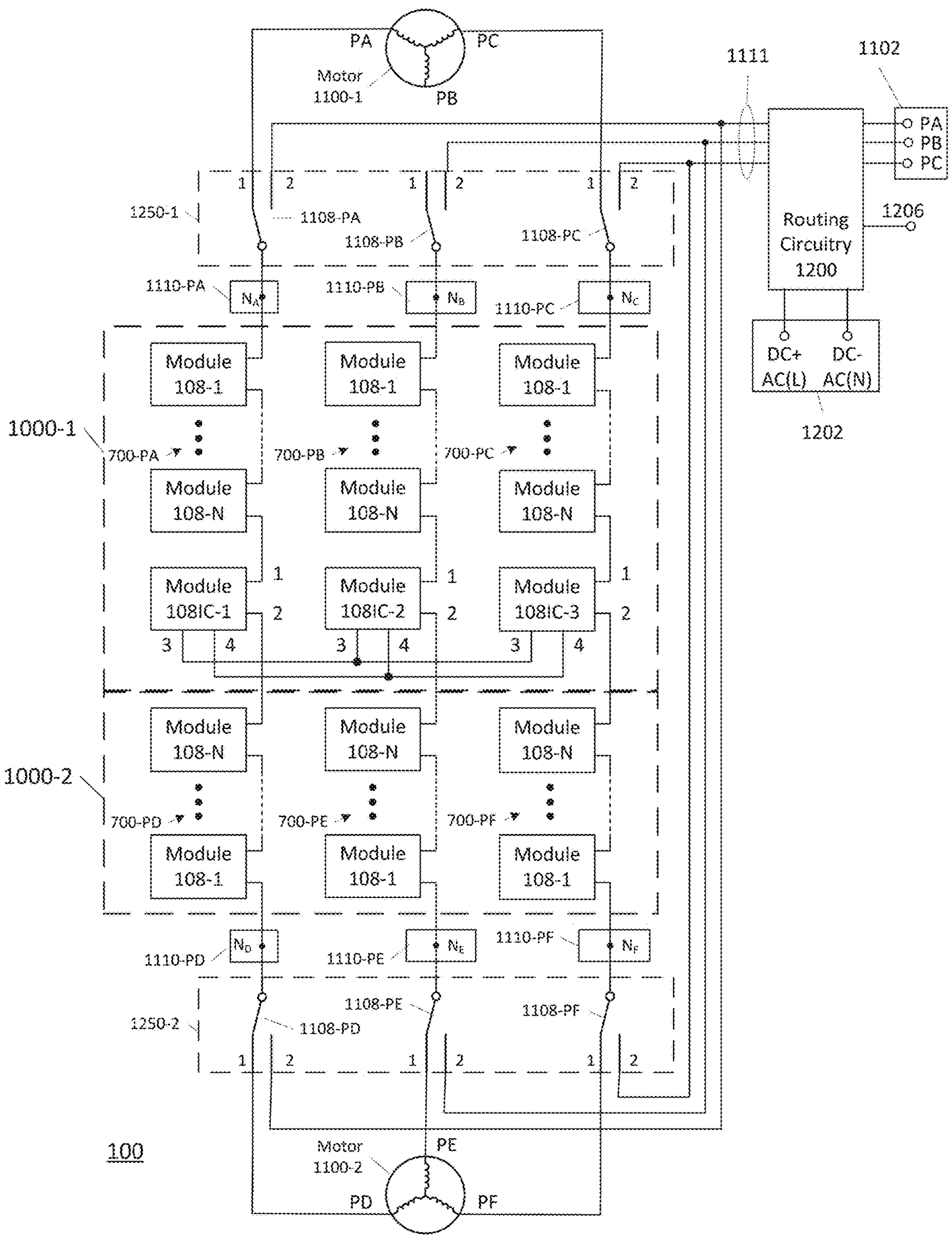
FIG. 14 is a block diagram depicting an example embodiment of a modular energy system configured for DC, single phase AC, and multiphase AC charging.

In some embodiments it can be desirable to charge arrays 700 in parallel, for example in embodiments where parallel arrays are used to generate higher currents or embodiments having more phase arrays 700 present than AC charging signals. FIG. 14 is a block diagram depicting an example embodiment of a system 100 having two subsystems 1000-1 and 1000-2 arranged in similar fashion to the embodiment of FIG. 10C. Switches 1108 are configured as SPDT switches. Here, each subsystem 1000-1 and 1000-2 powers a different motor 1100-1 and 1100-2. System 100 can be configured to be charged with DC, single phase AC, and/or multiphase charge signals depending on the configuration of routing circuitry 1200 (or absence thereof). Circuitry 1200 is coupled to multiphase lines 1111 that split to connect with switch assemblies 1250-1 and 1250-2 such that subsystems 1000-1 and 1000-2 are charged in parallel. For example, current being input to arrays 700-PA and 700-PD can charge those modules in parallel with the current being combined in module 108IC-1, and the same can occur for arrays 700-PB and 700-PE and module 108IC-2, as well as arrays 700-PC and 700-PF and module 108IC-3. Routing circuitry in this embodiment can be configured in accordance with the embodiments of FIGS. 12B-12D, or otherwise.

Figure 15A:
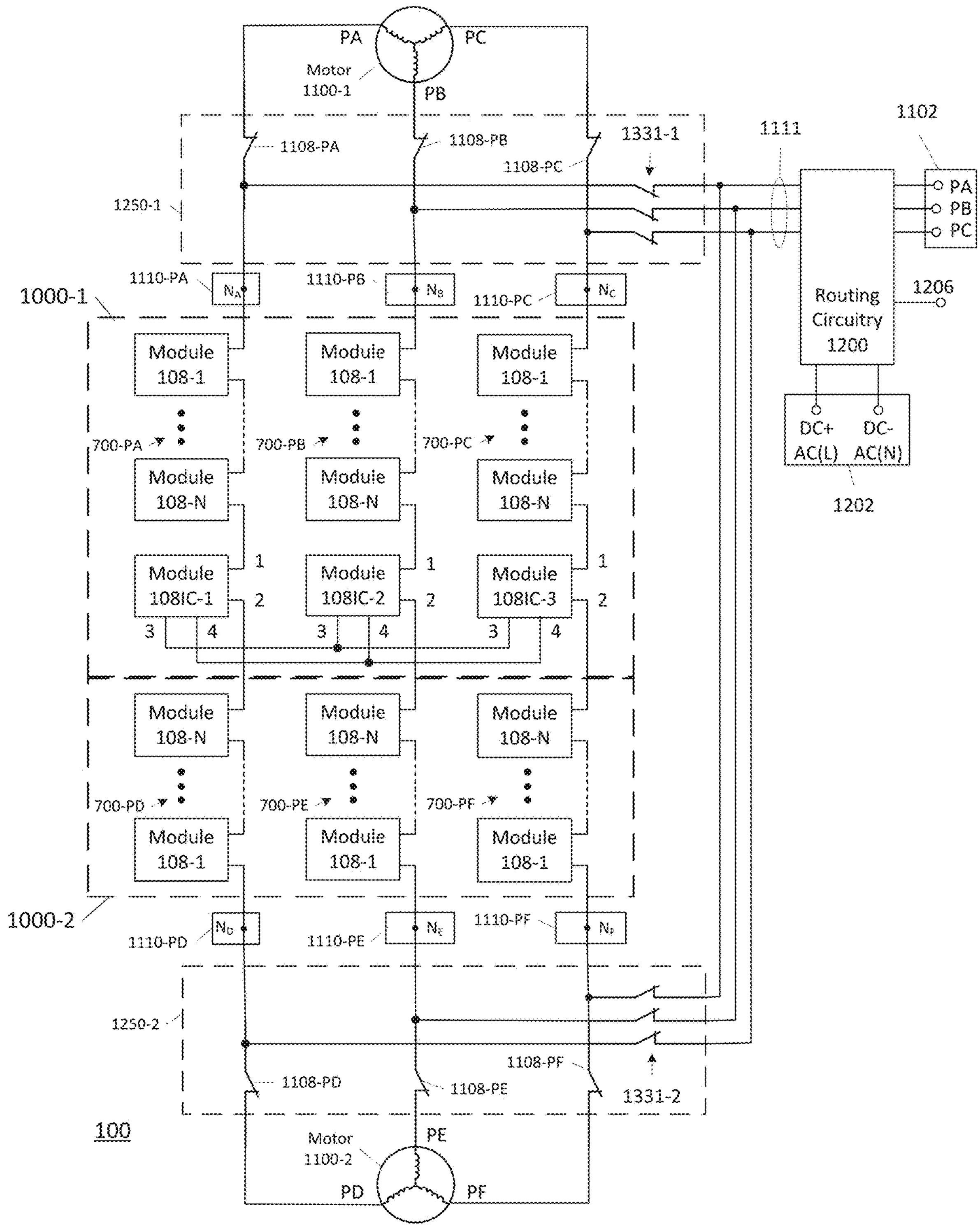
FIGS. 15A-15B and 15E are block diagrams depicting example embodiments of a modular energy system having two subsystems configured for DC, single phase AC, and multiphase AC charging.

FIG. 15A is a block diagram depicting another example embodiment of a system 100 with two subsystems 1000 for supplying two motors 1100. Here, switches 1108 are configured as SPST switches within switch assemblies 1250-1 and 1250-2, which also include switches 1331-1 and 1331-2, respectively. Switches 1331-1 and 1331-2 are configured as electromechanical relays and are closed during charging, and opened again during operation. Routing circuitry 1200 can be configured in accordance with the embodiments of FIGS. 12B-12D, or otherwise.

Figure 15B:
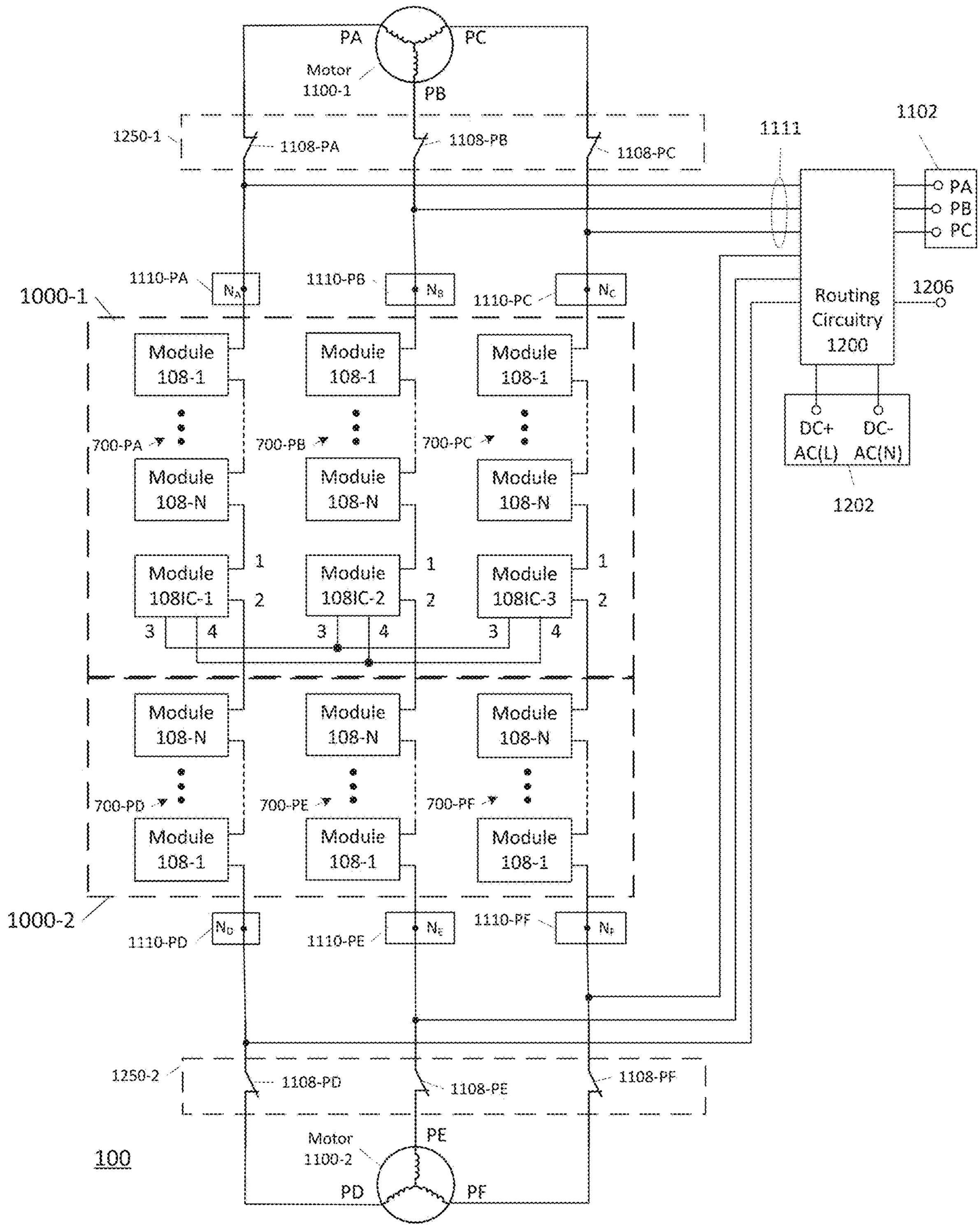
Figure 15C:
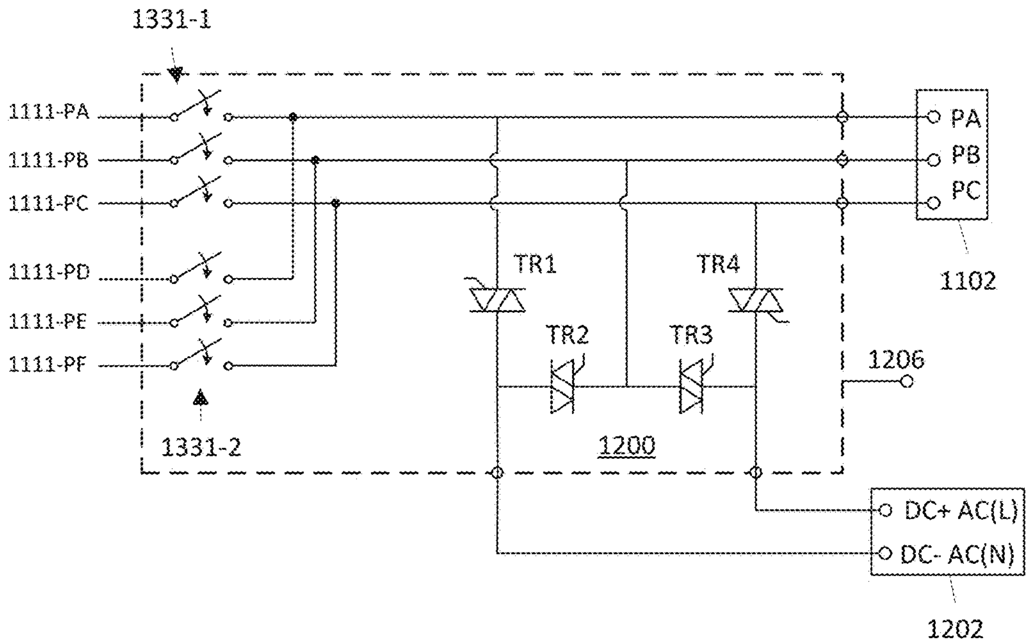
FIGS. 15C-15D and 15F-15K are schematic diagrams depicting additional example embodiments of routing circuitry.
Figure 15D:
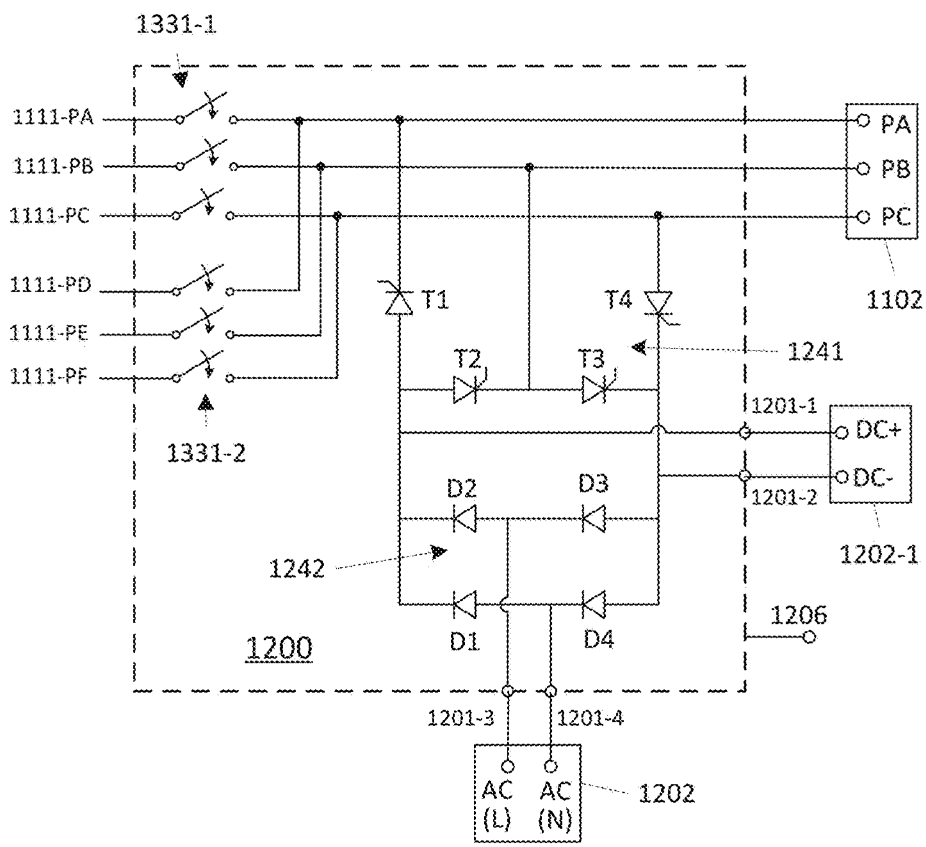

FIG. 15B is a block diagram depicting another example embodiment of a system 100 with two subsystems 1000 for supplying two motors 1100. Switches 1108 are again configured as SPST switches within switch assemblies 1250-1 and 1250-2, but switches 1331-1 and 1331-2 are positioned within routing circuitry 1200, as described with respect to FIGS. 15C-15D. FIGS. 15C and 15D are schematic diagrams depicting routing circuitry 1200 configured similarly to FIGS. 13B and 13C, respectively, but with three-phase lines 1111 split to feed the separate groups of switches 1331-1 and 1331-2. Routing circuitry 1200 to the right of the split can also be configured in accordance with the embodiment of FIG. 12B for DC and multiphase charging.

Figure 15E:
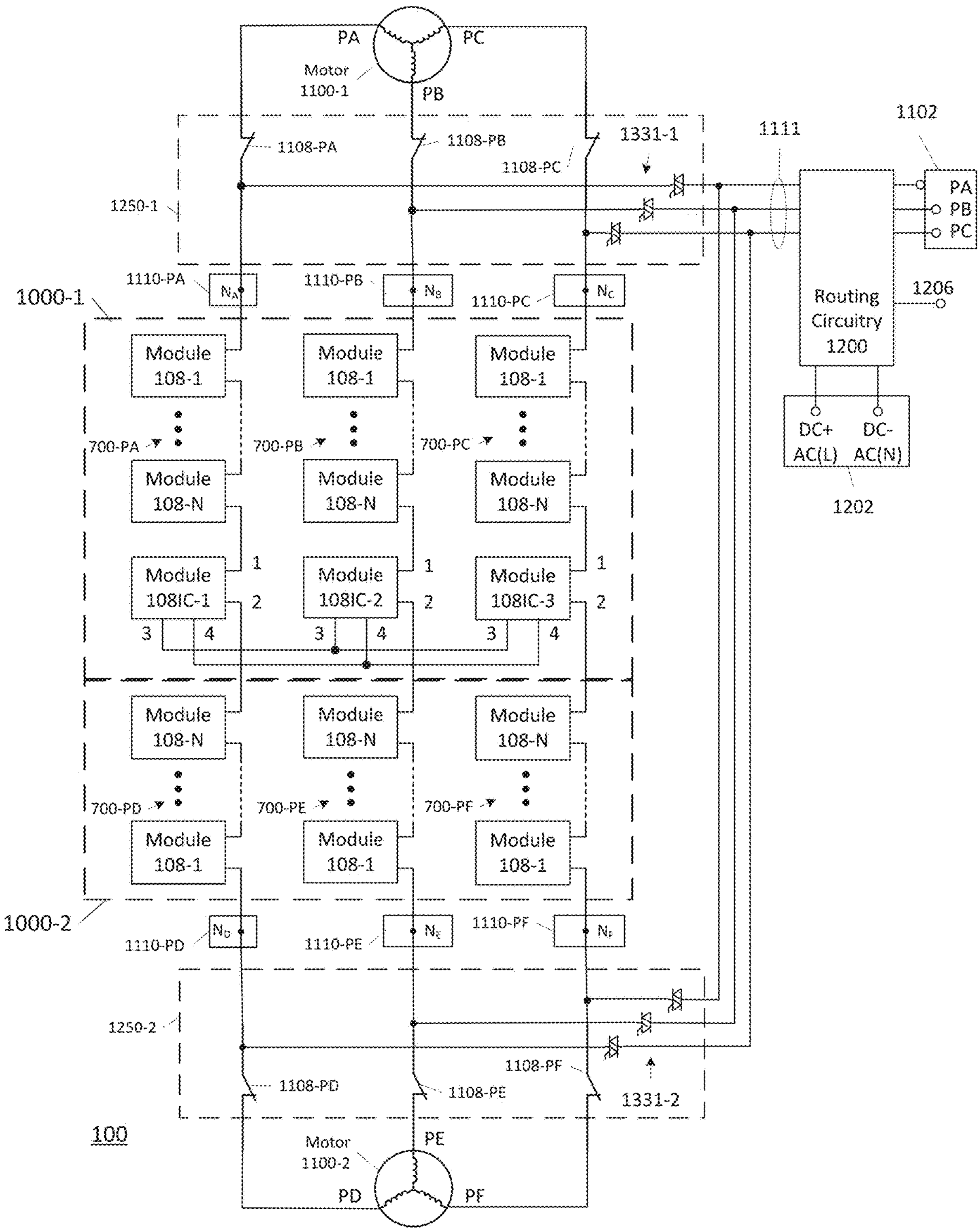

The embodiments of FIGS. 15A-15B can also be implemented with switches 1331 configured as SSR devices, such as triacs or others. FIG. 15E is a block diagram depicting an example embodiment similar to that of FIG. 15A but with switches 1331-1 and 1331-2 configured as triacs. Routing circuitry 1200 can be configured in accordance with the embodiments of FIGS. 12B-12D, or otherwise. In the embodiments of FIGS. 15A, 15B, and 15E, routing circuitry 1200 and connector 1202 can be omitted if it is desired to have the capability to only multiphase charge.

Figure 15F:
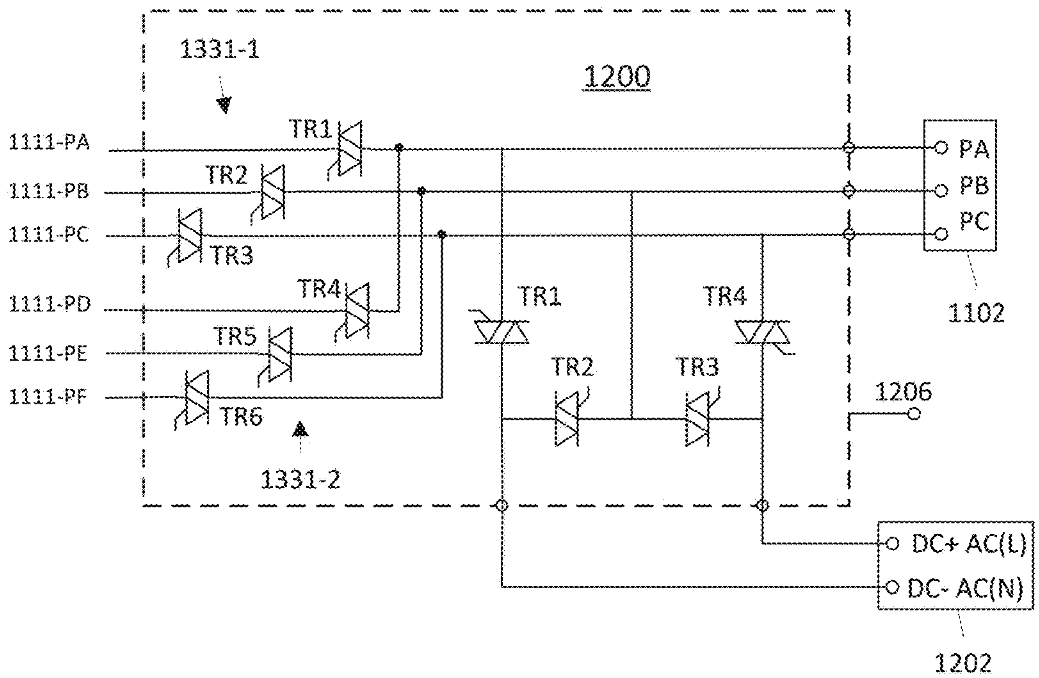
Figure 15G:
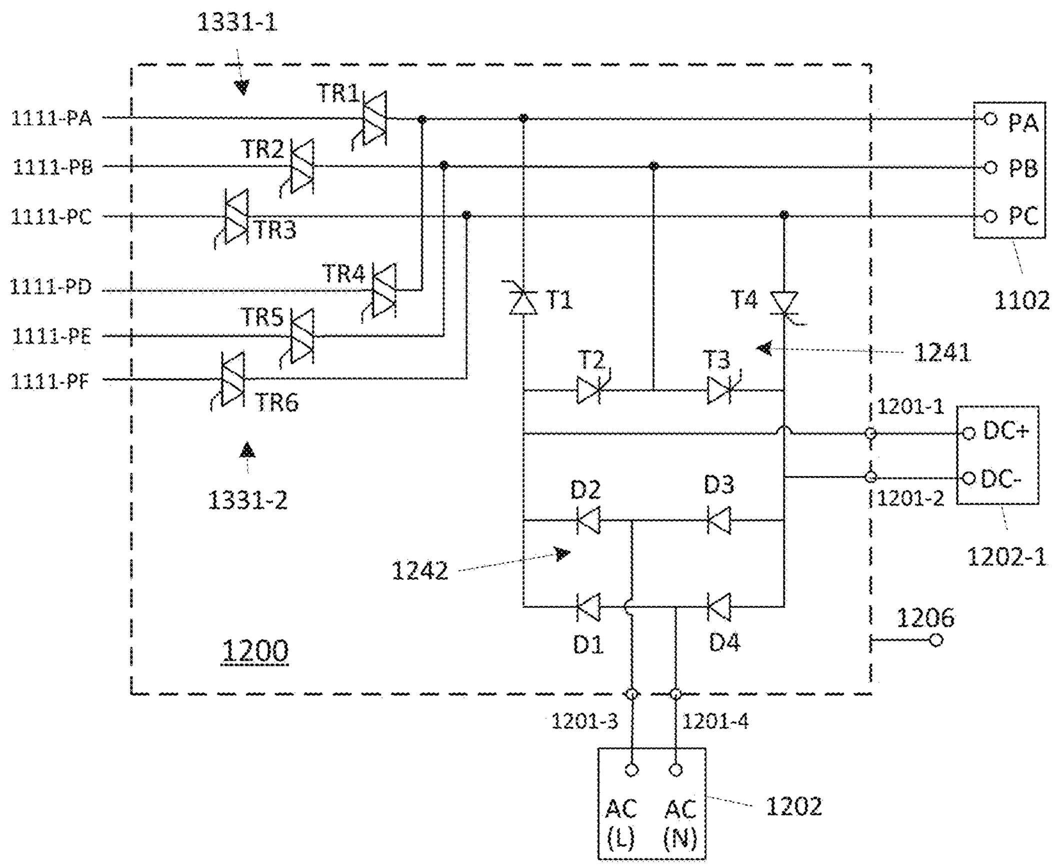
Figure 15H:
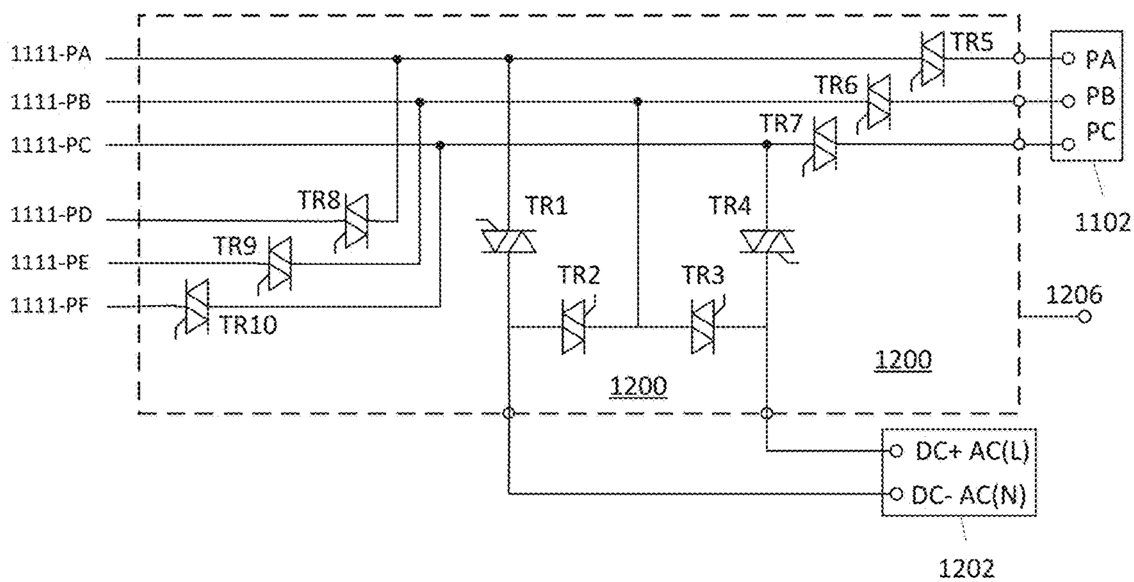

FIG. 15F is a block diagram depicting an example embodiment similar to that of FIG. 15B but with switches 1331-1 and 1331-2 configured as triacs. FIGS. 15G and 15H are schematic diagrams depicting example embodiments of routing circuitry 1200 for operation with the embodiment of FIG. 15F. The embodiments of FIGS. 15G and 15H are similar to those of FIGS. 15C and 15D, respectively, but with the separate groups of switches 1331-1 and 1331-2 implemented as triacs. Routing circuitry 1200 to the right of the split can also be configured in accordance with the embodiment of FIG. 12B for DC and multiphase charging.

Figure 15I:
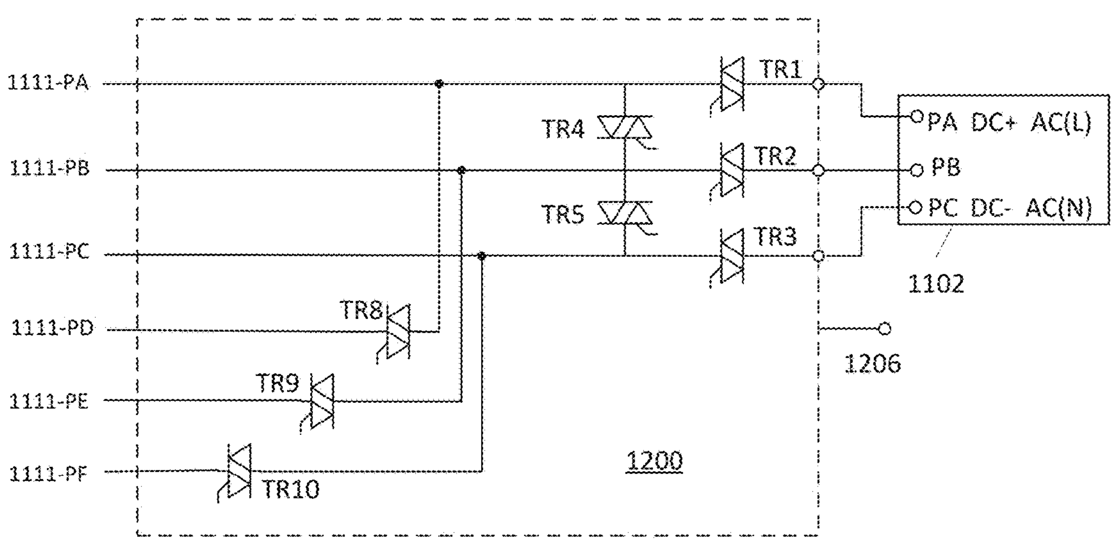

FIGS. 15H-15I are schematic diagrams depicting additional example embodiments of routing circuitry 1200 configured for use with the embodiment of FIG. 15B. In FIG. 15H, the triac arrangement of FIG. 12C is coupled with three-phase lines 1111 at nodes X, Y, and Z. Three triacs TR5, TR6, and TR7 are positioned on lines 1111-PA, 1111-PB, and 1111-PC between nodes X, Y, Z and connector 1102. Lines 1111 split to form a second group of lines 1111-PD, 1111-PE, and 1111-PF having triacs TR8, TR9, TR10 positioned thereon. During motor operation or DC or single phase AC charging, connector 1102 can be isolated by opening triacs TR5-TR7. During motor operation the two groups of lines 1111 can be disconnected by opening triacs TR8-TR10. During multiphase charging triacs TR5-TR10 are closed and triacs TR1-TR4 are open. During DC and single phase AC charging triacs TR8-TR10 are closed.

FIG. 15I depicts another example embodiment where the number of components from the embodiment of FIG. 15H have been reduced by consolidation and reconfiguration, while maintaining similar functionality. This embodiment has an SSR configuration 1510 similar to that of FIG. 13H. Like with the embodiment of FIG. 15H, lines 1111-PD, 1111-PE, and 1111-PF have triacs TR8-TR10 to disconnect the parallel connections during motor operation.

Figure 15J:
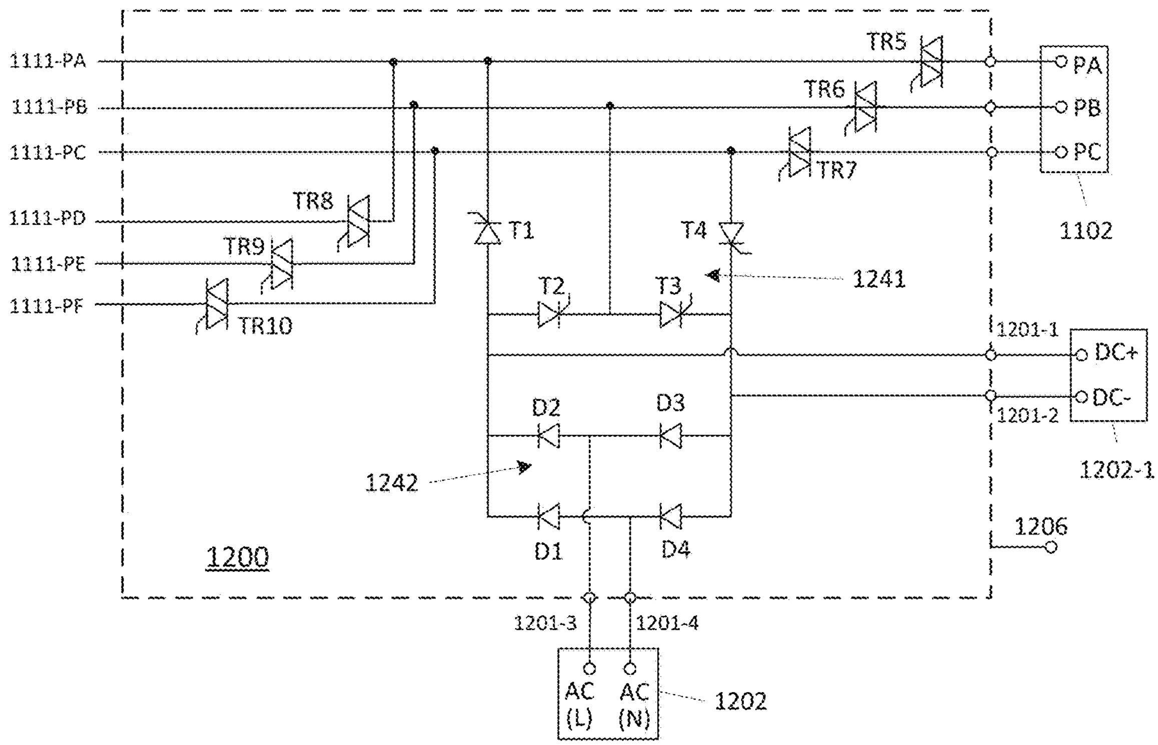
Figure 15K:
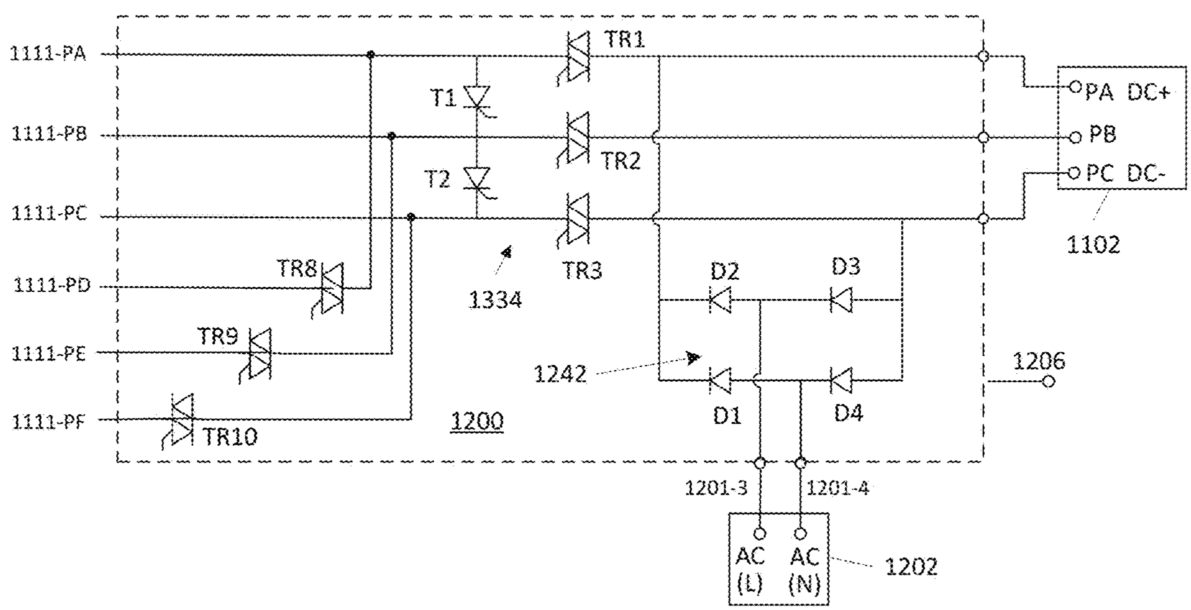

FIGS. 15J-15K are schematic diagrams depicting additional example embodiments of routing circuitry 1200 configured for use with the embodiment of FIG. 15B. In FIG. 15J, the triac arrangement of FIG. 12D is coupled with three-phase lines 1111 at nodes X, Y, and Z. Three triacs TR5, TR6, and TR7 are positioned on lines 1111-PA, 1111-PB, and 1111-PC between nodes X, Y, Z and connector 1102. Lines 1111 split to form a second group of lines 1111-PD, 1111-PE, and 1111-PF having triacs TR8, TR9, TR10 positioned thereon. During motor operation or DC or single phase AC charging, connector 1102 can be isolated by opening triacs TR5-TR7. During motor operation the two groups of lines 1111 can be disconnected by opening triacs TR8-TR10. During multiphase charging triacs TR5-TR10 are closed and thyristors T1-T4 are open. During DC and single phase AC charging triacs TR8-TR10 are closed.

FIG. 15K depicts another example embodiment where the number of components from the embodiment of FIG. 15J have been reduced by consolidation and reconfiguration, while maintaining similar functionality. This embodiment has an SSR configuration 1334 of FIG. 13F. The diode configuration 1242 is connected between configuration 1334 and connector 1102, which acts as both a multiphase and DC charge connector. Like with the embodiment of FIG. 15H, lines 1111-PD, 1111-PE, and 1111-PF have triacs TR8-TR10 to disconnect the parallel connections during motor operation. Dining motor operation, connectors 1102 and 1202 can be isolated by opening triacs TR1-TR3. During motor operation the two groups of lines 1111 can be disconnected by opening triacs TR8-TR10. During multiphase charging triacs TR1-TR3 and TR8-TR10 are closed and thyristors T1-T2 are open. During DC and single phase AC charging triacs TR8-TR10 are closed, and configuration 1334 is operated similar to that described with respect to FIG. 13F.

System 100 has a highly scalable and adaptable configuration that permits numerous different implementations to power applications having a wide breadth of voltage requirements and quantity of loads. The voltage requirements can vary from low voltage applications (e.g., electric scooters, etc.) on the order of hundreds of watts, to high voltage industrial applications (e.g., power grids, fusion research, etc.) on the order of megawatts, and higher. The number of loads can vary and those loads can be supplied by subsystems 1000 that are interconnected by one or more modules 108IC and under the control of a common control system 102. Alternatively, each subsystem 1000 can be under the control of a separate control system 102, where each control system 102 interfaces directly with the controller for the motor. The scalability and adaptability of system 100 applies both to stationary and mobile applications. To ease illustration, many of the following embodiments are again described with respect to mobile applications, particularly various embodiments of automotive EVs, although not limited to such.

The example embodiments can be used with conventional automotive EVs having a single motor and one or more associated subsystems 1000 (e.g., battery packs). Example embodiments can also be used with automotive EVs having two or more motors associated with a single subsystem 1000, or two or more motors each having one or more subsystems 1000 associated therewith. The motors can be conventional motors mounted within the vehicle body that transfer power to the wheels by way of a powertrain or drivetrain. The motors can alternatively be in-wheel motors that power wheel motion directly without a powertrain (or drivetrain). The EV may have an in-wheel motor for every wheel on the vehicle (e.g., 2, 3, 4, 5, 6, or more), or may have in wheel motors for only some of the wheels on the vehicle. If multiple motors are present, a combination of approaches can be used, e.g., in wheel motors for front wheels of the EV and a conventional in body motor and powertrain for rear wheels, or vice versa.

The present subject matter provides the capability for different subsystems 1000 to provide power for motors having different voltage requirements. For example, a single four wheel EV can have a first motor for powering the front wheels and a second motor for powering the rear wheels. The first motor may operate at a different voltage than the rear motor. Alternatively, the EV may have one motor for each front wheel and one motor for both rear wheels, where the motors for the front wheels have a different voltage requirements than the motor for the rear wheels. Or the EV may have one motor for the front wheels and two motors for the rear wheels, with the rear wheel motors having a different voltage requirements than the front wheel motor. Still further, each wheel can have its own motor, with front wheel motors having a voltage requirement that is different from the voltage requirement of the rear wheel motors. Such variable combinations also apply to multi-motor EVs having two, three, five, six or more wheels.

A motor having a relatively low voltage requirement, e.g., 300-400 V nominal line-to-line peak voltage, may have a subsystem 1000 with relatively less modules than a higher voltage application. Alternatively, or in addition, each module may have a lower nominal voltage than those of a higher voltage application. For example a motor having a relatively moderate voltage requirement that is higher than the low voltage requirement, e.g., a 400-700 V nominal line-to-line peak voltage, may have a subsystem 1000 with relatively more modules per array than the low voltage subsystem 1000, and/or those modules may have the same or a higher nominal voltage than those of the low voltage application. By further example, a motor having a relatively high voltage requirement, higher than the low and/or moderate voltage requirements, e.g., a 700-800 V nominal line-to-line peak voltage, may have a subsystem 1000 with relatively more modules per array than the low voltage and moderate voltage subsystems 1000, and/or, the nominal voltages of those modules may be relatively higher than those of the low voltage or moderate voltage subsystems 1000. Of course, all subsystems 1000 can be configured with the same number of modules and only the nominal voltage of the modules may vary, or all subsystems 1000 can be configured with modules having the same nominal voltage but with different numbers of modules per array.

The present subject matter also provides the capability to use energy sources having different types (e.g., different electrochemistry, different physical structure, etc.). For example, one or more first subsystems 1000 in a multi-motor EV may have modules 108 with batteries of a first type and one or more second subsystems 1000 in a multi-motor EV may have modules 108 with batteries of a second type. If interconnection modules 108IC are present, then those modules 108IC can have batteries of a third type different from the first and second types. If one or more subsystems have modules 108B with multiple energy sources per module, then still further combinations can be practiced, such as combinations where (a) the one or more first subsystems have multiple energy sources per module, and the one or more second subsystems have only one energy source per module. (b) the one or more first subsystems have multiple energy sources per module including a primary energy source of a first type and a secondary energy source of a second type, and the one or more second subsystems have multiple energy sources per module including a primary energy source of the same first type and a secondary energy source of a third type different from the first and second types, (c) the one or more first subsystems have multiple energy sources per module including a primary energy source of a first type and a secondary energy source of a second type, and the one or more second subsystems have multiple energy sources per module including a primary energy source of a third type, different from the first and second types, and a secondary energy source of the same second type, or (d) the one or more first subsystems have multiple energy sources per module and the one or more second subsystems have multiple energy sources per module, and the types of energy sources in the one or more first subsystems are different than the types of energy sources in the one or more second subsystems.

Energy sources having different types can manifest in terms of the operating characteristics of those energy sources. For example, battery energy sources of different types may have different nominal voltages, different C rates, different energy densities, different capacities, each of which may vary over temperature, state of charge, or usage (e.g., the number of cycles). Example of battery types include solid state batteries, liquid electrotype based batteries, liquid phase batteries as well as flow batteries such as lithium (Li)

metal batteries, Li ion batteries, Li air batteries, sodium ion batteries, potassium ion batteries, magnesium ion batteries, alkaline batteries, nickel metal hydride batteries, nickel sulfate batteries, lead acid batteries, zinc-air batteries, and others. Some examples of Li ion battery types include Li cobalt oxide (LCO), Li manganese oxide (LMO), Li nickel manganese cobalt oxide (NMC), Li iron phosphate (LFP), Lithium nickel cobalt aluminum oxide (NCA), and Li titanate (LTO).

The present subject matter provides the capability for different modules 108, subsystems 1000, and systems 100 to have energy sources of different types, particularly different types of batteries. One or more first subsystems in an EV can include modules each having an energy source of a first type, and one or more second subsystems in the EV can include modules each having an energy source of a second type different from the first type, where the two types differ with respect to at least two operating characteristics. A battery of a first type may have a first operating characteristic (e.g., nominal voltage, C rate, energy density, or capacity) that is relatively greater than the same first operating characteristic of a battery of a different second type, and the battery of the second type may have a different second operating characteristic (e.g., nominal voltage, C rate, energy density, or capacity) that is relatively greater than the same second operating characteristic of the battery of the first type. For example, an EV may have energy sources of a first type and energy sources of a second type, where the first type (e.g., LFP) provides a relatively high C rate and relatively low energy density (or capacity), thus making it more suitable for acceleration performance, while the second type (e.g., NMC) provides a relatively low C rate and a relatively high energy density (or capacity), thus making it more suitable for highway driving.

Thus, battery types can be mixed to achieve superior performance over different operating characteristics. The utilization of different types can be implemented within a single module (e.g., a primary source 206A of a first type and a secondary source 206B of a second type), between different modules of the same single subsystem 1000 or system 100 (e.g., one or more modules 108 having an energy source 206 of a first type and one or more modules 108 having an energy source 206 of a second type), and/or between subsystems 1000 or systems 100 (e.g., a first subsystem having modules that each have an energy source of a first type and a second subsystem having modules that each have an energy source of a second type).

These variations in voltage capability (e.g., low, moderate, high) and energy source type can be applied to all the embodiments described herein. These variations are particularly applicable to embodiments having two or more separate subsystems 1000 to power multiple motors 1100, such as those described with respect to FIGS. 10C, 14, 15A, 15B, 15E, and 16A-18B. When charging subsystems having different voltage capabilities, each subsystem can be charged independently by a dedicated charge port and charge cable (from a dedicated charge source or a shared charge source), or the subsystems can be charged concurrently from that same charge cable and connector, such as the parallel configurations described with respect to FIGS. 14, 15A, 15B, and 15E (and elsewhere). When charging any of the embodiments described herein, if desired to preserve enough margin to perform balancing during the charge process, it is preferable that the available charge source voltage (e.g., peak line to line voltage for AC charging) be less than the sum total of the present voltages of the sources 206 being charged at any one time.

Figure 16A:
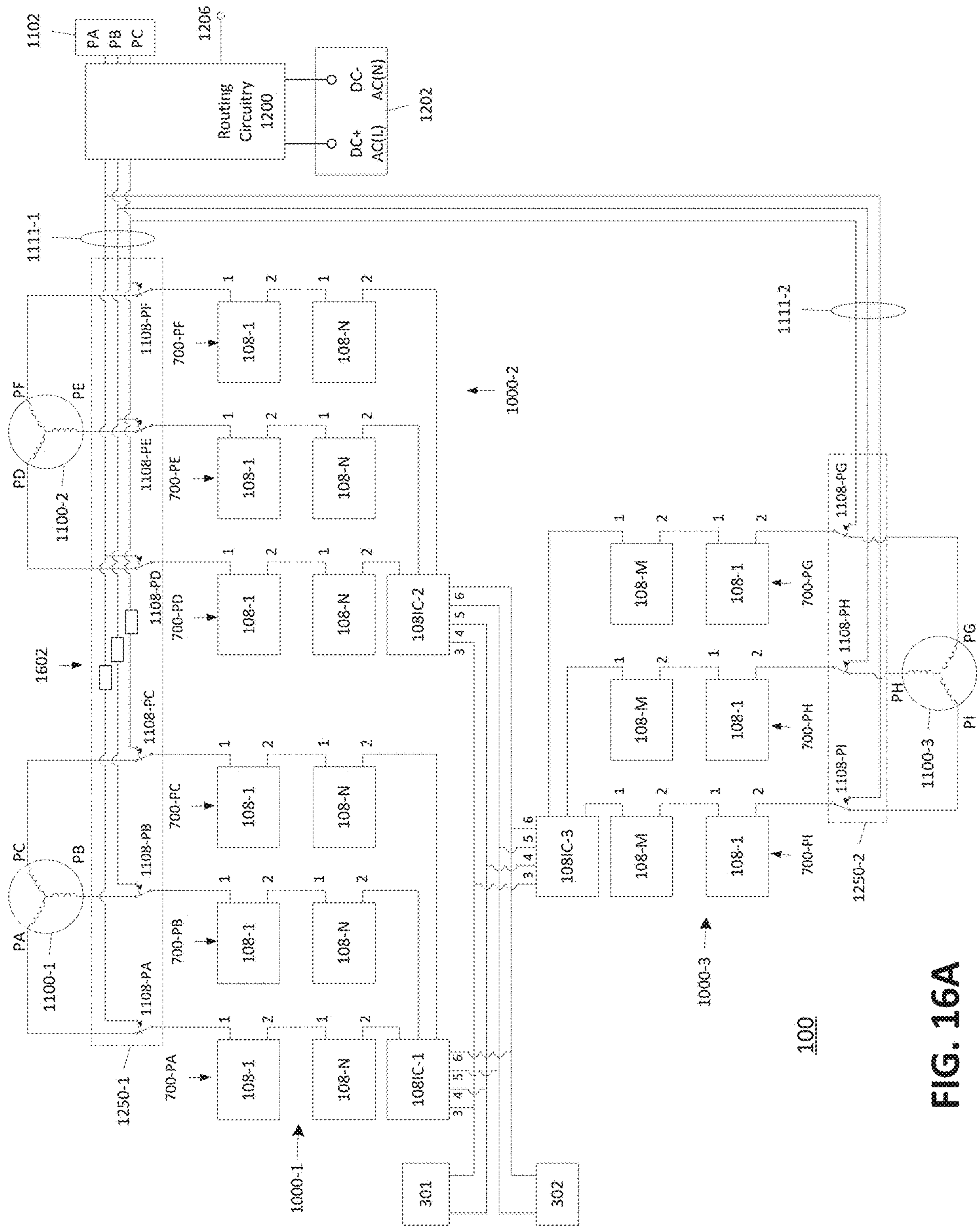
FIGS. 16A-16C are block diagrams depicting example embodiments of a modular energy system having three subsystems configured for DC, single phase AC, and multiphase AC charging.

FIG. 16A is a block diagram depicting an example embodiment of system 100 having three subsystems 1000-1, 1000-2, 1000-3 for powering three motors 1100-1, 1100-2, and 1100-3, respectively. In this example, motors 1100-1 and 1100-2 are each associated with a different front wheel of a four-wheel EV and have moderate voltage requirements, while motor 1100-3 is associated with the two rear wheels of the EV and has a relatively higher voltage requirement than motors 1100-1 and 1100-2. The arrays 700 of subsystems 1000-1 and 1000-2 each can have N modules 108 as shown, and the value of N for the two subsystems is preferably the same. The arrays 700 of subsystem 1000-3 can each have M modules 108, which can be any integer two or greater. The arrays 700 of subsystem 1000-3 are configured to produce a relatively greater voltage than the arrays 700 of subsystems 1000-1 and 1000-2, and thus subsystem 1000-3 will in many cases have more modules 108 than subsystems 1000-1 and 1000-2. In certain other embodiments the number of modules may be consistent between subsystems, for example, if each module 108 of subsystem 1000-3 is capable of generating a greater voltage than modules 108 of subsystems 1000-1 and 1000-2, such as by the use of a battery type having greater nominal voltage or by the inclusion of multiple energy sources 206 within each module 108 of subsystem 1000-3.

Three interconnection modules 108IC-1, 108IC-2, and 108IC-3 are present and each includes three switch portions 604 for connection to three different arrays 700. Each module 108IC is coupled to the three arrays 700 of a single subsystem, with module 108IC-1 coupled to arrays 700-PA, PB, PC of subsystem 1000-1, module 108IC-2 coupled to arrays 700-PD, PE, PF of subsystem 1000-2, and module 108IC-3 coupled to arrays 700-PG, PH, PI of subsystem 1000-3. In this embodiment, each subsystem 1000 can be under the control of a separate control system 102 that interfaces with that subsystem's associated motor 1100. Modules 108IC are interconnected to provide power for auxiliary loads 301 and 302.

In an alternative embodiment, each module 108IC can couple to at least two different subsystems 1000. For example, module 108IC-1 can couple to arrays 700-PA and 700-PB of subsystem 1000-1 and array 700-PG of subsystem 1000-3. Module 108IC-2 can couple to array 700-PC of subsystem 1000-1, array 700-PD of subsystem 1000-2, and array 700-PH of subsystem 1000-3. Module 108IC-3 can couple to arrays 700-PE and 700-PF of subsystem 1000-2 and array 700-PI of subsystem 1000-3. In this alternative embodiment, the subsystems 1000 can be under the control of a common control system 102 that interfaces with the controllers for all three motors 1100 and also collects the status information of each subsystem 1000, and is configured to perform interarray balancing between subsystems 1000.

In FIG. 16A, lines 1111-1 connect with switches 1108 within switch assembly 1250-1. An additional set of switches 1602 is included on lines 1111-1 between subsystems 1000-1 and 1000-2. These switches 1602 can be SPST switches (either electromechanical relays or SSRs) default to an open state such that motors 1100-1 and 1100-2 are disconnected during operation. Switches 1602 can be closed for charging under the control of the relevant system 102. Control lines are not shown. Switches 1108 are SPDT switches and the parallel charging approach described with respect to FIG. 14 can be used to charge these embodiments.

Figure 16B:
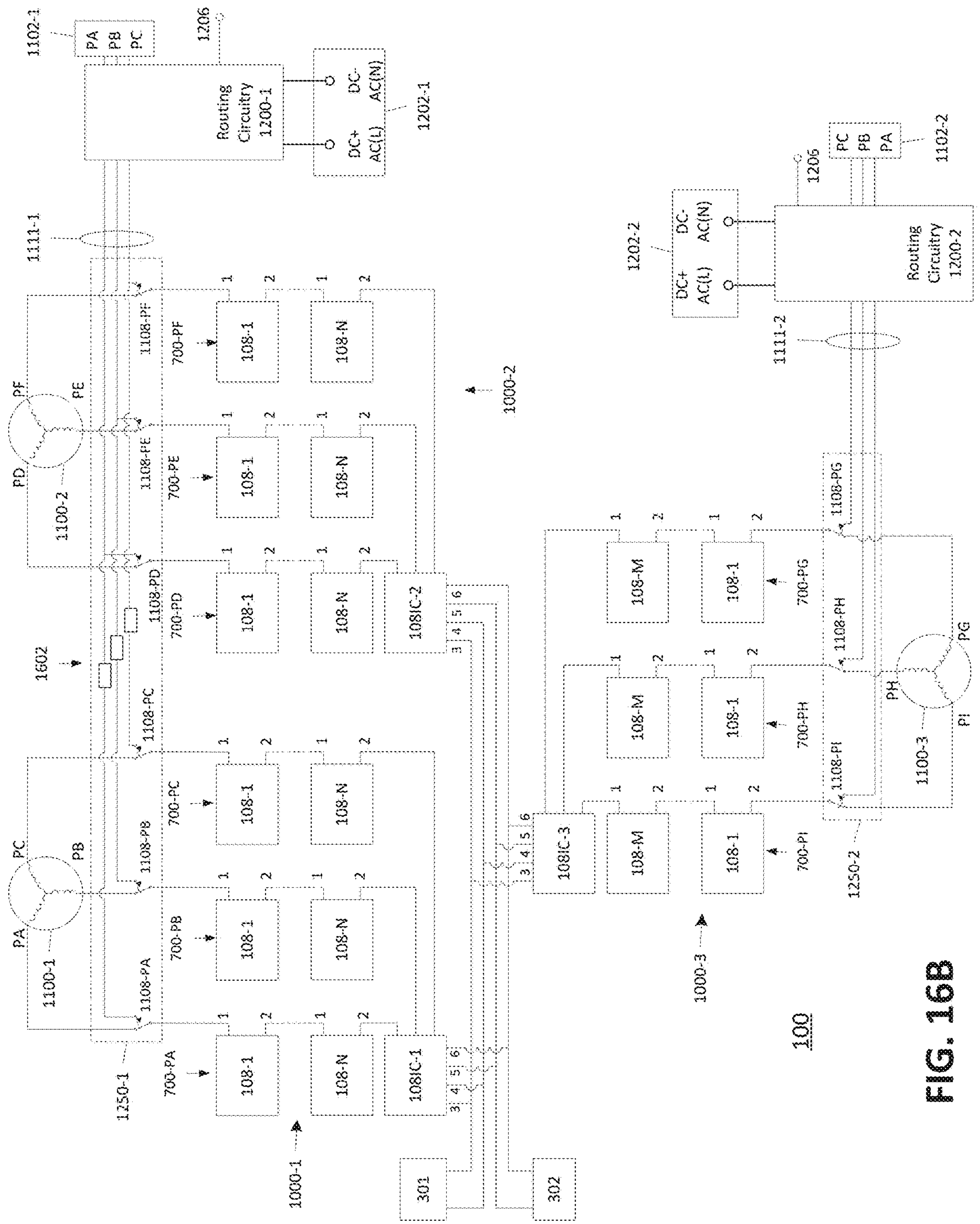

FIG. 16B is a block diagram depicting another example embodiment of a three motor topology where motors 1100-1 and 1100-2 are configured for multiphase charging from a first charge connector 1102-1 and motor 1100-3 is configured for multiphase charging from a second charge connector 1102-2. In this embodiment, different multiphase charge voltages can be applied to each connector, such that the relatively high voltage subsystem 1000-3 can be charged with a higher voltage charge signal than the relatively lower voltage subsystems 1000-1 and 1000-2.

Figure 16C:
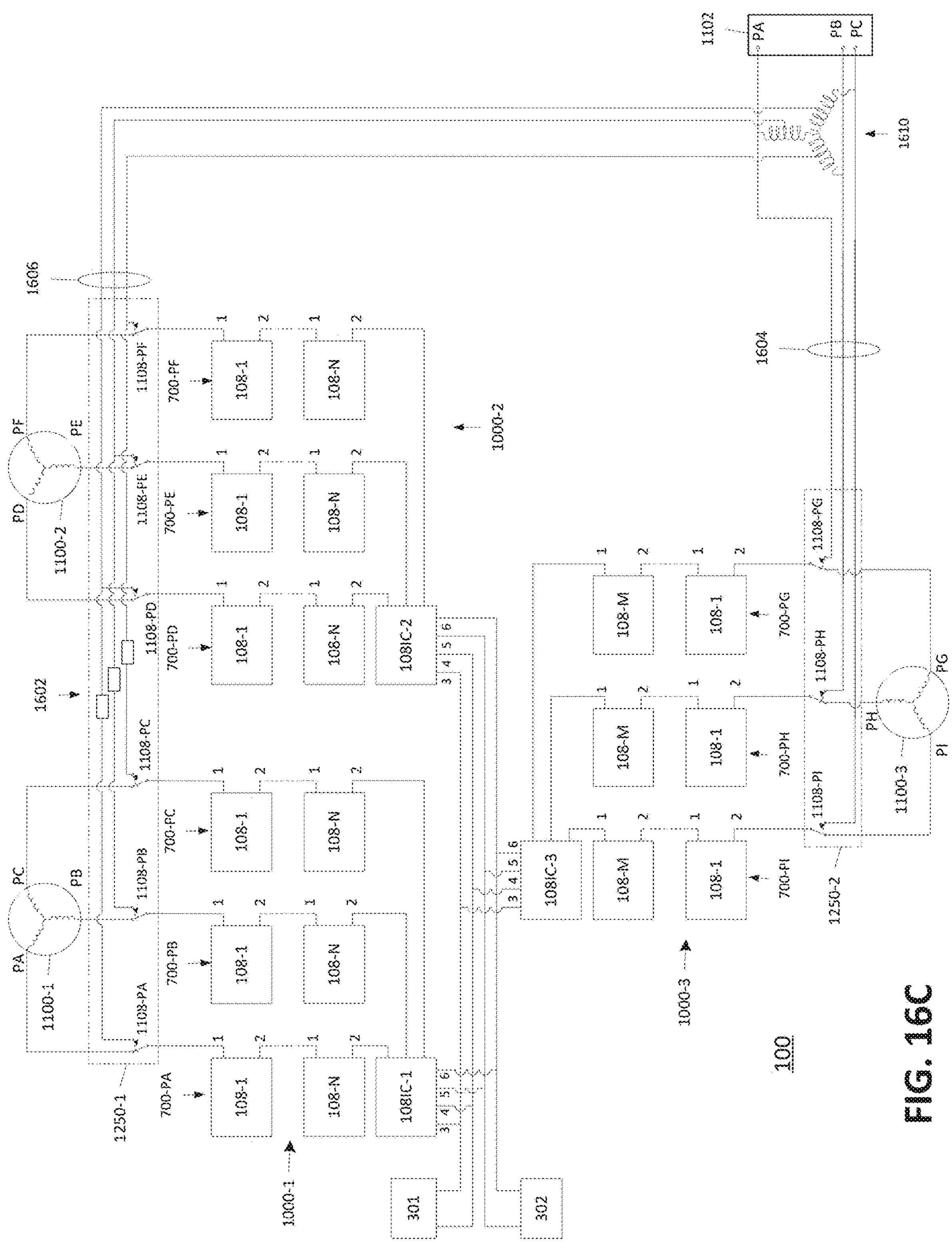

FIG. 16C is a block diagram depicting another example embodiment, where a single charge connector 1102 can be used and a high-voltage multiphase charge signal can be passed directly to subsystem 1000-3 over lines 1604 and lower voltage AC charge signals can be produced by three phase transformer 1610 and fed to subsystems 1000-1 and 1000-2 via lines 1606.

Figure 17:
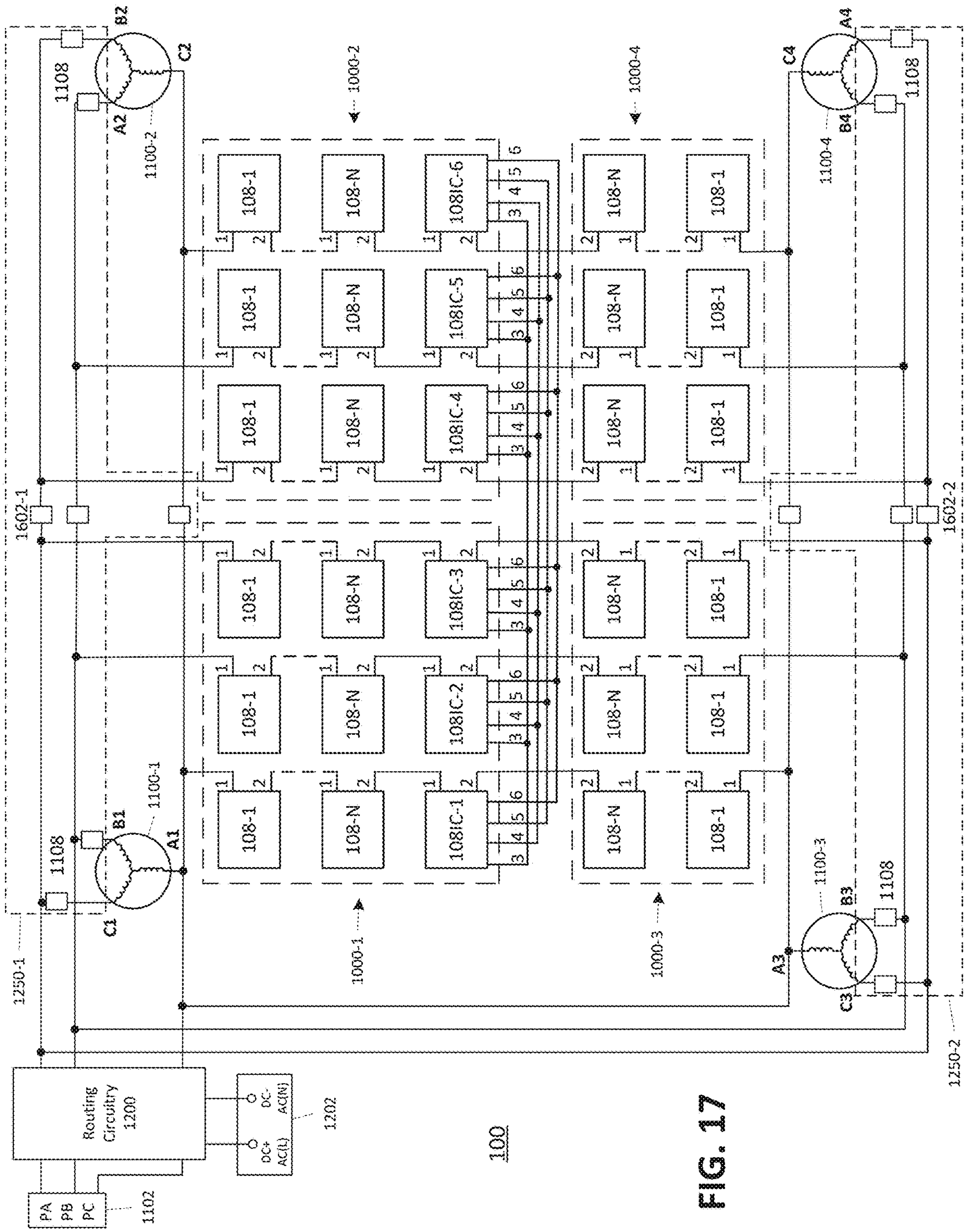
FIG. 17 is a block diagram depicting an example embodiment of a modular energy system having four subsystems configured for DC, single phase AC, and multiphase AC charging.

Each of the embodiments of FIGS. 16A-16C can be configured as a four motor system 100. FIG. 17 is a block diagram depicting an example embodiment of system 100 having four motors 1100 each with an associated subsystem 1000. In this embodiment, subsystem 1000-1 has three IC modules 108IC-1 through 108IC-3 and subsystem 1000-2 has three IC modules 108IC-4 through 108IC-6. Each module 108IC-1 through 108IC-3 has two switch portions 604 (not shown) for connecting to an array 700 of subsystem 1000-1 and an array 700 of subsystem 1000-3, and each module 108IC-4 through 108IC-6 has two switch portions 604 (not shown) for connecting to an array 700 of subsystem 1000-2 and an array 700 of subsystem 1000-4. This embodiment can be implemented under the control of a single control system 102 (not shown) configured to perform balancing between and within subsystems 1000. Alternatively, this four motor embodiment can be implemented with one (like the embodiment of FIG. 16A), two, or three IC modules 108 IC per subsystem 1000 to perform interphase balancing within each subsystem. The subsystems 1000 are each shown as having N modules but the number of modules per subsystem can differ. Two switches 1108 are used per motor 1100.

The charging configuration for this embodiment is similar to that of the three motor embodiments but with an additional set of switches 1602-2 located between subsystems 1000-3 and 1000-4. These switches 1602-2 can be SPST switches electromechanical relays or SSRs) that default to the open position and are closed during charging under the control of a control subsystem 102.

Figure 18A:
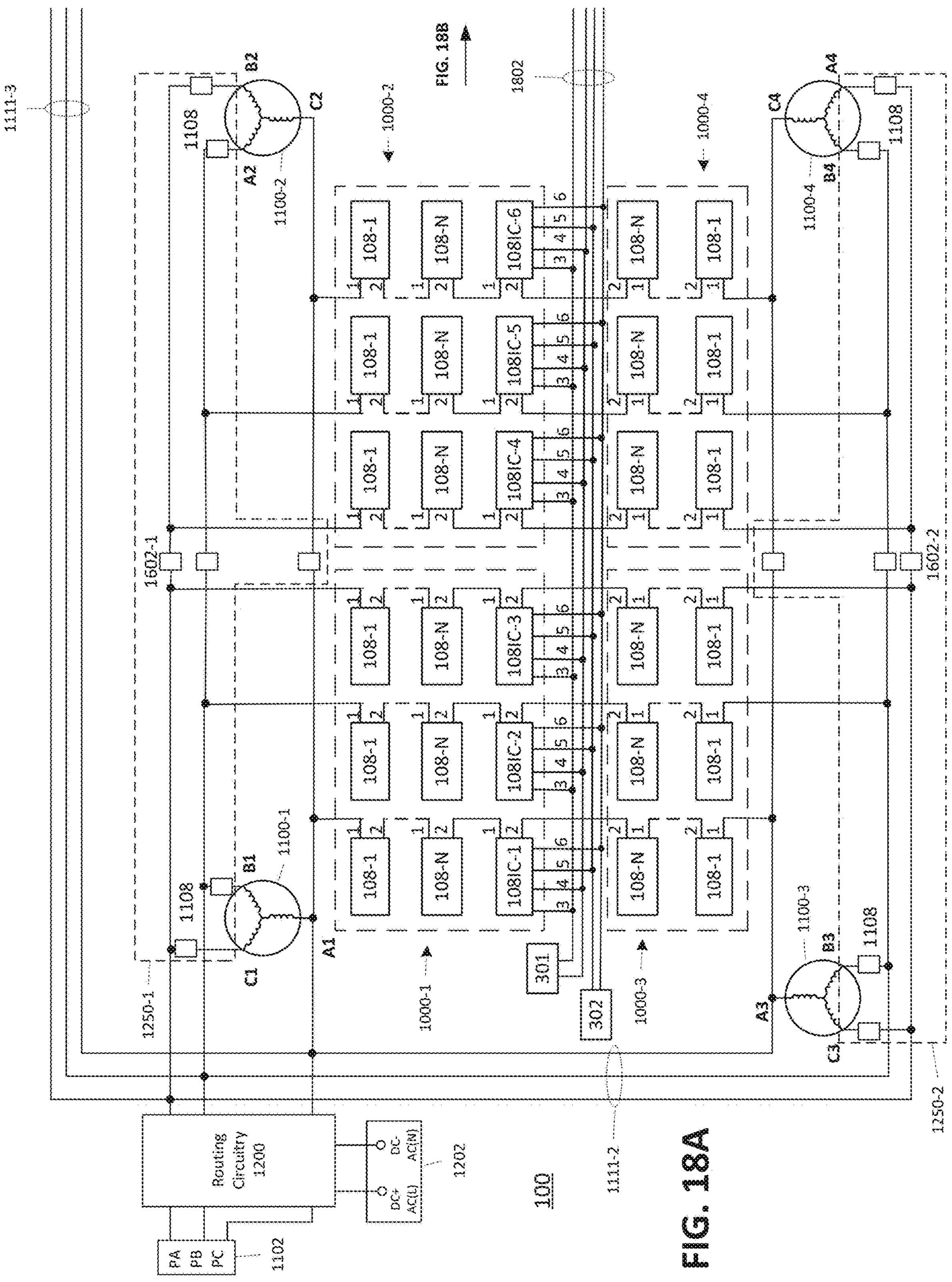
FIGS. 18A-18B are block diagrams depicting an example embodiment of a modular energy system having six subsystems configured for DC, single phase AC, and multiphase AC charging.
Figure 18B:
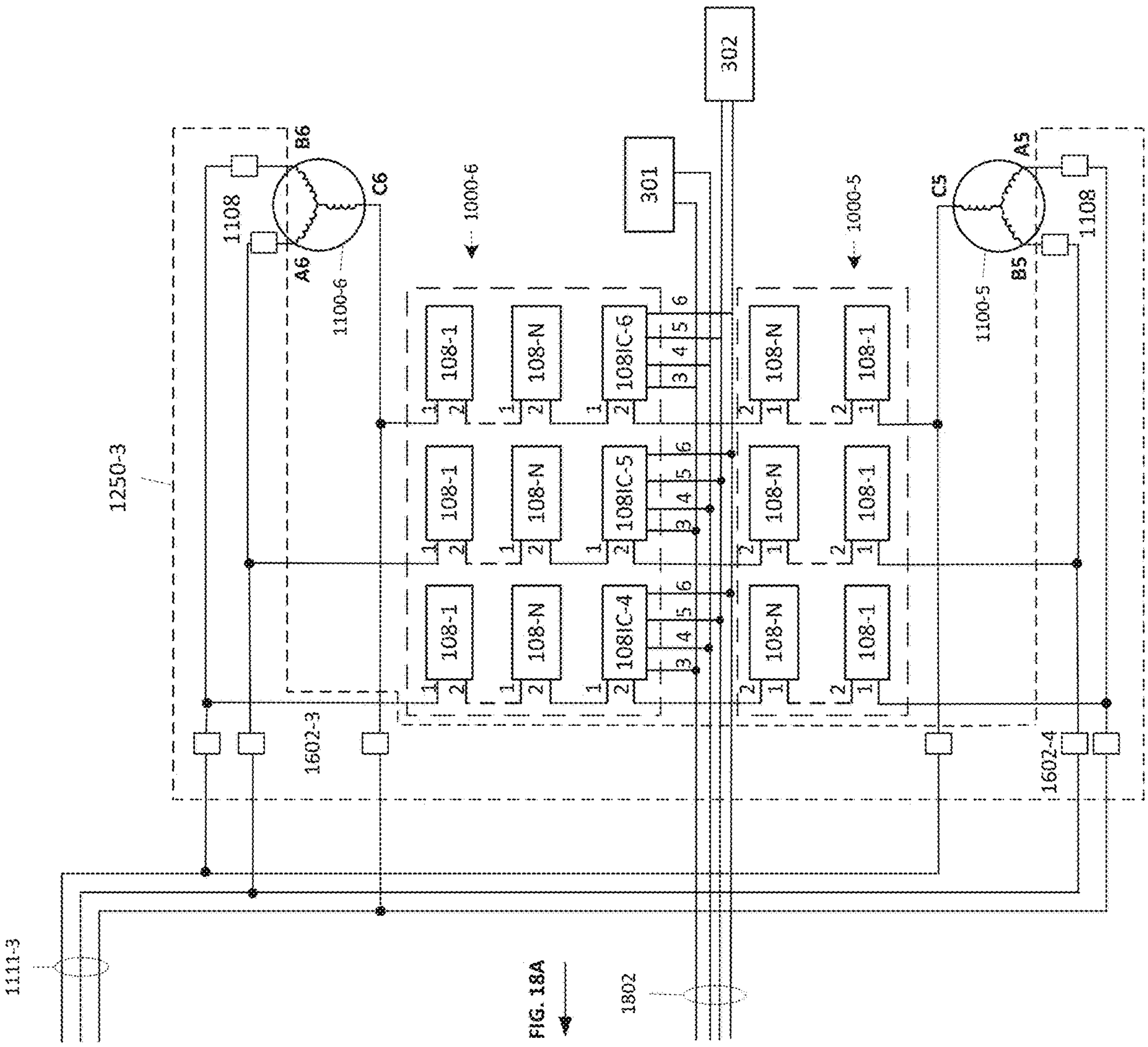

FIGS. 18A-18B are block diagrams depicting an example embodiment of system 100 configured to supply three-phase power to an EV having six motors. The six motor configuration can be used with an EV having a single chassis or multiple chassis movably connected together. For example a front chassis could have two motors and a rear chassis could have four motors, or the front chassis could have four motors in the rear chassis could have two motors. With the electrical configuration depicted here, motors 1100-1 and 1100-2 can be the front wheel motors with motors 1100-3 and 1100-4 the mid-wheel motors, and motors 1100-5 and 1100-6 the rear wheel motor. Alternatively, motors 1100-1 and 1100-3 can be the front wheel motors, motors 1100-2 and 1100-4 can be the mid-wheel motors, and motors 1100-5 and 1100-6 the rear wheel motors.

The charging configuration for this embodiment is similar to that of the four motor embodiments but with and additional split in lines 1111 such that third set of lines 1111-3 carry the multiphase charge signals to motors 1100-5 and 1100-6. An additional switch assembly 1250-3 can have two additional sets of switches 1602-3 and 1602-4 located between subsystems 1000-5 and 1000-6. These switches 1602-3 and 1602-4 can be PST switches (e.g., electromechanical relays or SSRs) that default to the open position and are closed during charging under the control of a control subsystem 102. Switches 1602-3 and 1602-4 can disconnect system 1000-5 from system 1000-6 and also provide isolation from charge connectors 1102 and 1202. If charge connector isolation is provided in routing circuitry 1200, then switches 1602-3 and 1602-4 can be consolidated as one set of switches.

In the embodiments of FIGS. 16A-16C, 17, and 18, switches 1108 can alternatively be configured as SPST switches as described herein, and the parallel charging approaches described with respect to FIGS. 15A-15K can be used for charging. The split in lines 1111 can occur outside of routing circuitry 1200 as shown in these embodiments, or within routing circuitry 1200 as with the embodiment of FIGS. 15B-15D and 15F-15K. As with the embodiments of FIGS. 14-15K, the embodiments of FIGS. 16A-16C, 17, and 18 can be configured for only multiphase charging, only single phase charging, only DC charging, all three types of charging, or any combination thereof. Arrays 700 can be charged in parallel during all three types of charging.

Figure 19A:
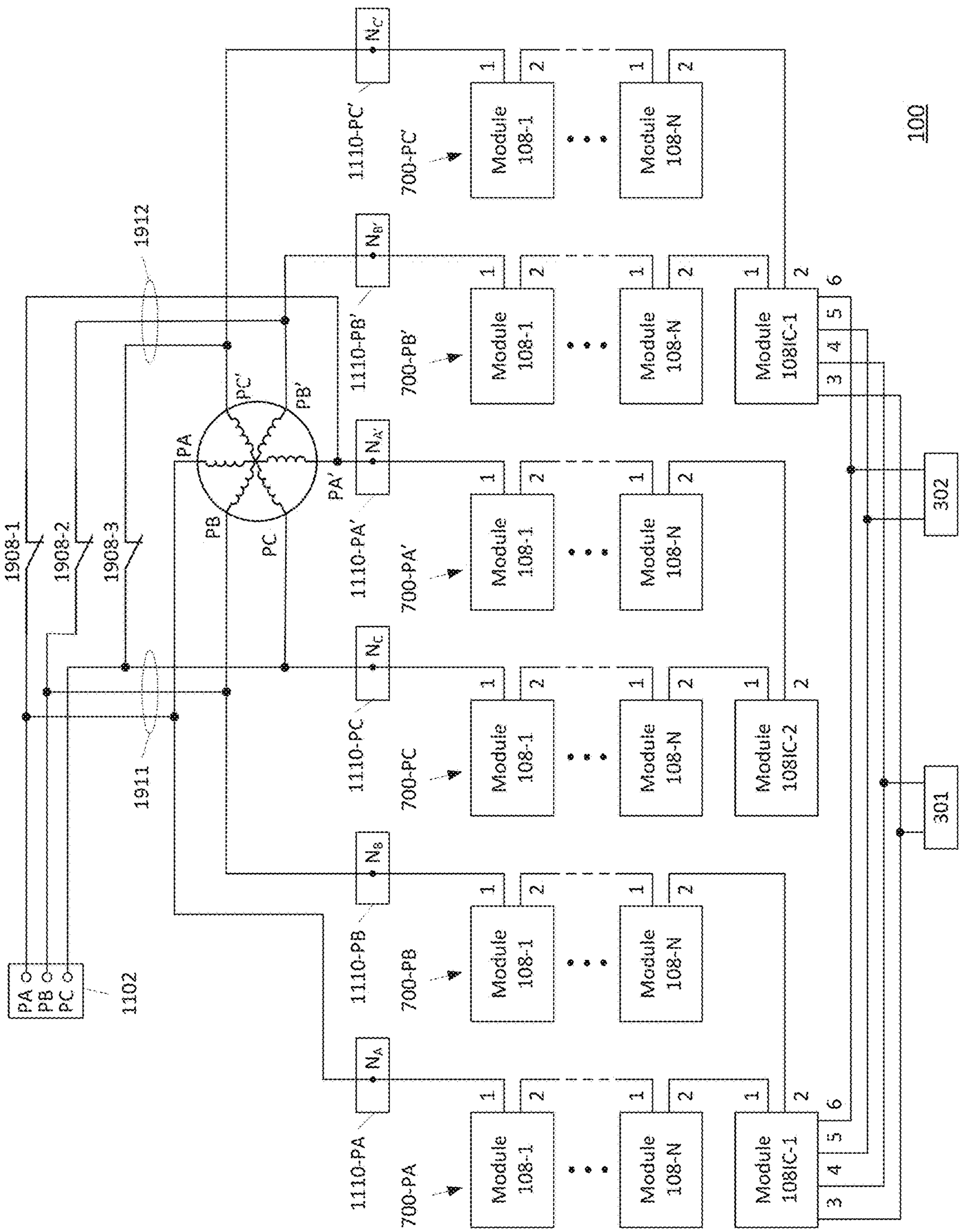
FIG. 19A is a block diagram depicting an example embodiment of a modular energy system configured for multiphase AC charging of arrays in parallel.
Figure 19B:
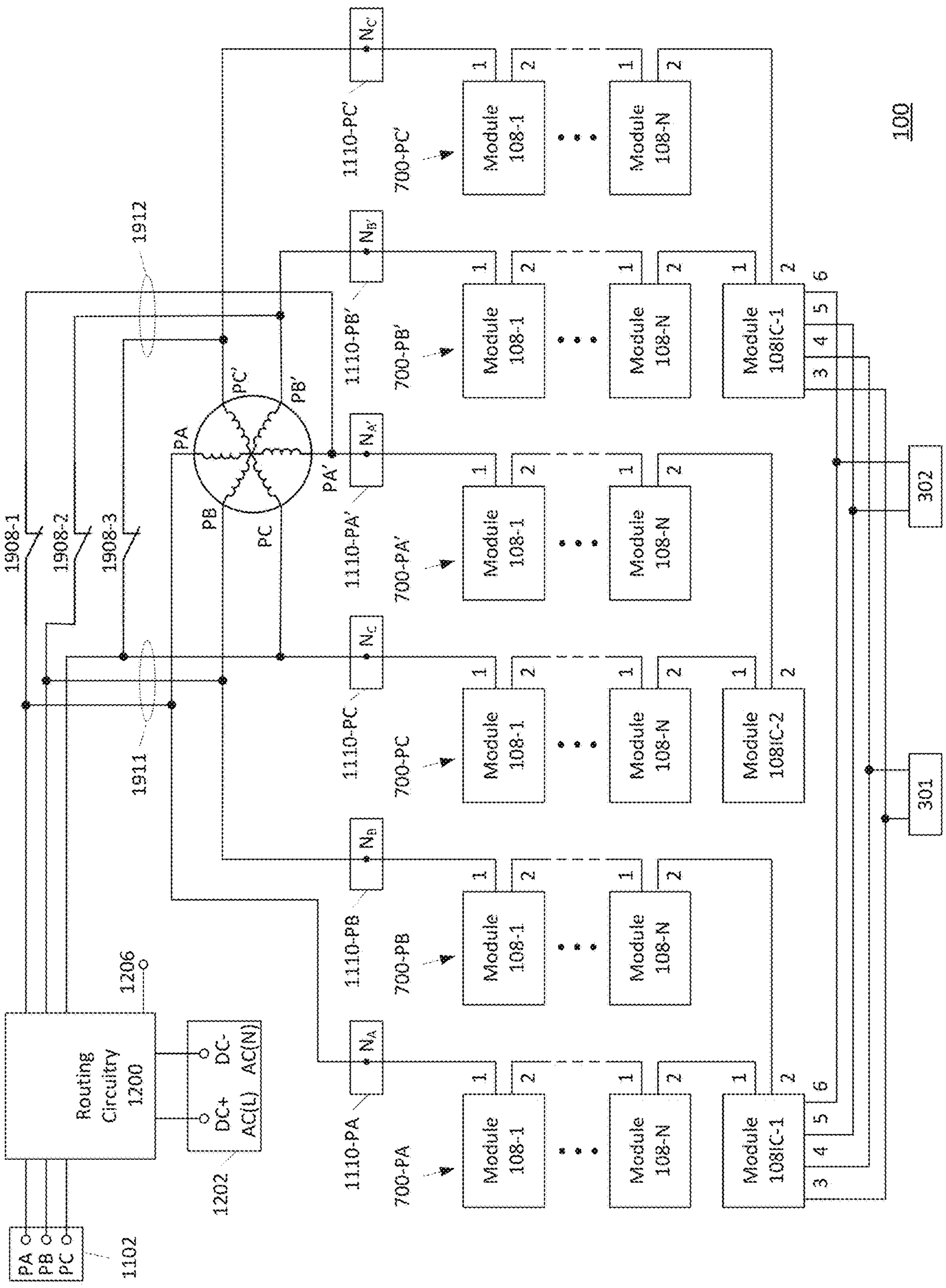
FIG. 19B is a block diagram depicting an example embodiment of a modular energy system configured for DC, single phase AC, and multiphase AC charging of arrays in parallel.

System 100 can also be configured to charge arrays 700 in parallel in a configuration powering only one motor. FIGS. 19A-19B are block diagrams depicting example embodiments of a six phase system 100 configured to supply power to a six phase motor 1900. System 100 includes an array 700 corresponding to each of the six phases PA, PB, PC, PA', PB', and PC'. Three-phase charge connector 1102 is connected to system 100 such that arrays 700-PA and 700-PA' can be charged in parallel, arrays 700-PB and 700-PB' can be charged in parallel, and arrays 700-PC and 700-PC' can be charged in parallel. The lines from connector 1102 branch into a first set of lines 1911 and a second set of lines 1912. The PA line of connector 1102 is connected to the PA port of motor 1900 and I/O port 1 of module 108-1 of array 700-PA via one of lines 1911, and the PA line of connector 1102 is connected to the PA' port of motor 1900 and I/O port 1 of module 108-1 of array 700-PA' via one of lines 1912. The PB line of connector 1102 is connected to the PB port of motor 1900 and I/O port 1 of module 108-1 of array 700-PB via another line 1911, and the PB line of connector 1102 is connected to the PB' port of motor 1900 and I/O port 1 of module 108-1 of array 700-PB' via another line 1912. The PC line of connector 1102 is connected to the PC port of motor 1900 and I/O port 1 of module 108-1 of array 700-PC via another line 1911, and the PC line of connector 1102 is connected to the PC' port of motor 1900 and I/O port 1 of module 108-1 of array 700-PC' via a final line 1912.

Switches 1908-1, 1908-2, and 1908-3 are serially connected within lines 1912 to selectively connect and disconnect the connections made by lines 1912. Switches 1908 preferably default to the open position for operation of motor 1900 while system 100 is in the discharge state. When system 100 enters the charge state, switches 1908 are closed to bypass motor 1900 and permit charging of the various arrays 700 in parallel. Switches 1908 can be configured as electromechanical or solid-state switches as described elsewhere herein. Alternatively, six switches can be placed at each of the six ports (PA-PC') of motor 1900 to bypass motor 1900 during charging.

The embodiment of FIG. 19A can be charged with a three-phase charge signal through three-phase connector 1902 in a manner similar to that described with respect to FIGS. 11A-11B, but with each array pair charged in parallel. Current can be routed through modules 108IC and used to charge the sources of modules 108IC as described herein.

The charging process can occur while voltage is still supplied to auxiliary loads 301 and 302. Voltage, current, and/or phase can be measured by monitor devices 1310 and the various modules 108 can be switched to target a power factor of one, or within a threshold of one (e.g., 1%, 2%, 5%), as described herein.

The embodiment of FIG. 19B includes routing circuitry 1200 as described with respect to FIGS. 12C-12D and can be charged with the three types of charging: DC, single-phase AC, or three-phase AC. The configurations of routing circuitry 1200 that apply charge connector isolation for parallel or a charging, e.g., as described with respect to FIGS. 15C, 15D, and 15F-15K can likewise be adapted for use in this embodiment having a six phase motor. Switches 1908 are closed during all three types of charging, and opened during normal operation of system 100 in the discharge state for powering motor 1900. Arrays 700 are again charged in parallel during all three types of charging.

Example Embodiments of Charging Arrays Through Motor

Figure 20:
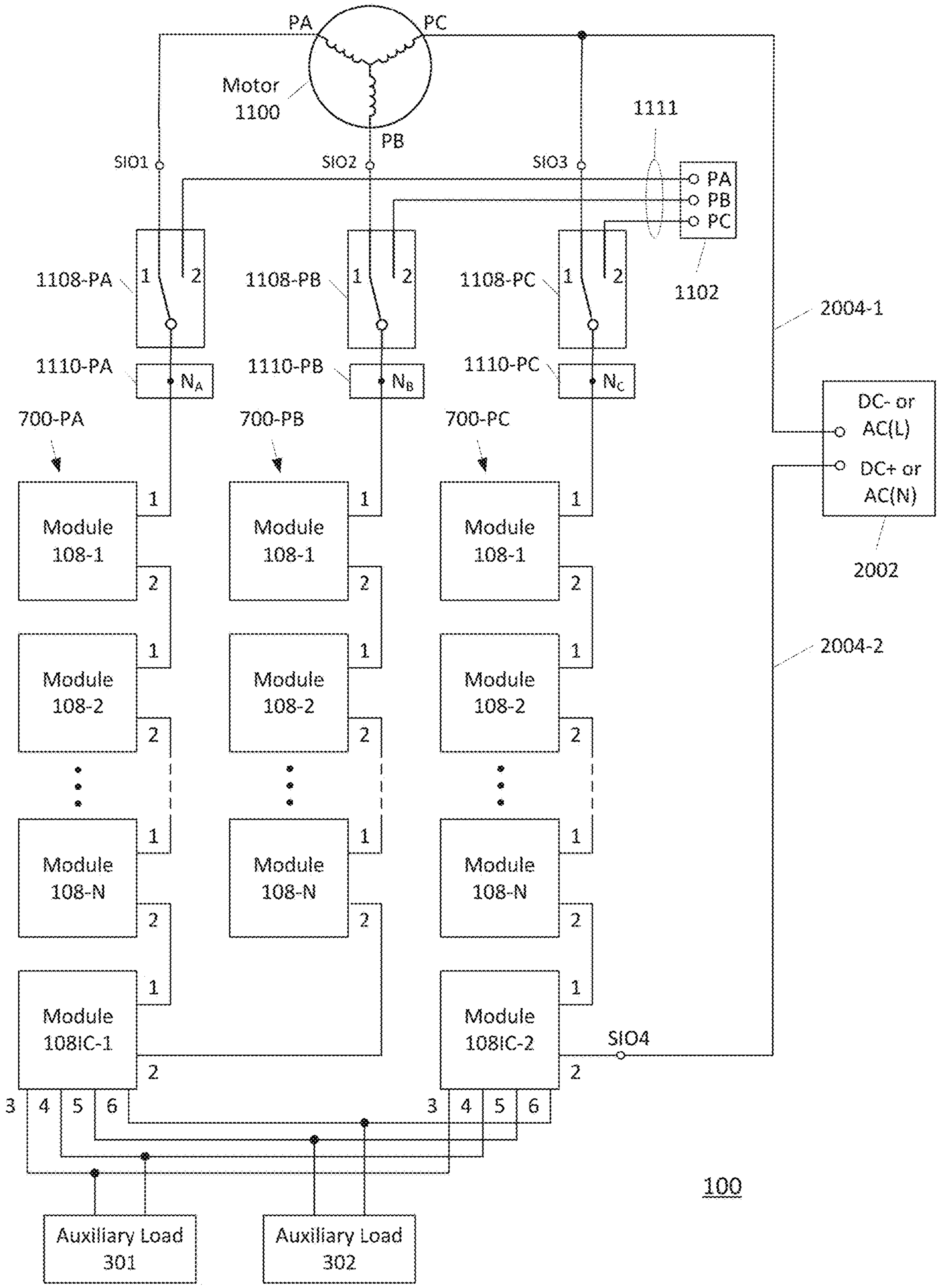
FIG. 20 is a block diagram depicting an example embodiment of a modular energy system configured for DC and/or single phase AC charging through a load, and multiphase charging bypassing the load.

System 100 can also be configured to charge arrays 700 through a motor such that adaptive routing circuitry 1200 is not needed. FIG. 20 is a block diagram depicting an example embodiment of system 100 similar to that of FIG. 11A, but with a dual DC and single phase AC charge connector 2002 that can be integrated with three-phase charge connector 1102 in a single user accessible location or can be separate therefrom and in a different location on the EV. Dual connector 2002 is connected to a first line 2004-1 that is in turn connected to a phase port of motor 1100, which in this embodiment is PC and switch 1108-PC. Connector 2002 is connected to a second line 2004-2 that can be connected to a system output port SIO4 of system 100. The system output port SIO4 can be a module output port 2 of an interconnection module 108IC-2 connected to array 700-PC, or an output port 2 of a module 108-N of array 700-PC if no IC module is present. Connector 2002 can be connected to positive and negative DC leads for DC charging, or AC line and AC neutral leads for single phase AC charging, which in this example are connected to lines 2004-1 and 2004-2, respectively. Other connections can be implemented.

DC charging can be performed such that one, two, or all three arrays 700 are charged at the same time. Also, single phase AC charging can be performed such that one, two, or all three arrays 700 are charged at the same time. DC and AC charging can be performed in a manner that seeks to balance temperature differentials between modules 108 as described herein, and to reach a balanced SOC across all modules 108 as described herein. AC charging is performed to maintain a power factor at or near unity. In all cases, if measurable current passes through the motor coils or windings and fluxes are generated, then the sensors of system 100 will detect this current and control system 102 will control the switching of each module 108 such that the magnitude and phase of all fluxes through all windings cancel or neutralize each other, or substantially cancel or neutralize each other such that any variation in fluxes is less than a threshold and insufficient to cause the motor to turn.

DC Charging Each Array Sequentially

To charge array 700-PA, switch 1108-PA is placed in position 1 to connect array 700-PA to motor 1100. Switches 1108-PB and 1108-PC are placed or kept in position 2. Upon application of the DC charge voltage, current enters the DC+ port of connector 2002, passes through line 2004-1 to motor 1100, where it passes through the PC and PA windings of the motor. The current exits motor 1100, passes through switch 1108-PA and monitor circuitry 1110-PA, and through array 700-PA, where each module 108-1 through 108-N can be individually charged by switching the respective converters 202 according to the techniques described herein. Charge current for modules 108IC-1 and 108IC-2 can pass through S7 of switch portion 604-PA, charge sources 206 of modules 108IC-1 and 108IC-2 (in parallel as shown in FIG. 10E), and exit module 108IC-2 through module I/O port 2, which can be placed along the rail (the node of IO port 6) as shown in FIG. 10E or between S7 and S8 of an additional switch portion 604. Current then exits system 100 through the DC− port of connector 2002.

To charge array 700-PB, switch 1108-PB is placed in position 1 to connect array 700-PB to motor 1100. Switches 1108-PA and 1108-PC are placed or kept in position 2. Current passes from the DC+ port of connector 2002, through line 2004-1 to motor 1100, then through the PC and PB windings of the motor. The current then passes through switch 1108-PB and monitor circuitry 1110-PB, and through array 700-PB, where each module 108-1 through 108-N can be individually charged by switching the respective converters 202 according to the techniques described herein. Charge current for modules 108IC-1 and 108IC-2 can pass through S7 of switch portion 604-PB, charge sources 206 of modules 108IC-1 and 108IC-2 (in parallel as shown in FIG. 10E), and exit module 108IC-2 through module I/O port 2, exiting system 100 through the DC− port of connector 2002.

To charge array 700-PC, switch 1108-PC is placed in position 1 to connect array 700-PC to line 2004-1. Switches 1108-PA and 1108-PB are placed or kept in position 2. Current passes from the DC+ port of connector 2002, through line 2004-1, bypasses motor 1100, passes through switch 1108-PC and monitor circuitry 1110-PC, and through array 700-PC, where each module 108-1 through 108-N can be individually charged by switching the respective converters 202 according to the techniques described herein. Charge current for modules 108IC-1 and 108IC-2 can pass through S7 of switch portion 604-PC, charge sources 206 of modules 108IC-1 and 108IC-2 (in parallel as shown in FIG. 10E), and exit module 108IC-2 through module I/O port 2, exiting system 100 through the DC− port of connector 2002. To stop charging sources 206 of modules 108IC, S8 of the relevant switch portion 604 can be activated to direct the current directly to port 2 of module 108IC-2.

DC Charging Two or More Arrays Concurrently

To charge two or more of arrays 700 concurrently with the DC charge signal provided at connector 2002, then the switches 1108 connected to the arrays 700 to be charged are placed or kept in position 1 and the switches 1108 connected to any array 700 not being charged is placed or kept in position 2. To stop charging sources 206 of modules 108IC, then S8 of each switch portion 604 of an array 700 been charged can be activated or switch portions 604 of the arrays 700 being charged can be modulated at 50-50 duty cycles. Current through the arrays 700 being charged is regulated by the modules 108 to maintain canceling fluxes through motor 1100, and also to charge energy sources 206 of the modules while balancing the modules (e.g., temperature and SOC).

Single Phase AC Charging all Arrays Concurrently

To charge all of arrays 700 concurrently with a single phase AC signal provided at connector 2002, then switches 1108 are placed or kept in position 1. Current from line 2004-1 is supplied to array 700-PA through the PC and PA windings of motor 1100, supplied to array 700-PB through the PC and PB windings of motor 1100, and supplied to array 700-PC directly from line 2004-1 (bypassing motor 1100). Current then passes through each of arrays 700-PA, 700-PB, and 700-PC and modules 108IC-1 and 108-IC2, exiting through I/O port 2 of module 108IC-2. Current through arrays 700 is regulated by the modules 108 to maintain canceling fluxes through motor 1100, such as by causing the current through windings PA and PB to equal that through winding PC, with all currents in the same phase, thus neutralizing the fluxes. Energy sources 206 of modules 108 can be charged while balancing one or more operating characteristics of the modules 108 (e.g., temperature and SOC) according to the techniques described herein.

Single Phase AC Charging Each Array or a Subset of Arrays Concurrently

To one or a subset of arrays 700 concurrently with a single phase AC signal provided at connector 2002, then the switches 1108 corresponding to the arrays 700 being charged are placed or kept in position 1 in the other switches are placed or kept in position 2. Current from line 2004-1 is supplied to the array(s) 700 being charged, either through the windings of motor 1100, or circumventing motor 1100 if array 700-PC as charged. Current then passes through the array(s) 700 being charged and modules 108IC-1 and 108-IC2, exiting through I/O port 2 of module 108IC-2. Current through the array(s) 700 being charged is regulated by the modules 108 to maintain canceling fluxes through motor 1100, which is relatively straightforward if only two windings are used (PC and PA, or PC and PB). Energy sources 206 of modules 108 can be charged while balancing one or more operating characteristics of the modules 108 (e.g., temperature and SOC) according to the techniques described herein.

In the aforementioned embodiments of charging system 100, both when bypassing motor 1100 and when charging through motor 1100, switches 1108 are switched to positions that permit current flow through the one or more arrays being charged and prevent current flow through any array not being charged. Alternatively, all switches 1108 can be placed in a position that permits charging and current flow through the array not being charged can be regulated or prevented using the modules 108 of that array 700 and any module 108IC coupled to that array 700. Some current flow through an array 700 not being charged may be desired to assist in neutralizing fluxes within the motor.

Charging Delia and Series Topologies

Figure 21A:
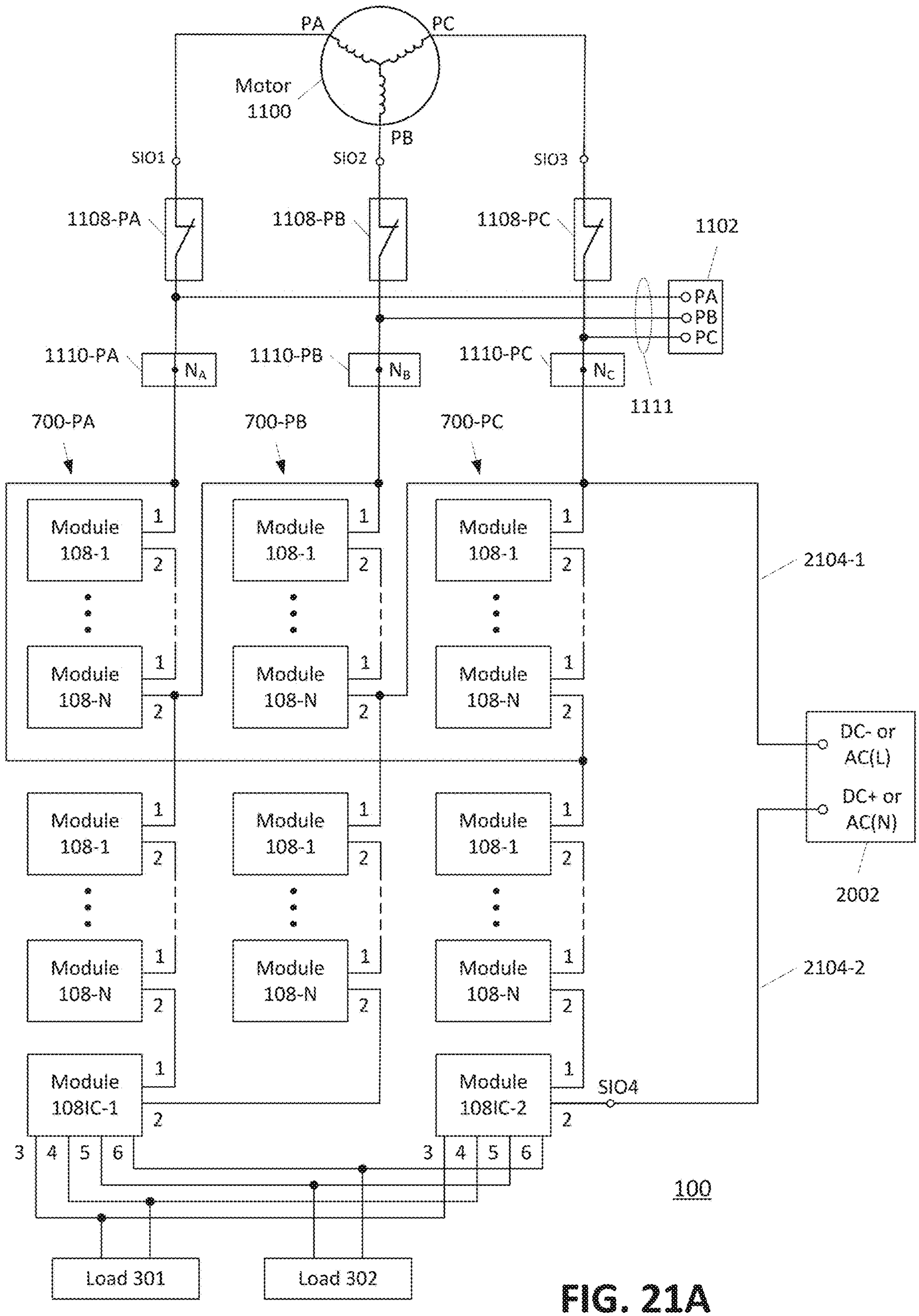
FIGS. 21A-21B are block diagrams depicting example embodiments of a modular energy system in a delta and series arrangement configured for DC, single phase AC, and multiphase charging.

The charging subject matter described herein can be used with topologies having delta and series arrangements of modules 108, similar to those described with respect to FIGS. 7D and 7E. FIG. 21A is a block diagram depicting an example embodiment of system 100 with a delta and series arrangement similar to that of FIG. 7E, but with the addition of interconnection modules 108IC-1 and 108IC-2 supplying auxiliary loads 301 and 302. This embodiment is configured for three-phase charging through connector 1102, or DC or single phase AC charging through connector 2002. Three-phase charging can occur directly from three-phase charge connector 1102. For DC and single phase AC charging, because arrays 700-PA, 700-PB, and 700-PC are interconnected by lines 2104, the DC+ and AC(L) current from line 2104-1 can be input directly to module 108-1 of array 700-PC and module 108-(M+1) of array 700-PB in circulated from there to the rest of modules 108 of system 100. Current from DC and single phase AC charging can exit via module 108IC-2 and line 2104-2.

Figure 21B:
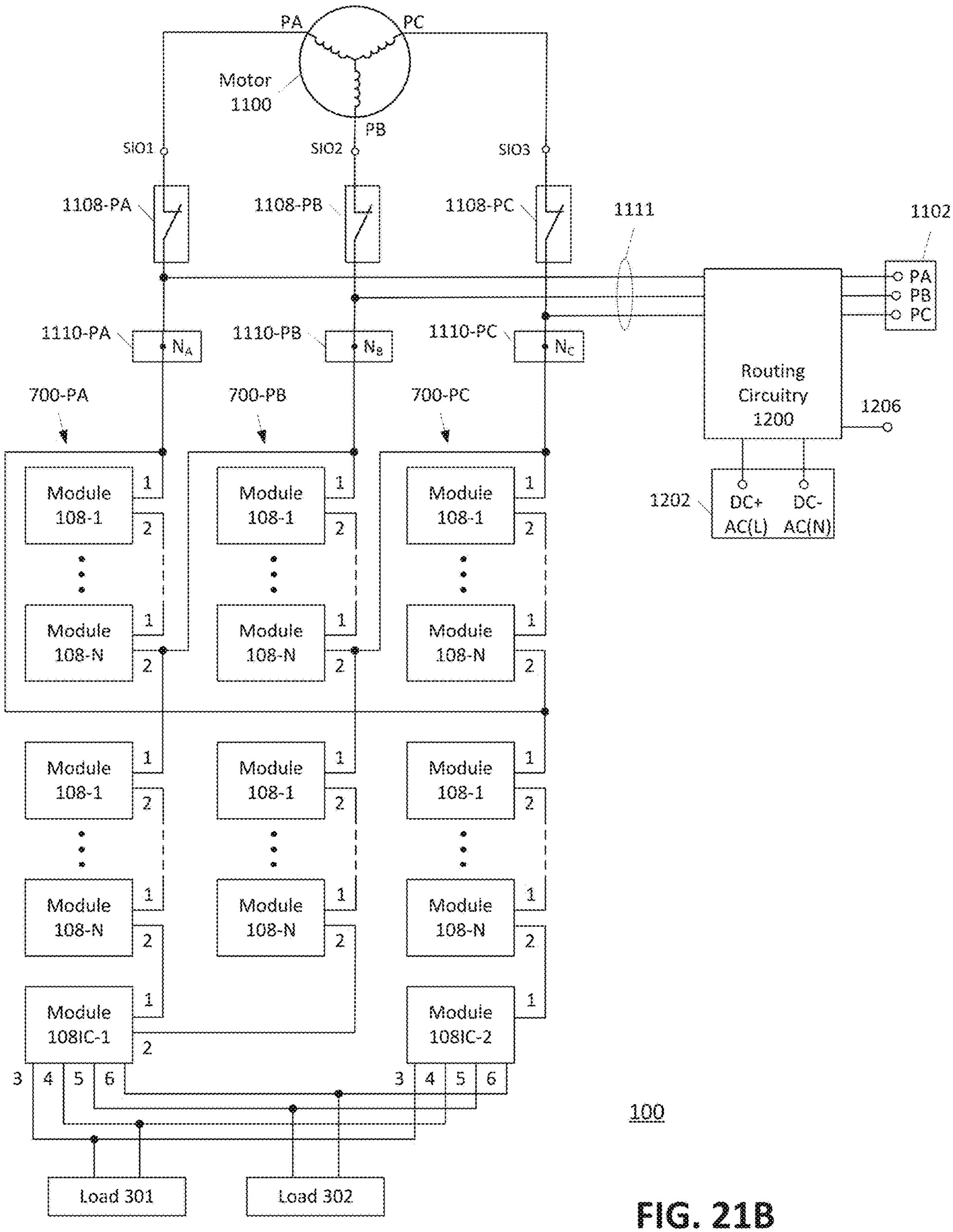

FIG. 21B is a block diagram depicting another example embodiment of system 100 having a similar arrangement to that of FIG. 21A, but with routing circuitry 1200 coupled between dual charge connector 1202 and three-phase charging lines 1111. This delta and series topologies can be charged using either a three-phase, single phase, or DC charge source as described elsewhere herein.

Charging Open Winding Loads

Figure 22:
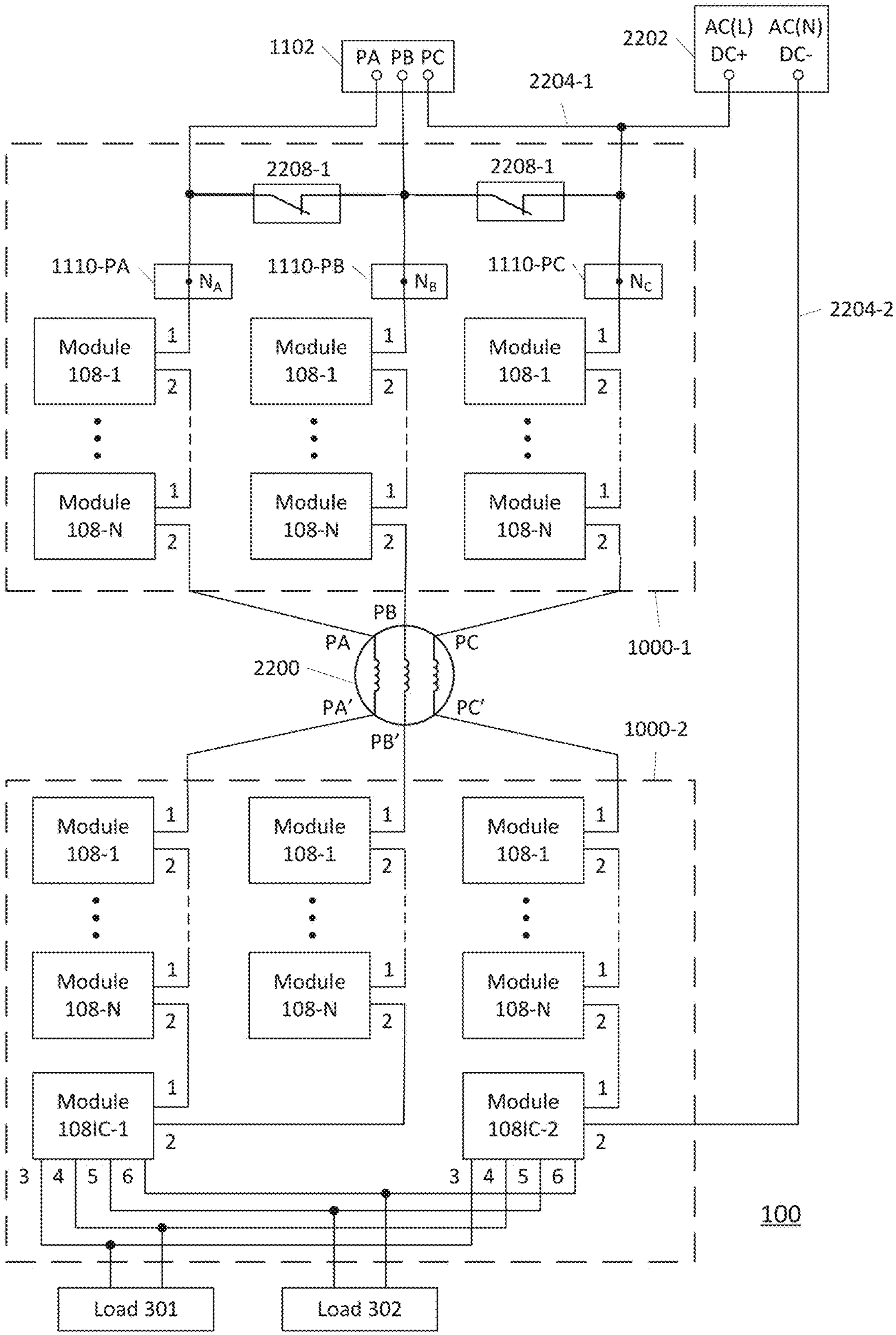
FIG. 22 is a block diagram depicting an example embodiment of a modular energy system having multiple subsystems configured for DC, single phase AC, and multiphase charging of a load.

The charging subject matter described herein can be used with topologies having multiple subsystems 1000 providing power for one or more open winding (or coil) loads. FIG. 22 is a block diagram depicting an example embodiment of a system 100 having to subsystems 1000-1 and 1000-2 for supplying an open winding motor 2200. Subsystem 1000-1 includes arrays 700-PA, 700-PB, and 700-PC first supplying power having phases PA, PB, and PC respectively to first ports of motor 2200. Subsystem 1000-2 includes arrays 700-PA', 700-PB', and 700-PC' first supplying power having phases PA', PB', and PC' respectively to second ports of motor 2200. Subsystem 1000-2 also includes modules 108IC-1 and 108IC-2 for interphase balancing and supply of loads 301 and 302.

Three-phase charge connector 1102 is coupled to I/O port 1 of modules 108-1 of arrays 700-PA, 700-PB, and 700-PC. Switch 2208-1 is connected between I/O port 1 of module 108-1 of array 700-PA and I/O port 1 of module 108-1 of array 700-PB. Switch 2208-2 is connected between I/O port 1 of module 108-1 of array 700-PB and I/O port 1 of module 108-1 of array 700-PC. Three-phase charge connector 1102 can be used to supply three-phase power for charging both subsystems 1000-1 and 1000-2 when switches 2208-1 and 2208-2 are in the open positions.

A dual DC and single phase AC charge connector 2202 has a DC+ or AC(L) line 2204-1 connected to I/O port 1 of module 108-1 of array 700-PC, and a DC− or AC(N) line 2204-2 connected to I/O port 2 of module 108IC-2. Dual charge connector 2202 can be used for DC or single phase AC charging when no three-phase charge source is connected and switches 2208-1 and 2208-2 are in the closed positions.

As with the other embodiments described herein, with the use of monitor circuitry 1110, charging is performed under the control of control system 102 to maintain fluxes within motor 2200 that cancel each other to prevent the motor from turning. Charging is also performed in a manner that targets a balanced condition of one or more operating characteristics (e.g., SOC or temperature) of each module 108 of system 100. For three-phase charging, current will pass from the one or two signals from the charge source that are positive to the remaining negative signal(s) of the charge source. For instance, if phase PA is positive and phases PB and PC are negative, then current will pass through array 700-PA, then through the PA-PA' winding of motor 2200, then through array 700-PA' and module 108IC-1. From there the current can pass back through one of two paths, either through array 700-PB', winding PB-PB', and array 700-PB, or through module 108IC-2, array 700-PC', winding PC-PC', and array 700-PC, and then out through connector 1102. As a current passes through each array 700 of subsystems 1000, regardless of the direction of current, each module 108 can be selectively charged according to the techniques described herein. Single phase AC and DC charging can be performed along each of the three current paths in parallel, with each module 108 switching as needed to charge in a balanced fashion, and with the three current paths being: (1) array 700-PA, winding PA-PA', array 700-PA', and module 108IC-1; (2) array 700-PB, winding PB-PB', array 700-PB', and module 108IC-1; and (3) array 700-PC, winding PC-PC', array 700-PC', and module 108IC-2.

Example Embodiments of Chargers

Figure 23A:
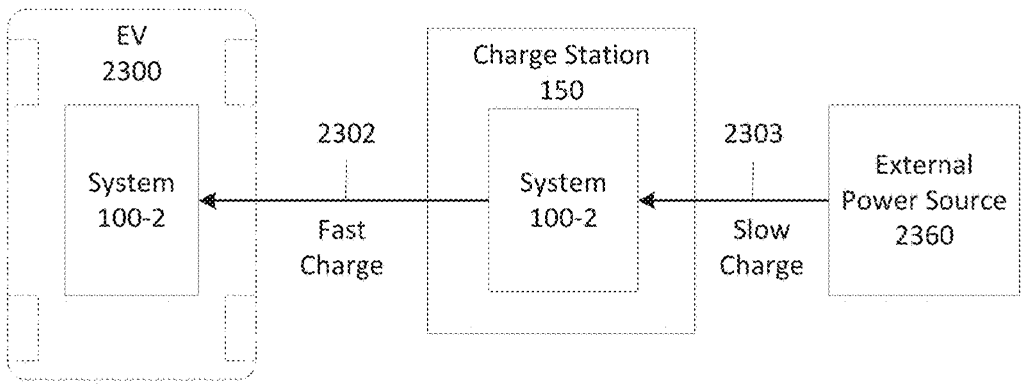
FIG. 23A is a block diagram depicting an example embodiment of a modular energy system in a charge station and a modular energy system in an EV.

System 100 can also be used as a charge source 150 for charging electric vehicles or other loads. FIG. 23A is a block diagram depicting an example embodiment of a first instance of system 100 (referred to here as system 100-1) configured as a buffer within charge station 150. System 100-1 can charge with energy from an external power provider the local utility grid and then fast charge and an EV 2300 using a charge cable 2302. The EV can have a conventional battery pack or can have a battery pack configured with a second instance of system 100 (referred to here as system 100-2). Fast charging of EV 2300 can be performed with a DC charge signal, a single phase AC charge signal, or multiphase AC charge signals, depending on the configuration of systems 100-1 and 100-2. Charging from the grid can occur at a relatively lower voltage and slower rate than the relatively higher voltage and faster charge rate performed over cable 2302. Furthermore, buffer system 100-1 may continually charge while fast charging one or more EV's 2300. Depending on the size of sources 206 within buffer system 100-1, system 100-1 may have the capacity to charge numerous EV's before requiring a recharge from the grid. In other embodiments, charge station 150 can be coupled to a renewable energy source such as an array of solar panels, a wind form, or other renewable source such that a utility grid connection may be omitted.

Figure 23B:
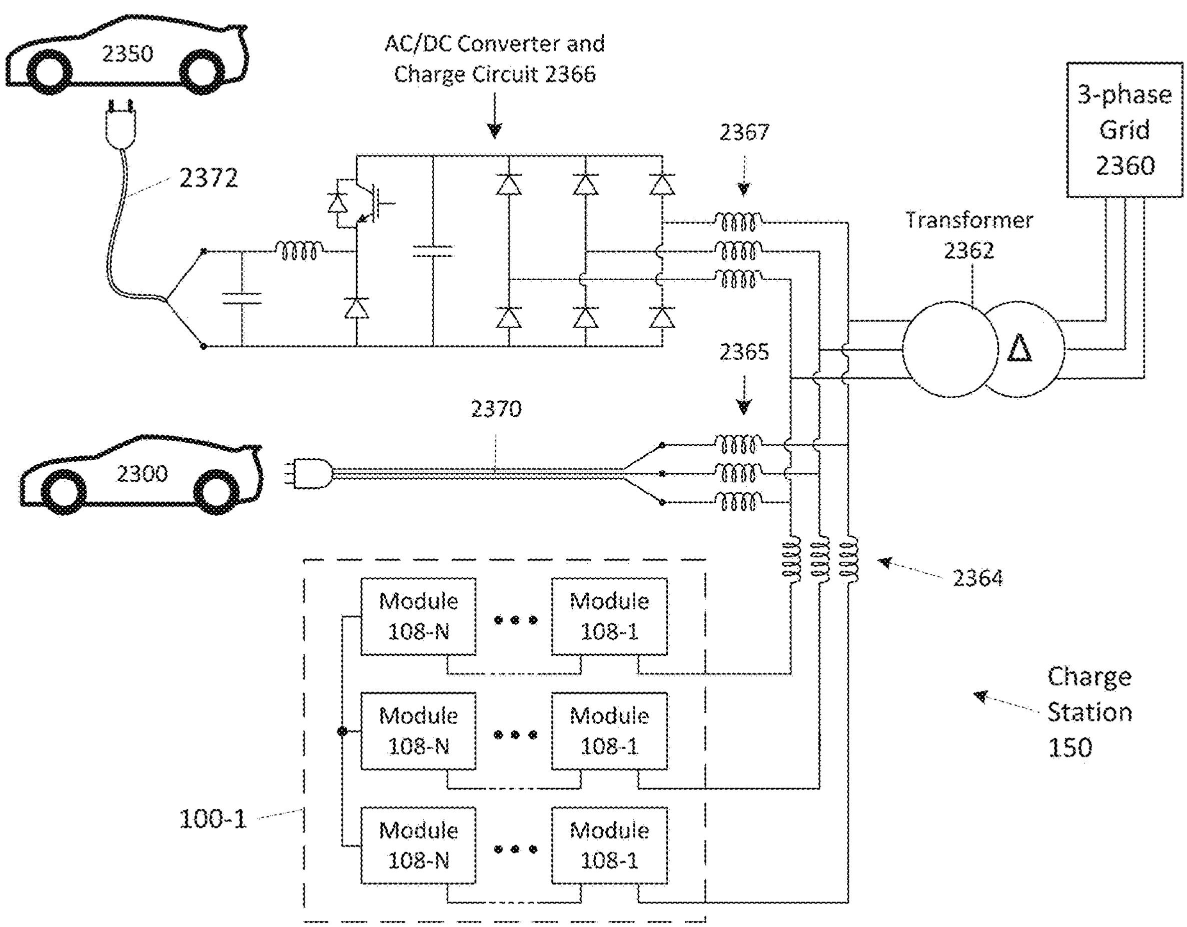
FIG. 23B is a schematic diagram depicting an example embodiment of a modular energy system in a charge station configured for DC, single phase AC, and multiphase charging of multiple EVs.

FIG. 23B is a schematic diagram depicting an example embodiment, similar to that of FIG. 23A, where a three-phase configuration of system 100-1 is used as an energy storage buffer within charge source 150. In this embodiment, charge source 150 is configured to provide high voltage three-phase charge signals to a first EV 2300 configured with a battery pack having system 100-2, and also provide a high voltage DC charge signal to a second EV 2350 having a conventional battery pack without modular switch capability. System 100-1 is a three-phase system having arrays 700-PA, 700-PB, and 700-PC that are connected to three phase grid 2360 by way of a transformer 2362 and inductive interface circuitry 2364. System 100-1 also includes an AC-DC converter and charge circuit 2366. System 100-1 can output three-phase power to EV 2300 by way of interface circuitry 2364 and inductive interface circuitry 2365 and charge cable 2370, and can output three-phase power to EV 2350 by way of interface circuitry 2364 inductive interface circuitry 2367 and AC-DC converter in charge circuit 2366, which converts the three-phase power to a DC signal, that is output over DC charge cable 2372.

In this embodiment, system 100-1 can slow charge from grid 2360 and store the energy within the sources of the various modules 108 for use in fast charging EV's 2300 and 2350 using either multiphase AC or DC approaches. Charge source 150 can regulate the output voltage for different vehicles (e.g., low voltage and high-voltage vehicles) by regulating the output voltages produced by the arrays 700 of system 100-1, in accordance with the PWM and other control techniques described herein. High-voltage charging can be performed at a high C rate that can be as high as the EV is rated to receive, e.g., 2C to 12C and higher based on system and EV configurations. Charge station 150 can also be configured for high voltage single phase or DC charging, for example, by placement of routing circuitry 1200 in EV 2300 or charge station 150, or alternatively by use of a transformer.

Charge source 150 can be configured to inject current to cancel harmonic components generated by AC-DC converter and charge circuit 2366. Harmonics generated by circuit 2366, or by other aspects of charging EV's 2300 and 2350 can be detected by monitor circuitry 2380, which can be configured to measure current, voltage, and/or phase of signals passing from and to grid 2360. Control system 102 (not shown) of system 100-1 can detect the harmonics and cause modules 108 of system 100-1 to produce compensatory current of opposite polarity to the harmonic but in phase with the harmonic to cancel redirection of the harmonic into grid 2360. This active filtering capability of system 100-1 can allow circuit 2366 to be implemented with higher harmonic components like diodes, which greatly reduces the cost of circuit 2366 as compared to similar circuits implemented with low harmonic components such as IGBTs.

Example Embodiments of Physical and Electrical System Layouts

The modular nature of system 100 allows greater flexibility in physical layout and orientation within an EV chassis. Module dimensions and aspect ratio in the horizontal plane is driven largely by the volume of the one or more energy sources 206 contained therein, with supporting circuity being much smaller and capable of being located above or below the housing 220 for the one or more sources 206 (see, e.g., FIG. 2C). FIGS. 24-28C are schematic diagrams depicting example embodiments of layouts for various configurations of system 100. Electrical connections for these figures are not shown in detail as such is thoroughly explained elsewhere herein, with emphasis instead being placed here on the physical arrangement.

Figure 24:
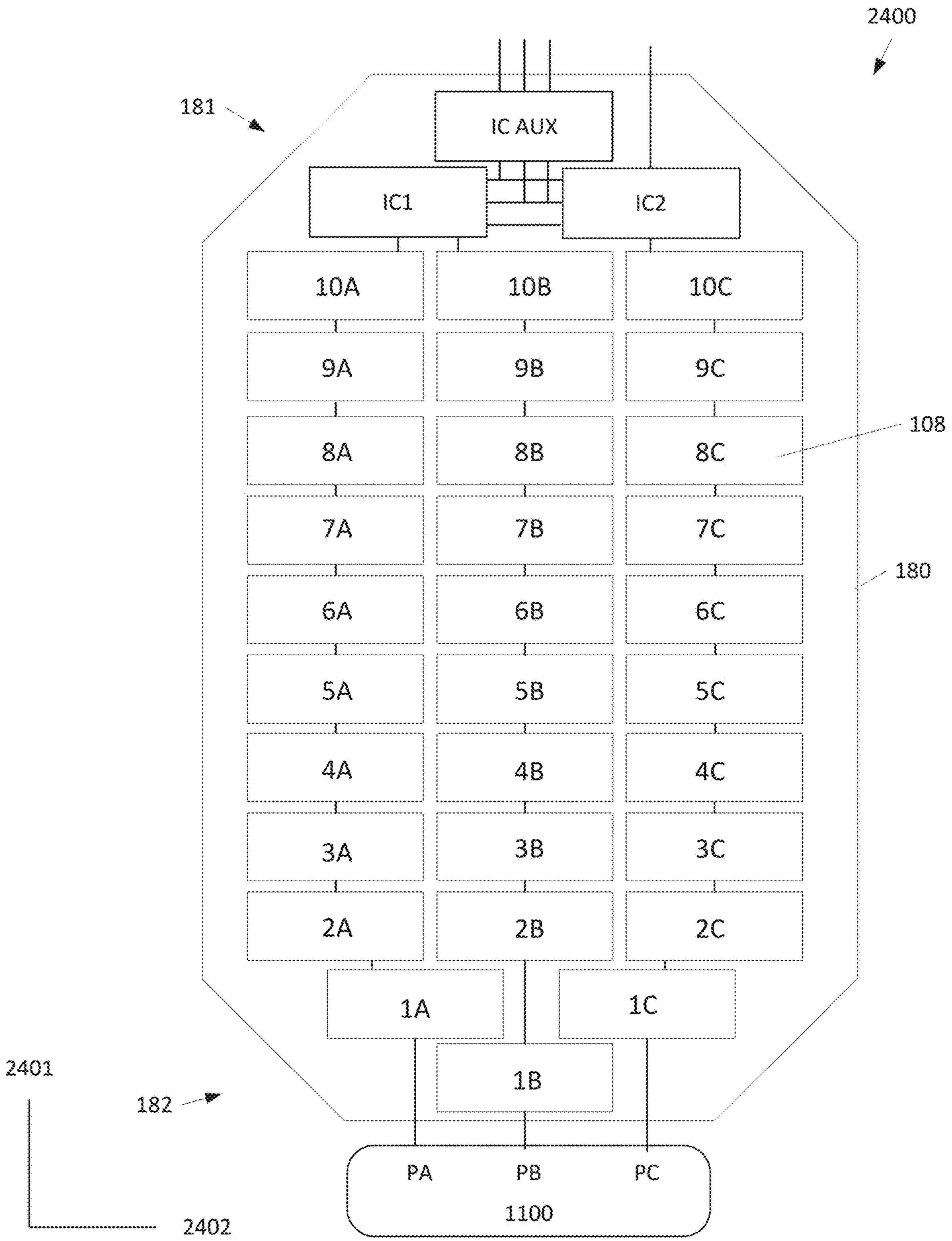
FIG. 24 is a schematic diagram depicting an example embodiment of a modular energy system within an interior region of an EV chassis.

FIG. 24 depicts an arrangement 2400 of system 100 within an internal region 180 at the base an EV chassis, where system 100 is configured in three arrays to supply three-phase power to motor 1100. Here, there are ten levels of modules 108 within each array. Modules 108 within the phase PA array are modules 1A through 10A, modules 108 within the phase PB array are modules 1B through 10B, and modules 108 within the phase PC array are modules 1C through 10C. System 100 also includes modules IC1, IC2, and ICAUX, configured in an arrangement similar to that of FIG. 10F where module ICAUX is configured in an auxiliary role. In the horizontal plane of the EV, each module 108 has a substantially rectangular profile with a shorter dimension oriented along axis 2401 and a longer dimension oriented along axis 2402. The modules 108-2 through 108-10 of each array are aligned in columns, where each column is parallel to axis 2401. Modules 108 of each level 2 through 10 are aligned in rows, where each row is parallel to axis 2402. Modules 108-1A, 1B, 1C are arranged in a staggered configuration occupying two rows, with modules 108-1A and 108-1C adjacent each other, and module 108-1A overlapping the columns for the PA and PB arrays and module 108-1C overlapping the columns for the PB and PC arrays. Module 108-1B is generally aligned in the column for phase PB, but has modules 108-1A and 108-1C interposed between module 108-1B and module 108-2B. A similar configuration is present on the opposite end of region 180 for modules 108IC. This configuration with staggered and rows allows the maximum amount of voltage carrying capacity to be compactly distributed within the region 180, which in this example has an eight sided configuration that is tapered at each end 181 and 182, and signifies the space within the EV chassis available for placement of the energy system 100. A battery pack enclosure for system 100 can have the same shape and dimensions as region 180 in the horizontal plane. Arrangement 2400 can be configured to perform charging in accordance with any of the single motor embodiments described herein, and can include switches 1108, a switch assembly 1250, charge connectors, and routing circuitry 1200.

Figure 25A:
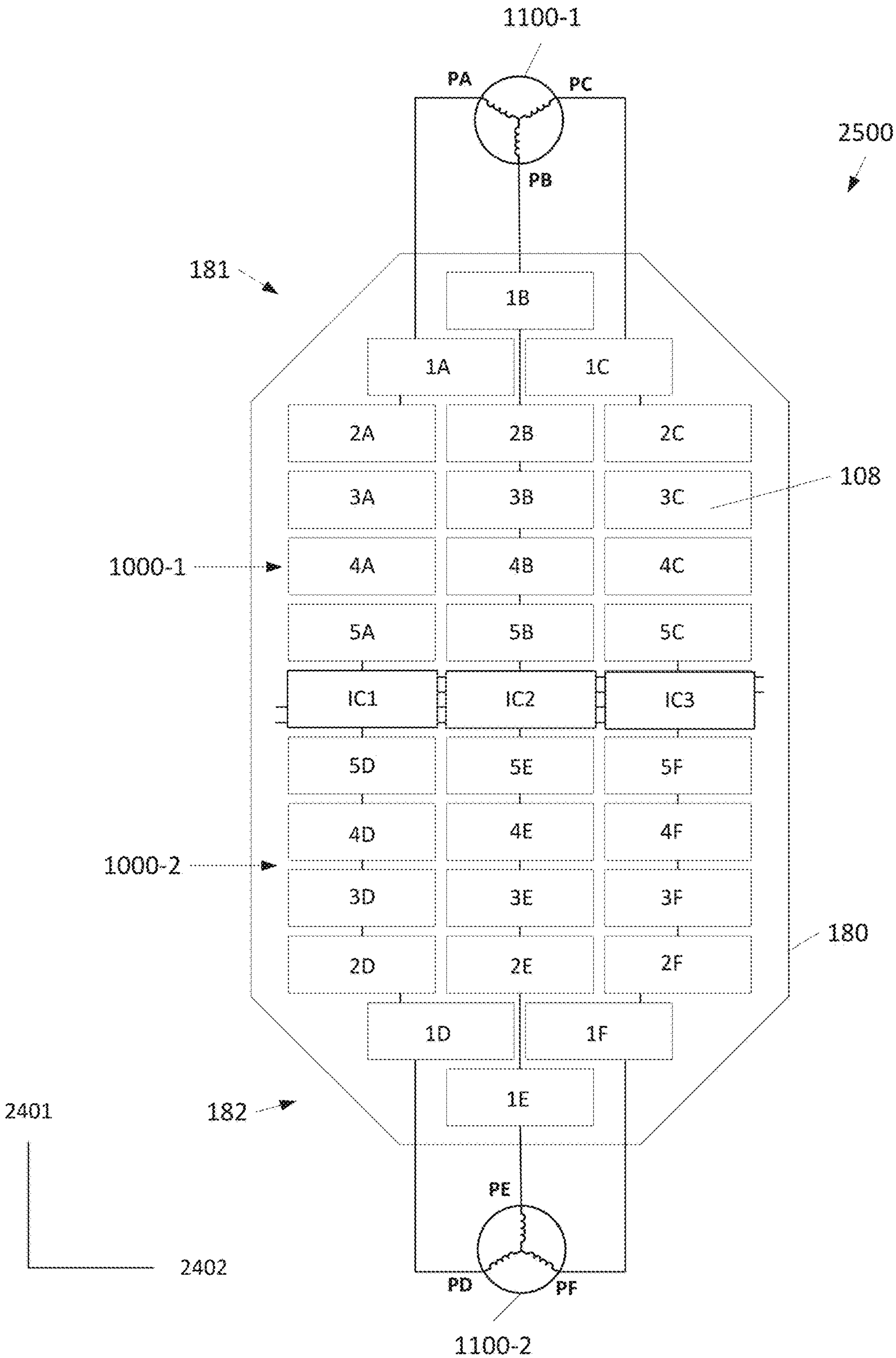
FIGS. 25A-25B are schematic diagrams depicting example embodiments of modular energy systems within an interior region of an EV chassis and configured to supply power for two motors.

FIG. 25A depicts an arrangement 2500 of another example embodiment of system 100 configured with two subsystems 1000-1 and 1000-2 configured to supply three-phase power (PA-PC and PD-PF) for motors 1100-1 and 1100-2, respectively. In this example, each subsystem 1000 includes five levels (rows) of modules 108. Modules 108 are again oriented in the same fashion, with the longer dimension of each module oriented along axis 2402 and the shorter dimension aligned along axis 2401. A row of IC modules 108IC is positioned between the two subsystems 1000, which are arranged in symmetrically opposite fashion. Electrical connections of this embodiment can vary in accordance with the embodiments described herein. Here, IC modules are shown connected in a fashion similar to that of FIGS. 15A, 15B, and 15E. Each subsystem 1000 can be configured to supply different voltages based on the requirements of the two motors 1100. Motor 1100-1 can provide power for a front two wheel drivetrain of the EV, while motor 1100-2 can provide power for a rear two wheel drivetrain, such that subsystems 1000 are oriented in a front and back arrangement. Arrangement 2500 can be configured to perform charging in accordance with any of the two motor embodiments described herein, and can include switches 1108, one or more switch assemblies 1250, charge connectors, and routing circuitry 1200.

Figure 25B:
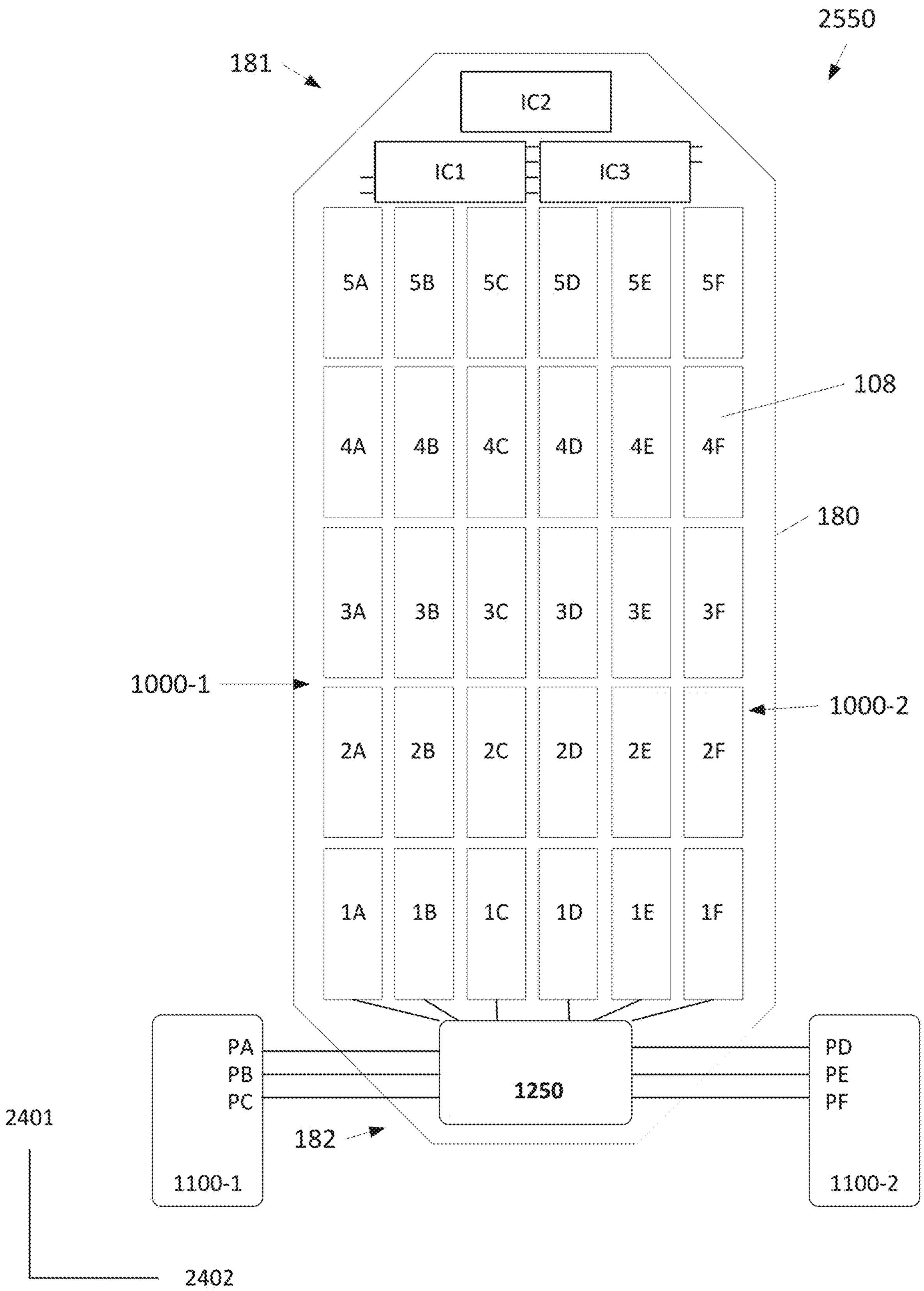

FIG. 25B depicts an arrangement 2550 of another example embodiment of system 100 configured with two subsystems 1000-1 and 1000-2 configured to supply three-phase power for motors 1100-1 and 1100-2, respectively. In this example, each subsystem 1000 again includes five levels (rows) of modules 108, but the subsystems 1000 are oriented in a left side and right side arrangement with modules 108 instead oriented with the longer dimension along axis 2401 and the shorter dimension along axis 2402. A row of staggered IC modules 108IC is present at end 181, with their orientations reversed such that the longer dimension of modules 108IC is along axis 2402, and the shorter dimension of modules 108 is along axis 2401. Electrical connections between all modules 108 of this embodiment can vary in accordance with the embodiments described herein. In this embodiment, because subsystems 1000 are positioned side-by-side along axis 2402, the subsystems preferably have the same or similar voltage configuration. Because each wheel has a dedicated motor 1100, the voltage supplied to those motors 1100 can be relatively greater than that of arrangement 2500. Motors 1100-1 and 1100-2 can power front wheels or rear wheels. Switch assembly 1250 is positioned at end 182 and is electrically connected between subsystems 1000 and motors 1100. Assembly 1250 can include switches 1108 for both motors 1100 (a combination of assemblies 1250-1 and 1250-2) as described with respect to FIGS. 14, 15A, 15B, and 15E. Arrangement 2550 can be configured to perform charging in accordance with any of the two motor embodiments described herein, and can include charge connectors and routing circuitry 1200.

Figure 26:
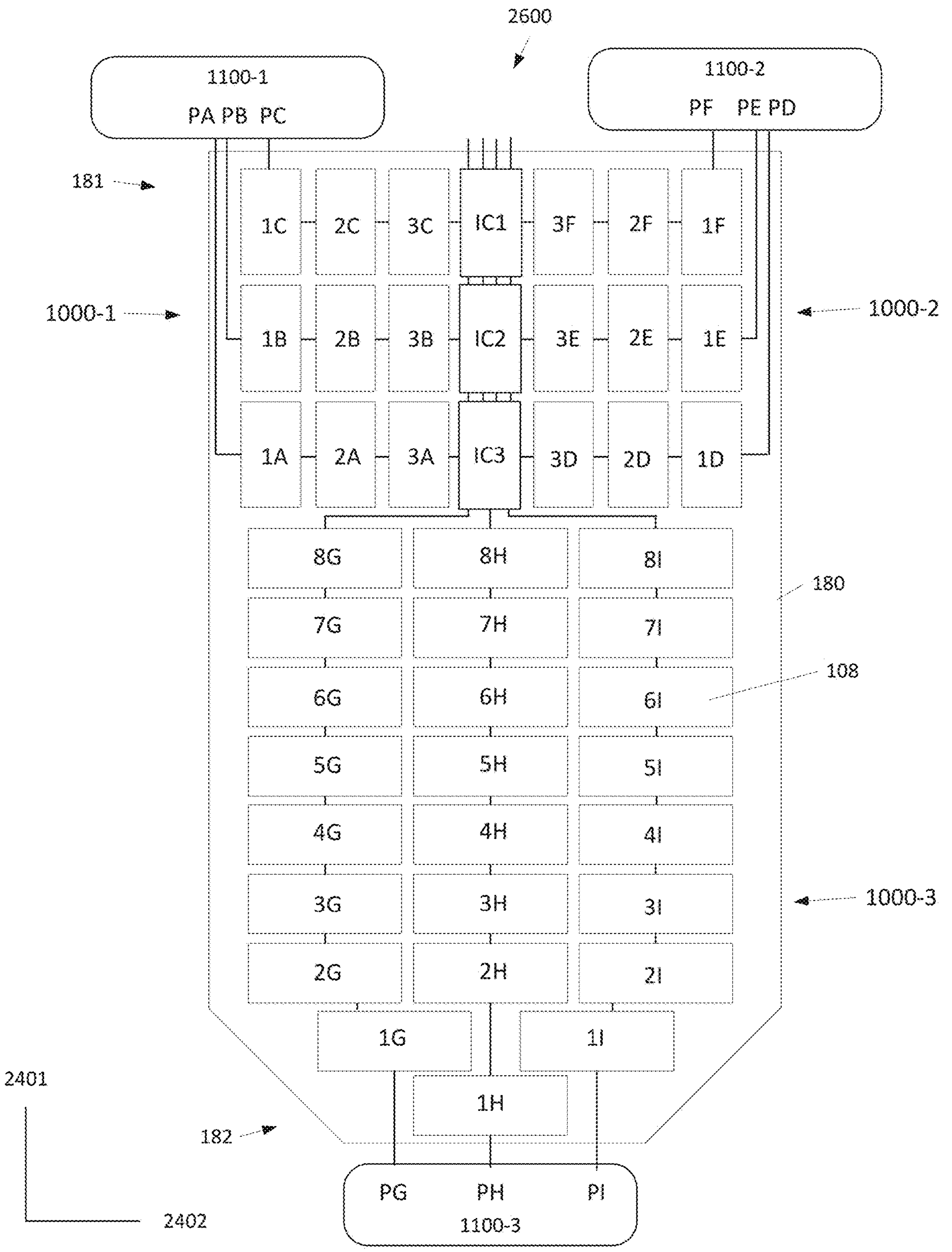
FIG. 26 is a schematic diagram depicting an example embodiment of a modular energy system within an interior region of an EV chassis and configured to supply power for three motors.

FIG. 26 depicts an arrangement 2600 of another example embodiment of system 100 configured with three subsystems 1000-1, 1000-2, and 1000-3 configured to supply three-phase power for motors 1100-1, 1100-2, and 1100-3, respectively. Motors 1100-1 and 1100-2 are each dedicated to a separate wheel of the EV and motor 1100-3 is dedicated to a drivetrain for two wheels. Motors 1100-1 and 1100-2 can power front wheels and motor 1100-3 can power rear wheels or vice versa. In this example, subsystem 1000-1 and 1000-2 each include three levels and are arranged in a side-by-side (left and right) relationship, with each array aligned in a row along axis 2402, and each level aligned in a column along axis 2401. A column aligned along axis 2401 and located between subsystems 1000-1 and 1000-2 includes three IC modules 108IC that interconnect all three subsystems 1000. Modules 108 of subsystems 1000-1 and 1000-2, in addition to modules 108IC, are oriented with the longer dimension of each module aligned along axis 2401 and the shorter dimension aligned along axis 2402. Subsystem 1000-3 includes eight levels of modules 108, with each array aligned in a column and levels two through eight aligned in a row, with the longer dimension of each module oriented along axis 2402 and the shorter dimension aligned along axis 2401, opposite to the orientation of subsystems 1000-1 and 1000-2. The first level of modules 108 of subsystem 1000-3 are arranged in staggered fashion at end 182. In this embodiment, the power provided by subsystem 1000-3 can be greater than the power provided by subsystem 1000-1 or subsystem 1000-2. Electrical connections between all modules 108 of this embodiment can vary in accordance with the embodiments described herein. Arrangement 2600 can be configured to perform charging in accordance with any of the three motor embodiments described herein, and can include switches 1108, switch assemblies 1250, charge connectors, and routing circuitry 1200.

Figure 27A:
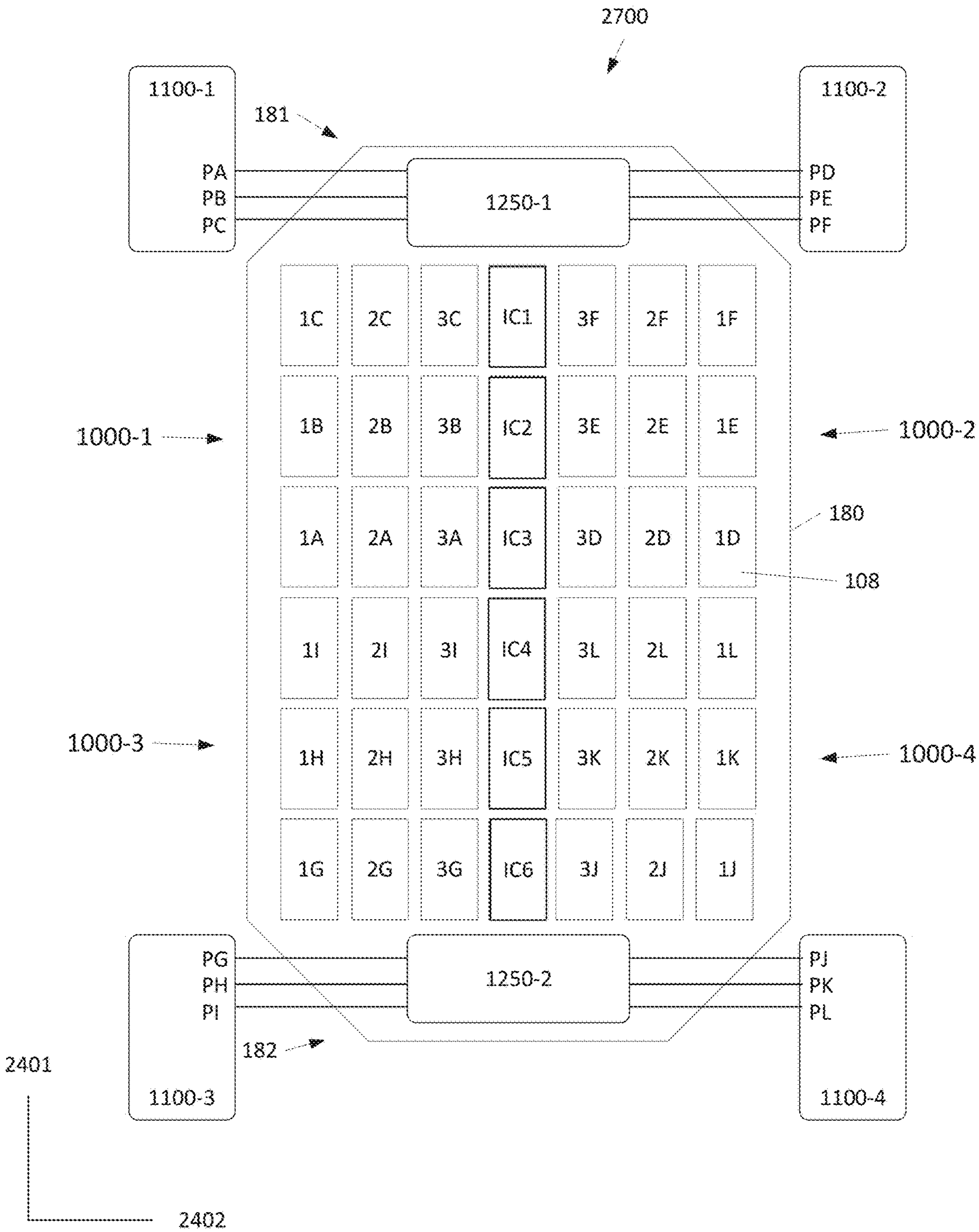
FIGS. 27A-27B are schematic diagrams depicting example embodiments of modular energy systems within an interior region of an EV chassis and configured to supply power for for motors.
Figure 27B:
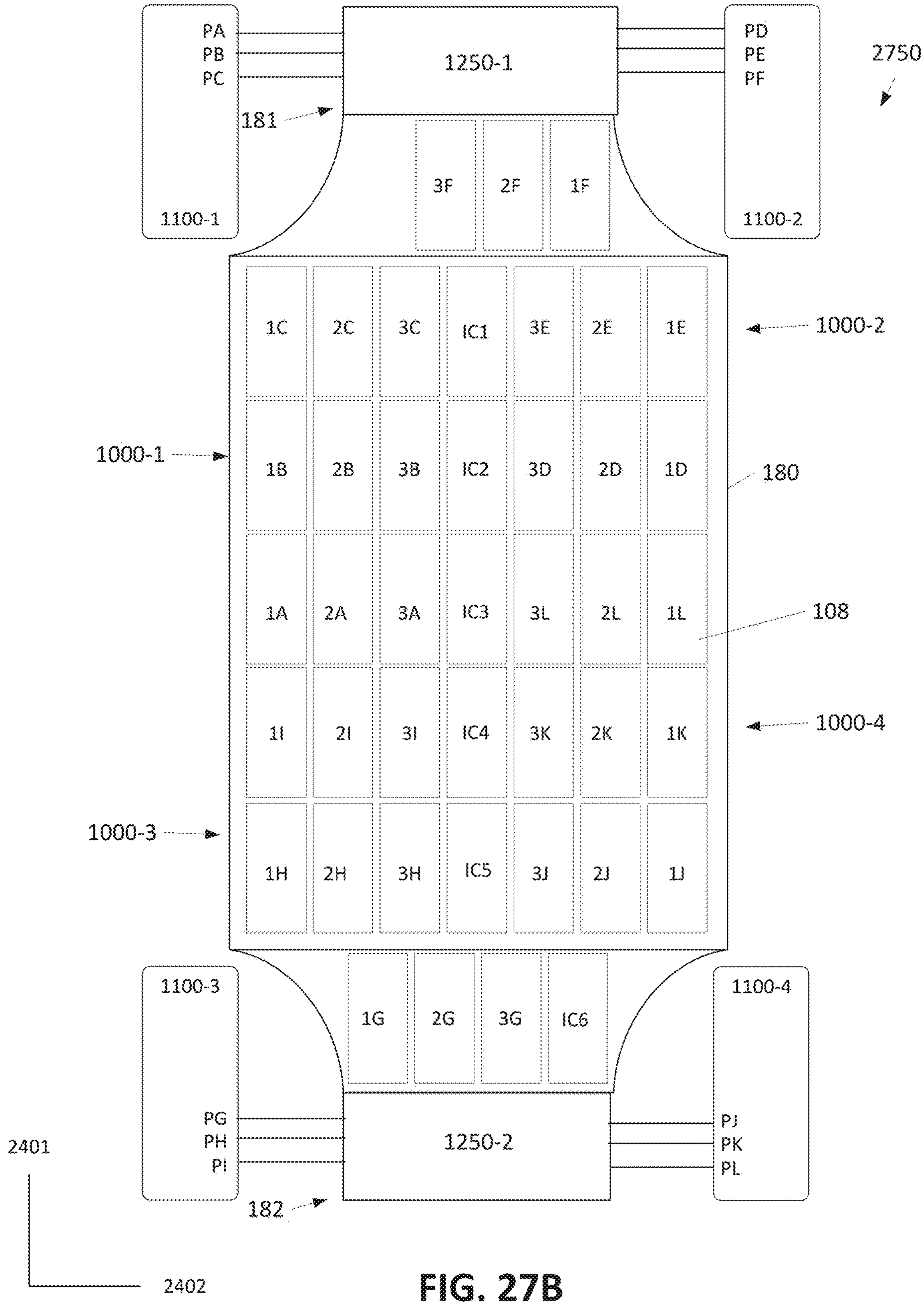

FIGS. 27A-27B depict arrangements 2700 and 2750, respectively, of example embodiments of system 100 configured with four subsystems 1000-1, 1000-2, 1000-3, and 1000-4 configured to supply three-phase power for motors 1100-1, 1100-2, 1100-3, and 1100-4, respectively. Motors 1100 are each dedicated to a separate wheel of the EV. Each subsystem 1000 includes three levels of modules 108, where all or most levels are aligned in a column along axis 2401, and each array is aligned in a row along axis 2402. All modules 108 are oriented with the longer dimension of each module aligned along axis 2401 and the shorter dimension aligned along axis 2402. In this embodiment, each subsystem 1000 is configured to generate the same voltage for its respective motor 1100, although in other embodiments the voltages produced by the various subsystems 1000 can differ. Electrical connections between all modules 108 of this embodiment can vary in accordance with the embodiments described herein. Modules 108IC interconnect the four subsystems 1000, e.g., as described with respect to FIG. 17, Assemblies 1250-1 and 1250-2 can be configured similar to the embodiment of FIG. 17 and the parallel charging subject matter described herein. Arrangement 2700 can be configured to charge in accordance with any of the three motor embodiments described herein, and can include charge connectors and routing circuitry 1200.

In arrangement 2700, the column of IC modules is oriented along axis 2401 and located in the center with subsystems 1000-1 and 1000-3 on the left side and subsystems 1000-2 and 1000-4 on the right side. In arrangement 2750, region 180 tapers into a columnar shape at both ends 181 and 182. The PC array of subsystem 1000-2 is located in this columnar region at end 181, and the PA array of subsystem 1000-3 (the diagonally opposite subsystem) is located in the columnar region of end 182, along with module 108IC-6. In an alternative to the embodiments of FIGS. 27A-27B, most or all levels can be aligned in a row along axis 2402, most or all arrays can be aligned in a column along axis 2401, and modules 108IC can be aligned as shown here or as a row along axis 2403.

Figure 28A:
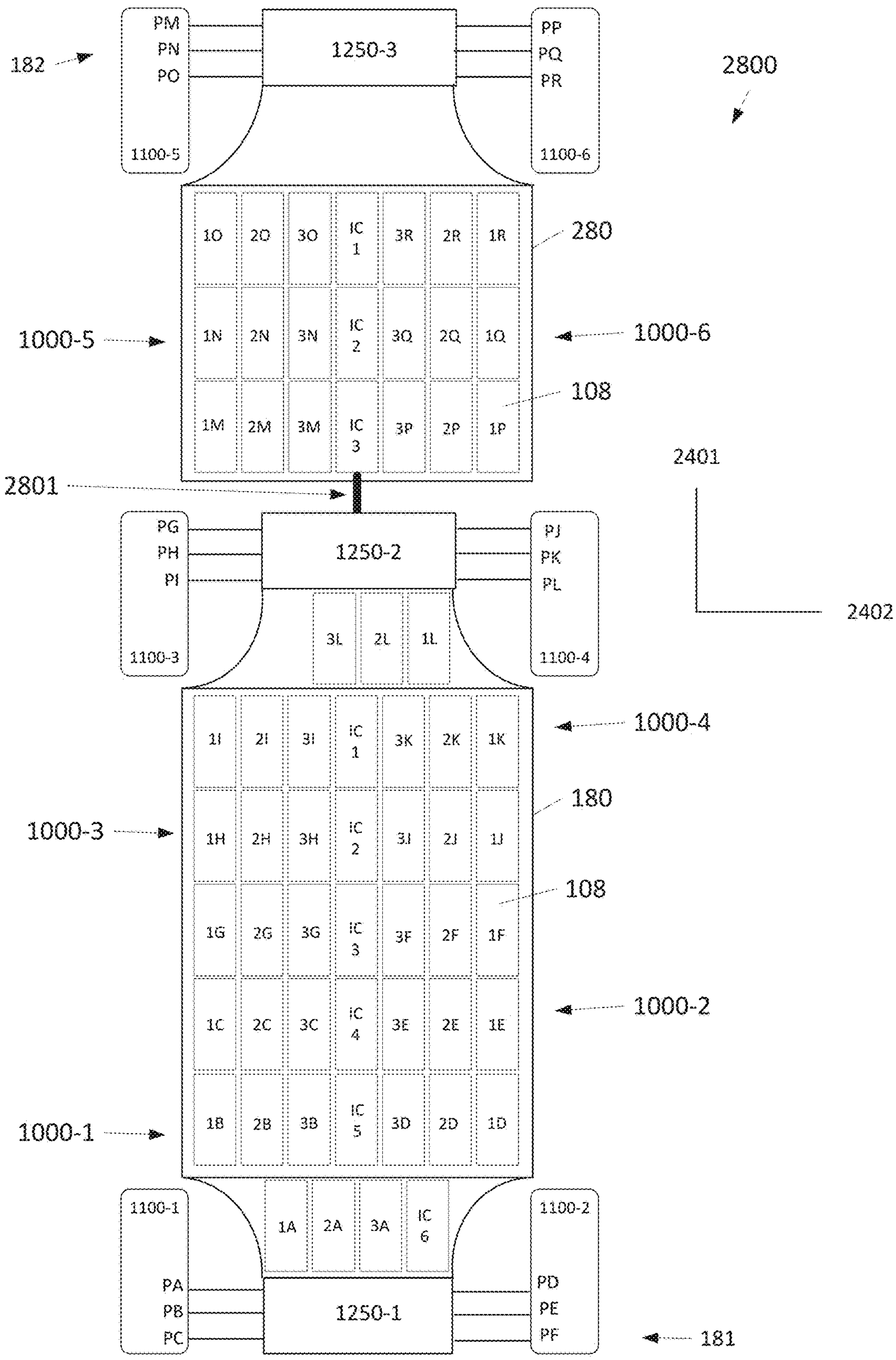
FIGS. 28A-28C are schematic diagrams depicting example embodiments of modular energy systems within interior regions of a first and a second chassis of an EV and configured to supply power for six motors.
Figure 28B:
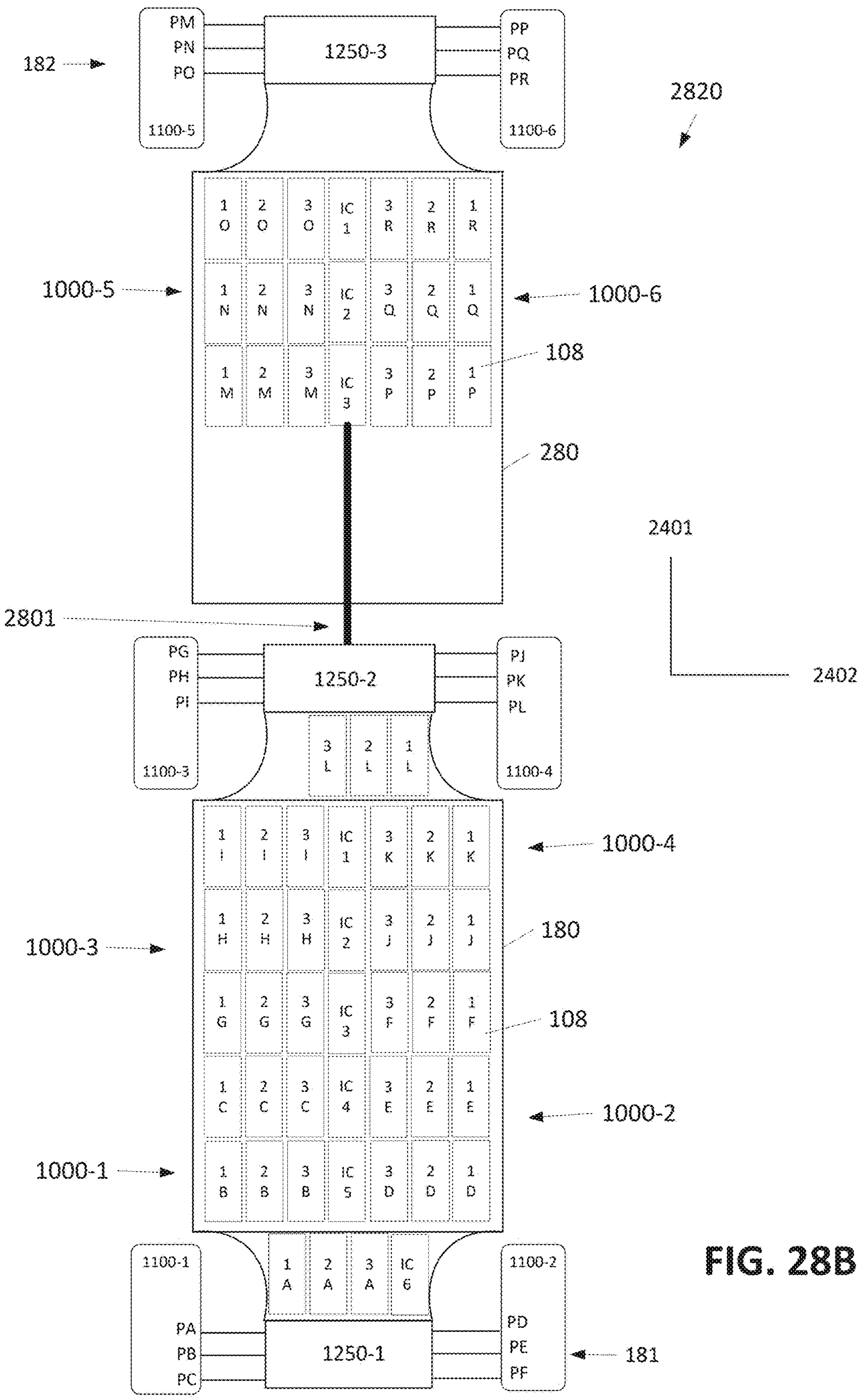
Figure 28C:
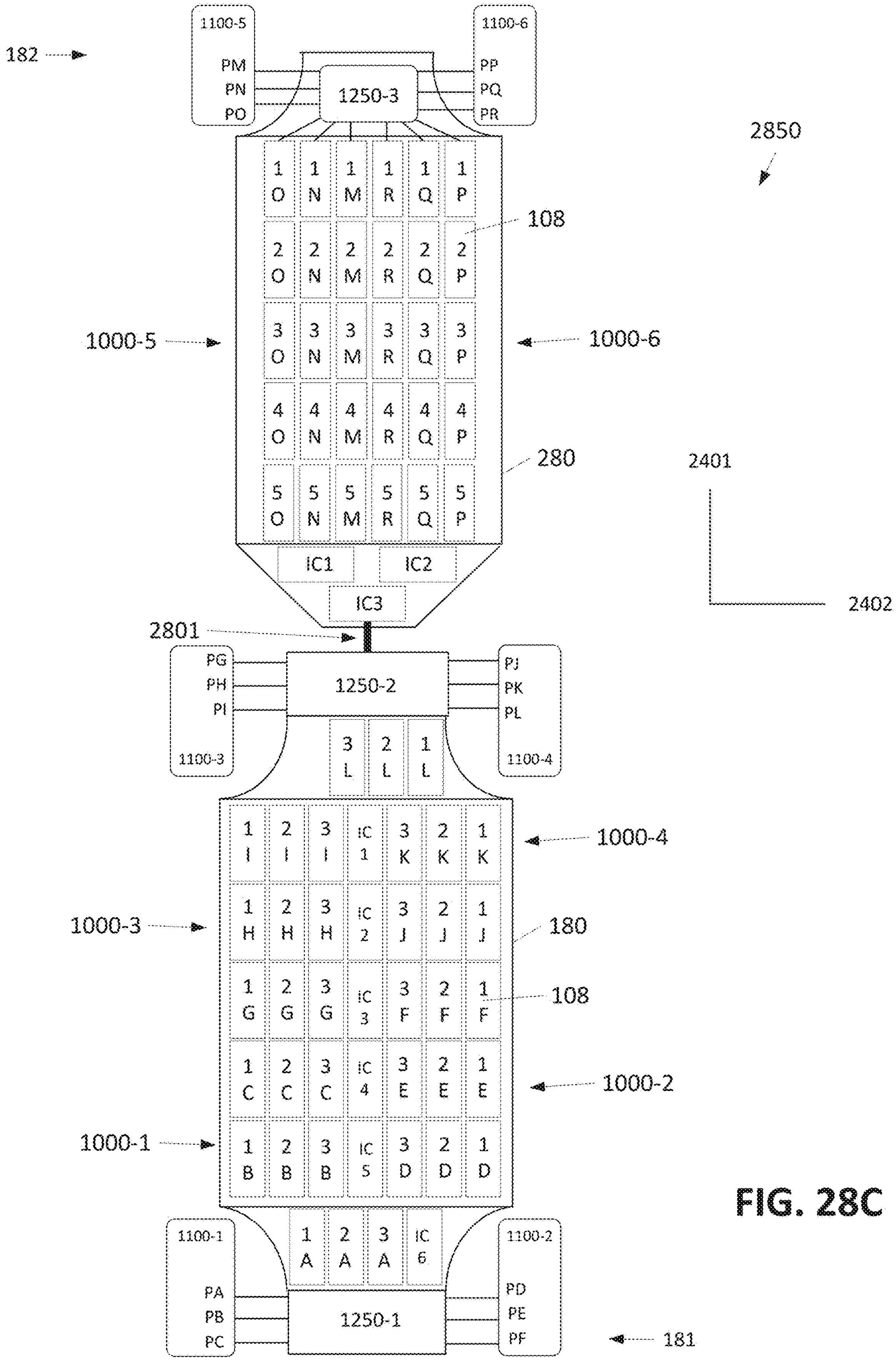

FIGS. 28A-28C depict arrangements 2800, 2820, and 2850, respectively, of example embodiments of system 100 configured with six subsystems 1000-1 through 1000-6 configured to supply three-phase power for motors 1100-1 through 1100-6, respectively. Motors 1100 are each dedicated to a separate wheel of the EV. In these embodiments the EV includes a first chassis having a first energy system region 180 and a second chassis having a second energy system region 280. The two chassis' are movable with respect to each other at mechanical and electrical connection 2801. The EV can be configured such that the first chassis is in front and the second chassis is in the rear, or vice versa. These six wheel configurations are suitable for larger EV's designed to carry large groups of people, or freight, or large loads, etc. The subject matter described with respect to FIGS. 28A-28C can be extended to still larger vehicles having two or more chassis' and seven or more motors. Electrical connections between all modules 108 can vary in accordance with the embodiments described herein. The various assemblies 1250 can be configured similar to the embodiment of FIGS. 18A-18B and the parallel charging subject matter described herein. Modules 108IC can interconnect all subsystems 1000 by the auxiliary load connections, and can perform interarray balancing between two or arrays of the same or different subsystems. Referring to the electrical arrangement of FIGS. 18A-18B, multiphase lines 1111-3 and auxiliary load lines 1802 can pass from region 180 to region 280 by electrical connection 2801. Arrangements 2800, 2820, and 2850 can be configured to charge in accordance with any of the three motor embodiments described herein, and can include charge connectors and routing circuitry 1200.

Arrangements 2800 and 2820 are similar except that region 280 is larger in arrangement 2820 than 2800, and has room for additional modules if desired. In these two embodiments, each subsystem 1000 includes three or more levels of modules 108 and all modules 108 are oriented with the longer dimension of each module aligned along axis 2401 and the shorter dimension aligned along axis 2402. Region 180 can be configured with an arrangement similar to that of 2750 (as shown here) or with arrangement 2700, or others contemplated herein. Subsystems 1000-5 and 1000-6 can be arranged in a front and back fashion (FIG. 25A), or in a left and right fashion as shown here, where each array is aligned in a row along axis 2402 and each level is aligned in a column along axis 2401.

The configuration of region 180 of arrangement 2850 is similar to that of arrangements 2800 and 2820. Region 280 of arrangement 2850 is configured similar to that of arrangement 2550 (FIG. 25B), where arrays are in columns each aligned along axis 2401 and levels are in rows each aligned along axis 2402. Arrangement 2850 has a second chassis that is still larger than those of 2800 and 2820 and can house subsystems capable of generating still greater power.

Example Embodiments Configured to Power Electric Suspensions and/or Steering

Electric vehicles can be configured with electric (active) suspension mechanisms and/or electric steering (e.g., steer-by-wire) for each wheel. An electrically powered suspension operates with an electric actuator or motor to actively move the suspension (as opposed to conventional passive suspensions that only mechanically react to stimulus applied to the wheel or car) in anticipation of movement of the vehicle or wheel. An electrically powered steering mechanism also operates with an electric actuator or motor to move the wheel in response to an electric signal passed by the steering controller (e.g., based on input by the driver to the steering wheel or by input from an automated driving control system).

The embodiments described herein can be utilized to power an actuator or motor for electric suspension and/or steering. The embodiments can power electric suspension at any and all wheels, can power electric steering at both front wheels (and also rear wheels if desired), up to and including both electric suspension and electric steering at each wheel. The embodiments can power electric steering and suspension using a single three-phase system 100 with no subsystems, or systems 100 having two, three, four, or more subsystems 1000.

Figure 29A:
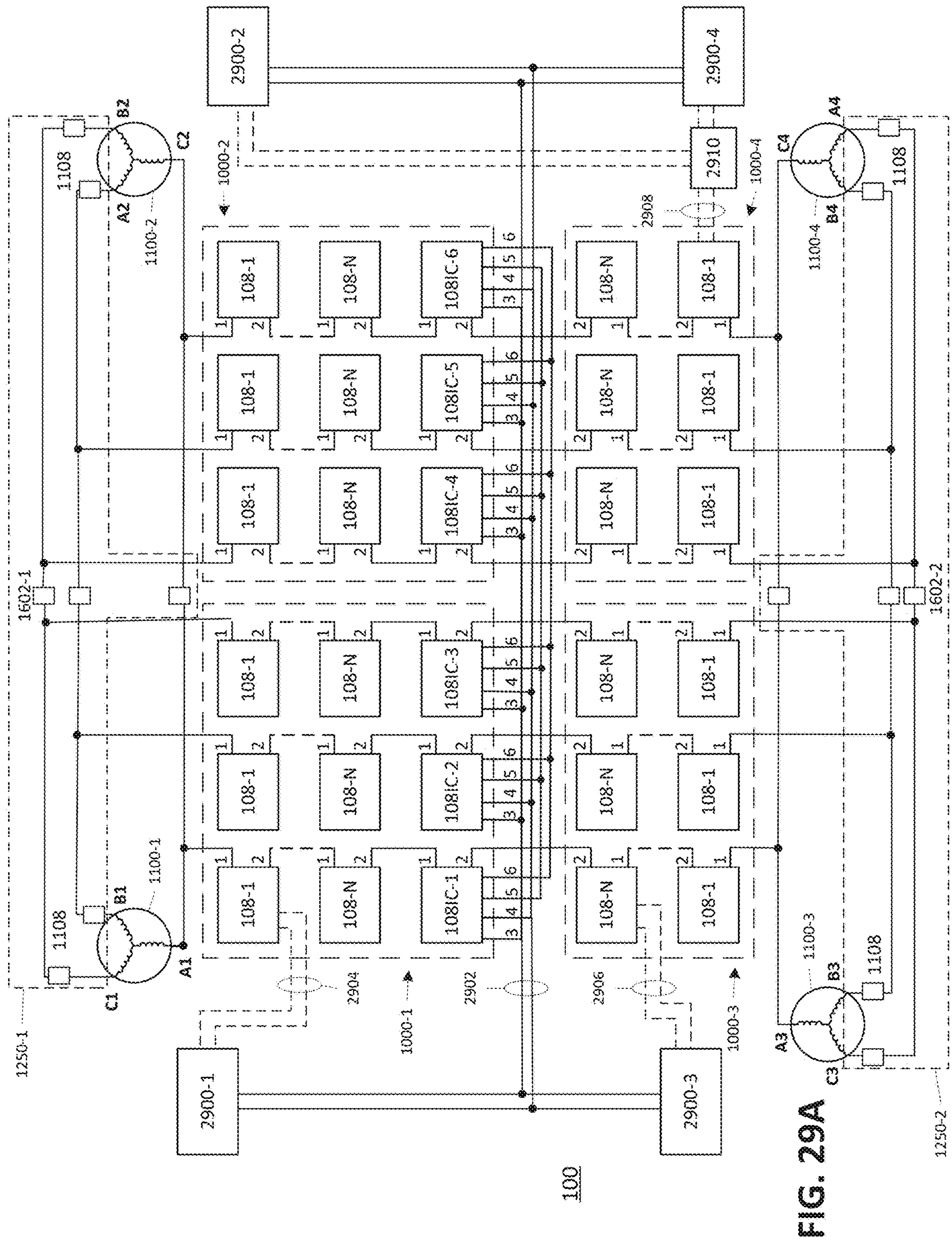
FIG. 29A is a block diagram depicting an example embodiment of the modular energy system configured to supply power for an electric motor of an active suspension or active steering mechanism.

FIG. 29A is a block diagram depicting example embodiments of a system 100 having four subsystems 1000-1 through 1000-4, where each subsystem 1000 is configured to power a three-phase motor 1100 associated with a wheel of the EV, as well as a DC actuator (or motor) 2900 associated with the wheel of the EV, where the DC actuator 2900 can be used for either electric suspension or electric steering. In FIG. 29A, each actuator 2900 is powered by auxiliary load lines 2902 that can be sourced by one or more interconnection modules 108IC. The voltage of lines 2902 can be the same voltage as the sources 206 of the interconnection modules 108IC, e.g., taken from ports 3 and 4 as described with respect to module 108C of FIG. 3C. Alternatively the voltage of lines 2902 can be regulated down from the voltage of sources 206 of modules 108IC, e.g., taken from ports 5 and 6. Alternatively, connections to lines 2902 can be omitted, and each actuator 2900 can be powered directly from a module 108. The module 108 that provides power can be the module that is located closest in proximity or location to each actuator 2900.

FIG. 29A depicts an alternative connection where lines 2904 connect actuator 2900-1 to module 108-1 of the PA1 array of subsystem 1000-1. Module 108-1 here is a corner module located closest in proximity to actuator 2900-1. If such connection were used, actuator 2900-2 could be powered by module 108-1 of array PC2 of subsystem 1000-2, actuator 2900-3 could be powered by module 108-1 of array PA3 of subsystem 1000-3, and actuator 2900-4 could be powered by module 108-1 of array PC4 of subsystem 1000-4 by additional lines 2904 (not shown).

Actuators 2900 need not be powered directly by a corner module and can be powered by any other module in the array closest to the actuator 2900. FIG. 29A depicts another alternative connection where lines 2906 connect actuator 2900-3 to module 108-N of the PA3 array of subsystem 1000-3, which is the array located in closest proximity to actuator 2900-3. Such connections can likewise be used as an alternative for each of the other actuators 2900.

If each actuator 2900 is grounded, that it may be desirable to provide isolation between actuators 2900 and system 100. FIG. 29A depicts another alternative connection where isolated converter 2910, which can be either a DC-DC converter or DC-AC converter, is positioned on lines 2908 extending from a module 108-1 of array PC4 of subsystem 1000-4 to actuator 2900-4. Such connections 2908 can likewise be used as an alternative for each of the other actuators 2900. In other embodiments, isolated converter 2910 can be interposed in lines 2902 or 2906, to provide isolated power from those other sources. While each of connections 2904, 2906, and 2908 are shown coming from a single module, such connections can come from multiple modules 108 to utilize parallel energy sources.

Figure 29B:
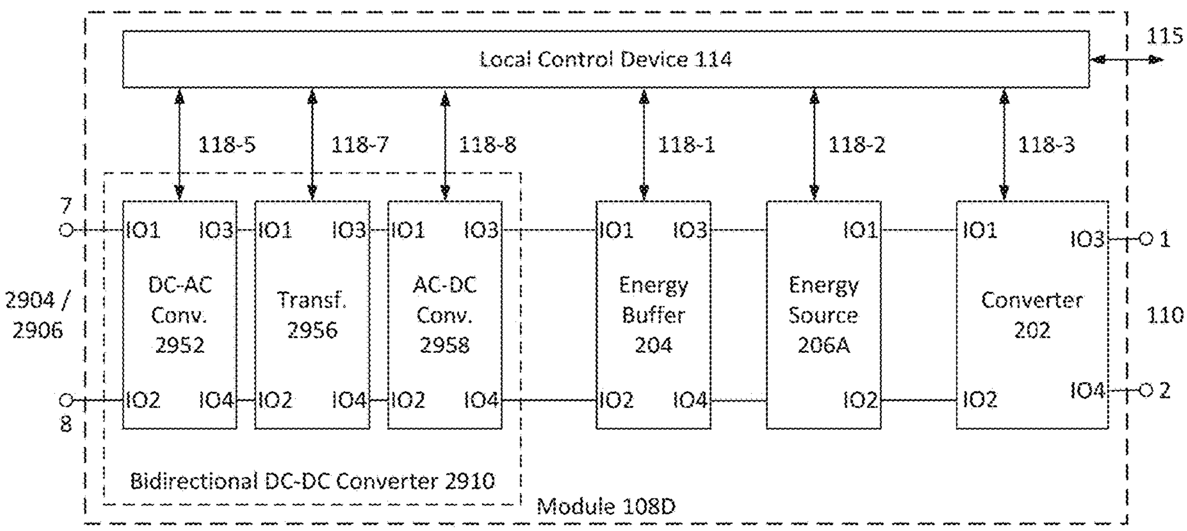
FIG. 29B is a block diagram depicting an example embodiment of a module for use in a modular energy system.

The isolated converter can be integrated directly into a module 108. FIG. 29B is a block diagram depicting an example embodiment of a module 108D configured with a DC-DC isolated converter 2910, and can provide power from source 206 (or power connection 110) to ports 7 and 8 connected to lines 2904 or 2906. Converter 2910 is connected between I/O ports 7 and 8 and buffer 204 and includes DC-AC converter 2952, connected to transformer 2956, which in turn is connected to AC-DC converter 2958. Converter 2958 can convert the DC voltage of source 206 into a high-frequency AC voltage, which transformer 2956 can modify to a different voltage if needed, and output that modified AC voltage to AC-DC converter 2952, which can convert the AC signal back into DC form for provision to actuator 2900. Transformer 2956 can also isolate module components 202, 204, 206, 2958, and 114 from ground. As with the other components of module 108D, monitor circuitry for converter 2952, transformer 2956, and converter 2958 can be included to measure currents, voltages, temperatures, faults, and the like. LCD 114 can monitor the status of converter 2910, particularly converter 2952, transformer 2956 (e.g., monitor circuitry or an active component associated therewith), and converter 2958, over data connections 118-5, 118-7, and 118-8, respectively. These connections 118-5 and 118-6 can also supply control signals to control switching of converter 2952 and to control any controllable elements within associated with transformer 2956. Isolation of LCD 114 can be maintained by isolation circuitry present on lines 118-5 and 118-6 (e.g., isolated gate drivers and isolated sensors).

Figure 29C:
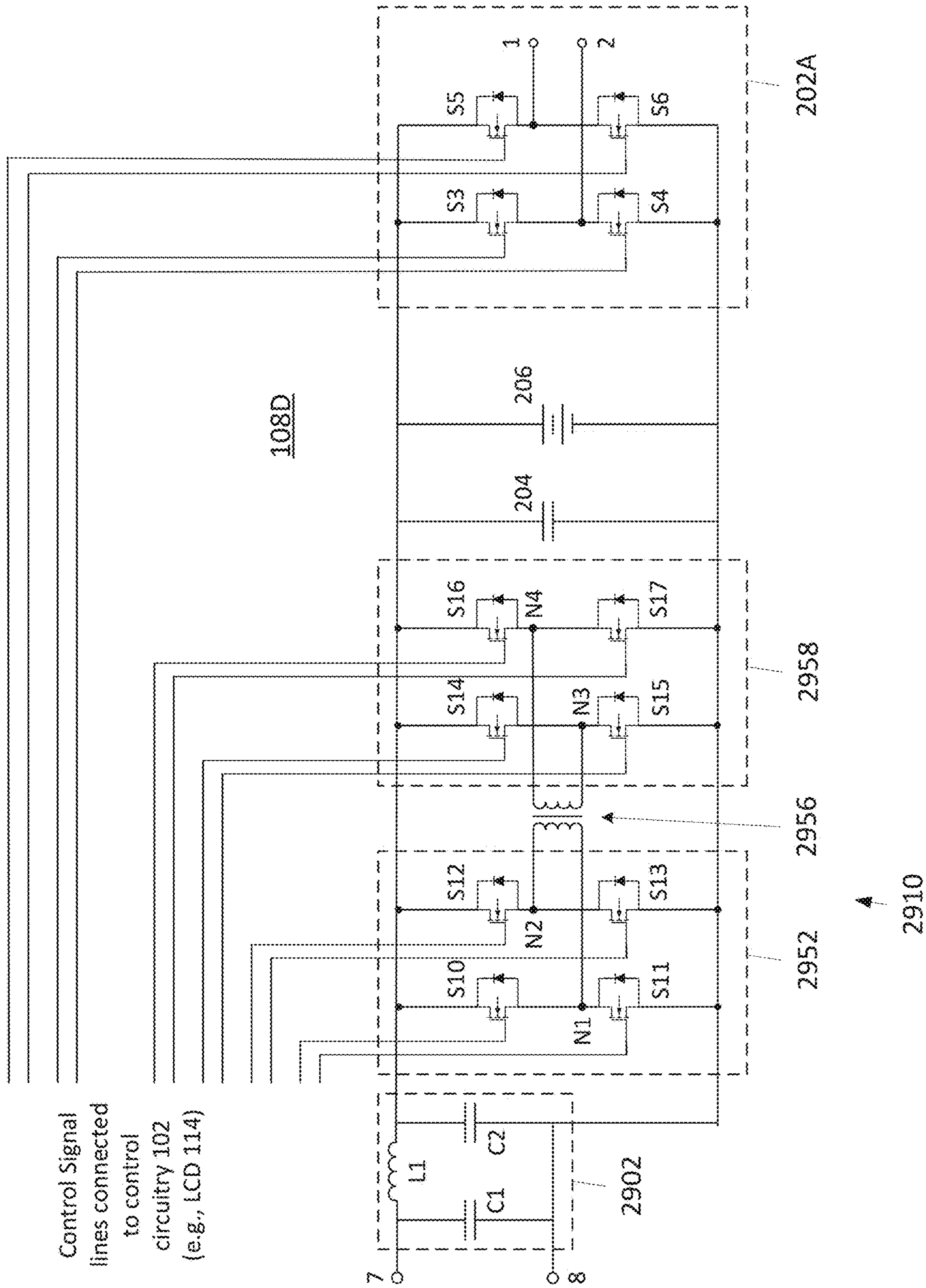
FIGS. 29C-29D are schematic diagrams depicting example embodiments of modules for use in a modular energy system.

FIG. 29C is a schematic diagram depicting an example embodiment of module 108D. Converter 202A is coupled with buffer 204, which is configured as a capacitor. I/O ports 7 and 8 are coupled to an optional LC filter 2902, which is in turn coupled to converter 2910, specifically DC-AC converter 2952, which is configured as a full bridge converter with switches S10, S11, S12, and S13. The full bridge outputs from nodes N1 and N2 are connected to a primary winding of transformer 2956. A secondary winding of transformer 2956 is coupled with nodes N3 and N4 of a second full bridge circuit configured as AC-DC converter 2958, having switches S14, S15, S16, and S17. The switches of converter 2958 can be semiconductor switches configured as MOSFETs, IGBT's, GaN devices, or others as described herein. LCD 114 or another element of control system 102 can provide the switching signals for control of switches S1-S6 and S10-S17.

Figure 29D:
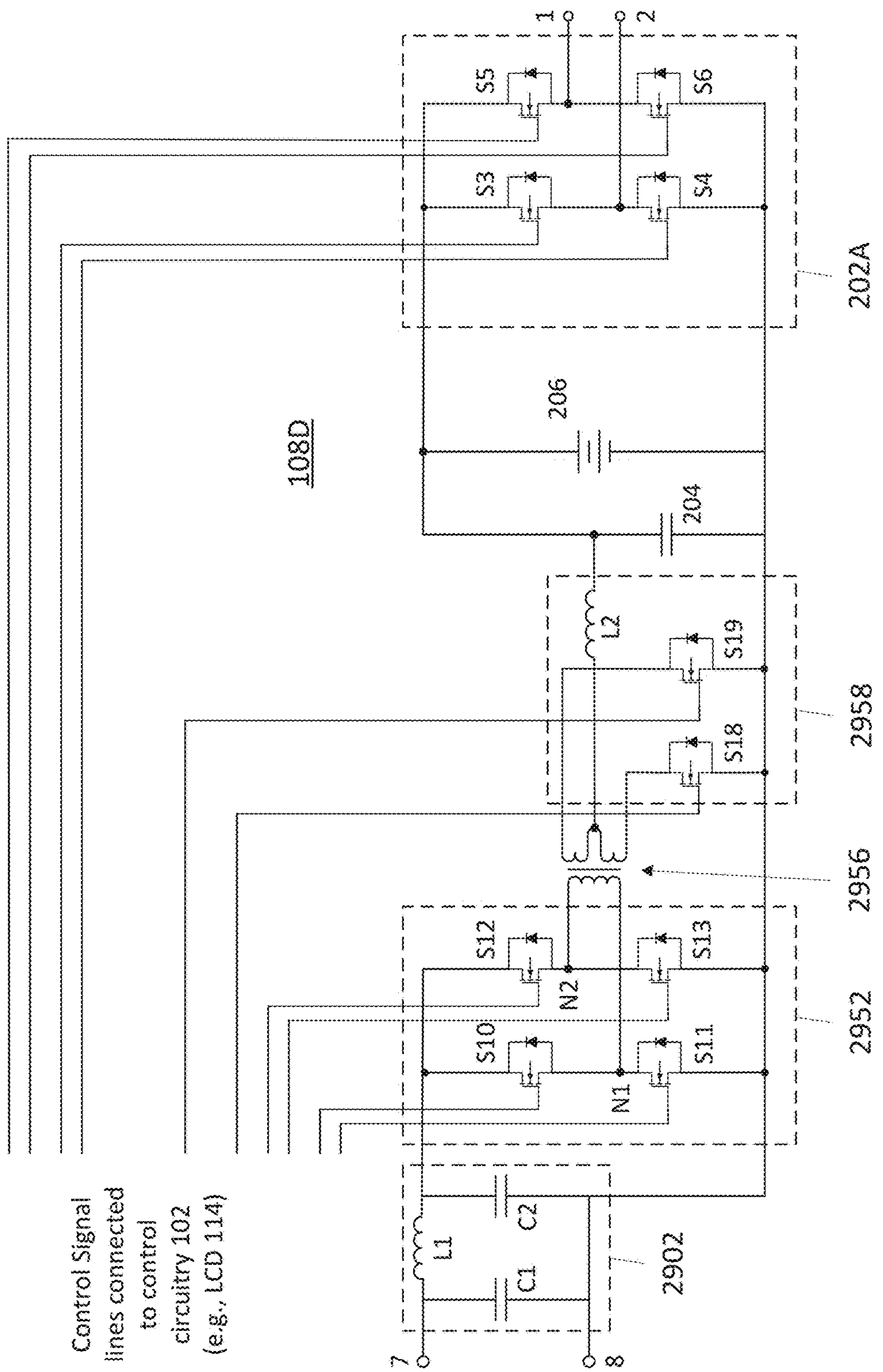

FIG. 29D is a schematic diagram depicting another example embodiment of module 108D, where AC-DC converter 2958 is configured as a push-pull converter with a first terminal of source 206 connected to one side of dual secondary windings of transformer 2956 through an inductor L2, and switches S18 and S19 connected between the opposite side of dual secondary windings and a common node (e.g., node 4) coupled with the opposite terminal of source 206. The push-pull configuration only requires two switches and thus is more cost-effective than a full bridge converter, although the switches have larger voltages applied across them.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated or taught otherwise.

In many embodiments, a modular energy system controllable to supply power to a load is provided, the modular energy system including: three arrays, each array including at least two modules electrically connected together to output an AC voltage signal including a superposition of output voltages from each of the at least two modules, where each of the modules includes an energy source and a converter; a charge port configured to conduct a DC or single phase AC charge signal; and routing circuitry connected between the charge port and the three arrays, where the routing circuitry is controllable to selectively route the DC or single phase AC charge signal to each of the three arrays.

In some embodiments, the system further includes a control system communicatively coupled with the routing circuitry, where the control system is configured to control the routing circuitry to selectively route the DC or single phase AC charge signal to each of the three arrays.

In some embodiments, the control system is communicatively coupled with each module of the three arrays and is configured to control the convener of each module to charge each module.

In some embodiments, the control system is configured to control the converters of each module according to a pulse width modulation or hysteresis technique. Each module can include monitor circuitry configured to monitor status information of the module, where each module is configured to output the status information to the control system, and where the control system is configured to control the converter of each module based on the status information. The status information can relate to temperature and state of charge of the module, and where the control system is configured to control the converter of each module to balance temperature and state of charge of all modules of the arrays.

In some embodiments, the routing circuitry includes a plurality of unidirectional solid-state relays controllable by the control system to selectively route the DC charge signal to each of the three arrays. The unidirectional solid-state relays can be thyristors.

In some embodiments, the routing circuitry includes a first port coupled with a DC+ line, a second port coupled with a DC− line, a third port coupled with a first array, a fourth port coupled with a second array, and a fifth port coupled with a third array, and includes: a first thyristor coupled between the first port and the third port; a second thyristor coupled between the first port and the fourth port; a third thyristor coupled between the fourth port and the second port; and a fourth thyristor coupled between the fifth port and the second port, where the thyristors are controllable by the control system to selectively route the DC charge signal at the first port to either the third or fourth port, and to selectively route a signal at the fourth or fifth port to the second port. The routing circuitry can include a sixth port coupled with a first AC line, a seventh port coupled with a second AC line, and can include: a first diode coupled between the seventh port and the first and second thyristors; a second diode coupled between the sixth port and the first and second thyristors; a third diode coupled from the third and fourth thyristors to the sixth port; and a fourth diode coupled from the third and fourth thyristors to the seventh port.

In some embodiments, the routing circuitry includes a plurality of bidirectional solid-state relays controllable by the control system to selectively route the DC or single phase AC charge signal to each of the three arrays. The bidirectional solid-state relays can be triacs.

In some embodiments, the routing circuitry includes a first port configured to couple with a DC+ charge signal or a single phase AC line charge signal, a second port configured to couple with a DC− charge signal or a single phase AC neutral signal, a third port coupled with a first array, a fourth port coupled with a second array, and a fifth port coupled with a third array, and includes: a first triac coupled between the first port and the third port; a second triac coupled between the first port and the fourth port; a third triac coupled between the fourth port and the second port; and a fourth triac coupled between the fifth port and the second port. The triacs can be controllable by the control system to, in operation in a DC charge state, selectively route the DC charge signal at the first port to either the third or fourth port, and to selectively route a signal at the fourth or fifth port to the second port, and where the triacs can be controllable by the control system to, in operation in a positive single phase AC charge state, selectively route the AC line charge signal at the first port to either the third or fourth port, and to selectively route a signal at the fourth or fifth port to the second port and, in operation in a negative single phase AC charge state, selectively route a signal at the second port two either the fourth or fifth port, and to selectively route a signal at the third or fourth port to the first port.

In some embodiments, the charge port is configured to conduct a three phase AC charge signal, and the routing circuitry includes a plurality of bidirectional solid-state relays controllable by the control system to selectively route the DC or single phase AC charge signal to each of the three arrays. The plurality of bidirectional solid-state relays can include triacs. The routing circuitry can include a first port configured to receive a DC or AC charge signal, a second port configured to receive an AC charge signal, and a third port configured to receive a DC or AC charge signal, and can further include: a first triac coupled between the first port and a first line connectable to a first array of the three arrays; a second triac coupled between the second port and a second line connectable to a second array of the three arrays; a third triac coupled between the third port and a third line connectable to a third array of the three arrays; a fourth triac coupled between the first and second lines; and a fifth triac coupled between the second and third lines.

In some embodiments, the system is further configured to selectively disconnect all modules and motors from a charge source.

In some embodiments, the three arrays can be interconnected by at least one interconnection module. The control system can be configured to control the at least one interconnection module to supply voltage for at least one auxiliary load when the system is in a charge state.

In some embodiments, the three arrays are interconnected in a delta series configuration.

In some embodiments, the load is a six phase load, the three arrays are a first set of arrays, and the system further includes a second set of arrays including an additional three arrays of modules, where the system is configured to charge the first and second set of arrays in parallel.

In some embodiments, the charge port is a first charge port, and the system further includes a second charge port configured to receive a three-phase charge signal. The first and second charge ports are integrated in the same user accessible location. The routing circuitry can be connected to lines from the second charge port.

In some embodiments, the system includes a plurality of switches coupled between a first module of each array and the load, where the plurality of switches are controllable to disconnect the load from the three arrays.

In some embodiments, the three arrays are of a first subsystem of the system configured to provide three-phase power to a first load, the system further including a second subsystem configured to provide three-phase power to a second load, where the second subsystem includes three arrays each including at least two modules electrically connected together to output an AC voltage signal including a superposition of output voltages from each of the at least two modules, where each of the modules of the second subsystem includes an energy source and a converter, where the first and second subsystems are coupled together by a first plurality of switches such that the first and second subsystems are electrically connectable in parallel for charging. The system can further include a third subsystem configured to provide three-phase power to a third load, where the third subsystem includes three arrays each including at least two modules electrically connected together to output an AC voltage signal including a superposition of output voltages from each of the at least two modules, where each of the modules of the third subsystem includes an energy source and a converter, where the first and third subsystems are coupled together by a second plurality of switches such that the first and third subsystems are electrically connectable in parallel for charging.

In many embodiments, a method of charging a modular energy system is provided, where the modular energy system is configured in accordance with any of the embodiments disclosed herein, and the method includes controlling the modular energy system while a charge signal is applied to charge the modular energy system and to balance at least one operating characteristic of the system. The at least one operating characteristic can be temperature. The charge signal can be a three-phase charge signal, a single phase charge signal, or a direct current (DC) charge signal. The modular energy system can be controlled to maintain a power factor of the system within a threshold of unity. Controlling the modular energy system can include controlling converters of modules of the energy system.

In many embodiments, a computer readable medium is provided that includes a plurality of instructions that, when executed by processing circuitry, cause the processing circuitry to control charging for a modular energy system, where the modular energy system is configured in accordance with any of the embodiments disclosed herein.

In many embodiments, a modular energy system of an electric vehicle (EV) is provided, the system including: a first subsystem configured to supply power to a first motor of the EV, the first subsystem including three arrays each including at least two first modules electrically connected together to output an AC voltage signal including a superposition of output voltages from each of the at least two first modules, where each of the first modules includes an energy source and a converter; a second subsystem configured to supply power to a second motor of the EV, the second subsystem including three arrays each including at least two second modules electrically connected together to output an AC voltage signal including a superposition of output voltages from each of the at least two second modules, where each of the second modules includes an energy source and a converter; and a plurality of switches configured to selectively connect the first and second subsystems for charging, where a nominal output voltage of the first subsystem is greater than a nominal output voltage of the second subsystem.

In some embodiments, each array of the first subsystem includes more modules than each array of the second subsystem.

In some embodiments, a nominal voltage of each first module is greater than a nominal voltage of each second module.

In some embodiments, the energy source of each first module is a battery of a first type, and the energy source of each second module is a battery of a second type, where the first type is different than the second type. The first type can have a relatively greater energy density than the second type. The second type can have a relatively greater C rate than the first type.

In some embodiments, the plurality of switches can be configured to connect a first array of the first subsystem in parallel with a first array of the second subsystem, a second array of the first subsystem in parallel with a second array of the second subsystem, and a third array of the first subsystem in parallel with a third array of the second subsystem. The system can further include: a charge port configured to conduct a DC or single phase AC charge signal; and routing circuitry connected between the charge port and the subsystems, where the routing circuitry is controllable to selectively route the DC or single phase AC charge signal to each parallel connection of subsystem arrays. The system can further include a control system communicatively coupled with the routing circuitry and the plurality of switches, where the control system is configured to control the selective routing of the routing circuitry. The control system can be communicatively coupled with the converters of each first module and each second module, and is configured to control the converters to charge each first and second module.

In some embodiments, the system further includes a third subsystem configured to supply power to a third motor of the EV, the third subsystem including three arrays each including at least two third modules electrically connected together to output an AC voltage signal including a superposition of output voltages from each of the at least two third modules, where each of the third modules includes an energy source and a converter. The plurality of switches can be a first plurality of switches, the system further including a second plurality of switches configured to selectively connect the second and third subsystems for charging. The maximum output voltage of the first subsystem can be greater than the maximum output voltage of the third subsystem. The first motor can be configured to power rear wheels of the EV, the second motor is configured to power a first front wheel of the EV, and the third motor is configured to power a second front wheel of the EV. The system can further include a fourth subsystem configured to supply power to a fourth motor of the EV, the fourth subsystem including three arrays each including at least two fourth modules electrically connected together to output an AC voltage signal including a superposition of output voltages from each of the at least two fourth modules, where each of the fourth modules includes an energy source and a converter.

In some embodiments, the nominal output voltage of the first subsystem is a nominal peak line-to-line output voltage of the first subsystem, and the nominal output voltage of the second subsystem is a nominal peak line-to-line output voltage of the second subsystem.

In many embodiments, a modular energy system controllable to supply power to a closed winding motor is provided, the system including: three arrays, each array including at least two modules electrically connected together to output an AC voltage signal including a superposition of output voltages from each of the at least two modules, where each of the modules includes an energy source and a converter; and a charge connector including a first port and a second port and configured to conduct a DC or single phase AC charge signal, where a first charge path extends from the first port through a first and second winding of the motor, through a first array, and ends at the second port, where a second charge path extends from the first port through the first winding and a third winding of the motor, through a second array, and ends at the second port, and where a third charge path extends from the first port of the connector, bypasses the motor and passes through a third array, and ends at the second port.

In some embodiments, the system further includes a control system communicatively coupled with the modules of the three arrays, where the control system is configured to control the converter of each module to charge each module. The control system can be configured to charge each of the three arrays concurrently with the DC charge signal. The control system can be configured to charge two of the three arrays concurrently with the DC charge signal. The control system can be configured to charge each of the three arrays sequentially with the DC charge signal. The control system can be configured to charge each of the three arrays concurrently with the single phase AC charge signal. The control system can be configured to charge two of the three arrays concurrently with the single phase AC charge signal. The control system can be configured to charge each of the three arrays sequentially with the single phase AC charge signal. The control system can be configured to charge along the first charge path and the second charge path concurrently such that fluxes generated on the first, second, and third windings of the motor are neutralized.

In some embodiments, the system includes a three-phase charge connector connected to a plurality of switches, where the switches are controllable by the control system to selectively connect the three-phase charge connector to the three arrays.

In some embodiments, the control system can be configured to control the converters of each module according to a pulse width modulation or hysteresis technique. Each module can include monitor circuitry configured to monitor status information of the module, where each module is configured to output the status information to the control system, and where the control system is configured to control the converter of each module based on the status information. The status information can relate to temperature and state of charge of the module, and where the control system is configured to control the converter of each module to balance temperature and state of charge of all modules of the arrays.

In some embodiments, the three arrays are interconnected by at least one interconnection module. The control system can be configured to control the at least one interconnection module to supply voltage for at least one auxiliary load when the system is in a charge state.

In many embodiments, a charge source configured to charge an electric vehicle (EV) is provided, the charge source including: a modular energy system including three arrays configured to generate power in at least three phases, each array including at least two modules electrically connected together to output an AC voltage signal including a superposition of output voltages from each of the at least two modules, where each of the modules includes an energy source and a converter.

In some embodiments, the charge source is configured to connect to an external power supply to charge the energy sources of the modular energy system. The external power supply can be a utility grid or a renewable energy source. The charge source can be configured to charge the EV at a first rate, where the charge source is configured to be charged by the external power supply at a second rate, and where the first rate is greater than the second rate.

In some embodiments, the charge source includes: monitor circuitry configured to detect a harmonic outputtable to the external power supply; and a control system configured to control the converters of the modules to generate compensatory current to cancel the harmonic. The charge source can further include a DC-AC converter including a plurality of diodes for rectification.

In some embodiments, the charge source can be configured to charge the EV with a DC charge signal, a single phase AC charge signal, or a three-phase AC charge signal.

In some embodiments, the EV can include a battery pack including: a modular energy system including three arrays configured to generate power in at least three phases, each array including at least two modules electrically connected together to output an AC voltage signal including a superposition of output voltages from each of the at least two modules, where each of the modules includes an energy source and a converter.

In many embodiments, a modular energy system controllable to supply power to an open winding motor is provided, the system including: a first subsystem including three arrays, each array including at least two modules electrically connected together to output an AC voltage signal including a superposition of output voltages from each of the at least two modules, where each of the modules includes an energy source and a converter, where the first subsystem is connected to a three-phase charge connector; and a second subsystem including three arrays, each array including at least two modules electrically connected together to output an AC voltage signal including a superposition of output voltages from each of the at least two modules, where each of the modules includes an energy source and a converter, where the first and second subsystems are configured to connect to the motor such that a first winding of the motor is connected between a first array of the first subsystem and a first array of the second subsystem, a second winding of the motor is connected between a second array of the first subsystem and a second array of the second subsystem, and a third winding of the motor is connected between a third array of the first subsystem and a third array of the second subsystem.

In some embodiments, a first port of the three-phase charge connector is coupled to the first array of the first subsystem, a second port of the three-phase charge connector is coupled to the second array of the first subsystem, and a third port of the three-phase charge connector is coupled to the third array of the first subsystem, the system further including: a first switch coupled between the first port and the second port; a second switch coupled between the second port and the third port; and a DC or single phase AC charge connector coupled with the third port and the third array of the second subsystem.

In many embodiments, a modular energy system of an electric vehicle (EV) is provided, the system including: three arrays, each array including at least two modules electrically connected together to output an AC voltage signal including a superposition of output voltages from each of the at least two modules, where each of the modules includes an energy source and a converter, where the three arrays are configured to provide three-phase power for a first electric motor configured to provide motive force for at least one wheel of the EV, and where at least one module of the three arrays is configured to provide power to a second electric motor of an electric suspension or electric steering mechanism of the EV.

In some embodiments, the system can be configured to provide power for two second electric motors of the EV.

In some embodiments, the system can be configured to provide power for four second electric motors of the EV.

In some embodiments, the at least one module is the module of the three arrays in closest proximity to the second electric motor.

In some embodiments, the at least one module is configured as an interconnection module coupled with at least two of the three arrays.

In some embodiments, the system includes a plurality of interconnection modules coupled between the three arrays, where each interconnection module includes an energy source and a converter, and the energy sources of the interconnection modules are connected in parallel. The at least one module can be one of the plurality of interconnection modules.

In some embodiments, the system further includes an isolation converter, where the at least one module of the three arrays is configured to provide power to the second electric motor by way of the isolation converter.

In some embodiments, the converter of the at least one module is a first converter, and the at least one module includes an isolation converter coupled with the energy source of the at least one module, where the at least one module is configured to provide power to the second electric motor from the energy source through the isolation converter. The isolation converter can include: a first DC-AC converter coupled with the energy source of the at least one module; a transformer coupled with the DC-AC converter; and a second DC-AC converter coupled with the transformer.

In some embodiments, the second electric motor is an electric actuator.

In some embodiments, the second electric motor is part of an electric suspension of the EV.

In some embodiments, the second electric motor is part of an electric steering mechanism of the EV.

In some embodiments, the three arrays are of a first subsystem of the system, and the system further includes at least one additional subsystem configured to provide three-phase power for a third electric motor of the EV configured to provide motive force for at least one wheel of the EV, where the at least one additional subsystem includes at least one additional module configured to provide power to a fourth electric motor of an electric suspension or electric steering mechanism of the EV.

In many embodiments, a modular energy system of an electric vehicle (EV) is provided, the system including: three arrays, each array including at least two levels of modules electrically connected together to output an AC voltage signal including a superposition of output voltages from each of the at least two modules, where each of the modules includes an energy source and a converter, where a chassis of the EV has a first axis and a perpendicular second axis in a horizontal plane of the EV, where a first dimension of the chassis along the first axis is relatively longer than a second dimension of the chassis along the second axis, where the three arrays are arranged in a pack configured to fit within the chassis, and where each module of the three arrays has a first dimension aligned along the first axis and a second dimension aligned along the second axis, where the second dimension of each module is relatively greater than the first dimension.

In some embodiments, for each array, a majority of modules of the array are aligned along the first axis.

In some embodiments, a first level of the arrays are arranged in staggered fashion at a first end of the pack. Other levels of the arrays can be aligned along the second axis. The system can further include a plurality of interconnection modules arranged in staggered fashion at a second end of the pack.

In some embodiments, the system can be configured to provide three-phase power to a motor located adjacent the first end of the pack.

In some embodiments, the three arrays are of a first subsystem, and the system further includes a second subsystem including three arrays of modules arranged in symmetrically opposite fashion to the first subsystem. The system can further include a plurality of interconnection modules positioned between the first and second subsystems and aligned along the second axis.

In many embodiments, a modular energy system of an electric vehicle (EV) is provided, the system including: a first subsystem including three arrays configured to provide three-phase power to a first motor of the EV, each array including at least two levels of modules electrically connected together to output an AC voltage signal including a superposition of output voltages from each of the at least two modules, where each of the modules includes an energy source and a converter; and a second subsystem including three arrays configured to provide three-phase power to a second motor of the EV, each array including at least two levels of modules electrically connected together to output an AC voltage signal including a superposition of output voltages from each of the at least two modules, where each of the modules includes an energy source and a converter, where a chassis of the EV has a first axis and a perpendicular second axis in a horizontal plane of the EV, where a first dimension of the chassis along the first axis is relatively longer than a second dimension of the chassis along the second axis, where the two subsystems are arranged in a pack configured to fit within the chassis, and where each module of the two subsystems has a first dimension aligned along the first axis and a second dimension aligned along the second axis, where the second dimension of each module is relatively smaller than the first dimension.

In some embodiments, for each array, a majority of modules of the array are aligned along the first axis. Each level of the arrays can be aligned along the second axis. The system can further include a plurality of interconnection modules arranged in staggered fashion at a first end of the pack.

In some embodiments, the first and second subsystems are configured to output power for the first and second motors at a second end of the pack.

In many embodiments, a modular energy system of an electric vehicle (EV) is provided, the system including: a first subsystem including three arrays configured to provide three-phase power to a first motor of the EV, each array including at least two levels of modules electrically connected together to output an AC voltage signal including a superposition of output voltages from each of the at least two modules, where each of the modules includes an energy source and a converter; a second subsystem including three arrays configured to provide three-phase power to a second motor of the EV, each array including at least two levels of modules electrically connected together to output an AC voltage signal including a superposition of output voltages from each of the at least two modules, where each of the modules includes an energy source and a converter; and a third subsystem including three arrays configured to provide three-phase power to a third motor of the EV, each array including at least two levels of modules electrically connected together to output an AC voltage signal including a superposition of output voltages from each of the at least two modules, where each of the modules includes an energy source and a converter, where a chassis of the EV has a first axis and a perpendicular second axis in a horizontal plane of the EV, where a first dimension of the chassis along the first axis is relatively longer than a second dimension of the chassis along the second axis, where the three subsystems are arranged in a pack configured to fit within the chassis, and where each module of the first and second subsystems has a first dimension aligned along the first axis and a second dimension aligned along the second axis, where the second dimension of each module is relatively smaller than the first dimension.

In some embodiments, each module of the third subsystems has a first dimension aligned along the first axis and a second dimension aligned along the second axis, where the second dimension of each module is relatively greater than the first dimension.

In some embodiments, the first subsystem is positioned on a left side of the EV in the second subsystem is positioned on a right side of the EV. The third subsystem is to the rear of the first and second subsystems. The first subsystem is configured to power a first motor for a front left wheel of the EV, the second subsystem is configured to power a second motor for a front right wheel of the EV, and the third subsystem is configured to power a third motor for rear wheels of the EV.

In some embodiments, the system further includes a plurality of interconnection modules positioned between the first and second subsystems.

In some embodiments, each array of the first and second subsystems is aligned along the second axis.

In some embodiments, each level of modules of the first and second subsystems is aligned along the first axis.

In some embodiments, a majority of modules of each array of the third subsystem subsystems are aligned along the first axis.

In some embodiments, a majority of levels of modules of the third subsystem are aligned along the second axis. A first level of modules of the third subsystem can be arranged in staggered fashion.

In many embodiments, a modular energy system of an electric vehicle (EV) is provided, the system including: four subsystems configured to provide three-phase power to four motors of the EV, each subsystem including three arrays, each array including at least two levels of modules electrically connected together to output an AC voltage signal including a superposition of output voltages from each of the at least two modules, where each of the modules includes an energy source and a converter, where a chassis of the EV has a first axis and a perpendicular second axis in a horizontal plane of the EV, where a first dimension of the chassis along the first axis is relatively longer than a second dimension of the chassis along the second axis, where the four subsystems are arranged in a pack configured to fit within the chassis, and where each module of the first and second subsystems has a first dimension aligned along the first axis and a second dimension aligned along the second axis, where the second dimension of each module is relatively smaller than the first dimension.

In some embodiments, the system further includes a plurality of interconnection modules aligned along the first axis.

In some embodiments, the four subsystems are a first subsystem, a second subsystem, a third subsystem, and a fourth subsystem, and where the four motors are a first motor, a second motor, a third motor, and a fourth motor, and the system further includes: a fifth subsystem configured to provide three-phase power to a fifth motor of the EV, the fifth subsystem including three arrays, each array including at least two levels of modules electrically connected together to output an AC voltage signal including a superposition of output voltages from each of the at least two modules, where each of the modules includes an energy source and a converter; and a sixth subsystem configured to provide three-phase power to a sixth motor of the EV, the sixth subsystem including three arrays, each array including at least two levels of modules electrically connected together to output an AC voltage signal including a superposition of output voltages from each of the at least two modules, where each of the modules includes an energy source and a converter.

In some embodiments, the chassis is a first chassis and the pack is a first pack, and the fifth and sixth subsystems are arranged in a second pack configured to fit within a second chassis of the EV movably coupled to the first chassis.

In many embodiments, a modular energy system of an electric vehicle (EV) is provided, the system including: four subsystems configured to provide three-phase power to four motors of the EV, each subsystem including three arrays, each array including at least two levels of modules electrically connected together to output an AC voltage signal including a superposition of output voltages from each of the at least two modules, where each of the modules includes an energy source and a converter, where a chassis of the EV has a first axis and a perpendicular second axis in a horizontal plane of the EV, where a first dimension of the chassis along the first axis is relatively longer than a second dimension of the chassis along the second axis, where the four subsystems are arranged in a pack configured to fit within the chassis, and where each module of the first and second subsystems has a first dimension aligned along the first axis and a second dimension aligned along the second axis, where the second dimension of each module is relatively greater than the first dimension.

In some embodiments, the system further includes a plurality of interconnection modules aligned along the second axis.

In some embodiments, the four subsystems are a first subsystem, a second subsystem, a third subsystem, and a fourth subsystem, and where the four motors are a first motor, a second motor, a third motor, and a fourth motor, and the system further includes: a fifth subsystem configured to provide three-phase power to a fifth motor of the EV, the fifth subsystem including three arrays, each array including at least two levels of modules electrically connected together to output an AC voltage signal including a superposition of output voltages from each of the at least two modules, where each of the modules includes an energy source and a converter; and a sixth subsystem configured to provide three-phase power to a sixth motor of the EV, the sixth subsystem including three arrays, each array including at least two levels of modules electrically connected together to output an AC voltage signal including a superposition of output voltages from each of the at least two modules, where each of the modules includes an energy source and a converter. The chassis can be a first chassis and the pack is a first pack, and the fifth and sixth subsystems can be arranged in a second pack configured to fit within a second chassis of the EV movably coupled to the first chassis.

The term "module" as used herein refers to one of two or more devices or sub-systems within a larger system. The module can be configured to work in conjunction with other modules of similar size, function, and physical arrangement (e.g., location of electrical terminals, connectors, etc.). Modules having the same function and energy source(s) can be configured identical (e.g., size and physical arrangement) to all other modules within the same system (e.g., rack or pack), while modules having different functions or energy source(s) may vary in size and physical arrangement. While each module may be physically removable and replaceable with respect to the other modules of the system (e.g., like wheels on a car, or blades in an information technology (IT) blade server), such is not required. For example, a system may be packaged in a common housing that does not permit removal and replacement any one module, without disassembly of the system as a whole. However, any and all embodiments herein can be configured such that each module is removable and replaceable with respect to the other modules in a convenient fashion, such as without disassembly of the system.

The term "master control device" is used herein in a broad sense and does not require implementation of any specific protocol such as a master and slave relationship with any other device, such as the local control device.

The term "output" is used herein in a broad sense, and does not preclude functioning in a bidirectional manner as both an output and an input. Similarly, the term "input" is used herein in a broad sense, and does not preclude functioning in a bidirectional manner as both an input and an output.

The terms "terminal" and "port" are used herein in a broad sense, can be either unidirectional or bidirectional, can be an input or an output, and do not require a specific physical or mechanical structure, such as a female or male configuration.

The term "nominal voltage" is a commonly used metric to describe a battery cell, and is provided by the manufacturer (e.g., by marking on the cell or in a datasheet). Nominal voltage often refers to the average voltage a battery cell outputs when charged, and can be used to describe the voltage of entities incorporating battery cells, such as battery modules and subsystems and systems of the present subject matter.

The term "C rate" is a commonly used metric to describe the discharge current divided by the theoretical current draw under which the battery would deliver its nominal rated capacity in one hour.

Different reference number notations are used herein. These notations facilitate the description of the present subject matter and do not limit the scope of that subject matter. Generally, a genus of elements is referred to with a number, e.g., "123", and a subgenus thereof is referred to with a letter appended to the number, e.g., 123A or 123B. References to the genus without the letter appendix (e.g., 123) refers to the genus as a whole, inclusive of all subgenuses. Some figures show multiple instances of the same element. Those elements may be appended with a number or a letter in a "–X" format, e.g., 123-1, 123-2, or 123-PA. This –X format does not imply that the elements must be configured identically in each instance, but is rather used to facilitate differentiation when referencing the elements in the figures. Reference to the genus 123 without the –X appendix broadly refers to all instances of the element within the genus.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

Processing circuitry can include one or more processors, microprocessors, controllers, and/or microcontrollers, each of which can be a discrete or stand-alone chip or distributed amongst (and a portion of) a number of different chips. Any type of processing circuitry can be implemented, such as, but not limited to, personal computing architectures (e.g., such as used in desktop PC's, laptops, tablets, etc.), programmable gate array architectures, proprietary architectures, custom architectures, and others. Processing circuitry can include a digital signal processor, which can be implemented in hardware and/or software. Processing circuitry can execute software instructions stored on memory that cause processing circuitry to take a host of different actions and control other components.

Processing circuitry can also perform other software and/or hardware routines. For example, processing circuitry can interface with communication circuitry and perform analog-to-digital conversions, encoding and decoding, other digital signal processing, multimedia functions, conversion of data into a format (e.g., in-phase and quadrature) suitable for provision to communication circuitry, and/or can cause communication circuitry to transmit the data (wired or wirelessly).

Any and all communication signals described herein can be communicated wirelessly except where noted or logically implausible. Communication circuitry can be included for wireless communication. The communication circuitry can be implemented as one or more chips and/or components (e.g., transmitter, receiver, transceiver, and/or other communication circuitry) that perform wireless communications over links under the appropriate protocol (e.g., Wi-Fi, Bluetooth, Bluetooth Low Energy, Near Field Communication (NFC), Radio Frequency Identification (RFID), proprietary protocols, and others). One or more other antennas can be included with communication circuitry as needed to operate with the various protocols and circuits. In some embodiments, communication circuitry can share antenna for transmission over links. RF communication circuitry can include a transmitter and a receiver e.g., integrated as a transceiver) and associated encoder logic.

Processing circuitry can also be adapted to execute the operating system and any software applications, and perform those other functions not related to the processing of communications transmitted and received.

Computer program instructions for carrying out operations in accordance with the described subject matter may be written in any combination of one or more programming languages, including an object oriented programming language such as Java, JavaScript, Smalltalk, C++, C#, Transact-SQL, XML, PHP or the like and conventional procedural programming languages, such as the "C" programming language or similar programming languages.

Memory, storage, and/or computer readable media can be shared by one or more of the various functional units present, or can be distributed amongst two or more of them (e.g., as separate memories present within different chips). Memory can also reside in a separate chip of its own.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory. The terms "non-transitory" and "tangible" as used herein, are intended to describe memory, storage, and/or computer readable media excluding propagating electromagnetic signals, but are not intended to limit the type of memory, storage, and/or computer readable media in terms of the persistency of storage or otherwise. For example, "non-transitory" and/or "tangible" memory, storage, and/or computer readable media encompasses volatile and non-volatile media such as random access media (e.g., RAM, SRAM, DRAM, FRAM, etc.), read-only media (e.g., ROM, PROM, EPROM, EEPROM, flash, etc.) and combinations thereof (e.g., hybrid RAM and ROM, NVRAM, etc.) and variants thereof.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that, the permissibility of each and every such combination and substitution will be readily recognized by those of ordinary skill in the art.

As used herein and in the appended claims, the singular forms "a," "an," and "the" include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

The invention claimed is:

1. A modular energy system controllable to supply power to a load, comprising:

three arrays, each array comprising at least two modules electrically connected together to output an AC voltage signal comprising a superposition of output voltages from each of the at least two modules, wherein each of the modules comprises an energy source and a converter;

a charge port configured to conduct a DC charge signal and a single phase AC charge signal; and routing circuitry connected between the charge port and the three arrays, wherein the routing circuitry is controllable to selectively route the DC charge signal to each of the three arrays when in a DC charge state, wherein the routing circuitry is controllable to selectively route the single phase AC charge signal to each of the three arrays when in an AC charge state, and wherein the routing circuitry comprises at least one switch that conducts the DC charge signal in the DC charge state and the AC charge signal in the AC charge state.

2. The system of claim 1, further comprising a control system communicatively coupled with the routing circuitry, wherein the control system is configured to control the routing circuitry to selectively route the DC charge signal or the single phase AC charge signal to each of the three arrays.

3. The system of claim 2, wherein the control system is communicatively coupled with each module of the three arrays and is configured to control the converter of each module to charge each module.

4. The system of claim 3, wherein the control system is configured to control the converter of each module according to a pulse width modulation or hysteresis technique.

5. The system of claim 3, wherein each module comprises monitor circuitry configured to monitor status information of the module, wherein each module is configured to output the status information to the control system, and wherein the control system is configured to control the converter of each module based on the status information.

6. The system of claim 5, wherein the status information relates to temperature and state of charge of the module, and wherein the control system is configured to control the converter of each module to balance temperature and state of charge of all modules of the arrays.

7. The system of claim 2, wherein the routing circuitry comprises a plurality of unidirectional solid-state relays controllable by the control system to selectively route the DC charge signal to each of the three arrays.

8. The system of claim 7, wherein the unidirectional solid-state relays are thyristors.

9. The system of claim 2, wherein the routing circuitry comprises a first port coupled with a DC+ line, a second port coupled with a DC− line, a third port coupled with a first array, a fourth port coupled with a second array, and a fifth port coupled with a third array, and comprises:

- a first thyristor coupled between the first port and the third port;
- a second thyristor coupled between the first port and the fourth port;
- a third thyristor coupled between the fourth port and the second port; and
- a fourth thyristor coupled between the fifth port and the second port,
- wherein the thyristors are controllable by the control system to selectively route the DC charge signal at the first port to either the third or fourth port, and to selectively route a signal at the fourth or fifth port to the second port.

10. The system of claim 9, wherein the routing circuitry comprises a sixth port coupled with a first AC line, a seventh port coupled with a second AC line, and comprises:

- a first diode coupled between the seventh port and the first and second thyristors;
- a second diode coupled between the sixth port and the first and second thyristors;
- a third diode coupled from the third and fourth thyristors to the sixth port; and
- a fourth diode coupled from the third and fourth thyristors to the seventh port.

11. The system of claim 2, wherein the routing circuitry comprises a plurality of bidirectional solid-state relays controllable by the control system to selectively route the DC charge signal or the single phase AC charge signal to each of the three arrays.

12. The system of claim 11, wherein the bidirectional solid-state relays are triacs.

13. The system of claim 2, wherein the routing circuitry comprises a first port configured to couple with a DC+ charge signal or a single phase AC line charge signal, a second port configured to couple with a DC− charge signal or a single phase AC neutral signal, a third port coupled with a first array, a fourth port coupled with a second array, and a fifth port coupled with a third array, and comprises:

- a first triac coupled between the first port and the third port;
- a second triac coupled between the first port and the fourth port;
- a third triac coupled between the fourth port and the second port; and
- a fourth triac coupled between the fifth port and the second port.

14. The system of claim 13, wherein the triacs are controllable by the control system to, in operation in the DC charge state, selectively route the DC charge signal at the first port to either the third or fourth port, and to selectively route a signal at the fourth or fifth port to the second port, and

- wherein the triacs are controllable by the control system to, in operation in a positive single phase AC charge state, selectively route the AC line charge signal at the first port to either the third or fourth port, and to selectively route a signal at the fourth or fifth port to the second port and, in operation in a negative single phase AC charge state, selectively route a signal at the second port two either the fourth or fifth port, and to selectively route a signal at the third or fourth port to the first port.

15. The system of claim 2, wherein the charge port is configured to conduct a three phase AC charge signal, and the routing circuitry comprises a plurality of bidirectional solid-state relays controllable by the control system to selectively route the DC or single phase AC charge signal to each of the three arrays.

16. The system of claim 15, wherein the plurality of bidirectional solid-state relays comprises triacs.

17. The system of claim 15, wherein the routing circuitry comprises a first port configured to receive a DC or AC charge signal, a second port configured to receive an AC charge signal, and a third port configured to receive a DC or AC charge signal, and further comprises:

- a first triac coupled between the first port and a first line connectable to a first array of the three arrays;
- a second triac coupled between the second port and a second line connectable to a second array of the three arrays;
- a third triac coupled between the third port and a third line connectable to a third array of the three arrays;
- a fourth triac coupled between the first and second lines; and
- a fifth triac coupled between the second and third lines.

18. The system of claim 1, further configured to selectively disconnect all modules and motors from a charge source.

19. The system of claim 2, wherein the three arrays are interconnected by at least one interconnection module.

20. The system of claim 19, wherein the control system is configured to control the at least one interconnection module to supply voltage for at least one auxiliary load when the system is in a charge state.

21. The system of claim 1, further comprising a control system communicably coupled with the routing circuitry, wherein the control system is configured to provide corresponding control signals to switches of the routing circuitry based on whether routing the DC charge signal or the AC charge signal to each of the three arrays, wherein the corresponding control signals when routing the DC charge signal to each of the three arrays is different from the corresponding control signals when routing the single phase AC charge signal to each of the three arrays.

* * * * *